US009693574B2

(12) United States Patent
Bromley

(10) Patent No.: US 9,693,574 B2
(45) Date of Patent: *Jul. 4, 2017

(54) COMPOSITIONS CONTAINING WATER-SOLUBLE DERIVATIVES OF VITAMIN E MIXTURES AND MODIFIED FOOD STARCH

(71) Applicant: VIRUN, INC., Pomona, CA (US)

(72) Inventor: Philip J. Bromley, Fullerton, CA (US)

(73) Assignee: Virun, Inc., Pomona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,880

(22) Filed: Aug. 1, 2014

(65) Prior Publication Data

US 2015/0110924 A1  Apr. 23, 2015

Related U.S. Application Data

(60) Provisional application No. 61/863,897, filed on Aug. 8, 2013.

(51) Int. Cl.
| A23L 1/30 | (2006.01) |
| A23L 1/0522 | (2006.01) |
| A23L 2/52 | (2006.01) |
| A23L 29/212 | (2016.01) |
| A23L 33/12 | (2016.01) |
| A23L 33/15 | (2016.01) |

(52) U.S. Cl.
CPC .............. *A23L 1/0522* (2013.01); *A23L 2/52* (2013.01); *A23L 29/212* (2016.08); *A23L 33/12* (2016.08); *A23L 33/15* (2016.08)

(58) Field of Classification Search
None
See application file for complete search history.

(56) References Cited

U.S. PATENT DOCUMENTS

| 2,661,349 A | 12/1953 | Caldwell et al. ............... 536/63 |
| 2,680,749 A | 6/1954 | Cawley et al. ............... 549/410 |
| 3,102,078 A | 8/1963 | Robeson et al. ............. 514/458 |
| 3,455,838 A | 7/1969 | Marotta et al. ............... 252/316 |
| 3,538,119 A | 11/1970 | Grant ............................ 549/410 |
| 4,035,235 A | 7/1977 | Richards ........................ 435/99 |
| 4,353,365 A | 10/1982 | Hallworth et al. ....... 128/203.15 |
| 4,460,617 A | 7/1984 | Barndt et al. ................ 426/471 |
| 4,524,769 A | 6/1985 | Wetterlin et al. ........ 128/203.15 |
| 4,665,204 A | 5/1987 | Wirth ............................ 549/410 |
| 4,670,285 A | 6/1987 | Clandinin et al. ............ 426/602 |
| 4,849,227 A | 7/1989 | Cho .............................. 424/498 |
| 4,916,163 A | 4/1990 | Ni ................................ 514/593 |
| 5,035,237 A | 7/1991 | Newell et al. ............ 128/203.15 |
| 5,167,950 A | 12/1992 | Lins ............................. 424/47 |
| 5,179,122 A | 1/1993 | Greene et al. ................ 514/458 |
| 5,239,993 A | 8/1993 | Evans et al. ............. 128/203.15 |
| 5,397,591 A | 3/1995 | Kyle et al. .................... 426/602 |
| 5,407,957 A | 4/1995 | Kyle et al. .................... 514/547 |
| 5,415,162 A | 5/1995 | Caspser et al. .......... 128/203.12 |
| 5,430,021 A | 7/1995 | Rudnic et al. ................ 514/10.1 |
| 5,492,938 A | 2/1996 | Kyle et al. .................... 514/786 |
| 5,583,105 A | 12/1996 | Kovacs et al. ................ 514/20.5 |
| 5,593,682 A | 1/1997 | Papas et al. .................. 424/401 |
| 5,597,595 A | 1/1997 | Dewille et al. ................ 426/74 |
| 5,580,553 A | 9/1997 | Billmers et al. ........... 424/78.17 |
| 5,672,699 A | 9/1997 | Billmers et al. ........... 424/78.17 |
| 5,711,983 A | 1/1998 | Kyle et al. .................... 426/635 |
| 5,715,810 A | 2/1998 | Armstrong et al. ...... 128/230.15 |
| 5,977,348 A | 11/1999 | Harris ........................ 536/123.1 |
| 6,037,466 A | 3/2000 | Maliczyszyn et al. ....... 536/102 |
| 6,045,826 A | 4/2000 | Borowy-Borowski et al. ............................. 424/451 |
| 6,086,915 A | 7/2000 | Zeligs et al. ................... 424/455 |
| 6,180,130 B1 | 1/2001 | Chen et al. ................... 424/439 |
| 6,193,985 B1 | 2/2001 | Sonne et al. .................. 424/400 |
| 6,265,717 B1 | 7/2001 | Sakata et al. ................. 250/289 |
| 6,267,985 B1 | 7/2001 | Chen et al. ................... 424/451 |
| 6,284,268 B1 | 9/2001 | Mishra et al. ................ 424/455 |
| 6,378,519 B1 | 4/2002 | Davies et al. ........... 128/203.21 |
| 6,391,370 B1 | 5/2002 | Rogers et al. ................ 426/611 |
| 6,455,512 B1 | 9/2002 | Ward et al. .................... 514/59 |
| 6,534,085 B1 | 3/2003 | Zeligs ........................... 424/451 |
| 6,632,443 B2 | 10/2003 | Borowy-Borowski et al. ............................. 424/400 |
| 6,689,387 B1 | 2/2004 | Zeligs ........................... 424/489 |
| 6,870,077 B2 | 3/2005 | Kenaschuk ................... 800/298 |

(Continued)

FOREIGN PATENT DOCUMENTS

| DE | 10 2005 049664 | 4/2007 |
| EP | 1 972 334 | 9/2010 |

(Continued)

OTHER PUBLICATIONS

U.S. Appl. No. 14/866,717, filed Sep. 25, 2015.
U.S. Appl. No. 14/866,724, filed Sep. 25, 2015.
U.S. Appl. No. 14/866,808, filed Sep. 25, 2015.
Letter/Written Disclosure of the Supplemental Information Disclosure Statement for the above-referenced application, filed herewith on Mar. 1, 2017, 2 pages.
Constantinides et al., "Advances in the use of tocols as drug delivery vehicles." Pharm. Res. 23(2):243-255 (2006).
Daniells, S. "Huge demand for omega-3 liquid products driving delivery innovations: Virun CEO," Nutraingredients-usa.com, Published on Mar. 20, 2014 [online] Retrieved from: <URL:nutraingredients-usa.com/content/view/print/899348 [retrieved on Jun. 2, 2014], 2 pages.

(Continued)

*Primary Examiner* — Patricia George
(74) *Attorney, Agent, or Firm* — Dentons US LLP; Stephanie Seidman

(57) ABSTRACT

Provided are compositions that contain a modified food starch and one or more non-polar compounds. In some instances, the compositions contain a water-soluble derivative of vitamin E mixture, containing relatively high concentrations of dimer forms of the PEG-derivative of vitamin E. Compositions include concentrates, dilution compositions and compositions for direct consumption. Methods for preparing the compositions also are provided.

41 Claims, No Drawings

(56) References Cited

U.S. PATENT DOCUMENTS

| | | | |
|---|---|---|---|
| 6,919,378 B2 | 7/2005 | Jacobs et al. | 514/618 |
| 6,977,166 B1 | 12/2005 | Ratledge et al. | 435/134 |
| 6,982,282 B2 | 1/2006 | Lambert et al. | 424/405 |
| 7,906,140 B2 | 3/2011 | Bromley et al. | 424/450 |
| 8,142,831 B2 | 3/2012 | Van Lengerich et al. | 426/443 |
| 8,252,322 B2 | 8/2012 | Trubiano et al. | 424/450 |
| 8,252,323 B2 | 8/2012 | Bromley | 424/450 |
| 8,282,977 B2 * | 10/2012 | Bromley | A61K 9/1075 426/443 |
| 8,337,931 B2 | 12/2012 | Bromley | 426/602 |
| 8,414,914 B2 | 4/2013 | Bromley et al. | 424/450 |
| 8,741,373 B2 | 6/2014 | Bromley | 514/560 |
| 8,765,661 B2 * | 7/2014 | Bromley | A61K 31/122 514/1 |
| 9,320,295 B2 | 4/2016 | Bromley | 424/94.1 |
| 9,351,517 B2 | 5/2016 | Bromley | 424/94.1 |
| 2003/0165572 A1 | 9/2003 | Auriou | 264/5 |
| 2004/0072330 A1 | 4/2004 | Ratledge et al. | 435/258.1 |
| 2004/0191296 A1 | 9/2004 | Sternberg | 424/423 |
| 2004/0219274 A1 | 11/2004 | Cook | 426/590 |
| 2005/0163828 A1 | 7/2005 | Bernard et al. | 525/411 |
| 2005/0208082 A1 | 9/2005 | Papas et al. | 424/400 |
| 2005/0281772 A1 | 12/2005 | Bromley et al. | 424/70.14 |
| 2006/0088558 A1 | 4/2006 | Jandzinski et al. | 424/400 |
| 2006/0165735 A1 | 7/2006 | Abril | 426/601 |
| 2006/0165769 A1 | 7/2006 | Hyatt et al. | 424/450 |
| 2007/0087104 A1 | 4/2007 | Chanamai | 426/602 |
| 2007/0141203 A1 | 6/2007 | Cook et al. | 426/72 |
| 2007/0141224 A1 | 6/2007 | Zawistowski | 426/611 |
| 2007/0166411 A1 | 7/2007 | Anthony et al. | 424/750 |
| 2007/0172513 A1 | 7/2007 | Trubiano et al. | 424/439 |
| 2007/0184117 A1 | 8/2007 | Gregory et al. | 424/489 |
| 2007/0298083 A1 | 12/2007 | Mehansho et al. | 426/590 |
| 2007/0298156 A1 | 12/2007 | Mehansho et al. | 426/590 |
| 2008/0058418 A1 | 3/2008 | D'Angelo et al. | 514/560 |
| 2008/0233056 A1 | 9/2008 | Berl | 424/49 |
| 2008/0254188 A1 | 10/2008 | Borowy-Borowski et al. | 424/400 |
| 2008/0311255 A1 | 12/2008 | Feltes et al. | 426/98 |
| 2009/0018186 A1 | 1/2009 | Chen et al. | 426/590 |
| 2009/0105331 A1 | 4/2009 | Schaffner et al. | 514/458 |
| 2009/0297491 A1 | 12/2009 | Bromley | 424/94.1 |
| 2009/0297665 A1 | 12/2009 | Bromley | 426/72 |
| 2009/0317532 A1 | 12/2009 | Bromley | 426/590 |
| 2010/0041622 A1 | 2/2010 | Bromley et al. | 514/52 |
| 2010/0080785 A1 | 4/2010 | Berl | 424/94.1 |
| 2010/0104730 A1 | 4/2010 | Mehansho et al. | 426/590 |
| 2010/0166915 A1 | 7/2010 | Mathisen et al. | 426/477 |
| 2010/0260913 A1 | 10/2010 | Horlacher et al. | 426/546 |
| 2010/0279413 A1 | 11/2010 | Fain | 435/406 |
| 2010/0284987 A1 | 11/2010 | Diguet et al. | 424/94.4 |
| 2011/0002905 A1 | 1/2011 | Chen et al. | 424/94.1 |
| 2011/0015266 A1 | 1/2011 | Hanefeld et al. | 252/363.5 |
| 2011/0020520 A1 | 1/2011 | Van Lengerich et al. | 426/546 |
| 2011/0081330 A1 | 4/2011 | Hitzfeld et al. | 424/94.1 |
| 2011/0097279 A1 | 4/2011 | Tamarkin et al. | 424/45 |
| 2011/0117184 A1 | 5/2011 | Bromley | 424/450 |
| 2011/0130562 A1 | 6/2011 | Berl | 540/604 |
| 2011/0135745 A1 | 6/2011 | Mathisen et al. | 424/522 |
| 2011/0184194 A1 | 7/2011 | Berl | 549/410 |
| 2011/0236364 A1 | 9/2011 | Bromley | 424/94.1 |
| 2012/0016026 A1 | 1/2012 | Bromley | 514/560 |
| 2012/0083530 A1 | 4/2012 | Mai et al. | 514/560 |
| 2012/0093998 A1 | 4/2012 | Voelker et al. | 426/590 |
| 2012/0251685 A1 | 10/2012 | Wang-Nolan et al. | 426/250 |
| 2012/0259023 A1 | 10/2012 | Hitzfeld et al. | 514/778 |
| 2012/0308644 A1 | 12/2012 | Bromley et al. | 424/450 |
| 2013/0017183 A1 | 1/2013 | Bromley | 424/94.1 |
| 2013/0017295 A1 | 1/2013 | Bromley | 426/66 |
| 2013/0309362 A1 | 11/2013 | Bromley | 424/72 |
| 2014/0039052 A1 | 2/2014 | Borowy-Borowski et al. | 514/560 |
| 2014/0086993 A1 * | 3/2014 | Guth et al. | A61K 47/22 424/489 |
| 2014/0227242 A1 | 8/2014 | Bromley et al. | 424/94.1 |
| 2014/0242055 A1 | 8/2014 | Bromley | 424/94.1 |
| 2014/0271593 A1 | 9/2014 | Bromley | 424/94.1 |
| 2016/0081927 A1 | 3/2016 | Bromley | 424/439 |
| 2016/0081975 A1 | 3/2016 | Bromley | 424/464 |
| 2016/0081976 A1 | 3/2016 | Bromley | 424/456 |
| 2016/0193146 A1 | 7/2016 | Bromley | 424/94.1 |
| 2016/0227832 A1 | 8/2016 | Bromley | 424/94.1 |

FOREIGN PATENT DOCUMENTS

| | | |
|---|---|---|
| WO | WO 95/31217 | 11/1995 |
| WO | WO 96/36316 | 11/1996 |
| WO | WO 98/08490 | 3/1998 |
| WO | WO 00/23545 | 4/2000 |
| WO | WO 02/17879 | 3/2002 |
| WO | WO 02/076970 | 10/2002 |
| WO | WO 2004/098311 | 11/2004 |
| WO | WO 2007/080515 | 7/2007 |
| WO | WO 2009/117152 | 9/2009 |
| WO | WO 2011/040141 | 4/2011 |
| WO | WO 2011/149854 | 12/2011 |
| WO | WO 2013/032934 | 3/2013 |

OTHER PUBLICATIONS

Gander, P. "Sea changes," published Nov. 5, 2013, [online] retrieved from: <URL:foodmanufacture.co.uk/content/view/print/843822 [retrieved Dec. 17, 2013], 2 pages.

Ling, X., "Research on the Preparation of Natural Vitamin E Derivatives," Wufang Database, published Sep. 18, 2006 [English abstract and main document in Chinese], 67 pages.

Partial Translation of Ling, X., "Research on the Preparation of Natural Vitamin E Derivatives," Wufang Database, Published on Sep. 18, 2006, 15 pages.

Press Release: "DSM: 'Consumers are searching for new ways to add omega-3s into their diet'," Published on Jul. 27, 2015 [online] Retrieved from: <URL:nutraingredients-usa.com/content/view/print/1145391 [retrieved on Nov. 4, 2015], 2 pages.

Press Release: "Hormel Foods Specialty Products Division and VIRUN®, Granted U.S. Pat. No. 8,741,373," published Jul. 9, 2014 [online] Retrieved from: <URL:pr.com/press-release/569191 [retrieved on Aug. 20, 2014], 3 pages.

Press Release: "Virun and Vital Pharmaceuticals expand operations," Published on Oct. 31, 2013, Retrieved from: <URL:bevnet.com/news/supplier-news/2013/virun-and-vital-pharmaceuticals-expand-operations/ [retrieved on Dec. 17, 2013], 2 pages.

Press Release: "VIRUN NutraBIOsciences™, Leader in Cognitive-Functional-Ingredients, to Sponsor Cognitive Health Forum at NutraIngredients—USA," Published on May 13, 2014 [online] Retrieved from: <URL:pr.com/press-release/557966 [retrieved on Jun. 2, 2014], 3 pages.

Press Release: "We All Want to Live in a Yellow Submarine at Virun's SupplySide West Booth," Published on Sep. 15, 2016 [online] Retrieved from <URL: pr.com/press-release/687560 [retrieved on Nov. 22, 2016], 3 pages.

Tadros, T. "Emulsion Science and Technology: A General Introduction." Emulsion Science and Technology. Ed. T. Tadros. Wienheim: Wiley-VCH, 2009, pp. 1-56.

Virun Facebook Page [online] Retrieved from: <URL: facebook.com/Virun-168007462662/?fref=ts [retrieved on May 31, 2016], 6 pages.

Virun Facebook Page [online] Retrieved from: <URL: facebook.com/viruninnovations/ [retrieved on Dec. 14, 2016], 25 pages.

Virun home Webpage found at www.virun.com [ accessed on Mar. 24, 2011], 49 pages.

Virun, "Virun Omega 3 Fortified Foods and Beverages," retrieved from the Internet:<URL: slideshare.net/virun/virun-omega-3-fortified-foods-and-beverages, [retrieved on May 7, 2010], 15 pages.

Appellant's Reply Brief, filed Jun. 8, 2016, in connection with U.S. Reexamination No. 90/012,700, 42 pages.

Response, filed Jul. 15, 2016, to International Search Report and Written Opinion, issued Jan. 5, 2016, in connection with International Patent Application No. PCT/US2015/051097, 52 pages.

(56) References Cited

OTHER PUBLICATIONS

Response, filed Jul. 18, 2016, to International Search Report and Written Opinion, issued Dec. 15, 2015, in connection with International Patent Application No. PCT/US2015/051083, 35 pages.
Written Opinion, issued Sep. 2, 2016, in connection with International Patent Application No. PCT/US2015/051083, 11 pages.
Written Opinion, issued Sep. 26, 2016, in connection with International Patent Application No. PCT/US2015/051097, 7 pages.
Office Action, issued Aug. 29, 2016, in connection with Chinese Patent Application No. 201480027972.8 [Original document in the Chinese language and English translation], 36 pages.
Office Action (Communication pursuant to Rule 94(3) EPC), issued Oct. 6, 2016, in connection with European Patent Application No. 14726228.1 [D1=WO2013/120025, D2=US2011/236364, D4=US2008/254188], 4 pages.
Response, filed Nov. 2, 2016, to Written Opinion, issued Sep. 2, 2016, in connection with International Patent Application No. PCT/US2015/051083, 28 pages.
Judgment, issued Nov. 10, 2016, in connection with U.S. Reexamination No. 90/012,700, U.S. Court of Appeals for the Federal Circuit, Appeal No. 16-1280, In re: Virun, Inc., 5 pages.
Response, filed Nov. 28, 2016, to Written Opinion, issued Sep. 26, 2016, in connection with International Patent Application No. PCT/US2015/051097, 49 pages.
Office Action, issued Nov. 29, 2016, in connection with Japanese Patent Application No. 2016-501718 [English summary, original document in Japanese, and English translation], 11 pages.
Office Action, issued Dec. 14, 2016, in connection with U.S. Appl. No. 14/866,808, 11 pages.
International Preliminary Report on Patentability, issued Dec. 15, 2016, in connection with International Patent Application No. PCT/US2015/051083, 11 pages.
Examination Report, issued Jan. 20, 2017, in connection with Australian Patent Application No. 2014235283, 2 pages.
Response, filed Feb. 7, 2017, to Office Action, issued Oct. 6, 2016, in connection with European Patent Application No. 14726228.1, 9 pages.
International Preliminary Report on Patentability, issued Feb. 7, 2017, in connection with International Patent Application No. PCT/US2015/051097, 7 pages.
Response, filed Feb. 22, 2017, to Office Action, issued Nov. 29, 2016, in connection with Japanese Patent Application No. 2016-501718 [document as filed in the Japanese language and English translation], 12 pages.
Letter/Written Disclosure of the Supplemental Information Disclosure Statement for the above-referenced application, filed herewith on Mar. 20, 2017, 2 pages.
Office Action, issued Mar. 8, 2017, in connection with U.S. Appl. No. 14/866,724, 9 pages.
Office Action, issued Mar. 9, 2017, in connection with U.S. Appl. No. 14/866,717, 10 pages.
Notice of Intent to Issue Ex Parte Reexamination Certificate, issued Mar. 10, 2017, in connection with U.S. Appl. No. 90/012,700, 5 pages.
U.S. Appl. No. 60/887,754, filed Feb. 1, 2007, Borowy-Borowski et al.
Letter/Written Disclosure of the Information Disclosure Statement for the above-referenced application, mailed on Feb. 2, 2015, 2 pages.
"Alpha-Tocopherol Polyethylene glycol Succinate (TPGS)," Pure Matters website [online][retrieved on Feb. 26, 2013] Retrieved from:<URL:resources.purematters.com/herbs-supplements/a/alpha-tocopherol-polyethylene-glycol-succinate-tpgs [2 pages].
*Analytical Chemistry an Introduction* 6th Ed., Skoog et al. eds., Chapters 22, "Applications of molecular absorption spectroscopy," (pp. 421-442) and 27, "Applications of chromatography," (pp. 509-530) (1994).
Antares Health Products "Vitamin-E TPGS," product brochure distributed at SupplySide Trade Show Oct. 22, 2008, 2 pages.

Argao et al., "d-Alpha-tocopheryl polyethylene glycol-1000 succinate enhances the absorption of vitamin D in chronic cholestatic liver disease of infancy and childhood," Ped. Res. 31(2):146-150 (1992).
Boukley, B, "Straight Dope: Canna Energy hemp oil drink scores sales high," Beveragedaily.com Published on Apr. 2, 2014 [online][retrieved on Jun. 2, 2014] Retrieved from:<URL:beveragedaily.com/content/view/print/905372 [2 pages].
Boukley, B. "'Next Generation' Omega-3 sports drink set to hydrate America" Beveragedaily.com Aug. 1, 2013 [online] Retrieved from:<URL:beveragedaily.com/content/view/print/804977 [accessed on Aug. 16, 2013], 2 pages.
Boukley, B. "Runaway Omega-3 beverage demand 'can be scary'—Virun CEO" Beveragedaily.com Dec. 20, 2013 [online] Retrieved from:<URL:beveragedaily.com/content/view/print/711158 [accessed on Aug. 16, 2013], 2 pages.
Boukley, B. "Searching for the Holy Grail: Science-backed functional beverages" Beveragedaily.com Mar. 3, 2013 [online] [retrieved at Retrieved from:<URL:beveragedaily.com/content/view/print/749075] [accessed on Aug. 16, 2013], 2 pages.
Boukley, B. "Stepan Lipid Nutrition and Virun paint bold brushstrokes on clear beverage 'canvas'," Beveragedaily.com Apr. 11, 2013 [online] Retrieved from:<URL:beveragedaily.com/content/view/print/761692 [accessed on Aug. 16, 2013], 2 pages.
Boukley, B. "Time for a Change . . . Cola? US firm heralds healthy cola revolution," Beveragedaily.com Apr. 30, 2013 [online] [retrieved at Retrieved from:<URL:beveragedaily.com/content/view/print/769020] [accessed on Aug. 16, 2013], 2 pages.
Bromley, P., "Nanotechnology and nonpolar active compounds in functional foods: An application note," Chapter 39, *Bio-Nanotechnology: A Revolution in Food, Biomedical and Health* Sciences (eds., Bagchi et al.), Blackwell Publishing Ltd., Oxford, UK., pp. 697-703 (2013).
Certified English translation of German patent DE 10 2005 049664, published Apr. 19, 2007, entitled: "Liquid Composition and Method for its Production," Inventor—Haller, 9 pages.
Certified English translation of International Patent WO 2011/040141, published Apr. 7, 2011, entitled: "Composition Containing Fat-soluble Vitamin," Inventor—Kondo, 17 pages.
Christiansen et al., "Investigating the stability of the nonionic surfactants tocopheryl polyethylene glycol succinate and sucrose laurate by HPLC-MS, DAD, and CAD," J. Pharm. Sci. 100(5):1773-1782 (2011).
Collnot et al., "Influence of vitamin E TPGS poly(ethylene glycol) chain length on apical efflux transporters in Caco-2 cell monolayers," J. Controlled Release 111:35-40 (2006).
Covington, M., "Omega-3 fatty acids," American Family Physician 70(1):133-140 (2004).
*CRC Handbook of Chemistry and Physics*, Lide, D., ed., 82nd edition, Cleveland, OH:CRC Press 15(14)-15(18) (2001).
Eastman PCI-102B Publication, "Vitamin E TPGS NF—Applications and Properties," Eastman Chemical Company, Oct. 2005 [24 pages].
Ernst, E., "The risk-benefit profile of commonly used herbal therapies: Ginkgo, St. John's Wort, Ginseng, Echinacea, Saw Palmetto, and Kava," Ann Intern Med. 136(1):42-53 (2002).
Fan, Y. and R. Chapkin, "Importance of dietary γ-linolenic acid in human health and nutrition," Journal of Nutrition 128(9):1411-1414 (1998).
Giddings et al., "High pressure gas chromatography of nonvolatile species. Compressed gas is used to cause migration of intractable solutes," Science, 162:67-73 (1968).
Goodrum et al., "Gum arabic glycoprotein contains glycomodules of both extensin and arabinogalactan-glycoproteins," Phytochemistry 54(1):99-106 (2000).
Gordon, A. and A. Shaughnessy, "Saw palmetto for prostate disorders," American Family Physician 67(6):1281-1283 (2003).
Griffin, W., "Classification of surface-reactive agents by HLB," J. Soc. Cos. Chem. 1:311-326 (1949).
Gutmann, V., "Solvent effects on the reactivities of organometallic compounds," Coord. Chem. Rev. 18:225-255 (1976).

(56) References Cited

OTHER PUBLICATIONS

Hegenbart, S. "Understanding Starch Functionality" [online]Retrieved from:<URL:foodproductdesign.com/articles/1996/01/understanding-starch-functionality.aspx] [accessed on Aug. 20, 2014], 4 pages.
Higgins, K., "Emerging plant technologies help processors make better beverages," Published 2013 [online][retrieved on Dec. 17, 2013] Retrieved from:<URL:foodprocessing.com/articles/2013/beverage-technology/?show=all, 3 pages.
Idris et al., "Characterisation of gum from Acacia senegal trees of different age and location using multidetection gel permeation chromatography," Food Hydrocolloids 12(4):379-388 (1998).
Islam et al., "A review of recent developments on the regulatory, structural and functional aspects of gum arabic," Food Hydrocolloids 11(4):493-505 (1997).
Kong et al., "Direct quantification of mono- and di-D-α-tocopherol polyethylene glycol 1000 succinate by high performance liquid chromatography." J. Chromatography A 1218:8664-8671 (2011).
Kosower, E., "2.6 solvent polarity: empirical measures," found in *An Introduction to Physical Organic Chemistry*, New York:Wiley, p. 293 (1969).
Lands, W., "Biochemistry and physiology of n-3 fatty acids," The FASEB Journal, 6(8):2530-2536 (1992).
Li et al., "δ-tocopherol is more active than α- or γ-tocopherol in inhibiting lung tumorigenesis in vivo." Cancer Prev. Res. (Phila.) 4(3):404-413 (2011).
Light, J.M., "Modified Foot Starches: Why, What, Where and How" [online] Retrieved from:<URL:scribd.com/doc/198479392/Modified-Food-Starches] [accessed on Jul. 29, 2013] AACC's 74th Annual Meeting in Washington, DC, Oct. 29-Nov. 2, 1989, 20 pages.
Lipshutz et al. "TPGS-750-M: a second-generation amphiphile for metal-catalyzed cross-couplings in water at room temperature." J. Org. Chem. 76(11):4379-4391 (2011).
Lowery et al., "2.4 Solutions," found in *Mechanism and Theory in Organic Chemistry*, Harper Collins Publishers, 3rd ed., p. 177 (1987).
N-Creamer™ 46 Features Sheet, Ingredion, Jan. 10, 2012, 2 pages.
N-Creamer™ 46 Material Safety Data Sheet, Ingredion, Sep. 26, 2012, 5 pages.
N-Creamer™ 46 Technical Services Bulletin, National Starch Food Innovation, [online] [available at https://www.yumpu.com/en/document/view/12279502/technical-service-bulletin-n-creamer-tm-46] [accessed on Jun. 6, 2013], 2 pages.
NutraBIOsciences™ food-beverage technology evolved product brochure, published May 21, 2014 [online] Retrieved from:<URL:beveragedaily.com/smartlead/view/918190/4/NutraBIOsciences-food-beverage-technology-evolved] [accessed on Jun. 2, 2014], 3 pages.
Offer for Sale, "Kaneka Liquid CoQ10" formulation, to Kaneka Nutrients L.P., Pasadena, TX, on Jun. 22-27, 2007, 2 pages.
Perry, R. and D. Green, *Perry's Chemical Engineers' Handbook*, Sixth Edition, New York:McGraw-Hill, pp. 20-54 to 20-57 (1984).
Press Release, "OmegaH2O® clear shelf stable Omega-3, CoQ10 and other non polar compounds U.S. Appl. No. 12/383,244 approved in Europe and Notice of Allowance in U.S.," Published on Jun. 4, 2012 [online] Retrieved from:<URL:pr.com/press-release/417599 [4 pages].
Press Release: "VIRUN® & Pacific Deep Ocean Biotech Combine Natural Mineral Complexes with OmegaH2O® EPA and DHA for Foods, Beverages & Supplements" Jun. 18, 2014 [online] [retrieved at http://www.pr.com/press-release/565168] [accessed on Aug. 20, 2014], 2 pages.
Randall et al., "The role of the proteinaceous component on the emulsifying properties of gum arabic," Food Hydrocolloids 2(2):131-140 (1988).
Ross et al., "Omega-3 fatty acids as treatments for mental illness: which disorder and which fatty acid?," Lipids in Health and Disease 6:21 pp. 1-19 (2007).
Schultz, H. "PQQ set to make splash in sports nutrition beverages," nutraingredients-usa.com Aug. 6, 2013 [online] [retrieved at http://www.nutraingredients-usa.com/content/view/print/807624] [accessed on Aug. 16, 2013], 2 pages.
Scientific Panel of the European Food Safety Authority, "Opinion of the Scientific Panel on Food Additives, Flavourings, Processing Aids and Materials in Contact with Food on a request from the Commission related to D-alpha-tocopheryl polyethylene glycol 1000 succinate (TPGS) in use for food for partic ular nutritional purposes." EFSA J. 490:1-20 (2007).
Sheu et al.,"Influence of micelle solubilization by tocopheryl polyethylene glycol succinate (TPGS) on solubility enhancement and percutaneous penetration of estradiol." J. Controlled Release 88:355-368 (2003).
Snyder, L., "Classification of the solvent properties of common liquids," J. Chromatography A 92:223-230 (1974).
Starling, S., "Virun debuts shelf-stable, H20 soluble, nanotech omega-3," Published on Mar. 12, 2009 [online] Retrieved from:<URL:beveragedaily.com/Products/Virun-debuts-shelf-stable-H20-soluble-nanotech-omega-3 [1 page].
Swern, D., *Bailey's Industrial Oil and Fat Products*, vol. 1, 4th edition. John Wiley & Sons, New York, p. 387-391, 424-428 (1979).
US Pharmacopeia NF-30, Vitamin E Polyethylene Glycol Succinate, pp. 2013-2015 (2012).
Varma et al. "Enhanced oral paclitaxel absorption with vitamin E-TPGS: effect on solubility and permeability in vitro, in situ and in vivo." Eur. J. Pharm. Sci. 25(4-5):445-453 (2005).
Virun Clear Water Soluble Omega-3 DHA, EPA & ALA for Foods & Beverages, Copyright 2009 [online] Retrieved from:<URL:slideshare.net/virun/virun-food-beverage-division-v2 accessed on May 11, 2009], 6 pages.
Virun Esolv technology Webpage, Retrieved from:<URL:virun.com/omega2.htm [accessed Jun. 2, 2014], 1 page.
Virun Facebook Page Retrieved from:<URL:facebook.com/pages/Virun/168007462662 [accessed on Jun. 2, 2014], 14 pages.
Virun Facebook Page, Retrieved from:<URL:facebook.com/pages/Virun/168007462662, [accessed on Aug. 16, 2013], 8 pages.
Virun Facebook Page, Retrieved from:<URL:facebook.com/pages/Virun/168007462662, [accessed on Dec. 17, 2013], 6 pages.
Virun home Webpage Retrieved from:<URL:virun.com [accessed on May 1, 2013], 22 pages.
Virun Improving Life Through Safe & Effective Oral Delivery, Copyright 2009 [online][retrieved on May 11, 2009] Retrieved from:<URL:slideshare.net/virun/virun-improving-life-through-safe-effective-oral- [15 pages].
Virun Intricate Science; found at www.slideshare.net/virun/virun-intricate-science [accessed May 25, 2011], 22 pages.
Virun on slideshare.net, Philip Bromley's Presentations on SlideShare found at: www.slideshare.net/virun [accessed on May 8, 2009], 2 pages.
Virun Pharmaceutical & Food Beverage Divisions, Copyright 2009 [online][retrieved on May 11, 2009] Retrieved from:<URL:slideshare.net/virun/virun-food-beverage-divisions [9 pages].
Virun Product Sheet "Clear oils for water based beverages," Jan. 16, 2009, 4 pages.
Watson, E., "Think you need to pop pills to get a decent dose of omega-3? Think again, say Hormel and Virun" [online] Retrieved from:<URL:usa.com/Suppliers2/Hormel-Virun-patent-new-way-to-add-omega-3s-to-foods-beverages] [accessed on Aug. 20, 2014] 5 pages.
Yu et al. "Vitamin E-TPGS increases absorption flux of an HIV protease inhibitor by enhancing its solubility and permeability," Pharm. Res. 16:1812-1817 (1999).
Zhao et al. "Enhanced oral bioavailability of paclitaxel formulated in vitamin E-TPGS emulsified nanoparticles of biodegradable polymers: in vitro and in vivo studies," J. Pharm. Sci. 99(8):3552-3560 (2010).
International Search Report/Written Opinion, issued Jul. 3, 2009, in connection with International Application No. PCT/US2009/001775, 15 pages.

(56) References Cited

OTHER PUBLICATIONS

Response to Written Opinion, submitted Jan. 19, 2010, in connection with International Patent Application No. PCT/US2009/001775, 35 pages.
International Search Report/Written Opinion, issued Apr. 7, 2010, in connection with International Patent Application No. PCT/US2009/001774, 15 pages.
International Preliminary Report on Patentability, issued Jun. 11, 2010, in connection with International Patent Application No. PCT/US2009/001775, 18 pages.
Response to Written Opinion, submitted Jul. 7, 2010, in connection with International Patent Application No. PCT/US2009/001774, 37 pages.
International Preliminary Report on Patentability, issued Sep. 3, 2010, in connection with International Patent Application No. PCT/US2009/001774, 15 pages.
Examination Report, issued Mar. 7, 2011, in connection with European Patent Application No. 09722985.0, 6 pages.
International Search Report and Written Opinion, issued Jul. 22, 2011, for International Application No. PCT/US2011/000538, 11 pages.
Restriction Requirement, issued Sep. 6, 2011, in connection with U.S. Appl. No. 12/383,241, 6 pages.
Response to Examination Report, submitted Sep. 16, 2011, in connection with European Patent Application No. 09722985.0, 8 pages.
International Search Report and Written Opinion, issued Sep. 26, 2011, in connection with International Application No. PCT/US2011/001099, 9 pages.
Office Action, issued Oct. 4, 2011, in connection with U.S. Appl. No. 12/383,244, 13 pages.
Intention to Grant European patent, issued Nov. 8, 2011, in connection with European Patent Application No. 09723157.5, 4 pages.
Examination Report, issued Dec. 19, 2011, in connection with European Patent Application No. 09722985.0, 4 pages.
Response to Written Opinion, submitted Jan. 23, 2012, in connection with International Application No. PCT/US2011/000538, 9 pages.
Translation of Office Action, issued Feb. 8, 2012, in connection with Chinese patent Application No. 200980118257.4, 2 pages.
Response to Restriction Requirement, submitted Mar. 6, 2012, in connection with U.S. Appl. No. 12/383,241, 11 pages.
Examiner's Report, issued Mar. 28, 2012, in connection with Canadian Patent Application No. 2,715,018, 2 pages.
Examiner's Report, issued Mar. 28, 2012, in connection with Canadian Patent Application No. 2,718,231, 3 pages.
Response to Office Action, submitted Apr. 4, 2012, in connection with U.S. Appl. No. 12/383,244, 16 pages.
Office Action, issued Apr. 4, 2012, in connection with U.S. Appl. No. 12/383,241, 12 pages.
Response to Examination Report, submitted Apr. 5, 2012, in connection with European Patent Application No. 09722985.0, 60 pages.
Response to Examiner's Report, submitted Apr. 17, 2012, in connection with Canadian Patent Application No. 2,715,018, 7 pages.
Decision to Grant, issued Apr. 19, 2012, in connection with European Patent Application No. 09723157.5, 1 pages.
Response to Written Opinion, submitted Apr. 23, 2012, in connection with International Application No. PCT/US2011/001099, 10 pages.
PCT Communication, issued Apr. 25, 2012, in connection with International Patent Application No. PCT/US2011/000538, 4 pages.
Notice of Allowance, issued May 30, 2012, in connection with U.S. Appl. No. 12/383,244, 5 pages.
Communication reporting grant, issued May 16, 2012, of European Patent Application No. 09723157.5, 2 pages.
Notice of Allowance, issued May 17, 2012 in connection with Canadian Patent Application No. 2,715,018, 1 page.
Translation of Office Action, issued May 31, 2012, in connection with Chinese Patent Application No. 200980118258.9, 1 page.

Second Written Opinion, issued Jun. 1, 2012 in connection with International Patent Application No. PCT/US2011/001099, 5 pages.
Response to Examiner's Report, submitted Jun. 8, 2012, in connection with Canadian Patent Application No. 2,718,231, 18 pages.
Itention to Grant European patent, issued Jun. 15, 2012, in connection with European Patent Application No. 09722985.0, 5 pages.
Response to PCT Communication, submitted Jun. 25, 2012, in connection with International Patent Application No. PCT/US2011/000538, 5 pages.
International Preliminary Report on Patentability, issued Jul. 16, 2012, in connection with International Patent Application No. PCT/US2011/000538, 12 pages.
Response to Office Action, submitted Jul. 16, 2012, and Instructions for response to Office Action, in connection with Chinese patent Application No. 200980118257.4, 27 pages.
Response to Office Action, submitted Jul. 30, 2012, in connection with U.S. Appl. No. 12/383,241, 16 pages.
Response to Written Opinion, submitted Aug. 1, 2012 in connection with International Patent Application No. PCT/US2011/001099, 5 pages.
Examination Report, issued Aug. 17, 2012, in connection with Canadian Patent Application No. 2,718,231, 2 pages.
International Preliminary Report on Patentability, issued Aug. 20, 2012, in connection with International Patent Application No. PCT/US2011/001099, 6 pages.
Final Office Action, issued Aug. 21, 2012, in connection with U.S. Appl. No. 12/383,241, 17 pages.
Response to Examination Report, submitted Aug. 29, 2012, in connection with Canadian Patent Application No. 2,718,231, 11 pages.
Office Action, issued Sep. 6, 2012, in connection with U.S. Appl. No. 13/065,510, 22 pages.
Third Party Reexamination Request, submitted Oct. 9, 2012, in connection with U.S. Pat. No. 8,282,977, 148 pages.
Response to Office Action, submitted Oct. 15, 2012, in connection with Chinese Patent Application No. 200980118258.9, 17 pages.
Notice of Allowance, issued Nov. 7, 2012, in connection with Canadian Patent Application No. 2,718,231, 2 pages.
Decision to Grant, issued Nov. 8, 2012, in connection with European Patent Application No. 09722985.0, 2 pages.
Office communication, issued Nov. 14, 2012, in connection with U.S. Appl. No. 90/012,700, 3 pages.
Translation of Office Action, issued Nov. 15, 2012, in connection with Israeli Patent Application No. 208133, 3 pages.
Extended European Search Report, issued Dec. 5, 2012, in connection with European Patent Application No. 12188577.6, 7 pages.
Order Granting Request for Ex Parte Reexamination, issued Dec. 10, 2012, in connection with U.S. Appl. No. 90/012,700, 17 pages.
Restriction Requirement, issued Jan. 3, 2013, in connection with U.S. Appl. No. 13/134,927, 7 pages.
Office Action, issued Jan. 5, 2013, and translation, in connection with Chinese Patent Application No. 200980118257.4, 8 pages.
Response to Restriction Requirement, submitted Jan. 16, 2013, in connection with U.S. Appl. No. 13/134,927, 8 pages.
Notice of Appeal, submitted Feb. 21, 2013, in connection with U.S. Appl. No. 12/383,241, 1 page.
Office Action, issued Mar. 4, 2013, in connection with U.S. Appl. No. 90/012,700, 40 pages.
Office Action, issued Mar. 4, 2013, and translation, in connection with Chinese Patent Application No. 200980118258.9, 11 pages.
Response to Office Action, submitted Mar. 6, 2013, in connection with U.S. Appl. No. 13/065,510, 24 pages.
Response to Office Action, submitted Mar. 20, 2013, and instructions for response, in connection with Chinese Patent Application No. 200980118257.4, 17 pages.
Office Action, issued Mar. 26, 2013, in connection with with U.S. Appl. No. 13/134,927, 22 pages.
Office Action, issued Mar. 27, 2013, in connection with Mexican Patent Application No. MX/a/2010/010050, 9 pages.
Response to Office Action, submitted May 6, 2013, in connection with U.S. Appl. No. 90/012,700, 88 pages.

(56) References Cited

OTHER PUBLICATIONS

Response to Office Action, submitted May 15, 2013, and instructions for response, in connection with Mexican Patent Application No. MX/a/2010/010050, 16 pages.
International Search Report and Written Opinion, issued May 29, 2013, in connection with International Patent Application No. PCT/US2013/025445, 11 pages.
Foreign Associate Communication, received Jun. 17, 2013, reporting Notice of Allowance, in connection with Mexican Patent Application No. MX/a/2010/010050, 1 page.
Request for Continued Examination and Preliminary Amendment filed in response to Final Office Action, submitted Jun. 19, 2013, in connection with U.S. Appl. No. 12/383,241, 31 pages.
Final Office Action, issued Jun. 28, 2013, in connection with U.S. Appl. No. 13/065,510, 22 pages.
Office Action, issued Jul. 4, 2013, in connection with Australian Patent Application No. 2009226019, 2 pages.
Response to Office Action, submitted Jul. 19, 2013, and instructions for response, in connection with Chinese patent Application No. 200980118258.9, 25 pages.
Response to Office Action, submitted Jul. 22, 2013, in connection with Australian Patent Application No. 2009226019, 18 pages.
Response to Rule 70(2) and 70a(2) communication, submitted Jul. 23, 2013, in conneciton with European Patent Application No. 12188577.6, 9 pages.
Supplemental Response to Office Action, submitted Jul. 26, 2013, in connection with Australian Patent Application No. 2009226019, 19 pages.
Office Action, issued Jul. 30, 2013, and translation, in connection with Chinese Patent Application No. 200980118257.4, 6 pages.
Notice of Acceptance, issued Aug. 15, 2013, in connection with Australian Patent Application No. 2009226019, 2 pages.
Office Action and Search Report, issued Aug. 21, 2013, and translation, in connection with Chinese Patent Application No. 201180025197.9, 9 pages.
Translation of Response to Office Action, submitted Sep. 10, 2013, in connection with Israeli Patent Application No. 208133, 16 pages.
Final Office Action, issued Sep. 23, 2013, in connection with U.S. Appl. No. 90/012,700, 46 pages.
Response to Office Action, submitted Sep. 26, 2013, in connection with with U.S. Appl. No. 13/134,927, 25 pages.
Office Action, issued Sep. 27, 2013, in connection with U.S. Appl. No. 12/383,241, 9 pages.
Office Action, issued Nov. 21, 2013, and translation, in connection with Chinese patent Application No. 200980118258.9, 9 pages.
Response to Office Action, submitted Nov. 25, 2013, in connection with U.S. Appl. No. 90/012,700, 71 pages.
Office Action, issued Nov. 25, 2013, and translation, in connection with Chinese Patent Application No. 20130096300.X, 4 pages.
Advisory Action, issued Dec. 6, 2013, in connection with U.S. Appl. No. 90/012,700, 4 pages.
Summary of issues to discuss in interview, submitted Dec. 10, 2013, in connection with U.S. Appl. No. 90/012,700, 6 pages.
Response to Office Action, submitted Dec. 16, 2013, and instructions for response to Office Action, in connection with Chinese Patent Application No. 200980118257.4, 30 pages.
Response to International Search Report and Written Opinion, submitted Dec. 10, 2013, in connection with International Patent Application No. PCT/US2013/025445, 43 pages.
Response to Office Action, submitted Dec. 20, 2013, in connection with U.S. Appl. No. 12/383,241, 20 pages.
Interview Summary, issued Dec. 23, 2013, in connection with U.S. Appl. No. 90/012,700, 11 pages.
Second Response to Office Action, submitted Dec. 23, 2013, in connection with U.S. Appl. No. 90/012,700, 23 pages.
Notice of Allowance, issued Jan. 10, 2014,and corrected Notice of Allowance, issued Feb. 19, 2014, in connection with with U.S. Appl. No. 13/134,927, 26 pages.
Advisory Action, issued Jan. 10, 2014, in connection with U.S. Appl. No. 90/012,700, 4 pages.
Communication pursuant to Rule 94(3) EPC, issued Jan. 10, 2014, in connection with European Patent Application No. 12 188 577.6, 4 pages.
Third Response to Office Action, submitted Jan. 15, 2014, in connection with U.S. Appl. No. 90/012,700, 12 pages.
Translation of Notification Prior to Allowance, issued Jan. 21, 2014, in connection with Israeli Patent Application No. 208133, 3 pages.
Notice of Appeal and Petition, submitted Jan. 23, 2014, in connection with U.S. Appl. No. 90/012,700, 12 pages.
Advisory Action, issued Jan. 24, 2014, in connection with U.S. Appl. No. 90/012,700, 4 pages.
Written Opinion, issued Jan. 27, 2014, in connection with International Patent Application No. PCT/US2013/025445, 6 pages.
Notice of Allowance, issued Feb. 6, 2014, and replacement PTOL-37 form, issued Feb. 10, 2014, in connection with U.S. Appl. No. 12/383,241, 8 pages.
Response to Office Action, submitted Feb. 7, 2014, and instructions for response, in connection with Chinese patent Application No. 200980118258.9, 15 pages.
Response to Written Opinion, submitted Feb. 27, 2014, in connection with International Patent Application No. PCT/US2013/025445, 30 pages.
Response to Office Action, submitted Mar. 5, 2014, and instructions for response, in connection with Chinese Patent Application No. 201180025197.9, 33 pages.
Supplemental Response to Written Opinion, submitted Mar. 10, 2014, in connection with International Patent Application No. PCT/US2013/025445, 26 pages.
Appeal Brief, submitted Mar. 24, 2014, in connection with U.S. Appl. No. 90/012,700, 68 pages.
Response to Office Action, submitted Mar. 26, 2014, and instructions for response, in connection with Chinese Patent Application No. 20130096300.X, 10 pages.
Restriction Requirement, issued Apr. 23, 2014, in connection with U.S. Appl. No. 13/815,193, 10 pages.
Office Action, issued Apr. 25, 2014, and translation, in connection with Korean Patent Application No. 10-2010-7027534, 11 pages.
Examiner's Response to Appeal Brief, issued May 9, 2014, in connection with U.S. Appl. No. 90/012,700, 76 pages.
Amendment and Request for Continued Examination, submitted May 27, 2014, in connection with U.S. Appl. No. 13/065,510, 26 pages.
Office Action, issued May 29, 2014, and translation, in connection with Chinese patent Application No. 200980118258.9, 10 pages.
Response to Restriction Requirement, submitted Jun. 3, 2014, in connection with U.S. Appl. No. 13/815,193, 7 pages.
Office Action, issued Jun. 4, 2014, and translation, in connection with Chinese Patent Application No. 200980118257.4, 7 pages.
International Preliminary Report on Patentability, issued Jun. 6, 2014, in connection with International Patent Application No. PCT/US2013/025445, 7 pages.
Reply Brief, submitted Jul. 9, 2014, in connection with U.S. Appl. No. 90/012,700, 30 pages.
Office Action, issued Jul. 16, 2014, in connection with U.S. Appl. No. 13/065,510, 19 pages.
Office Action, issued Jul. 1, 2014, and translation, in connection with Chinese Patent Application No. 201180025197.9, 7 pages.
Office Action, issued Jul. 18, 2014, and translation, in connection with Chinese Patent Application No. 20130096300.X, 6 pages.
Response to Communication pursuant to Rule 94(3) EPC, submitted Jul. 21, 2014, in connection with European Patent Application No. 12 188 577.6, 6 pages.
International Search Report and Written Opinion, issued Aug. 12, 2014, in connection with International Patent Application No. PCT/US2014/0250006, 13 pages.
Response to Office Action, submitted Aug. 25, 2014, and instructions for response, in connection with Korean Patent Application No. 10-2010-7027534, 71 pages.
Amendment after examiner phone interview, submitted Aug. 25, 2014, in connection with Chinese Patent Application No. 200980132984.6, 11 pages.

(56) References Cited

OTHER PUBLICATIONS

Response to Office Action and Request for Reexamination, submitted Sep. 15, 2014, and instructions for response, in connection with Chinese patent Application No. 200980118258.9, 24 pages.
Restriction Requirement, issued Sep. 18, 2014, in connection with U.S. Appl. No. 13/815,193, 6 pages.
Response to Office Action and Request for Reexamination, submitted Sep. 19, 2014, and instructions for response, in connection with Chinese Patent Application No. 200980118257.4, 24 pages.
Notification of Grant, issued Sep. 25, 2014, and translation, in connection with Chinese Patent Application No. 200980132984.6, 4 pages.
Response to Office Action, submitted Sep. 28, 2014, and instructions for response, in connection with Chinese Patent Application No. 20130096300.X, 17 pages.
Response to Restriction Requirement, submitted Oct. 7, 2014, in connection with U.S. Appl. No. 13/815,193, 5 pages.
Response to Office Action, submitted Nov. 17, 2014, and instructions for response, in connection with Chinese Patent Application No. 201180025197.9, 23 pages.
Translation of Response to Office Action, submitted Nov. 17, 2014, in connection with Israeli Patent Application No. 208133, 8 pages.
Restriction Requirement, issued Dec. 17, 2014, in connection with U.S. Appl. No. 14/207,310, 6 pages.
Response to International Search Report and Written Opinion, submitted Jan. 13, 2015, in connection with International Patent Application No. PCT/US2014/0250006, 31 pages.
Notice of Hearing, issued Jan. 13, 2015, in connection with U.S. Appl. No. 90/012,700, 3 pages.
Response to Office Action, submitted Jan. 16, 2015, in connection with U.S. Appl. No. 13/065,510, 24 pages.
Letter/Written Disclosure of the Supplemental Information Disclosure Statement for the above-referenced application, filed herewith on Mar. 7, 2016, 2 pages.
Global Healing Center, "What is Vegetable Glycerin" Published on Nov. 6, 2012, Last Updated on Jun. 11, 2014; http://www.globalhealingcenter.com/natural-health/what-is-vegetable-glycerin/ [accessed on Jun. 24, 2015], 3 pages.
Gutfinger et al., "Quantitative changes in some unsaponifiable components of soya bean oil due to refining." J Sci Food Agric. 25(9):1143-1147 (1974).
Hou et al., "Sugar Variation in Soybean Seed Assessed with a Rapid Extraction and Quantification Method," International Journal of Agronomy vol. 2009 Article ID 484571: 1-8 (2009).
Press Release: "The State of California Invests in VIRUN® NutraBIOsciences™; VIRUN® Receives Two More Patent Grants in China While Premiering Esolv® Vitamin E Encapsulator" Apr. 7, 2015 [online] [retrieved at http://pdf.pr.com/press-release/pr-613759.pdf] [accessed on Nov. 4, 2015], 4 pages.
Virun Facebook Page found at https://www.facebook.com/pages/Virun/168007462662 [accessed on Mar. 10, 2015], 11 pages.
Virun Facebook Page found at https://www.facebook.com/Virun-168007462662/?fref=ts [accessed on Nov. 4, 2015], 18 pages.
Bromley, P., "Inside Virun: Manufacturing the next generation of supplements, foods and beverages," presented at The 2016 Beverage Innovation: Online Summit, Feb. 18, 2016, available at: https://vts.inxpo.com/scripts/Server.nxp?LASCmd=AI:1;S:17;F:QP!14100&EventKey=178592&EventAttendeeKey=14661401&RandomValue=1456260156563 [accessed on Feb. 23, 2016], 70 pages.
Virun Esolv—Clean label claim, vitamin E emulsifier, Product Pamphlet, Feb. 10, 2016, available at: https://vts.inxpo.com/scripts/Server.nxp?LASCmd=AI:1;S:41008;F:LBSATTACH!V&AttachmentKey=1309430 [accessed Feb. 23, 2016], 3 pages.
Virun Esolv—free emulsifier, Product Pamphlet, Feb. 10, 2016, available at: https://vts.inxpo.com/scripts/Server.nxp?LASCmd=AI:1;S:41008;F:LBSATTACH!V&AttachmentKey=1309401 [accessed Feb. 23, 2016], 2 pages.
Virun Esolv—functional beverages cognitive ingredients, Product Pamphlet, Feb. 10, 2016, available at: https://vts.inxpo.com/scripts/Server.nxp?LASCmd—AI:1;S:41008;F:LBSATTACH!V&AttachmentKey=1309416 [accessed Feb. 23, 2016], 4 pages.
Office Action, issued Jan. 21, 2015, in connection with Chinese Patent Application No. 201310096300.X [English translation and original document in Chinese], 24 pages.
International Preliminary Report on Patentability, issued Mar. 23, 2015, in connection with International Patent Application No. PCT/US2014/025006, 6 pages.
Non-final Office Action, mailed Jun. 26, 2015, in connection with U.S. Appl. No. 14/207,310, 12 pages.
Amendment and Response, submitted Aug. 26, 2015, to Non-final Office Action, dated Jun. 26, 2015, in connection U.S. Appl. No. 14/207,310, 16 pages.
Notification of Grant, issued Oct. 10, 2015, and Search Report, issued Sep. 24, 2015, in connection with Chinese Patent Application No. 201310096300.X [English translation and original document in Chinese], 7 pages.
Final Office Action, mailed Dec. 1, 2015, in connection with U.S. Appl. No. 14/207,310, 7 pages.
Response, filed Dec. 3, 2015, to Communication pursuant to Rules 161(1) and 162 EPC, dated Oct. 22, 2015, in connection with European Application No. 14726228.1, 16 pages.
Amendment after Final, filed Dec. 4, 2015, to Final Office Action, mailed Dec. 1, 2015, in connection with U.S. Appl. No. 14/207,310, 10 pages.
International Search Report and Written Opinion, mailed Dec. 15, 2015, in connection with corresponding International Patent Application No. PCT/US2015/051083, 15 pages.
International Search Report and Written Opinion, mailed Jan. 5, 2016, in connection with corresponding International Patent Application No. PCT/US2015/051097, 12 pages.
U.S. Appl. No. 90/012,700, filed Oct. 9, 2012.

\* cited by examiner

COMPOSITIONS CONTAINING WATER-SOLUBLE DERIVATIVES OF VITAMIN E MIXTURES AND MODIFIED FOOD STARCH

RELATED APPLICATIONS

Benefit of priority is claimed to U.S. Provisional Application Ser. No. 61/863,897, filed Aug. 8, 2013, entitled "COMPOSITIONS CONTAINING WATER-SOLUBLE DERIVATIVES OF VITAMIN E MIXTURES AND MODIFIED FOOD STARCH," to Philip J. Bromley.

This application is related to U.S. Provisional Application Ser. No. 61/852,243, filed Mar. 15, 2013, entitled "FORMULATIONS OF PEG-DERIVATIVES OF VITAMIN E AND COMPOSITIONS CONTAINING SAME," to Philip J. Bromley.

This application is related to U.S. Provisional Application Ser. No. 61/863,732, filed Aug. 8, 2013, entitled "FORMULATIONS OF PEG-DERIVATIVES OF VITAMIN E AND COMPOSITIONS CONTAINING SAME," to Philip J. Bromley, filed as U.S. Application. Ser. No. 14/207,310 on Mar. 12, 2014, now U.S. Pat. No. 9,351,517. The subject matter of each of the above-referenced applications is incorporated by reference in its entirety.

This application is related to U.S. application Ser. No. 13/134,927, filed Jun. 20, 2011, published as US-2012-001602 and entitled "COMPOSITIONS CONTAINING NON-POLAR COMPOUNDS", now U.S. Pat. No. 8,741,373; and International Application No. PCT/US2011/001099, filed Jun. 20, 2011, published as International PCT Publication No. WO 2011/162802 and entitled "COMPOSITIONS CONTAINING NON-POLAR COMPOUNDS," all of which claim priority to U.S. Provisional Application Ser. No. 61/398,192, filed Jun. 21, 2010, entitled "COMPOSITIONS CONTAINING NON-POLAR COMPOUNDS," each to Philip J. Bromley and Chetan S. Rao.

This application is related to U.S. application Ser. No. 13/815,193, filed Feb. 8, 2013, entitled "BEVERAGE COMPOSITIONS CONTAINING NON-POLAR COMPOUNDS," and International Application No. PCT/US2013/025445, filed Feb. 8, 2013, entitled "BEVERAGE COMPOSITIONS CONTAINING NON-POLAR COMPOUNDS," all of which claim priority to U.S. Provisional Application Ser. No. 61/633,431, filed Feb. 10, 2012, entitled "BEVERAGE COMPOSITIONS CONTAINING NON-POLAR COMPOUNDS," and U.S. Provisional Application Ser. No. 61/743,466, filed Sep. 4, 2012, entitled "BEVERAGE COMPOSITIONS CONTAINING NON-POLAR COMPOUNDS," each to Philip J. Bromley.

This application also is related to U.S. application Ser. No. 12/383,244, filed Mar. 20, 2009, published as US-2009-0297665-A1, issued as U.S. Pat. No. 8,282,977, and entitled "COMPOSITIONS CONTAINING NON-POLAR COMPOUNDS," and International Application No. PCT/US2009/001775, filed Mar. 20, 2009, published as International PCT Application No. WO 2009/117152 and entitled "EMULSIONS INCLUDING A PEG-DERIVATIVE OF TOCOPHEROL," all of which claim priority to U.S. Provisional Application Ser. No. 61/070,381, filed Mar. 20, 2008, entitled "COMPOSITIONS CONTAINING NON-POLAR COMPOUNDS" and U.S. Provisional Application Ser. No. 61/132,424, filed Jun. 16, 2008, entitled "COMPOSITIONS CONTAINING NON-POLAR COMPOUNDS," each to Philip Bromley.

This application also is related to U.S. patent application Ser. No. 12/383,241, filed Mar. 20, 2009, published as US-2009-0297491-A1 entitled "COMPOSITIONS CONTAINING NON-POLAR COMPOUNDS", now U.S. Pat. No. 8,765,661, and International Application No. PCT/US2009/001774, filed Mar. 20, 2009, published as International PCT Publication No. WO 2009/117151 and entitled "VITAMIN E DERIVATIVES AND THEIR USES," all of which claim priority to U.S. Provisional Application Ser. No. 61/070,392, filed Mar. 20, 2008, entitled "COMPOSITIONS CONTAINING NON-POLAR COMPOUNDS" and U.S. Provisional Application Ser. No. 61/132,409, filed Jun. 16, 2008, entitled "COMPOSITIONS CONTAINING NON-POLAR COMPOUNDS," each to Philip Bromley.

This application also is related to U.S. patent application Ser. No. 13/065,510, filed Mar. 22, 2011, published as US-2011-0236364-AI entitled "COMPOSITIONS CONTAINING NON-POLAR COMPOUNDS", now U.S. Pat. No. 9,320,295, and International Application No. PCT/US2011/000538, filed Mar. 22, 2011, published as International PCT Publication No. WO 2011/119228 and entitled "COMPOSITIONS CONTAINING NON-POLAR COMPOUNDS," all of which claim priority to U.S. Provisional Application Ser. No. 61/340,944, filed Mar. 23, 2010, entitled "COMPOSITIONS CONTAINING NON-POLAR COMPOUNDS," each to Philip Bromley.

The subject matter of each of the above-referenced applications is incorporated by reference in its entirety.

FIELD OF THE INVENTION

Provided herein are compositions that contain a modified food starch and one or more non-polar compounds. In some instances, the compositions contain a water-soluble derivative of vitamin E mixture, containing varying amounts of monomer and dimer forms of the PEG-derivative of vitamin E. Compositions include concentrates, dilution compositions and compositions for direct consumption. Methods for preparing the compositions also are provided.

BACKGROUND

Non-polar compounds are not easily dissolved in aqueous solutions, such as water or other polar solvent. A number of non-polar compounds are used in compositions for human ingestion, for example, pharmaceuticals, nutraceuticals and/or dietary supplements. Exemplary of non-polar compounds used in such compositions are vitamins and minerals, fatty acids, and other non-polar compounds, non-polar active agents, and non-polar active ingredients. Because of poor water solubility, inclusion of non-polar compounds in products for human consumption, for example, supplements, foods and beverages, is often challenging.

Available compositions containing non-polar compounds, particularly food or beverage compositions containing non-polar compounds, and methods for formulating such compositions, are limited. In addition, the amount, or concentration, of non-polar compounds in available food and beverage products is limited due to the display of undesirable organoleptic properties when the amount of non-polar compound is increased. Thus, there is a need to develop compositions for human consumption, such as food and beverage products, that contain non-polar compounds and methods for making the compositions. Accordingly, it is among the objects herein to provide compositions, including food and beverage compositions, containing non-polar compounds, and methods for making the compositions.

SUMMARY

Provided herein are compositions containing a modified food starch, in an amount between 1% or about 1% and 70% or about 70%, by weight, of the composition; a PEG-derivative of vitamin E surfactant, in an amount between 1% or about 1% and 98% or about 98%, by weight, of the composition, where the PEG-derivative of vitamin E surfactant is high dimer composition that contains a water-soluble derivative of vitamin E mixture that comprises at least 13 weight % water-soluble derivative of vitamin E dimer and up to 87 weight % water-soluble derivative of vitamin E monomer; and one or more non-polar compounds. In some examples, the compositions provided herein also contain a polar solvent. In such examples, the polar solvent can be present in an amount up to at or about 80%, by weight, of the composition. In some examples, the compositions provided herein can be formulated for direct consumption. In other examples, the compositions provided herein are concentrates, such as emulsion concentrates.

In some examples, the compositions provided herein are for formulated for direct consumption and contain one or more non-polar compounds in an amount between 0.001% or about 0.001% and 25% or about 25%, 0.001% or about 0.001% and 20% or about 20%, 0.001% or about 0.001% and 15% or about 15%, 0.001% or about 0.001% and 10% or about 10%, 0.001% or about 0.001% and 5% or about 5%, 0.001% or about 0.001% and 1% or about 1%, 0.01% or about 0.01% and 25% or about 25%, between 0.01% or about 0.01% and 20% or about 20%, between 0.01% or about 0.01% and 15% or about 15%, between 0.01% or about 0.01% and 10% or about 10%, between 0.01% or about 0.01% and 5% or about 5%, between 0.01% or about 0.01% and 1% or about 1%, between 0.1% or about 0.1% and 25% or about 25%, between 0.1% or about 0.1% and 20% or about 20%, between 0.1% or about 0.1% and 15% or about 15%, between 0.1% or about 0.1% and 10% or about 10%, between 0.1% or about 0.1% and 5% or about 5%, between 0.5% or about 0.5% and 25% or about 25%, between 0.5% or about 0.5% and 20% or about 20%, between 0.5% or about 0.5% and 15% or about 15%, between 0.5% or about 0.5% and 10% or about 10%, between 0.5% or about 0.5% and 5% or about 5%, between 1% or about 1% and 25% or about 25%, between 1% or about 1% and 20% or about 20%, between 1% or about 1% and 15% or about 15%, between 1% or about 1% and 10% or about 10%, between 1% or about 1% and 5% or about 5%, by weight, of the composition.

In some examples, the compositions provided herein are for formulated for direct consumption and contain a modified food starch in an amount that is between 0.1% or about 0.1% and 35% or about 35%, between 0.1% or about 0.1% and 20% or about 20%, between 0.1% or about 0.1% and 15% or about 15%, between 0.1% or about 0.1% and 10% or about 10%, between 0.5% or about 0.5% and 35% or about 35%, between 0.5% or about 0.5% and 30% or about 30%, between 0.5% or about 0.5% and 25% or about 25%, between 0.5% or about 0.5% and 20% or about 20%, between 0.5% or about 0.5% and 15% or about 15%, between 0.5% or about 0.5% and 10% or about 10%, between 1% or about 1% and 35% or about 35%, between 1% or about 1% and 30% or about 30%, between 1% or about 1% and 25% or about 25%, between 1% or about 1% and 20% or about 20%, between 1% or about 1% and 15% or about 15%, between 1% or about 1% and 10% or about 10%, between 5% or about 5% and 35% or about 35%, between 5% or about 5% and 30% or about 30%, between 5% or about 5% and 25% or about 25%, between 5% or about 5% and 20% or about 20%, between 5% or about 5% and 15% or about 15%, between 10% or about 10% and 35% or about 35%, between 10% or about 10% and 30% or about 30%, between 10% or about 10% and 25% or about 25%, between 10% or about 10% and 20% or about 20%, between 10% or about 10% and 15% or about 15%, between 15% or about 15% and 35% or about 35%, between 15% or about 15% and 30% or about 30%, between 15% or about 15% and 25% or about 25%, between 15% or about 15% and 20% or about 20%, between 20% or about 20% and 35% or about 35%, between 20% or about 20% and 30% or about 30%, between 20% or about 20% and 25% or about 25%, between 25% or about 25% and 35% or about 35%, between 25% or about 25% and 30% or about 30%, between 30% or about 30% and 35% or about 35%, by weight, of the composition.

In some examples, the compositions provided herein are for formulated for direct consumption and contain a PEG-derivative of vitamin E surfactant is present in an amount that is between 0.1% or about 0.1% and 35% or about 35%, between 0.1% or about 0.1% and 20% or about 20%, between 0.1% or about 0.1% and 15% or about 15%, between 1% or about 1% and 35% or about 35%, between 1% or about 1% and 30% or about 30%, between 1% or about 1% and 25% or about 25%, between 1% or about 1% and 20% or about 20%, between 1% or about 1% and 15% or about 15%, between 5% or about 5% and 35% or about 35%, between 5% or about 5% and 30% or about 30%, between 5% or about 5% and 25% or about 25%, between 5% or about 5% and 20% or about 20%, between 5% or about 5% and 15% or about 15%, between 10% or about 10% and 35% or about 35%, between 10% or about 10% and 30% or about 30%, between 10% or about 10% and 25% or about 25%, between 10% or about 10% and 20% or about 20%, between 10% or about 10% and 15% or about 15%, between 15% or about 15% and 35% or about 35%, between 15% or about 15% and 30% or about 30%, between 15% or about 15% and 25% or about 25%, between 15% or about 15% and 20% or about 20%, between 20% or about 20% and 35% or about 35%, between 20% or about 20% and 30% or about 30%, between 20% or about 20% and 25% or about 25%, between 25% or about 25% and 35% or about 35%, between 25% or about 25% and 30% or about 30%, between 30% or about 30% and 35% or about 35%, by weight, of the composition. In other examples, the PEG-derivative of vitamin E surfactant can be an amount between 2% or about 2% and 20% or about 20%, between 2% or about 2% and 15% or about 15%, between 5% or about 5% and 20% or about 20%, between 5% or about 5% and 15% or about 15%, between 8% or about 8% and 20% or about 20%, between 8% or about 8% and 15% or about 15%, between 10% or about 10% and 20% or about 20%, between 10% or about 10% and 15% or about 15%, between 15% or about 15% and 20% or about 20%, by weight, of the composition.

In some examples, the compositions provided herein are for formulated for direct consumption and contain a polar solvent in an amount between 1% or about 1% and 99% or about 99%, between 1% or about 1% and 95% or about 95%, between 1% or about 1% and 90% or about 90%, between 1% or about 1% and 85% or about 85%, between 1% or about 1% and 80% or about 80%, between 5% or about 5% and 99% or about 99%, between 5% or about 5% and 95% or about 95%, between 5% or about 5% and 90% or about 90%, between 5% or about 5% and 85% or about 85%, between 5% or about 5% and 80% or about 80%, between 10% or about 10% and 99% or about 99%, between 10% or about 10% and 95% or about 95%, between 10% or about 10% and 90% or about 90%, between 10% or about 10% and 85% or about 85%, between 10% or about 10% and 80% or about 80%, between 15% or about 15% and 99% or about 99%, between 15% or about 15% and 95% or about 95%, between 15% or about 15% and 90% or about 90%, between 15% or about 15% and 85% or about 85%, between 15% or about 15% and 80% or about 80%, between 20% or about 20% and 99% or about 99%, between 20% or about 20% and 95% or about 95%, between 30% or about 30% and 99% or about 99%, between 30% or about 30% and 95% or about 95%, between 40% or about 40% and 99% or about 99%, between 40% or about 40% and 95% or about 95%, between 50% or about 50% and 99% or about 99%, between 50% or about 50% and 95% or about 95%, between 60% or about 60% and 99% or about 99%, between 60% or about 60% and 95% or about 95%, by weight, of the composition.

In other examples, the compositions provided herein are concentrates and contain one or more non-polar compounds in an amount that is between 2% or about 2% and 50% or about 50%, between 2% or about 2% and 45% or about 45%, between 2% or about 2% and 40% or about 40%, between 2% or about 2% and 35% or about 35%, between 2% or about 2% and 30% or about 30%, between 2% or about 2% and 25% or about 25%, between 5% or about 5% and 50% or about 50%, between 5% or about 5% and 45% or about 45%, between 5% or about 5% and 40% or about 40%, between 5% or about 5% and 35% or about 35%, between 5% or about 5% and 30% or about 30%, between 5% or about 5% and 25% or about 25%, between 8% or about 8% and 50% or about 50%, between 8% or about 8% and 45% or about 45%, between 8% or about 8% and 40% or about 40%, between 8% or about 8% and 35% or about 35%, between 8% or about 8% and 30% or about 30%, between 8% or about 8% and 25% or about 25%, between 10% or about 10% and 50% or about 50%, between 10% or about 10% and 45% or about 45%, between 10% or about 10% and 40% or about 40%, between 10% or about 10% and 35% or about 35%, between 10% or about 10% and 30% or about 30%, between 10% or about 10% and 25% or about 25%, between 15% or about 15% and 50% or about 50%, between 15% or about 15% and 45% or about 45%, between 15% or about 15% and 40% or about 40%, between 15% or about 15% and 35% or about 35%, between 15% or about 15% and 30% or about 30%, between 15% or about 15% and 25% or about 25%, by weight, of the composition.

In some examples, the compositions provided herein are concentrates and contain a modified food starch in an amount between 2% or about 2% and 30% or about 30%, between 2% or about 2% and 25% or about 25%, between 2% or about 2% and 20% or about 20%, between 2% or about 2% and 15% or about 15%, between 5% or about 5% and 30% or about 30%, between 5% or about 5% and 25% or about 25%, between 5% or about 5% and 20% or about 20%, between 5% or about 5% and 15% or about 15%, between 8% or about 8% and 30% or about 30%, between 8% or about 8% and 25% or about 25%, between 8% or about 8% and 20% or about 20%, between 8% or about 8% and 15% or about 15%, between 10% or about 10% and 30% or about 30%, between 10% or about 10% and 25% or about 25%, between 10% or about 10% and 20% or about 20%, between 10% or about 10% and 15% or about 15%, between 15% or about 15% and 30% or about 30%, between 15% or about 15% and 25% or about 25%, between 15% or about 15% and 20% or about 20%, by weight, of the composition.

In some examples, the compositions provided herein are concentrates and contain a PEG-derivative of vitamin E surfactant in an amount between 2% or about 2% and 20% or about 20%, between 2% or about 2% and 15% or about 15%, between 5% or about 5% and 20% or about 20%, between 5% or about 5% and 15% or about 15%, between 8% or about 8% and 20% or about 20%, between 8% or about 8% and 15% or about 15%, between 10% or about 10% and 20% or about 20%, between 10% or about 10% and 15% or about 15%, between 15% or about 15% and 20% or about 20%, by weight, of the composition.

In some examples, the compositions provided herein are concentrates and contain a polar solvent is provided in the composition in an amount that is between 40% or about 40% and 90% or about 90%, between 40% or about 40% and 85% or about 85%, between 40% or about 40% and 80% or about 80%, between 40% or about 40% and 75% or about 75%, between 40% or about 40% and 70% or about 70%, between 45% or about 45% and 90% or about 90%, between 45% or about 45% and 85% or about 85%, between 45% or about 45% and 80% or about 80%, between 45% or about 45% and 75% or about 75%, between 45% or about 45% and 70% or about 70%, between 50% or about 50% and 90% or about 90%, between 50% or about 50% and 85% or about 85%, between 50% or about 50% and 80% or about 80%, between 50% or about 50% and 75% or about 75%, between 50% or about 50% and 70% or about 70%, between 55% or about 55% and 90% or about 90%, between 55% or about 55% and 85% or about 85%, between 55% or about 55% and 80% or about 80%, between 55% or about 55% and 75% or about 75%, between 60% or about 60% and 90% or about 90%, between 60% or about 60% and 85% or about 85%, between 60% or about 60% and 80% or about 80%, between 60% or about 60% and 75% or about 75%, between 65% or about 65% and 90% or about 90%, between 65% or about 65% and 85% or about 85%, between 65% or about 65% and 80% or about 80%, by weight, of the composition.

Also provided herein are compositions that are liquid emulsion concentrates that contain a modified food starch in an amount between 5% or about 5% and 25% or about 25%, by weight, of the composition; a PEG-derivative of vitamin E surfactant in an amount between 1% or about 1% and 30% or about 30%, by weight, of the composition, wherein the PEG-derivative of vitamin E surfactant is a water-soluble derivative of vitamin E mixture that comprises at least 13 weight % water-soluble derivative of vitamin E dimer and up to 87% water-soluble derivative of vitamin E monomer; and one or more non-polar compounds in an amount between 5% or about 5% and 30% or about 30%, by weight, of the composition. In some examples, the PEG-derivative of vitamin E surfactant is present in an amount that is between 2% or about 2% and 30% or about 30%, between 2% or about 2% and 20% or about 20%, or between 2% or about 2% and 10% or about 10%, by weight, of the composition, and the modified food starch can be present in an amount that is between 8% or about 8% and 20% or about 20%, by weight, of the composition.

In some of the compositions provided herein that are liquid emulsion concentrates containing a modified food starch, PEG-derivative of vitamin E and non-polar compound, the water-soluble derivative of vitamin E mixture contains least at or about 20%, 25% or 29%, by weight, a water-soluble derivative of a vitamin E dimer. For example the water-soluble derivative of vitamin E mixture contains at or about 75%, 70%, 69%, 62%, 55%, 50%, 45%, 40%, 35% water-soluble derivative of vitamin E dimer or between at or about 29% and at or about 69%, inclusive, by weight, water-soluble derivative of vitamin E dimer. In other examples, the water-soluble derivative of vitamin E mixture contains less than at or about 70%, 65%, 63%, 62% or 61%, by weight, water-soluble derivative of vitamin E monomer.

In some examples of the compositions provided herein containing a PEG-derivative of vitamin E, the water-soluble derivative of vitamin E mixture contains a PEG moiety that has a molecular weight between at or about 100 Da and 20,000 Da, 200 Da and 10,000 Da, 200 Da and 8000 Da, 200 Da and 6000 Da, 200 Da and 5000 Da, 200 Da and 3000 Da, 200 Da and 1000 Da, 200 Da and 800 Da, 200 Da and 600 Da, 200 Da and 400 Da, 400 Da and 20,000 Da, 400 Da and 10,000 Da, 400 Da and 8000 Da, 400 Da and 6000 Da, 400 Da and 5000 Da, 400 Da and 3000 Da, 400 Da and 1000 Da, 400 Da and 800 Da, 400 Da and 600 Da, 600 Da and 20,000 Da, 600 Da and 10,000 Da, 600 Da and 8000 Da, 600 Da and 6000 Da, 600 Da and 5000 Da, 600 Da and 3000 Da, 600 Da and 1000 Da, 600 Da and 800 Da, 800 Da and 20,000 Da, 800 Da and 10,000 Da, 800 Da and 8000 Da, 800 Da and 6000 Da, 800 Da and 5000 Da, 800 Da and 3000 Da, 800 Da and 1000 Da, 1000 Da and 20,000 Da, 1000 Da and 10,000 Da, 1000 Da and 8000 Da, 1000 Da and 6000 Da, 1000 Da and 5000 Da, 1000 Da and 3000 Da, 3000 Da and 20,000 Da, 3000 Da and 10,000 Da, 3000 Da and 8000 Da, 3000 Da and 6000 Da, 3000 Da and 5000 Da, 5000 Da and 20,000 Da, 5000 Da and 10,000 Da, 5000 Da and 8000 Da, 5000 Da and 6000 Da, 6000 Da and 20,000 Da, 6000 Da and 10,000 Da, 6000 Da and 8000 Da, 8000 Da and 20,000 Da, 8000 Da and 10,000 Da or 10000 Da and 20,000 Da, or has a molecular weight of 100, 200, 238, 300, 400, 500, 600, 750, 800, 1000, 1200, 1500, 2000, 2500, 3000, 3400, 3500, 4000, 6000, 8000, 10,000, 12,000 or 20,000 Da.

In some examples, the compositions provided herein contain a water-soluble derivative of a vitamin E mixture that is selected from among a tocopheryl polyethylene glycol succinate (TPGS), tocopheryl polyethylene glycol sebacate, tocopheryl polyethylene glycol dodecanodioate, tocopheryl polyethylene glycol suberate, tocopheryl polyethylene glycol azelaate, tocopheryl polyethylene glycol citraconate, tocopheryl polyethylene glycol methylcitraconate, tocopheryl polyethylene glycol itaconate, tocopheryl polyethylene glycol maleate, tocopheryl polyethylene glycol glutarate, tocopheryl polyethylene glycol glutaconate, tocopheryl polyethylene glycol fumarate, tocopheryl polyethylene glycol phthalate, tocotrienol polyethylene glycol succinate, tocotrienol polyethylene glycol sebacate, tocotrienol polyethylene glycol dodecanodioate, tocotrienol polyethylene glycol suberate, tocotrienol polyethylene glycol azelaate, tocotrienol polyethylene glycol citraconate, tocotrienol polyethylene glycol methylcitraconate, tocotrienol polyethylene glycol itaconate, tocotrienol polyethylene glycol maleate, tocotrienol polyethylene glycol glutarate, tocotrienol polyethylene glycol glutaconate, tocotrienol polyethylene glycol fumarate, or tocotrienol polyethylene glycol phthalate. In some examples, the water-soluble derivative of vitamin E mixture is a tocopheryl polyethylene glycol succinate (TPGS), tocopheryl sebacate polyethylene glycol, tocopheryl dodecanodioate polyethylene glycol, tocopheryl suberate polyethylene glycol, tocopheryl azelaate polyethylene glycol, tocopheryl citraconate polyethylene glycol, tocopheryl methylcitraconate polyethylene glycol, tocopheryl itaconate polyethylene glycol, tocopheryl maleate polyethylene glycol, tocopheryl glutarate polyethylene glycol, tocopheryl glutaconate polyethylene glycol and tocopheryl phthalate polyethylene glycol, TPGS analogs or TPGS homologs. In particular examples, the water-soluble derivative of vitamin E mixture is α-tocopheryl polyethylene glycol succinate (TPGS), such as α-tocopheryl polyethylene glycol succinate 1000.

In some examples, the compositions provided herein contain a water-soluble derivative of vitamin E mixture having between at or about 25% and 30%, 25% and 35%, 25% and 40%, 25% and 45%, 25% and 50%, 25% and 55%, 25% and 60%, 25% and 65%, 30% and 35%, 30% and 40%, 30% and 45%, 30% and 50%, 30% and 55%, 30% and 60%, 30% and 65%, 30% and 69%, 35% and 40%, 35% and 45%, 35% and 50%, 35% and 55%, 35% and 60%, 35% and 65%, 35% and 69%, 40% and 45%, 40% and 50%, 40% and 55%, 40% and 60%, 40% and 65%, 40% and 69%, 45% and 50%, 45% and 55%, 45% and 60%, 45% and 65%, 45% and 69%, 50% and 55%, 50% and 60%, 50% and 65%, 50% and 69%, 55% and 60%, 55% and 65%, 55% and 69%, 60% and 65%, 60% and 69% or 65% and 69%, by weight, water-soluble derivative of vitamin E monomer, such as at or about 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68% or 69%, by weight, water-soluble derivative of vitamin E monomer.

In some examples, the compositions provided herein contain a water-soluble derivative of vitamin E mixture having between at or about 13% and 20%, 13% and 25%, 13% and 30%, 13% and 35%, 13% and 40%, 13% and 45%, 13% and 50%, 13% and 55%, 13% and 60%, 13% and 65%, 13% and 70%, 13% and 75%, 20% and 25%, 20% and 30%, 20% and 35%, 20% and 40%, 20% and 45%, 20% and 50%, 20% and 55%, 20% and 60%, 20% and 65%, 20% and 70%, 20% and 75%, 25% and 30%, 25% and 35%, 25% and 40%, 25% and 45%, 25% and 50%, 25% and 55%, 25% and 60%, 25% and 65%, 25% and 70%, 25% and 75%, 30% and 35%, 30% and 40%, 30% and 45%, 30% and 50%, 30% and 55%, 30% and 60%, 30% and 65%, 30% and 70%, 30% and 75%, 35% and 40%, 35% and 45%, 35% and 50%, 35% and 55%, 35% and 60%, 35% and 65%, 35% and 70%, 35% and 75%, 40% and 45%, 40% and 50%, 40% and 55%, 40% and 60%, 40% and 65%, 40% and 70%, 40% and 75%, 45% and 50%, 45% and 55%, 45% and 60%, 45% and 65%, 45% and 70%, 45% and 75%, 50% and 55%, 50% and 60%, 50% and 65%, 50% and 69%, 55% and 60%, 55% and 65%, 55% and 70%, 55% and 75%, 60% and 65%, 60% and 70%, 60% and 75%, 65% and 70%, 65% and 75% or 70% and 75%, by weight, water-soluble derivative of vitamin E dimer, such as at or about 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74% or 75%, by weight, water-soluble derivative of vitamin E dimer.

In some examples, the compositions provided herein contain a water-soluble derivative of vitamin E mixture that contains between at or about 35% and at or about 65%, inclusive, by weight, water-soluble derivative of vitamin E monomer and between at or about 25% and at or about 65%, inclusive, by weight, water-soluble derivative of vitamin E dimer; or a water-soluble derivative of vitamin E mixture that contains between at or about 29% and at or about 61%, or between at or about 29% and at or about 62%, by weight, water-soluble derivative of vitamin E dimer; or a water-soluble derivative of vitamin E mixture that contains between at or about 35% and at or about 55%, by weight, water-soluble derivative of vitamin E dimer. In some of the compositions provided herein, the water-soluble derivative of vitamin E mixture can be a high dimer water-soluble derivative of vitamin E mixture.

In some of the compositions provided herein that are liquid emulsion concentrates containing a modified food starch, PEG-derivative of vitamin E and non-polar compound, the polar solvent is present in an amount that is between 40% or about 40% and 85% or about 85%, by weight, of the composition. In some examples, the polar solvent is a polar protic solvent, such as water, glycerin, propylene glycol, ethylene glycol, tetraethylene glycol, triethylene glycol or trimethylene glycol. For example, the polar solvent is water and the amount of water is between 45% or about 45% and 80% or about 80%, or between 55% or about 55% and 70% or about 70%, by weight, of the composition. In other examples, the amount of water in the composition is between 65% or about 65% and 80% or about 80%, or between 68% or about 68% and 76% or about 76%, by weight, of the composition.

Also provided herein are compositions that are liquid emulsion concentrates that contain a modified food starch in an amount between 15% or about 15% and 25% or about 25%, by weight, of the concentrate composition; a polar solvent in an amount between 55% or about 55% and 80% or about 80%, by weight, of the concentrate; and one or more non-polar compounds in an amount between 5% or about 5% and 20% or about 20%, by weight, of the concentrate, wherein the non-polar compounds can be non-polar active ingredients such as polyunsaturated fatty acids, omega-3 fatty acids, omega-6 fatty acids, omega-9 fatty acids, conjugated fatty acids, coenzyme Q-containing active ingredients, oil soluble vitamins other than a vitamin E, alpha lipoic acid, medium chain triglycerides, carotenoid-containing active ingredients and phytochemicals and cannabinoids.

In some examples, the modified food starch is present in an amount between 15% or about 15% and 20% or about 20%, or between 16% or about 16% and 19% or about 19%, by weight, of the composition. In some examples of the compositions provided herein wherein the composition is a liquid emulsion concentrate and the composition contains a modified food starch, one or more non-polar compounds and a polar solvent, the non-polar compound is present in an amount between 5% or about 5% and 15% or about 15%, or between 5% or about 5% and 12% or about 12%, by weight, of the composition. In some examples, the polar solvent can be a polar protic solvent selected from among water, glycerin, propylene glycol, ethylene glycol, tetraethylene glycol, triethylene glycol and trimethylene glycol.

In any of the compositions provided herein, the starch can be modified physically, enzymatically, chemically or by any combination thereof. For example, the modified food starch can be modified by pregelatinization, oxidation, enzymatic degradation, enzymatic conversion, esterification, cross-linking, acetylation, hydroxypropylation or any combination thereof. In some examples, the modified food starch is chemically modified by esterification with a C3-C22 fatty acid chain. In some examples, the modified food starch can be a modified corn, potato, wheat, rice, tapioca, sago, oat, barley, amaranth, waxy corn, cassava, waxy barley, waxy rice, glutinous rice or sweet rice starch. Exemplary modified food starches include octenyl succinate starches selected from among a sodium octenyl succinate starch, calcium octenyl succinate starch, and aluminum octenyl succinate starch. Exemplary of a modified food starch provided herein is a modified waxy corn starch, such as a sodium octenyl succinate waxy corn starch.

In any of the compositions provided herein, the one or more non-polar compounds can contain non-polar active ingredients such as polyunsaturated fatty acids, omega-3 fatty acids, omega-6 fatty acids, omega-9 fatty acids, conjugated fatty acids, coenzyme Q-containing active ingredients, oil soluble vitamins other than a vitamin E, alpha lipoic acid, medium chain triglycerides, cannabinoids, carotenoid-containing active ingredients and/or phytochemicals. In exemplary compositions, the one or more non-polar compounds contain one or more polyunsaturated fatty acids, such as an omega-3 fatty acid, an omega-6 fatty acid, and/or a conjugated fatty acid. Exemplary polyunsaturated fatty acids that can be present in the provided compositions include docosahexaenoic acid (DHA), eicosapentaenoic acid (EPA), fish oil, flaxseed oil, borage oil, alpha-linolenic acid (ALA), gamma-linolenic acid (GLA), conjugated linoleic acid (CLA), and saw palmetto extract. In some examples, the provided compositions contain DHA that can be present in an amount that is between 20% or about 20% and 90% or about 90% or between 25% or about 25% and 85% or about 85%; or between 35% or about 35% and 70% or about 70%, or between 25% or about 25% and 40% or about 40%, by weight, of the non-polar active ingredients. In some examples, the provided compositions contain EPA that contains between 5% or about 5% and 15% or about 15%, between 5% or about 5% and 13% or about 13%, or between 5% or about 5% and 10% or about 10% EPA, by weight, of the non-polar active ingredients. In some examples, the provided compositions contain ALA that contain between 50% or about 50% and 80% or about 80%, or between 65% or about 65% and 75% or about 75% ALA, by weight, of the non-polar active ingredients. In some examples, the provided compositions contain GLA that contains at least 22% or about 22% GLA, by weight, of the non-polar active ingredients.

Any of the compositions provided herein can further contain a co-surfactant in an amount sufficient to stabilize the composition compared to in the absence of the co-surfactant. In some examples the co-surfactant can contain a phospholipid. In some examples, the phospholipid is phosphatidylcholine. The phospholipid can be present in any of the provided compositions in an amount that is between 0.1% or about 0.1% and 1% or about 1%, by weight, of the composition.

Any of the compositions provided herein also can contain a preservative in an amount sufficient to preserve the composition. In some of the compositions, the preservative contains benzyl alcohol. In some examples, benzyl alcohol is present in an amount that is between 0.1% or about 0.1% and 1% or about 1%, by weight, of the composition.

Any of the compositions provided herein also can contain a non-polar solvent, that is different from the non-polar active ingredient, in an amount sufficient to dissolve the non-polar active ingredient. In some examples, the non-polar solvent contains a Vitamin E oil, a flaxseed oil, or a combination thereof. In some examples, the non-polar solvent can be present, for example, in an amount between 1% or about 1% and 6% or about 6%, by weight, of the concentrate.

Any of the compositions provided herein an emulsion stabilizer, that is different from the modified food starch in an amount sufficient to stabilize the concentrate, compared to in the absence of the emulsion stabilizer. In some examples the emulsion stabilizer contains a blend of gums, such as any one or more of guar gum, xanthan gum and sodium alginate.

A flavor can be added to any of the compositions provided herein in an amount sufficient to enhance the taste of the composition, the smell of the composition, or a combination thereof, compared to in the absence of the flavor. Exemplary flavors that can be added to the provided compositions include lemon oil, D-limonene, or a combination thereof.

Any of the compositions provided herein also can contain a pH adjuster, such that the pH adjuster contains an acid or a base at an amount sufficient to affect the pH of the concentrate compared to the pH adjuster. In some examples, the pH adjuster contains citric acid, phosphoric acid, or a combination thereof.

Also provided are beverages the contain any of the compositions provided herein. Exemplary beverages provided herein include water, soda, milk, juice, and sports or nutrition beverages.

Also provided herein are methods for preparing a liquid emulsion concentrate by (a) generating a water phase by (i) heating a polar solvent in a first vessel; (ii) adding one or more water phase ingredients; and (iii) mixing until combined; (b) generating an oil phase by (i) heating a high dimer water-soluble derivative of vitamin E mixture and a preservative in a second vessel, wherein the a high dimer water-soluble derivative of vitamin E mixture in an amount between 2% or about 2% and 10% or about 10%, by weight, of the concentrate; (ii) adding one or more oil phase ingredients, where the oil phase ingredients contain one or more non-polar compounds in an amount between 5% or about 5% and 30% or about 30%, by weight, of the concentrate; and (iii) mixing until combined; and (c) emulsifying the oil phase and the water phase to generate the liquid emulsion concentrate; where the oil phase or the water phase contains a modified food starch in an amount between 8% or about 8% and 20% or about 20%, by weight, of the concentrate composition.

Methods are also provided for preparing a liquid emulsion concentrate by (a) generating a water phase by (i) heating a polar solvent in a first vessel, wherein the polar solvent is present in an amount between 55% or about 55% and 80% or about 80%, by weight, of the concentrate; (ii) adding one or more water phase ingredients; and (iii) mixing until combined; (b) generating an oil phase by heating one or more oil phase ingredients, wherein the oil phase ingredients comprising a non-polar compound in an amount between 5% or about 5% and 20% or about 20%, by weight, of the concentrate wherein the non-polar compound(s) is/are a polyunsaturated fatty acid, omega-3 fatty acid, omega-6 fatty acid, omega-9 fatty acid, conjugated fatty acid, coenzyme Q-containing active ingredient, oil soluble vitamin other than a vitamin E, alpha lipoic acid, medium chain triglyceride, carotenoid-containing active ingredient or phytochemical; and (c) emulsifying the oil phase and the water phase to generating the liquid emulsion concentrate; wherein one or more of the oil phase ingredients, or one or more of the water phase ingredients, contain(s) a modified food starch in an amount between 15% or about 15% and 25% or about 25%, by weight, of the concentrate composition.

In any of the methods provided herein, the oil phase ingredients, the water phase ingredients, or the oil phase ingredients and the water phase ingredients are heated to 60° C. or about 60° C. or to 71° C. or about 71° C.

In any of the methods provided herein, the emulsification of the oil phase and the water phase is performed with a homogenizer. In some examples, the emulsification is performed at between 20 rpm or about 20 rpm and 300 rpm or about 300 rpm, and/or includes rapidly cooling the forming emulsion during the emulsifying step, thereby cooling the forming emulsion to between 25° C. or about 25° C. and 43° C. or about 43° C. The forming emulsion can be cooled to between 25° C. or about 25° C. and 35° C. or about 35° C., to between at or about 35° C. and 43° C., or to at or about 40° C., in less than 60 minutes or less than about 60 minutes.

In some examples, the mixing and heating of the oil phase ingredients or the mixing and the heating of the water phase ingredients are performed simultaneously.

In some of the provided methods, the high dimer water-soluble derivative of vitamin E mixture contains at least 13 weight % water-soluble derivative of vitamin E dimer and up to 87% water-soluble derivative of vitamin E monomer. For example, the high dimer water-soluble derivative of vitamin E mixture can contain at least at or about 20%, 25% or 29%, by weight, water-soluble derivative of vitamin E dimer, and or up to at or about 75%, 70%, 69%, 62%, 55%, 50%, 45%, 40%, 35% water-soluble derivative of vitamin E dimer or between at or about 29% and at or about 69%, inclusive, by weight, water-soluble derivative of vitamin E dimer. In some examples of the provided methods, the high dimer water-soluble derivative of vitamin E mixture comprises less than at or about 70%, 65%, 63%, 62% or 61%, by weight, water-soluble derivative of vitamin E monomer.

In some examples of the provided methods, the water-soluble derivative of vitamin E mixture contains a PEG moiety having a molecular weight between at or about 100 Da and 20,000 Da, 200 Da and 10,000 Da, 200 Da and 8000 Da, 200 Da and 6000 Da, 200 Da and 5000 Da, 200 Da and 3000 Da, 200 Da and 1000 Da, 200 Da and 800 Da, 200 Da and 600 Da, 200 Da and 400 Da, 400 Da and 20,000 Da, 400 Da and 10,000 Da, 400 Da and 8000 Da, 400 Da and 6000 Da, 400 Da and 5000 Da, 400 Da and 3000 Da, 400 Da and 1000 Da, 400 Da and 800 Da, 400 Da and 600 Da, 600 Da and 20,000 Da, 600 Da and 10,000 Da, 600 Da and 8000 Da, 600 Da and 6000 Da, 600 Da and 5000 Da, 600 Da and 3000 Da, 600 Da and 1000 Da, 600 Da and 800 Da, 800 Da and 20,000 Da, 800 Da and 10,000 Da, 800 Da and 8000 Da, 800 Da and 6000 Da, 800 Da and 5000 Da, 800 Da and 3000 Da, 800 Da and 1000 Da, 1000 Da and 20,000 Da, 1000 Da and 10,000 Da, 1000 Da and 8000 Da, 1000 Da and 6000 Da, 1000 Da and 5000 Da, 1000 Da and 3000 Da, 3000 Da and 20,000 Da, 3000 Da and 10,000 Da, 3000 Da and 8000 Da, 3000 Da and 6000 Da, 3000 Da and 5000 Da, 5000 Da and 20,000 Da, 5000 Da and 10,000 Da, 5000 Da and 8000 Da, 5000 Da and 6000 Da, 6000 Da and 20,000 Da, 6000 Da and 10,000 Da, 6000 Da and 8000 Da, 8000 Da and 20,000 Da, 8000 Da and 10,000 Da or 10000 Da and 20,000 Da, or has a molecular weight of 100, 200, 238, 300, 400, 500, 600, 750, 800, 1000, 1200, 1500, 2000, 2500, 3000, 3400, 3500, 4000, 6000, 8000, 10,000, 12,000 or 20,000 Da.

Exemplary high dimer water-soluble derivatives of a vitamin E mixture used in the provided methods include tocopheryl polyethylene glycol succinate, tocopheryl polyethylene glycol sebacate, tocopheryl polyethylene glycol dodecanodioate, tocopheryl polyethylene glycol suberate, tocopheryl polyethylene glycol azelaate, tocopheryl polyethylene glycol citraconate, tocopheryl polyethylene glycol methylcitraconate, tocopheryl polyethylene glycol itaconate, tocopheryl polyethylene glycol maleate, tocopheryl polyethylene glycol glutarate, tocopheryl polyethylene glycol glutaconate, tocopheryl polyethylene glycol fumarate, tocopheryl polyethylene glycol phthalate, tocotrienol polyethylene glycol succinate, tocotrienol polyethylene glycol sebacate, tocotrienol polyethylene glycol dodecanodioate, tocotrienol polyethylene glycol suberate, tocotrienol polyethylene glycol azelaate, tocotrienol polyethylene glycol citraconate, tocotrienol polyethylene glycol methylcitraconate, tocotrienol polyethylene glycol itaconate, tocotrienol polyethylene glycol maleate, tocotrienol polyethylene glycol glutarate, tocotrienol polyethylene glycol glutaconate, tocotrienol polyethylene glycol fumarate and tocotrienol polyethylene glycol phthalate. For example, the high dimer water-soluble derivative of vitamin E mixture can be tocopheryl polyethylene glycol succinate (TPGS), tocopheryl sebacate polyethylene glycol, tocopheryl dodecanodioate polyethylene glycol, tocopheryl suberate polyethylene glycol, tocopheryl azelaate polyethylene glycol, tocopheryl citraconate polyethylene glycol, tocopheryl methylcitraconate polyethylene glycol, tocopheryl itaconate polyethylene glycol, tocopheryl maleate polyethylene glycol, tocopheryl glutarate polyethylene glycol, tocopheryl glutaconate polyethylene glycol and tocopheryl phthalate polyethylene glycol, TPGS analogs or TPGS homologs. In particular methods, the high dimer water-soluble derivative of vitamin E mixture is a α-tocopheryl polyethylene glycol succinate (TPGS), such as α-tocopheryl polyethylene glycol succinate 1000.

In some examples of the methods provided herein contain the high dimer water-soluble derivative of vitamin E mixture in an amount that is between at or about 25% and 30%, 25% and 35%, 25% and 40%, 25% and 45%, 25% and 50%, 25% and 55%, 25% and 60%, 25% and 65%, 30% and 35%, 30% and 40%, 30% and 45%, 30% and 50%, 30% and 55%, 30% and 60%, 30% and 65%, 30% and 69%, 35% and 40%, 35% and 45%, 35% and 50%, 35% and 55%, 35% and 60%, 35% and 65%, 35% and 69%, 40% and 45%, 40% and 50%, 40% and 55%, 40% and 60%, 40% and 65%, 40% and 69%, 45% and 50%, 45% and 55%, 45% and 60%, 45% and 65%, 45% and 69%, 50% and 55%, 50% and 60%, 50% and 65%, 50% and 69%, 55% and 60%, 55% and 65%, 55% and 69%, 60% and 65%, 60% and 69% or 65% and 69%, by weight, water-soluble derivative of vitamin E monomer, or in an amount that is or is about 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 53%, 50%, 51%, 52%, 53%, 54%, 55%, 56%, 57%, 58%, 59%, 60%, 61%, 62%, 63%, 64%, 65%, 66%, 67%, 68% or 69%, by weight, water-soluble derivative of vitamin E monomer.

In some examples of the provided methods, the high dimer water-soluble derivative of vitamin E mixture is present in an amount between at or about 13% and 20%, 13% and 25%, 13% and 30%, 13% and 35%, 13% and 40%, 13% and 45%, 13% and 50%, 13% and 55%, 13% and 60%, 13% and 65%, 13% and 70%, 13% and 75%, 20% and 25%, 20% and 30%, 20% and 35%, 20% and 40%, 20% and 45%, 20% and 50%, 20% and 55%, 20% and 60%, 20% and 65%, 20% and 70%, 20% and 75%, 25% and 30%, 25% and 35%, 25% and 40%, 25% and 45%, 25% and 50%, 25% and 55%, 25% and 60%, 25% and 65%, 25% and 70%, 25% and 75%, 30% and 35%, 30% and 40%, 30% and 45%, 30% and 50%, 30% and 55%, 30% and 60%, 30% and 65%, 30% and 70%, 30% and 75%, 35% and 40%, 35% and 45%, 35% and 50%, 35% and 55%, 35% and 60%, 35% and 65%, 35% and 70%, 35% and 75%, 40% and 45%, 40% and 50%, 40% and 55%, 40% and 60%, 40% and 65%, 40% and 70%, 40% and 75%, 45% and 50%, 45% and 55%, 45% and 60%, 45% and 65%, 45% and 70%, 45% and 75%, 50% and 55%, 50% and 60%, 50% and 65%, 50% and 69%, 55% and 60%, 55% and 65%, 55% and 70%, 55% and 75%, 60% and 65%, 60% and 70%, 60% and 75%, 65% and 70%, 65% and 75% or 70% and 75%, by weight, water-soluble derivative of vitamin E dimer, or in an amount that is or is about 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74% or 75%, by weight, water-soluble derivative of vitamin E dimer.

In some examples of the provided methods, the high dimer water-soluble derivative of vitamin E mixture contains between at or about 35% and at or about 65%, inclusive, by weight, water-soluble derivative of vitamin E monomer and between at or about 25% and at or about 65%, inclusive, by weight, water-soluble derivative of vitamin E dimer. In other examples of the provided methods, the high dimer water-soluble derivative of vitamin E mixture contains between at or about 29% and at or about 61%, or between at or about 29% and at or about 62%, by weight, water-soluble derivative of vitamin E dimer. The water-soluble derivative of vitamin E mixture, in some of the provided methods, contains between at or about 35% and at or about 55%, by weight, water-soluble derivative of vitamin E dimer. In some methods, the water-soluble derivative of vitamin E mixture is a high dimer water-soluble derivative of vitamin E mixture.

In any of the provided methods, starch can be modified physically, enzymatically, chemically or by any combination thereof. For example, the starch can be modified by pregelatinization, oxidation, enzymatic degradation, enzymatic conversion, esterification, cross-linking, acetylation, hydroxypropylation or any combination thereof. In some methods, the modified food starch is chemically modified by esterification with a C3-C22 fatty acid chain. The modified food starch used in any of the provided methods can be a modified corn, potato, wheat, rice, tapioca, sago, oat, barley, amaranth, waxy corn, cassava, waxy barley, waxy rice, glutinous rice or sweet rice starch. In some examples, the modified food starch is an octenyl succinate starch that is a sodium octenyl succinate starch, calcium octenyl succinate starch or aluminum octenyl succinate starch. In any of the methods provided herein, the modified food starch can be a modified waxy corn starch, such as a sodium octenyl succinate waxy corn starch.

Non-polar compound(s) used in any of the provided methods can contain non-polar active ingredients, such as polyunsaturated fatty acids, omega-3 fatty acids, omega-6 fatty acids, omega-9 fatty acids, conjugated fatty acids, coenzyme Q-containing active ingredients, oil soluble vitamins other than a vitamin E, alpha lipoic acid, medium chain triglycerides, carotenoid-containing active ingredients, cannabinoids and/or phytochemicals. In any of the provided methods, the non-polar active ingredient can contain at least one polyunsaturated fatty acid, such as an omega-3 fatty acid, omega-6 fatty acid and/or conjugated fatty acid.

In any of the provided methods, the non-polar active ingredient can contain a polyunsaturated fatty acid, such as a docosahexaenoic acid (DHA), an eicosapentaenoic acid (EPA), a fish oil, a flaxseed oil, a borage oil, an alpha-linolenic acid (ALA), a gamma-linolenic acid (GLA), a conjugated linoleic acid (CLA) and a saw palmetto extract. In some methods, DHA is provided in the non-polar active ingredient in an amount that is between 20% or about 20% and 90% or about 90% or between 25% or about 25% and 85% or about 85%; or between 35% or about 35% and 70% or about 70%, or between 25% or about 25% and 40% or about 40%, by weight, of the non-polar active ingredients. EPA can be present in the non-polar active ingredients, in some of the provided methods, in an amount that is between 5% or about 5% and 15% or about 15%, between 5% or about 5% and 13% or about 13%, or between 5% or about 5% and 10% or about 10%, by weight, of the non-polar active ingredients. The non-polar active ingredient can contain ALA, in some methods, in an amount between 50% or about 50% and 80% or about 80%, or between 65% or about 65% and 75% or about 75%, by weight, of the non-polar active ingredients. In some methods, GLA can be present in an amount that is at least 22% or about 22%, by weight, of the non-polar active ingredients.

In some examples of the methods provided herein, the water phase ingredients can contain a polar solvent, added at an amount between 40% or about 40% and 85% or about 85%, by weight, of the concentrate. In some methods, the polar solvent is a polar protic solvent, such as water, glycerin, propylene glycol, ethylene glycol, tetraethylene glycol, triethylene glycol and trimethylene glycol.

In some methods, the polar solvent is water and the water is added at an amount that is between 45% or about 45% and 80% or about 80%, or between at or about 55% or about 55% and 70% or about 70%, by weight, of the concentrate. In other methods, the polar solvent is water and the water is added at an amount between 65% or about 65% and 80% or about 80%, or between at or about 68% or about 68% and 76% or about 76%, by weight, of the concentrate.

In any of the methods provided herein, the oil phase or water phase ingredients can further contain a co-surfactant in an amount sufficient to stabilize the concentrate. In some methods, the co-surfactant can contain a phospholipid. In particular methods, the phospholipid contains phosphatidylcholine. The phospholipid can be present in an amount that is between 0.1% or about 0.1% and 1% or about 1%, by weight, of the concentrate.

The oil phase or the water phase ingredients also can contain at least one preservative in amount sufficient to preserve the concentrate in any of the methods provided herein. In some methods, the preservative includes benzyl alcohol. In exemplary methods, benzyl alcohol is present in an amount that is between 0.1% or about 0.1% and 1% or about 1%, by weight, of the concentrate.

In any of the methods provided herein, the oil phase ingredients can contain a non-polar solvent that dissolves the non-polar active ingredient and differs therefrom, wherein the amount of non-polar solvent is sufficient to dissolve the non-polar active ingredient. In some methods, the non-polar solvent contains a Vitamin E oil or a flaxseed oil or a combination thereof. The non-polar solvent, in some methods, is between 1% or about 1% and 6% or about 6% of the concentrate.

An emulsion stabilizer can be included among the oil phase ingredients, the water phase ingredients, or the oil phase ingredients and the water phase ingredients in any of the methods provided herein. In some methods, the emulsion stabilizer is different from the modified food starch, at an amount sufficient to stabilize the concentrate. For example, the emulsion stabilizer can comprise a blend of gums, such any one or more of guar gum, xanthan gum and sodium alginate.

The provided methods can include adding one or more flavors to the concentrate, at an amount sufficient to enhance the taste of the concentrate, the smell of the concentrate, or a combination thereof. Exemplary flavors that can be added include one or more of lemon oil and D-limonene.

The methods provided herein can include adding one or more pH adjusters to the concentrate, wherein the pH adjuster(s) contain an acid or a base at an amount sufficient to affect the pH of the concentrate. In some methods, the pH is adjusted by addition of citric acid or phosphoric acid.

Also provided are methods of providing an oil-based additive in a beverage adding any of the compositions provided herein to an aqueous beverage medium in an amount, such that the aqueous medium contains an effective amount of the non-polar active ingredient for supplementation of the diet. In some methods, the beverage can be water, soda, milk, juice or a sports nutrition beverage, and/or the non-polar active ingredient(s) can be an omega-3 fatty acid, omega-6 fatty acid, conjugated fatty acid, coenzyme Q10 compound, phytosterol and/or saw palmetto extract. In some of the provided methods, the non-polar active ingredient(s) is/are coenzyme Q10, a docosahexaenoic acid (DHA), an eicosapentaenoic acid (EPA), a fish oil, a flaxseed oil, a borage oil, an alpha-linolenic acid (ALA), a gamma-linolenic acid (GLA), a conjugated linoleic acid (CLA), a saw palmetto extract, and/or a phytosterol.

Also provided herein are powders formulated from any of the compositions provided herein and methods for preparing powders that include spray drying or freeze drying any of the compositions provided herein. For example, provided herein is a lyophilized or spray dried powder produced by lyophilizing or spray drying a liquid emulsion concentrate of any of the compositions provided herein.

Also provided are uses of any of the compositions herein for the preparation of a beverage and for the preparation of a dry powder.

Provided herein are beverage compositions, that contain a beverage concentrate and a mixture of a bicarbonate or carbonate, an ingestible acid and an antioxidant, in a beverage base, such that the beverage composition contains at least at or at least about 0.05%, by weight, one or more non-polar compounds, and the organoleptic properties of the beverage composition containing the beverage concentrate are the same or about the same as the organoleptic properties of the beverage composition in the absence of the beverage concentrate for at least at or about 1 month, wherein the beverage base is present in an amount at of at least 50%, by weight, of the composition; the bicarbonate or carbonate is present in an amount between at or about 0.01% and at or about 7%, inclusive, by weight, of the composition; the ingestible acid is present in an amount between at or about 0.01% and at or about 5%, inclusive, by weight, of the composition; the antioxidant is present in an amount between at or about 0.01% and at or about 3%, inclusive, by weight, of the composition; the beverage composition is for direct ingestion; and the beverage concentrate contains (a) a modified food starch in an amount between 8% or about 8% and 20% or about 20%, by weight, of the concentrate; (b) a PEG-derivative of vitamin E surfactant in an amount between 2% or about 2% and 10% or about 10%, by weight, of the concentrate, wherein the PEG-derivative of vitamin E surfactant is a water-soluble derivative of vitamin E mixture that comprises at least 13 weight % water-soluble derivative of vitamin E dimer and up to 87% water-soluble derivative of vitamin E monomer; and (c) one or more non-polar compounds in an amount between 5% or about 5% and 30% or about 30%, by weight, of the concentrate.

Also provided herein are beverage compositions containing a beverage concentrate and a mixture of a bicarbonate or carbonate, an ingestible acid and an antioxidant, in a beverage base, such that the beverage composition contains at least at or at least about 0.05%, by weight, one or more non-polar compounds and the organoleptic properties of the beverage composition containing the beverage concentrate are the same or about the same as the organoleptic properties of the beverage composition in the absence of the beverage concentrate for at least at or about 1 month, wherein the beverage base is present in an amount at of at least 50%, by weight, of the composition; the bicarbonate or carbonate is present in an amount between at or about 0.01% and at or about 7%, inclusive, by weight, of the composition; the ingestible acid is present in an amount between at or about 0.01% and at or about 5%, inclusive, by weight, of the composition; the antioxidant is present in an amount between at or about 0.01% and at or about 3%, inclusive, by weight, of the composition; the beverage composition is for direct ingestion; and the beverage concentrate contains (a) a modified food starch in an amount between 15% or about 15% and 25% or about 25%, by weight, of the concentrate; (b) a polar solvent in an amount between 55% or about 55% and 80% or about 80%, by weight, of the concentrate; and (c) one or more non-polar compounds in an amount between 5% or about 5% and 20% or about 20%, by weight, of the concentrate.

In any of the beverage compositions provided herein, the concentrate is present in an amount between at or about 0.001% and at or about 10%, inclusive, by weight, of the beverage composition.

In some of the provided beverage compositions, the water-soluble derivative of vitamin E mixture comprises at least at or about 20%, 25'% or 29%, by weight, water-soluble derivative of vitamin E dimer. In some beverage compositions, the water-soluble derivative of vitamin E mixture can contain up to at or about 75%, 70%, 69%, 62%, 55%, 50%, 45%, 40%, 35% water-soluble derivative of vitamin E dimer or between at or about 29% and at or about 69%, inclusive, by weight, water-soluble derivative of vitamin E dimer. In some beverage compositions, the water-soluble derivative of vitamin E mixture comprises less than at or about 70%, 65%, 63%, 62% or 61%, by weight, the water-soluble derivative of vitamin E monomer.

In some examples of the beverage compositions provided herein, the water-soluble derivative of vitamin E mixture contains a PEG moiety having a molecular weight between at or about 100 Da and 20,000 Da, 200 Da and 10,000 Da, 200 Da and 8000 Da, 200 Da and 6000 Da, 200 Da and 5000 Da, 200 Da and 3000 Da, 200 Da and 1000 Da, 200 Da and 800 Da, 200 Da and 600 Da, 200 Da and 400 Da, 400 Da and 20,000 Da, 400 Da and 10,000 Da, 400 Da and 8000 Da, 400 Da and 6000 Da, 400 Da and 5000 Da, 400 Da and 3000 Da, 400 Da and 1000 Da, 400 Da and 800 Da, 400 Da and 600 Da, 600 Da and 20,000 Da, 600 Da and 10,000 Da, 600 Da and 8000 Da, 600 Da and 6000 Da, 600 Da and 5000 Da, 600 Da and 3000 Da, 600 Da and 1000 Da, 600 Da and 800 Da, 800 Da and 20,000 Da, 800 Da and 10,000 Da, 800 Da and 8000 Da, 800 Da and 6000 Da, 800 Da and 5000 Da, 800 Da and 3000 Da, 800 Da and 1000 Da, 1000 Da and 20,000 Da, 1000 Da and 10,000 Da, 1000 Da and 8000 Da, 1000 Da and 6000 Da, 1000 Da and 5000 Da, 1000 Da and 3000 Da, 3000 Da and 20,000 Da, 3000 Da and 10,000 Da, 3000 Da and 8000 Da, 3000 Da and 6000 Da, 3000 Da and 5000 Da, 5000 Da and 20,000 Da, 5000 Da and 10,000 Da, 5000 Da and 8000 Da, 5000 Da and 6000 Da, 6000 Da and 20,000 Da, 6000 Da and 10,000 Da, 6000 Da and 8000 Da, 8000 Da and 20,000 Da, 8000 Da and 10,000 Da or 10000 Da and 20,000 Da, or has a molecular weight of 100, 200, 238, 300, 400, 500, 600, 750, 800, 1000, 1200, 1500, 2000, 2500, 3000, 3400, 3500, 4000, 6000, 8000, 10,000, 12,000 or 20,000 Da.

Exemplary water-soluble derivatives of a vitamin E mixture, which can be included in some of the beverage compositions provided herein, include tocopheryl polyethylene glycol succinate, tocopheryl polyethylene glycol sebacate, tocopheryl polyethylene glycol dodecanodioate, tocopheryl polyethylene glycol suberate, tocopheryl polyethylene glycol azelaate, tocopheryl polyethylene glycol citraconate, tocopheryl polyethylene glycol methylcitraconate, tocopheryl polyethylene glycol itaconate, tocopheryl polyethylene glycol maleate, tocopheryl polyethylene glycol glutarate, tocopheryl polyethylene glycol glutaconate, tocopheryl polyethylene glycol fumarate, tocopheryl polyethylene glycol phthalate, tocotrienol polyethylene glycol succinate, tocotrienol polyethylene glycol sebacate, tocotrienol polyethylene glycol dodecanodioate, tocotrienol polyethylene glycol suberate, tocotrienol polyethylene glycol azelaate, tocotrienol polyethylene glycol citraconate, tocotrienol polyethylene glycol methylcitraconate, tocotrienol polyethylene glycol itaconate, tocotrienol polyethylene glycol maleate, tocotrienol polyethylene glycol glutarate, tocotrienol polyethylene glycol glutaconate, tocotrienol polyethylene glycol fumarate and tocotrienol polyethylene glycol phthalate.

In some beverage compositions, the water-soluble derivative of vitamin E mixture is selected from among tocopheryl polyethylene glycol succinate (TPGS), tocopheryl sebacate polyethylene glycol, tocopheryl dodecanodioate polyethylene glycol, tocopheryl suberate polyethylene glycol, tocopheryl azelaate polyethylene glycol, tocopheryl citraconate polyethylene glycol, tocopheryl methylcitraconate polyethylene glycol, tocopheryl itaconate polyethylene glycol, tocopheryl maleate polyethylene glycol, tocopheryl glutarate polyethylene glycol, tocopheryl glutaconate polyethylene glycol and tocopheryl phthalate polyethylene glycol, TPGS analogs and TPGS homologs. For example, the water-soluble derivative of vitamin E mixture can be α-tocopheryl polyethylene glycol succinate (TPGS), such as α-tocopheryl polyethylene glycol succinate 1000.

In some examples of the beverage compositions provided herein, the water-soluble derivative of a vitamin E mixture can contain between at or about 25% and 30%, 25% and 35%, 25% and 40%, 25% and 45%, 25% and 50%, 25% and 55%, 25% and 60%, 25% and 65%, 30% and 35%, 30% and 40%, 30% and 45%, 30% and 50%, 30% and 55%, 30% and 60%, 30% and 65%, 30% and 69%, 35% and 40%, 35% and 45%, 35% and 50%, 35% and 55%, 35% and 60%, 35% and 65%, 35% and 69%, 40% and 45%, 40% and 50%, 40% and 55%, 40% and 60%, 40% and 65%, 40% and 69%, 45% and 50%, 45% and 55%, 45% and 60%, 45% and 65%, 45% and 69%, 50% and 55%, 50% and 60%, 50% and 65%, 50% and 69%, 55% and 60%, 55% and 65%, 55% and 69%, 60% and 65%, 60% and 69% or 65% and 69%, by weight, water-soluble derivative of vitamin E monomer, or can contain at or about 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68% or 69%, by weight, water-soluble derivative of vitamin E monomer.

In some examples of the beverage compositions provided herein, the water-soluble derivative of vitamin E mixture contains between at or about 13% and 20%, 13% and 25%, 13% and 30%, 13% and 35%, 13% and 40%, 13% and 45%, 13% and 50%, 13% and 55%, 13% and 60%, 13% and 65%, 13% and 70%, 13% and 75%, 20% and 25%, 20% and 30%, 20% and 35%, 20% and 40%, 20% and 45%, 20% and 50%, 20% and 55%, 20% and 60%, 20% and 65%, 20% and 70%, 20% and 75%, 25% and 30%, 25% and 35%, 25% and 40%, 25% and 45%, 25% and 50%, 25% and 55%, 25% and 60%, 25% and 65%, 25% and 70%, 25% and 75%, 30% and 35%, 30% and 40%, 30% and 45%, 30% and 50%, 30% and 55%, 30% and 60%, 30% and 65%, 30% and 70%, 30% and 75%, 35% and 40%, 35% and 45%, 35% and 50%, 35% and 55%, 35% and 60%, 35% and 65%, 35% and 70%, 35% and 75%, 40% and 45%, 40% and 50%, 40% and 55%, 40% and 60%, 40% and 65%, 40% and 70%, 40% and 75%, 45% and 50%, 45% and 55%, 45% and 60%, 45% and 65%, 45% and 70%, 45% and 75%, 50% and 55%, 50% and 60%, 50% and 65%, 50% and 69%, 55% and 60%, 55% and 65%, 55% and 70%, 55% and 75%, 60% and 65%, 60% and 70%, 60% and 75%, 65% and 70%, 65% and 75% or 70% and 75%, by weight, water-soluble derivative of vitamin E dimer, or contains at or about 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74% or 75%, by weight, water-soluble derivative of vitamin E dimer.

The water-soluble derivative of vitamin E mixture, in some of the provided beverage compositions, can comprise between at or about 35% and at or about 65%, inclusive, by weight, water-soluble derivative of vitamin E monomer and between at or about 25% and at or about 65%, inclusive, by weight, water-soluble derivative of vitamin E dimer. Other beverage compositions can contain a water-soluble derivative of vitamin E mixture that contains between at or about 29% and at or about 61%, or between at or about 29% and at or about 62%, by weight, water-soluble derivative of vitamin E dimer. In other examples of beverage compositions, the water-soluble derivative of vitamin E mixture can contain between at or about 35% and at or about 55%, by weight, water-soluble derivative of vitamin E dimer. In some examples of the beverage compositions provided herein, the water-soluble derivative of vitamin E mixture is a high dimer water-soluble derivative of vitamin E mixture.

In any of the beverage compositions provided herein, the starch can be modified physically, enzymatically, chemically or by any combination thereof. In some beverage compositions, the starch can be modified by pregelatinization, oxidation, enzymatic degradation, enzymatic conversion, esterification, cross-linking, acetylation, hydroxypropylation or any combination thereof. For example, the modified food starch can be chemically modified by esterification with a C3-C22 fatty acid chain.

The modified food starch, in any of the beverage compositions provided herein, can be a modified corn, potato, wheat, rice, tapioca, sago, oat, barley, amaranth, waxy corn, cassava, waxy barley, waxy rice, glutinous rice or sweet rice starch. In some examples, the modified food starch is an octenyl succinate starch that is a sodium octenyl succinate starch, calcium octenyl succinate starch or aluminum octenyl succinate starch.

In the compositions provided herein, the modified food starch can be any known to the skilled artisan. Modified food starches include, but are not limited to, modified waxy corn starches and sodium octenyl succinate waxy corn starch.

Bicarbonates and carbonates include those selected from among potassium bicarbonate, sodium bicarbonate, potassium carbonate, sodium carbonate, calcium carbonate, magnesium carbonate and zinc carbonate. Ingestible acids, include, for example, citric acid, phosphoric acid, adipic acid, ascorbic acid, lactic acid, malic acid, fumaric acid, gluconic acid, succinic acid, tartaric acid and maleic acid. Antioxidants, include for example, ascorbic acid, ascorbate and a coenzyme Q-containing compound. Vitamin C can be used as the antioxidant is vitamin C, present, for example, in an amount between at or about 0.01% and at or about 0.5%, inclusive, by weight, of the composition, where the composition is for direct consumption. Where the antioxidant is a coenzyme Q-containing compound, it can be present in amount of between at or about 0.1% and at or about 1%, inclusive, by weight, of the composition, where the composition is for direct ingestion. Acids, such as citric acid, for example, is present in an amount between at or about 0.05% and at or about 4%, inclusive, by weight, of the composition, where the composition is for direct consumption.

The compositions for direct consumption, such as the beverage compositions, can include one or more non-polar compounds at a concentration that is between at or about 0.05% and at or about 20%, inclusive, by weight, of the composition. Non-polar compounds for inclusion in any of the compositions provided herein, include, but are not limited to, polyunsaturated fatty acids, omega-3 fatty acids, omega-6 fatty acids, omega-9 fatty acids, conjugated fatty acids, coenzyme Q-containing active ingredients, oil soluble vitamins other than a vitamin E, alpha lipoic acid, medium chain triglycerides, carotenoid-containing active ingredients and phytochemicals. Exemplary of these non-polar compounds is a polyunsaturated fatty acid selected from among a docosahexaenoic acid (DHA), an eicosapentaenoic acid (EPA), a fish oil, a flaxseed oil, a borage oil, an alpha-linolenic acid (ALA), a gamma-linolenic acid (GLA), a conjugated linoleic acid (CLA), and a saw palmetto extract. The amount of DHA can be between 20% or about 20% and 90% or about 90% or between 25% or about 25% and 85% or about 85%; or between 35% or about 35% and 70% or about 70%, or between 25% or about 25% and 40% or about 40%, by weight, of the non-polar ingredients. The concentration of EPA can be between 5% or about 5% and 15% or about 15%, between 5% or about 5% and 13% or about 13%, or between 5% or about 5% and 10% or about 10% by weight, of the non-polar ingredients. The amount of ALA can be between 50% or about 50% and 80% or about 80%, or between 65% or about 65% and 75% or about 75%, by weight, of the non-polar ingredients. The amount of GLA can be 22% or about 22%, by weight, of the non-polar ingredients.

The compositions for direct consumption can contain one or more non-polar compounds in an amount between 15% or about 15% and 20% or about 20%, or between 16% or about 16% and 19% or about 19%, by weight, of the concentrate. These compositions can contain a polar solvent in an amount between 40% or about 40% and 85% or about 85%, by weight, of the concentrate. Polar solvents include protic solvents, such as, but not limited to water, glycerin, propylene glycol, ethylene glycol, tetraethylene glycol, triethylene glycol and trimethylene glycol and mixtures thereof. Exemplary concentrations, for example, of water, include between 45% or about 45% and 80% or about 80%, or between 55% or about 55% and 70% or about 70%, by weight, of the concentrate, such as between 65% or about 65% and 8% or about 80%, or between 68% or about 68% and 76% or about 76%, by weight, of the concentrate.

The compositions can include other ingredients, such as but not limited to: a co-surfactant, such as a phospholipid, such as phophatidyl choline in an amount sufficient to stabilize the concentrate compared to the absence of the co-surfactant, in an amount, such as between 0.1% or about 0.1% and 1% or about 1%, by weight, of the composition, such as a concentrate; a preservative, such as benzyl alcohol in an amount between 0.1% or about 0.1% and 1% or about 1%, by weight, of the composition, such as a concentrate.

The compositions can include addition non-polar solvents that is in an amount sufficient to dissolve or aid in dissolution of the non-polar active ingredient and that differs therefrom. Examples of such non-polar solvents, include, but are not limited to, a Vitamin E oil, a flaxseed oil, or a combination thereof. Exemplary amounts, such as in concentrates, include between 1% or about 1% and 6% or about 6%, by weight, of the concentrate.

The compositions can include additional and different emulsion stabilizers from the modified food starch, such as a blend of gums, including any one or more of guar gum, xanthan gum and sodium alginate. The compositions, particularly those for direct consumption can include a flavor enhancer and/or taste modifier to render the composition more palatable or palatable compared to the absence thereof. Flavors and taste modifiers include, for example, lemon oil, D-limonene, cinnamon, sweeteners, vanilla, and any others, and combination thereof. The compositions also can include a pH adjuster contains an acid or a base at an amount sufficient to affect the pH of the concentrate compared to the pH adjuster. pH adjusters, include, but are not limited to, ingestible acids, such as citric acid, phosphoric acid and combinations thereof.

The compositions provided herein can be provided in a container. The container, which can be a bottle, ampoule or such container, can be sealed and optionally can contain nitrogen, where the nitrogen replaces air in the container, thus actin as a preservative.

Related nanoemulsion concentrates and preparations thereof are described, for example, in U.S. Pat. No. 8,282,977 and co-pending U.S. application Ser. No. 13/575,440, published as US-2013-0017295, U.S. patent application Ser. No. 12/383,241, published as US-2009-0297491, U.S. patent application Ser. No. 13/065,510, published as US-2011-0236364, U.S. patent application Ser. No. 13/134,927, published as US-2012-016026 and U.S. patent application Ser. No. 13/815,193. The subject matter of each of the above-referenced applications is incorporated herewith by reference in its entirety.

DETAILED DESCRIPTION

Outline
A. Definitions
B. Compositions Containing Modified Food Starches
  1. Concentrates
    a. Liquid emulsion concentrates
      i. Formulating the liquid concentrates
      ii. Common ingredients and typical concentration ranges
    b. Dilution compositions containing the liquid emulsion concentrates
    c. Evaluation of the initial concentrates and dilution compositions
      i. Stability
        1. Stability determined by empirical evaluation
        2. Oxidative stability
      ii. Clarity
        1. Clarity determined by empirical evaluation
        2. Clarity determined by particle size or number of particles
        3. Turbidity
      iii. Empirical evaluation
      iv. Oxidative Stability
      v. Particle size
      vi. Turbidity measurement
      vii. Desirable characteristics for human consumption
      viii. Safety
      ix. Oral bioavailability
    d. Selecting a formulation and modifying formulations
  2. Compositions for direct consumption
  Common ingredients and typical concentration ranges
  3. Powder forms of the compositions
  4. Exemplary ingredients and concentration ranges
    a. Non-Polar Compounds
      i. Polyunsaturated Fatty Acid (PUFA)-containing active ingredients
        1. Omega-3 fatty acid compounds
          a. DHA/EPA
            i. Fish oils
            ii. Algae oil
          b. Flax Seed Oil—omega 3 (ALA)
        2. Omega-6 compounds
          Borage oil (Gamma-Linolenic Acid (GLA))
        3. Conjugated Linoleic Acid (CLA)
      ii. Coenzyme Q Active Ingredients
        Coenzyme Q10
      iii. Phytochemical-Containing Active Ingredients
        1. Phytosterols
        2. Resveratrol
      iv. Carotenoid-Containing Active Ingredients
        1. Carotenes
        2. Xanthophylls
      v. Micronutrient-Containing Active Ingredients
        1. Vitamins
        2. Alpha Lipoic Acid (Thioctic Acid)
      vi. Other fatty acids
        1. Saw Palmetto extract
        2. MCT oil
    b. Modified Food Starches
    c. Surfactants
      i. Vitamin E derived surfactants
        1. PEG-Derivatives of Vitamin E
          a. Tocopherols and Tocotrienols
          b. PEG moieties
          c. Linkers
          d. Tocopherol polyethylene glycol and Tocotrienol polyethylene glycol diesters (dicarboxylic acid esters of Vitamin E linked to PEG)
          e. Other Vitamin E PEG Esters
          f. TPGS Surfactants
            TPGS analogs
        2. Water-soluble derivative of vitamin E mixtures
      ii. Concentration of the surfactant
    d. Polar solvents
    e. Soluble Fiber
    f. Co-surfactants (emulsifiers)
      Phospholipids
    g. Emulsion stabilizers (co-emulsifier)
    h. Preservatives and Sterilizers
    i. Non-polar solvents
    j. Flavors
    k. pH adjusters
    l. Antifoaming agents
    m. Stabilizers
      i. Bicarbonates or carbonates
      ii. Acids
      iii. Antioxidants
    n. Sweeteners
C. Methods for Making Compositions Containing Non-Polar Compounds
  1. Equipment for making the compositions
    a. Scales
    b. Purifiers, including filters
    c. Vessels for mixing the ingredients
    d. Mixers
    e. Heating apparatuses
    f. Cooling apparatuses
    g. Transfer means
    h. Evaluation equipment 2. General methods for making compositions
   a. Water phase ingredients
   b. Water phase production
   c. Oil phase ingredients
   d. Oil phase production
   e. Combining phases
   f. Cooling
   g. Filtration, additions, evaluation and packaging
   h. Cleaning the equipment
3. Bench-top process
4. Scaled-up manufacturing processes
   a. Water purification
   b. Generation of the water phase and oil phase
   c. Combining and emulsifying the phases
   d. Cooling
   e. Additional steps
5. Methods for making food and beverage compositions containing the concentrates
   a. Dilutions
   b. Analyzing the aqueous liquid dilution compositions containing the liquid emulsion concentrates D. Examples A. Definitions Unless defined otherwise, all technical and scientific terms used herein have the same meaning as is commonly understood by one of skill in the art to which the invention(s) belong. All patents, patent applications, published applications and publications, GENBANK sequences, websites and other published materials referred to throughout the entire disclosure herein, unless noted otherwise, are incorporated by reference in their entirety. In the event that there is a plurality of definitions for terms herein, those in this section prevail. Where reference is made to a URL or other such identifier or address, it is understood that such identifiers can change and particular information on the internet can come and go, but equivalent information is known and can be readily accessed, such as by searching the internet and/or appropriate databases. Reference thereto evidences the availability and public dissemination of such information.

As used herein, colloid refers to a mixture containing two phases, a dispersed phase and a continuous phase, the dispersed phase containing particles (droplets) distributed throughout the continuous phase. Colloidal mixtures include aerosols, foams and dispersions, for example, emulsions. A liquid colloid, for example, an emulsion, can have a similar appearance, for example, clarity, to a solution, in which there is no dispersed phase.

As used herein, emulsion refers to a colloidal dispersion of two immiscible liquids, for example, an oil and water (or other aqueous liquid, e.g., a polar solvent), one of which is part of a continuous phase and the other of which is part of a dispersed phase. The provided compositions include emulsions, typically oil-in-water emulsions (which include any oil soluble phase dispersed in any aqueous phase, also called the water phase), in which the oil phase is the dispersed phase and the water phase is the continuous phase. Emulsions typically are stabilized by one or more surfactants and/or co-surfactants and/or emulsion stabilizers. Surfactants form an interfacial film between the oil and water phase of the emulsion, providing stability. Typically, the emulsions of the provided compositions contain micelles, containing one or more surfactants surrounding a non-polar active ingredient, which are dispersed in the water phase. Exemplary of the provided emulsions are the provided liquid emulsion concentrates and compositions made by diluting the concentrates.

As used herein, a nanoemulsion is an emulsion in which the dispersed droplets, for example, the micelles, have a diameter (particle size) less than 1000 nm or less than about 1000 nm, typically, less than 500 nm or less than about 500 nm, typically less than 300 nm or about 300 nm, for example, less than 250 nm or about 250 nm, for example, less than 200 nm or less than about 200 nm, for example, less than or less than about 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm.

As used herein, "micelle" refers to aggregates formed by surfactants that typically form when the surfactant is present in an aqueous composition, typically when the surfactant is used at a concentration above the critical micelle concentration (CMC). In micelles, the hydrophilic portions of the surfactant molecules contact the aqueous or the water phase, while the hydrophobic portions form the core of the micelle, which can encapsulate non-polar ingredient(s), for example, the non-polar compounds in the provided compositions. Typically, the surfactants and/or co-surfactants in the provided compositions aggregate in the emulsions and the aqueous liquids to form micelles, which contain the non-polar compound(s). The hydrophilic portion(s) of the surfactant molecules are oriented toward the outside of the micelle, in contact with the aqueous medium, while the hydrophobic portion(s) of the surfactant molecules are oriented toward the center of the micelle, in contact with the non-polar compound(s), which is contained in the center of the micelle. The micelles can contain more than one surfactant. Typically, the micelles in the provided compositions have a particle size of about 1000 nm, typically, less than 500 nm or less than about 500 nm, typically less than 300 or about 300 nm, for example, less than 250 nm or about 250 nm, for example, less than 200 nm or less than about 200 nm, for example, less than or less than about 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm.

As used herein, "inverse micelles" are surfactant aggregates that typically form in lipophilic solutions, with the hydrophilic portions forming the core. When the cross sectional area of the hydrophobic region of the surfactant molecule is greater than that of the hydrophilic part of the molecule, the formation of micelles, which can be hexagonal phase structures, is favored.

As used herein, "liposomes" are surfactant aggregates composed of lipid bilayers, typically having an aqueous core. Liposomes typically are formed by lipid surfactants, typically, phospholipids, which are amphipathic, phosphate-containing lipids, for example, molecules containing one phosphate, a glycerol and one or more fatty acids, and similar surfactants. Alternatively, phospholipid surfactants can be used as co-surfactants, which can be incorporated into aggregates of other surfactant(s), for example, micelles. Lipid bilayers are two dimensional sheets in which all of the hydrophobic portions, e.g., acyl side chains, are shielded from interaction with aqueous liquid, except those at the ends of the sheet. An energetically unfavorable interaction of the acyl chains with water results in the folding of the bilayers to form liposomes, three-dimensional lipid bilayer vesicles. In one example, the liposome is formed as a single bilayer enclosing a single aqueous space (small unilamellar vesicles; SUVS). In another example, the liposome is composed of concentric bilayers with many aqueous spaces alternating with the bilayers (multilamellar vesicles; MLVS). Liposomes can be used to encapsulate hydrophobic and hydrophilic active ingredients. In liposomes, non-polar active ingredients typically are partitioned within the bilayers whereas hydrophilic active ingredients typically are trapped within the aqueous compartments. In one example, liposomes can be advantageous as a carrier/encapsulation system because they are stable and can protect the active ingredients from degradation, e.g., by oxygen and digestive enzymes.

As used herein, a "starch" refers to a carbohydrate containing a large number of glucose units joined by 1,4-alpha and 1,6-alpha glycosidic bonds.

As used herein, "modified food starch" refers to a starch that has been modified chemically, enzymatically, physically or by any combination thereof. For example, the modified food starch can be modified by pregellatinization, oxidation, enzymatic degradation, enzymatic conversion, esterification, cross-linking, acetylation, hydroxypropylation or any combination thereof. For example, the modified food starch is chemically modified by esterification with a C3-C22 fatty acid chain, such as an octenyl succinate starch. Exemplary of an octenyl succinate starch is a sodium octenyl succinate starch, calcium octenyl succinate starch or aluminum octenyl succinate starch. Modified food starches include modified corn, potato, wheat, rice, tapioca, sago, oat, barley, ameranth, waxy corn, cassava, waxy barley, waxy rice, glutinous rice or sweet rice starches.

As used herein, "surfactant" and "surface active agent" refer synonymously to synthetic and naturally occurring amphiphilic molecules that have hydrophobic portion(s) and hydrophilic portion(s). Due to their amphiphilic (amphipathic) nature, surfactants and co-surfactants typically can reduce the surface tension between two immiscible liquids, for example, the oil and water phases in an emulsion, stabilizing the emulsion. Any known surfactant or co-surfactant can be used with the provided compositions (see, e.g., U.S. Pat. No. 6,267,985). The surfactant(s) contained in the provided compositions typically have an HLB value between 12 and 20, inclusive, such as 12 or about 12 and 18, 19 or 20 or about 18, 19 or 20, 13 or about 13 and 20 or about 20, for example, 13 or about 13, 14 or about 14, 15 or about 15, 16 or about 16, 17 or about 17, 18 or about 18, 19 or about 19, and 20 or about 20, and typically between at or about 13 and at or about 18, more typically between at or about 15 and at or about 18. Exemplary surfactants include, but are not limited to, polyethylene glycol (PEG)-derived surfactants, such as PEG-derivatives of Vitamin E or water-soluble derivative of vitamin E mixtures, such as a high dimer water-soluble derivative of vitamin E mixture and tocotrienol or tocopherol PEG diesters, such as TPGS (e.g., TPGS 1000) and TPGS analogs. Typically, the surfactant is a natural surfactant, for example, a surfactant that is G.R.A.S. (generally recognized as safe) by the FDA and/or Kosher certified.

As used herein, "hydrophilic-lipophilic balance," "hydrophile-lipophile balance" or "HLB" refer synonymously to a value that is used to index and describe a surfactant according to its relative hydrophobicity/hydrophilicity, relative to other surfactants. A surfactant's HLB value is an indication of the molecular balance of the hydrophilic and lipophilic portions of the surfactant, which is an amphipathic molecule. Each surfactant and mixture of surfactants (and/or co-surfactants) has an HLB value that is a numerical representation of the relative weight percent of hydrophobic and hydrophilic portions of the surfactant molecule(s). HLB values are derived from a semi-empirical formula. The relative weight percentages of the hydrophobic and hydrophilic groups are indicative of surfactant properties, including the molecular structure, for example, the types of aggregates the surfactant will form and the solubility of the surfactant. See, for example, Griffin, W. C. *J. Soc. Cos. Chem.* 1:311 (1949). HLB values have been determined and are available for a plurality of surfactants (e.g., see U.S. Pat. No. 6,267,985) and can be determined using routine methods. It should be appreciated that HLB values for a surfactant or co-surfactant can vary, depending upon the empirical method used to determine the value. HLB values also are influenced by factors such as temperature and pH, such that accepted values vary as much as ±10% (see, e.g., Nonionic Surfactants: Physical Chemistry, Surfactant Science Series, Volume 23, Martin J. Schick, ed., 1987). Thus, HLB values of surfactants and co-surfactants provide a rough guide for formulating compositions based on relative hydrophobicity/hydrophilicity.

Surfactant HLB values range from 1 to 45, while the range for non-ionic surfactants typically is from 1 to 20 and the general range of interest herein is 12 to 20 or about 12 to about 20, inclusive. The more lipophilic a surfactant is, the lower its HLB value. Conversely, the more hydrophilic a surfactant is, the higher its HLB value. In general, surfactants with HLB values greater than 10 or greater than about 10 are more soluble in aqueous compositions, for example, water, and are called "hydrophilic surfactants," while surfactants having HLB values less than 10 or less than about 10 are more soluble in fats, oils and waxes, and are referred to as "hydrophobic surfactants" or "lipophilic surfactants." Relatively amphiphilic surfactants are soluble in oil and water based liquids and typically have HLB values close to 10 or about 10. A surfactant typically is selected from among surfactants having HLB values within a particular range of the surfactant or co-surfactant that can be used to guide formulations. Table 1 lists HLB values of exemplary surfactants and co-surfactants.

TABLE 1 reported HLB Values of Exemplary Surfactants and Co-Surfactants

| Surfactant/co-surfactant | HLB |
|---|---|
| PEG-2 Hydrogenated Castor Oil | 1.7 |
| Sorbitan Trioleate | 1.8 |
| Sorbitan Tristearate | 2.1 |
| Glyceryl Stearate | 3.5 |
| Sorbitan Sesquioleate | 3.7 |
| Labrafil | 4 |
| Sorbitan Oleate | 4.3 |
| Sorbitan monostearate | 4.7 |
| PEG-2 oleyl ether | 4.9 |
| PEG-2 stearyl ether | 4.9 |
| PEG-7 Hydrogenated Castor Oil | 5 |
| PEG-2 cetyl ether | 5.3 |
| PEG-4 Sorbitan Stearate | 5.5 |
| PEG-2 Sorbitan Isostearate | 6 |
| Sorbitan Palmitate | 6.7 |
| Triton SP-135 | 8 |
| Sorbitan monolaurate | 8.6 |
| PEG-40 Sorbitan Peroleate | 9.5 |
| PEG-4 lauryl ether | 9.7 |
| Polysorbate 81 | 10 |
| PEG-40 Sorbitan Hexaoleate | 10 |
| PEG-40 Sorbitan Perisostearate | 10 |
| PEG-10 Olive Glycerides | 10 |
| PEG sorbitol hexaoleate | 10.2 |
| Polysorbate 65 | 10.5 |
| PEG-25 Hydrogenated Castor Oil | 10.8 |
| Polysorbate 85 | 11 |

TABLE 1-continued reported HLB Values of Exemplary Surfactants and Co-Surfactants

| Surfactant/co-surfactant | HLB |
| --- | --- |
| PEG-7 Glyceryl Cocoate | 11 |
| PEG-8 Stearate | 11.1 |
| PEG sorbitan tetraoleate | 11.4 |
| PEG-15 Glyceryl Isostearate | 12 |
| PEG-35 Almond Glycerides | 12 |
| Tocopherol polyethylene glycol succinate (TPGS) | 12-18 |
| PEG-10 oleyl ether | 12.4 |
| PEG-8 isooctylphenyl ether | 12.4 |
| PEG-10 stearyl ether | 12.4 |
| PEG-35 Castor Oil | 12.5 |
| PEG-10 cetyl ether | 12.9 |
| Nonoxynol-9 | 12.9 |
| PEG-40 Castor Oil | 13 |
| PEG-10 isooctylphenyl ether | 13.5 |
| PEG-40 Hydrogenated Castor Oil | 14 |
| Labrasol | 14 |
| Nonoxynol-15 | 14.2 |
| PEG-12 tridecyl ether | 14.5 |
| PEG-18 tridecyl ether | 14.5 |
| Polysorbate 60 | 14.9 |
| Polysorbate 80 | 15 |
| PEG-20 Glyceryl Stearate | 15 |
| PEG-20 Stearate | 15 |
| PEG-20 stearyl ether | 15.3 |
| PEG-20 oleyl ether | 15.3 |
| Polysorbate 40 | 15.6 |
| PEG20 cetyl ether | 15.7 |
| PEG(20) hexadecyl ether | 15.7 |
| PEG-60 Hydrogenated Castor Oil | 16 |
| PEG-30 Stearate | 16.5 |
| Polysorbate 20 | 16.7 |
| PEG-75 Lanolin | 16.7 |
| PEG23 lauryl ether | 16.9 |
| PEG-40 Stearate | 17.3 |
| PEG-50 Stearate | 17.7 |
| PEG40 isooctylphenyl ether | 17.9 |
| PEG-100 Stearate | 18.8 |
| Pluronic F68 | 29 |
| Phosphatidylcholine | 7.6 |

As used herein, "vitamin E" refers to any naturally occurring or synthetic form of vitamin E, for example, tocopherols and tocotrienols, and can refer to a single form of the compound or a mixture of forms.

As used herein, "water-soluble derivative of vitamin E mixture," "water-soluble vitamin E derivative composition," "water-soluble vitamin E derivative," "water-soluble vitamin E derivative surfactant," and "water-soluble vitamin E surfactant," which are be used interchangeably, refer to compositions that contain mixtures of water-soluble forms of vitamin E (vitamin E-derivatized with moieties, such as polyalkylene glycol) that increase the water solubility of the water-insoluble vitamin E. The mixtures contain dimers and monomers of the vitamin E derivatives The water-soluble vitamin E derivative mixtures (compositions) include vitamin E (natural or synthetic forms of vitamin E), such as tocopherol derivatives and tocotrienol derivatives. Derivatives of vitamin E, such as PEG-derivatives previously produced are manufactured to contain as much monomer form as possible, and to contain minimal amounts of any dimer form (see, e.g., Christiansen et al. (2011) J. Pharm. Sci. 100(5):1773-1782).

In contrast, the high dimer derivative of vitamin E mixtures employed herein are manufactured to contain dimer forms. The mixtures described herein contain at least 13%, particularly at least or at least about 20%, 25%, 29% or more, dimer form of the water-soluble vitamin E derivative. In particular, the water-soluble derivative of vitamin E mixtures are manufactured to contain between or between about 13 wt % and about or up to 95%, 90%, 85%, 80% or 75 wt %, particularly from at least 29% to 75% or 80%, inclusive, of the water-soluble vitamin E dimer. In general, the high dimer derivatives, such as PEG-derivatives of vitamin E mixtures, such as a high dimer TPGS composition, contain 30%-60%, particularly 35%-52% dimer, the remainder being the monomer form and less than 5%, generally 3%, 2%, or 1%, other trace components, such as unreacted reagents, such as vitamin E and the hydrophilic derivatizing moiety.

In general, the mixtures herein contain at least 13% of the dimer form and up to 87% monomer form, particularly at least 25% dimer form and up to 70% monomer form, such as between or between about 25 wt % and 69%, inclusive, monomer. Hence, the water-soluble derivative of vitamin E mixtures contain a substantial amount (i.e., 13% or more, particularly 25%, 29%, 35%, 48%, 52% or more) dimer form compared to commercially available forms that are manufactured to provide the monomer form.

As manufactured, the high dimer mixture scan include other forms and unreacted components, hence the total amount of dimer and monomer do not necessarily total 100%, by weight, of the composition. It is shown herein that inclusion of at least 13%, 20%, 25%, 29% or more dimer form, and some monomer form, about less than 87%, 69%, 65%, 60%, 55%, 50% monomer with at least 30% dimer, confers advantageous properties on these water-soluble derivative of vitamin E mixtures not possessed by such compositions that contain lower amounts of the dimer form.

Examples of water-soluble derivative of vitamin E mixtures are those formed by covalently attaching the vitamin E moiety, e.g., a tocopherol or tocotrienol, to a hydrophilic moiety, for example, an alkylene glycol, such as a polyethylene glycol (PEG) moiety, via a linker. The compositions as provided herein are manufactured so that the resulting water-soluble vitamin E derivative mixtures (compositions) include a mixture of monomers and dimers of the water-soluble vitamin E derivatives, and contain a substantial amount (compared to prior art preparations), i.e., from 13% to 95%, inclusive, such as least 13%, 20%, 25%, 29%, up to as much as 75%, 80%, 85%, 90%, 95%, by weight, dimer form and generally less than 70%, 65%, 63%, 62%, 61% or 60% or less monomer form. Water-soluble vitamin E derivative mixtures (compositions) include, for example, polyalkylene glycol derivatives of tocopherol, e.g., polyethylene glycol (PEG) derivatives of tocopherol, and polyalkylene glycol derivatives of tocotrienol, e.g., polyethylene glycol (PEG) derivatives of tocotrienol. The water-soluble vitamin E derivatives can include, for example, vitamin E TPGS (D-α-tocopheryl polyethylene glycol succinate), TPGS analogs, TPGS homologs and TPGS derivatives.

As used herein, "tocopherol" and "tocotrienol" refer to any naturally occurring or synthetic form of vitamin E, and can refer to a single compound or a mixture of tocopherols and tocotrienols. Examples of tocopherols include, for example, α-tocopherol, D-α-tocopherol, β-tocopherol, γ-tocopherol and δ-tocopherol. Examples of tocotrienols include, for example, α-tocotrienol, β-tocotrienol, γ-tocotrienol and δ-tocotrienol.

As used herein, a "PEG derivative of vitamin E" or "vitamin E-PEG conjugate" or "vitamin E-PEG derivative," is a compound containing one or more vitamin E moiety (e.g., a tocopherol or tocotrienol) joined by a covalent bond, for example an ester, ether, amide or thioester bond, to one or more polyethylene glycol (PEG) moieties, via a linker, such as a dicarboxylic or tricarboxylic acid. Exemplary of PEG derivatives of vitamin E are D-α-tocopheryl polyethylene glycol succinate (TPGS), TPGS analogs, TPGS homologs and TPGS derivatives.

As used herein, a "tocopherol polyethylene glycol diester" and "TPGD" refer to a PEG-derivative of tocopherol where the linker is a dicarboxylic acid (a carboxylic acid having two carboxy groups, e.g., succinic acid), such as succinic acid. Exemplary of dicarboxylic acids that can be used as linkers in these tocopherol and tocotrienol PEG diester surfactants are succinic acid, sebacic acid, dodecanedioic acid, suberic acid, or azelaic acid, citraconic acid, methylcitraconic acid, itaconic acid, maleic acid, glutaric acid, glutaconic acid, fumaric acids and phthalic acids. Exemplary of TPGDs are tocopherol succinate polyethylene glycol (TPGS), tocopherol sebacate polyethylene glycol, tocopherol dodecanodioate polyethylene glycol, tocopherol suberate polyethylene glycol, tocopherol azelaate polyethylene glycol, tocopherol citraconate polyethylene glycol, tocopherol methylcitraconate polyethylene glycol, tocopherol itaconate polyethylene glycol, tocopherol maleate polyethylene glycol, tocopherol glutarate polyethylene glycol, tocopherol glutaconate polyethylene glycol, and tocopherol phthalate polyethylene glycol, among others.

As used herein, "tocopherol polyethylene glycol succinate," "TPGS," "tocopheryl polyethylene glycol succinate surfactant" and "TPGS surfactant" refer to tocopherol polyethylene glycol (PEG) diesters, that are formed by joining, via esterification, tocopherol succinate, which itself is an ester made by esterification of tocopherol and succinic acid. The term tocopherol refers to any naturally occurring or synthetic form of vitamin E, and can refer to a single compound or a mixture. Examples of tocopherols include, for example, α-tocopherol, D-α-tocopherol, β-tocopherol, γ-tocopherol and δ-tocopherol. The PEG moiety of the TPGS surfactant can be any PEG moiety, for example, PEG moieties between 200 daltons or about 200 daltons and 20,000 daltons or about 20,000 daltons, typically between 200 daltons or about 200 daltons and 6000 daltons or about 6000 daltons, for example, between 600 daltons or about 600 daltons and 6000 daltons or about 6000 daltons, typically between 200 daltons or about 200 daltons and 2000 daltons or about 2000 daltons, between 600 daltons or about 600 daltons and 1500 daltons or about 1500 daltons, or between 600 daltons or about 600 daltons and 1000 daltons or about 1000 daltons, for example, 200 daltons or about 200 daltons, 300 daltons or about 300 daltons, 400 daltons or about 400 daltons, 500 daltons or about 500 daltons, 600 daltons or about 600 daltons, 800 daltons or about 800 daltons, and 1000 daltons or about 1000 daltons; and PEG moieties that are modified, for example, methylated PEG (m-PEG) and/or PEG moieties including other PEG analogs, e.g., PEG-NHS, PEG-aldehyde, PEG-SH, PEG-NH$_2$, PEG-CO$_2$H, and branched PEGs. Typically, the TPGS surfactant is Generally Recognized As Safe (GRAS) and Kosher certified.

Exemplary of the TPGS surfactants is TPGS-1000, which has a PEG moiety of 1000 daltons. The TPGS can be any natural, water-soluble, tocopherol polyethylene glycol succinate, for example, the food grade TPGS sold under the name Eastman Vitamin E TPGS®, food grade, by Eastman Chemical Company, Kingsport, Tenn. This TPGS is water-soluble form of natural-source vitamin E, which is prepared by esterifying the carboxyl group of crystalline d-alpha-tocopheryl acid succinate with polyethylene glycol 1000 (PEG 1000), and contains between 260 and 300 mg/g total tocopherol. TPGS typically has a reported HLB value of between 12 or 13 or about 12 or 13 and 18 or about 18.

As used herein, "tocopherol polyethylene glycol succinate analog", "TPGS analog", and "TPGS analog surfactant" refer to compounds, other than TPGS, that are similar to a parent TPGS compound, but differ slightly in composition, for example, by the variation, addition or removal of an atom, one or more units (e.g., methylene unit(s)—(CH$_2$)$_n$) or one or more functional groups. TPGS analogs include Vitamin E derived surfactants, including PEG derivatives of Vitamin E, including vitamin E PEG diesters, such as, but not limited to, tocopherol polyethylene glycol sebacate (PTS), tocopherol polyethylene glycol dodecanodioate (PTD), tocopherol polyethylene glycol suberate (PTSr), tocopherol polyethylene glycol azelaate (PTAz), and polyoxyethanyl tocotrienyl sebacate (PTrienS) as well as other PEG derivatives of Vitamin E.

As used herein, "TPGS monomer" is a single vitamin E moiety, i.e., D-α-tocopherol, covalently joined to a polyethylene glycol through a succinate linker, and a TPGS dimer is made up of two vitamin E moieties, i.e., D-α-tocopherol, covalently joined to a polyethylene glycol through one or more succinate linkers (shown below). The esterification reaction between the vitamin E moiety, for example, D-α-tocopheryl succinate, and PEG results in a highly complex crude product that contains a mixture of TPGS monomer, unreacted PEG, unreacted vitamin E (e.g., D-α-tocopheryl succinate), catalyst, and TPGS dimer, formed when a second molecule of the vitamin E moiety reacts with the terminal hydroxyl group of a PEG moiety already conjugated to TPGS monomer via a linker. For purposes herein, mixtures are produced by performing the under conditions that result in higher amounts of the TPGS dimer are produced as compared to prior art preparations. In addition, the TPGS dimer can be purified and the amounts increased. The water-soluble derivative of vitamin E derivative mixtures, where the vitamin E derivative is TPGS, described herein contain a mixture of TPGS monomer and TPGS dimer, and contain more than 12%, but generally at least 20%, 25%, 29%, 35% and more, TPGS dimer, up to as much as 95% or about 95% TPGS dimer, but typically up to about 75%. The remainder of the composition contains the TPGS monomer, and can contain unreacted starting materials and catalyst. Similarly, water-soluble derivative of vitamin E derivative mixtures containing vitamin E derivatives other than TPGS contain mixtures of dimer and monomer.

Exemplary of TPGS analogs are compounds, other than TPGS compounds, having the formula shown in Scheme II:

Scheme II

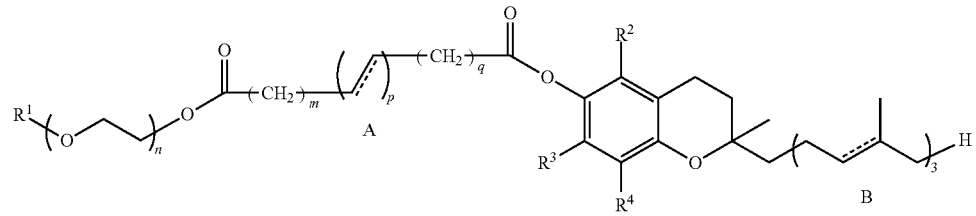

where $R^1$, $R^2$, $R^3$ and $R^4$ each independently is hydrogen (H) or methyl (CH$_3$); each dashed line is, independently, a single or double bond; n is an integer from 1 to 5000; m and q each independently are 0 or 1; and p is an integer from 1 to 20. For example, TPGS analogs include, but are not limited to, compounds having the formula in Scheme II, where, when the bonds represented by the dashed lines marked by "A" and "B" are single bonds, and m and q each equal 0, and p is any integer from 2-20. TPGS analogs also include compounds where the dashed line at B or the dashed line at A, or both the dashed lines, represents at least one double bond. For example, TPGS analogs include a compound as in Scheme II, where when the dashed line in A represents only single bonds, the dashed line in "B" represents one or more double bonds, e.g., tocotrienol PEG diesters. TPGS analogs also include compounds as in Scheme II, where when the dashed line marked "B" represents only single bonds, the dashed line marked "A" represents one or more double bonds; or when the dashed line labeled "A" does not represent double bonds, and m and q are each zero, p is greater than 1.

Also exemplary of TPGS analogs are compounds, other than TPGS compounds, having the formula shown in Scheme III:

Scheme III

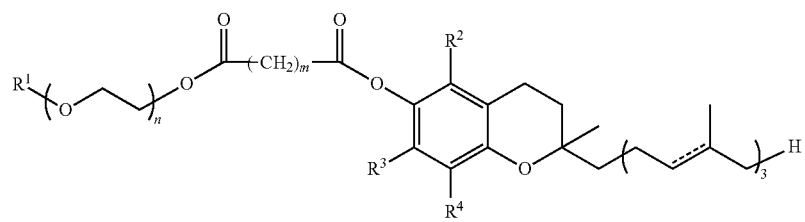

where $R^1$, $R^2$, $R^3$ and $R^4$ each independently is hydrogen (H) or methyl (CH$_3$); the bond represented by the dashed line is either a single or double bond; m is an integer from 1 to 20, and n is an integer from 1 to 5000.

Also exemplary of TPGS analogs include compounds other than TPGS, having PEG moieties that vary in chain length, according to the formula shown in Scheme IV:

Scheme IV

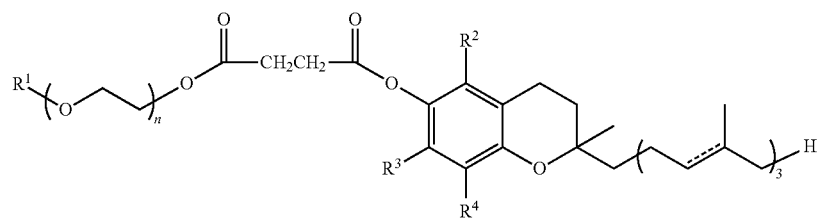

where $R^1$, $R^2$, $R^3$ and $R^4$ each independently is hydrogen (H) or methyl (CH$_3$), and n is an integer from 1 to 5000.

As used herein, "TPGS-1000 analogs" are compounds other than TPGS-1000 that are similar to a parent TPGS-1000 compound, but differ slightly in composition, for example, by the variation, addition or removal of an atom, one or more units (e.g., methylene unit(s)—(CH$_2$)$_n$) or one or more functional groups. Suitable TPGS-1000 analogs include, but are not limited to, other TPGS compounds, having PEG moiety(ies) that vary in chain length and molecular weight compared to TPGS-1000, including, for example, TPGS compounds having PEG moieties between 200 or about 200 daltons and 20,000 daltons or about 20,000 daltons, typically between 200 daltons or about 200 daltons and 6000 daltons or about 6000 daltons, for example, between 600 daltons or about 600 daltons and 6000 daltons or about 6000 daltons, typically between 200 daltons or about 200 daltons and 2,000 daltons or about 2,000 daltons, between 600 daltons or about 600 daltons and 1500 daltons or about 1500 daltons, such as, but not limited to, 200, 300, 400, 500, 600, 800, and 1000 daltons. Also exemplary of TPGS-1000 analogs are TPGS compounds having PEG moieties that are modified, for example, methylated PEG (m-PEG) and/or PEG moieties including other PEG analogs, e.g., PEG-NHS, PEG-aldehyde, PEG-SH, PEG-NH$_2$, PEG-CO$_2$H, and branched PEGs. Also exemplary of TPGS-1000 analogs are any TPGS analogs, e.g., Vitamin E derived surfactants, including PEG derivatives of Vitamin E, including vitamin E PEG diesters, such as, but not limited to, tocopherol polyethylene glycol sebacate (PTS), tocopherol polyethylene glycol dodecanodioate (PTD), tocopherol polyethylene glycol suberate (PTSr), tocopherol polyethylene glycol azelaate (PTAz) and polyoxyethanyl tocotrienyl sebacate (PTrienS) as well as other PEG derivatives of Vitamin E.

As used herein, "TPGS homologs" are analogs of TPGS that differ from a TPGS parent compound only by the presence or absence of a simple unit, such as a methylene unit, or some multiple of such units, e.g., —(CH$_2$)$_n$—.

Typically, suitable TPGS homologs have similar surfactant properties compared to the parent compound (TPGS), for example, similar HLB values, for example, HLB values between 12 or 13 or about 12 or about 13 and 20 or about 20. Exemplary of TPGS homologs are tocopherol polyethylene glycol sebacate (PTS), tocopherol polyethylene glycol dodecanodioate (PTD), tocopherol polyethylene glycol suberate (PTSr), tocopherol polyethylene glycol azelaate (PTAz). Exemplary of TPGS homologs are compounds having the formula in Scheme II (above), where neither the A or B dashed line represents a double bond and where, when m and q each are 0, p is greater than 1.

As used herein, "TPGS-1000 homologs" are analogs of TPGS-1000 that differ from a TPGS-1000 parent compound only by the presence or absence of a simple unit, such as a methylene unit, or some multiple of such units, e.g., $-(CH_2)_n-$. Exemplary TPGS-1000 homologs have similar surfactant properties compared to the parent compound (TPGS-1000), for example, similar HLB values, for example, HLB values between 12, 13, or 14 or about 12, 13 or 14 and 18, 19 or 20 or about, 18, 19 or 20. Exemplary TPGS-1000 homologs include TPGS-1000 homologs with slight variations in the length of the PEG chain moiety, and Me-TPGS-1000, which is a TPGS-1000 having a methyl cap on the PEG moiety.

As used herein, analog refers to a chemical compound that is structurally similar to another compound (referred to as a parent compound), but differs slightly in composition, for example, by the variation, addition or removal of an atom, one or more units (e.g., methylene unit(s), $-(CH_1)_n-$) or one or more functional groups. The analog can have different chemical or physical properties compared with the original compound and/or can have improved biological and/or chemical activity. Alternatively, the analog can have similar or identical chemical or physical properties compared with the original compound and/or can have similar or identical biological and/or chemical activity. For example, the analog can be more hydrophilic or it can have altered reactivity as compared to the parent compound. The analog can mimic the chemical and/or biologically activity of the parent compound (i.e., it can have similar or identical activity), or, in some cases, can have increased or decreased activity. The analog can be a naturally or non-naturally occurring (e.g., synthetic) variant of the original compound. Other types of analogs include isomers (e.g., enantiomers, diastereomers) and other types of chiral variants of a compound, as well as structural isomers. The analog can be a branched or cyclic variant of a linear compound. For example, a linear compound can have an analog that is branched or otherwise substituted to impart certain desirable properties (e.g., improve hydrophobicity or bioavailability). Exemplary of the analogs used in the provided compositions and methods are TPGS analogs, which can be used as surfactants in place of the TPGS in the provided compositions.

As used herein, homolog refers to an analog that differs from the parent compound only by the presence or absence of a simple unit, such as a methylene unit, or some multiple of such units, e.g., $-(CH_2)_n-$. Typically, a homolog has similar chemical and physical properties as the parent compound. Exemplary of the homologs used in the provided compositions and methods are TPGS homologs.

As used herein, $C_1-C_x$ includes $C_1-C_2$, $C_1-C_3$ ... $C_1-C_x$.

As used herein, the term "alkyl" and "alkyl group" refer to straight or branched chain substituted or unsubstituted hydrocarbon groups having any number of carbon atoms; number of carbon atoms can be specified, for example, 1 to 30 carbon atoms, 8 to 28 carbon atoms, 7 to 27 carbon atoms, 8 to 22 carbon atoms, 8 to 20 carbon atoms, 8 to 18 carbon atoms and 12 to 18 carbon atoms. An alkyl group can be a "saturated alkyl," meaning that it does not contain any alkene or alkyne groups or an "unsaturated alkyl," meaning that it contains at least one alkene or alkyne group, and optionally can be substituted. An alkyl group that includes at least one carbon-carbon double bond ($C=C$) also is referred to by the term "alkenyl;" alkenyl groups optionally can be substituted. An alkyl group that includes at least one carbon-carbon triple bond ($C\equiv C$) also is referred to by the term "alkynyl;" alkynyl groups optionally can be substituted.

As used herein, "hydrophilic" and "polar" refer synonymously to ingredients and/or compounds having greater solubility in aqueous liquids, for example, water, than in fats, oils and/or organic solvents (e.g., methanol, ethanol, ethyl ether, acetone and benzene). Exemplary of the polar ingredients in the provided compositions are polar solvents.

As used herein, a "solvent" is an ingredient that can be used to dissolve another ingredient. Solvents include polar and non-polar solvents.

As used herein, "polar solvent" refers to a solvent which is more readily miscible with water and polar ingredients. The polarity of a solvent can be assessed by measuring a number of different parameters according to well-known methods as described herein (see, e.g., Prizbytek, "High Purity Solvent Guide," Burdick and Jackson Laboratories, Inc., 1980). Polar solvents generally have high dielectric constants, typically dielectric constants greater than at or about 15, such as at or about 15, 16, 17, 18, 19, 20, 21, 22, 23, 24, 25, 26, 27, 28, 29, 30, 31, 32, 33, 34, 35, 40, 45, 50, 55, 60, 65, 70, 75, 80 85, 90, or greater than 90, and generally have high polarity indices, typically greater than at or about 3, such as at or about 3, 4, 5, 6, 7, 8 or 9 or greater than 9. Polar solvents generally have large dipole moments, typically greater than at or about 1.4 Debye, such as at or about, 1.4, 1.5, 1.6, 1.7, 1.8, 1.9, 2.0, 2.1, 2.2, 2.3, 2.4, 2.5, 2.6, 3.0, 3.5, 4 or greater than 4 Debye. Polar solvents include polar protic solvents and polar aprotic solvents. Exemplary polar solvents include, but are not limited to, water, glycerin, and propylene glycol.

As used herein, a "polar protic solvent" is a polar solvent containing a hydrogen atom attached to an electronegative atom, such that the hydrogen has a proton-like character and/or the bond between the hydrogen and electronegative atom is polarized. Exemplary polar protic solvents include, but are not limited to water, alcohols, including monohydric, dihydric and trihydric alcohols, including, but not limited to, methanol, ethanol, glycerin and propylene glycol. Dihydric alcohols are alcohols containing two hydroxyl groups. Exemplary dihydric alcohols include, but are not limited to, glycols, e.g., propylene glycol, ethylene glycol, tetraethylene glycol, triethylene glycol and trimethylene glycol. Trihydric alcohols are alcohols containing three hydroxyl groups. Exemplary trihydric alcohols include, but are not limited to glycerin, butane-1,2,3-triol, pentane-1,3,5-triol and 2-amino-2-hydroxymethyl-propane-1,3-diol. Monohydric alcohols are alcohols containing a single hydroxyl group, including but not limited to, methanol, ethanol, propanol, isopropanol, n-butanol and t-butanol.

As used herein, "non-polar", "lipophilic" and "lipid-soluble" synonymously refer to compounds (e.g., non-polar compounds) and/or ingredients, for example, non-polar active ingredients, which have greater solubility in organic solvents (e.g., ethanol, methanol, ethyl ether, acetone, and benzene) and in fats and oils, than in aqueous liquids, for example, water.

As used herein, "non-polar compounds" include drugs, hormones, vitamins, nutrients and other lipophilic compounds that contain one or more non-polar active ingredients. Typically, the non-polar compounds used in the provided compositions are poorly water soluble, for example, water insoluble or compounds having low water solubility. Exemplary non-polar compounds contain non-polar active ingredients, for example, lipid-soluble drugs, hormones, essential fatty acids, for example, polyunsaturated fatty acids (PUFA), for example, omega-3, omega-6 and omega-9 fatty acids, vitamins, nutrients, nutraceuticals, minerals and other non-polar active ingredients. Additional exemplary non-polar compounds are described herein. The provided compositions can be formulated with any non-polar compound, for example, containing any non-polar active ingredient.

As used herein, a "non-polar active ingredient" refers to a non-polar ingredient within a non-polar compound, that, when administered to a subject, for example, a human, induces or is proposed to induce a desired response, such as altering body function at the cellular, tissue, organ or other level, and/or altering cosmetic appearance or other property, or a non-polar compound or ingredient that is ingested in order to achieve a desired effect. Non-polar active ingredients can be any synthetic or natural non-polar ingredient or compound, including a pharmaceutical, drug, therapeutic, nutritional supplement, herb, hormone or other ingredient. Non-polar active ingredients can include the non-polar active ingredients listed herein, as well as other pharmaceutically acceptable or food-grade active derivatives of the active ingredients, for example, salts, esters, amides, prodrugs, active metabolites, isomers, fragments and analogs. Active ingredients can include compounds proven to have a desired effect and also compounds thought to produce such effects, for example, compounds typically ingested for nutritional supplementation purposes.

As used herein, "fatty acid" refers to straight-chain hydrocarbon molecules with a carboxyl (COOH) group at one end of the chain.

As used herein, "polyunsaturated fatty acid" and "PUFA" are used synonymously to refer to fatty acids that contain more than one carbon-carbon double bond in the carbon chain of the fatty acid. PUFAs, particularly essential fatty acids, are useful as dietary supplements. Exemplary PUFAs include omega-3 fatty acids, omega-6 fatty acids, omega-9 fatty acids, conjugated fatty acids and compounds containing saw palmetto extract.

As used herein, "essential fatty acids" are PUFAs that mammals, including humans, cannot synthesize using any known chemical pathway. Thus, essential fatty acids must be obtained from diet or by supplementation. Exemplary of essential PUFA fatty acids are omega-3 ($\omega$3; n-3) fatty acids and omega-6 ($\omega$-6; n-6) fatty acids.

As used herein, omega-3 ($\omega$3; n-3) fatty acids are methylene interrupted polyenes, which have two or more cis double bonds, separated by a single methylene group and in which the first double bond appears at the third carbon from the last ($\omega$) carbon. Omega-3 fatty acids are used as dietary supplements, for example, for disease treatment and prevention. In one example, the provided compositions contain non-polar active ingredients that contain at least one omega-3 fatty acid. Exemplary of omega-3 fatty acids are Alpha-Linolenic acid ($\alpha$-Linolenic acid; ALA) (18:3$\omega$3) (a short-chain fatty acid); Stearidonic acid (18:4$\omega$3) (a short-chain fatty acid); Eicosapentaenoic acid (EPA) (20:5$\omega$3) Docosahexaenoic acid (DHA) (22:6$\omega$3); Eicosatetraenoic acid (24:4$\omega$3); Docosapentaenoic acid (DPA, Clupanodonic acid) (22:5$\omega$3); 16:3 $\omega$3; 24:5 $\omega$3 and nisinic acid (24:6$\omega$3). Longer chain omega-3 fatty acids can be synthesized from ALA (the short-chain omega-3 fatty acid). Exemplary of non-polar active ingredients containing omega-3 fatty acids are non-polar active ingredients containing DHA and/or EPA, for example, containing fish oil, hill oil and/or algae oil, for example, microalgae oil, and non-polar active ingredients containing alpha-linolenic acid (ALA), for example, containing flaxseed oil.

As used herein, omega-6 ($\omega$-6; n-6) fatty acids are methylene interrupted polyenes, which have two or more cis double bonds, separated by a single methylene group and in which the first double bond appears at the sixth carbon from the last ($\omega$) carbon. In one example, the provided compositions contain non-polar active ingredients that contain at least one omega-6 fatty acid. Exemplary of omega-6 fatty acids are Linoleic acid (18:2$\omega$6) (a short-chain fatty acid); Gamma-linolenic acid (GLA) (18:3$\omega$6); Dihomo gamma linolenic acid (DGLA) (20:3$\omega$6); Eicosadienoic acid (20:2$\omega$6); Arachidonic acid (AA) (20:4$\omega$6); Docosadienoic acid (22:2$\omega$6); Adrenic acid (22:4$\omega$6); and Docosapentaenoic acid (22:5$\omega$6). Exemplary of non-polar active ingredients containing omega-6 fatty acids are ingredients containing GLA, for example, borage oil.

As used herein, conjugated fatty acids are polyunsaturated fatty acids with two or more conjugated double bonds, that is polyunsaturated fatty acids which have at least one pair of double bonds separated by only one single bond. Exemplary of conjugated fatty acids are conjugated linoleic acids (CLA).

As used herein, "algae oil" refers to any oil derived from marine dinoflagellates in, for example, microalgae, for example, *Crypthecodinium* sp., particularly, *Crypthecodinium cohnii*. In one example, algae oil is used as a non-polar compound, for example, as an active ingredient, in the provided compositions. The algae oil typically contains DHA. In one example, the algae oil also is a source of EPA.

As used herein, "fish oil" refers to any oil derived from any fish, typically a cold water fish, for example, from fish tissue, for example, from frozen fish tissue, for example, from cod liver. In one example, fish oil is used as a non-polar compound, for example, an active ingredient, in the provided compositions. The fish oil typically contains DHA. In one example, the fish oil also contains EPA.

As used herein, a "non-polar solvent" refers to oils and other non-polar ingredients that dissolve non-polar compounds. Typically, the non-polar solvent is an oil that is included in the composition in addition to the non-polar compound. For example, the non-polar solvent typically is not the non-polar compound itself, e.g., is distinct from the non-polar compound. Certain compounds, for example, flaxseed oil and safflower oil, can be non-polar solvents and non-polar compounds, or non-polar active ingredients. Typically, the non-polar solvent contains one or more oils, typically oils other than the non-polar active ingredient, or oil(s) not contained in the active ingredient. Exemplary non-polar solvents include, but are not limited to, oils (in addition to the non-polar active ingredient), for example, Vitamin E oil, oleic acid, flaxseed oil, CLA, Borage Oil, D-limonene, canola oil, corn oil, MCT oil and oat oil. Other oils also can be used. Exemplary of the Vitamin E oil is the oil sold by ADM Natural Health and Nutrition, Decatur, Ill., under the name Novatol™ 5-67 Vitamin E (D-alpha-Tocopherol; ADM product code 410217). This Vitamin E oil contains at least 67.2% Tocopherol and approximately 32.8% soybean oil. In one example, the non-polar solvent is referred to, synonymously as "non-polar solubilizer." In one example, the non-polar compound is dissolved in a non-polar solvent in practicing the methods of producing the provided compositions. In this example, the provided compositions contain non-polar solvents in amounts sufficient to dissolve the non-polar compound. More than one non-polar solvent can be used.

As used herein, "soluble fiber" refers to any soluble dietary fiber that can be readily fermented in the colon, typically a plant based dietary fiber, for example, a soluble fiber from legumes, vegetables, such as broccoli and carrots, root vegetables, such as potatoes, sweet potatoes and onions, oats, rye, chia, barley and fruits, such as prunes, plums, berries, bananas, apples and pears. Typically, soluble dietary fiber contains non-starch polysaccharides, such as arabinoxylans, cellulose, dextrans, inulin, beta-glucans, fructo-oligosaccharides, oligosaccharides and polysaccharides. For example, soluble fibers include but are not limited to fructo-oligosaccharides, for example, inulins, for example, inulins found in chicory, Jerusalem artichoke, dahlia, garlic, leeks and onions, fructans and water-soluble soybean fiber. Exemplary of a soluble fiber that can be used in the provided concentrates is an inulin, for example, Oliggo-Fiber Instant Inulin (Fibruline® Instant) (supplied by Cosucra-Groupe Warcoing SA, Belgium, sold by Gillco Products, San Marcos, Calif.), containing chicory inulin.

As used herein, "inulin" refers to a mixture of polysaccharides having various molecular weights or degrees of polymerization; in general, inulin contains fructose units with beta 1-2 bonds terminating in a glucose unit. The term "inulin" is used generically herein to refer to raw inulin and fractions of inulin.

As used herein, "preservative" and "preservativer" are used synonymously to refer to ingredients that can improve stability of the provided compositions. Preservatives, particularly food and beverage preservatives, are well known. Any known preservative can be used in the provided compositions. Exemplary of the preservatives that can be used in the provided compositions are oil soluble preservatives, for example, benzyl alcohol, Benzyl Benzoate, Methyl Paraben, Propyl Paraben, antioxidants, for example, Vitamin E, Vitamin A Palmitate and Beta Carotene. Typically, a preservative is selected that is safe for human consumption, for example, in foods and beverages, for example, a GRAS certified and/or Kosher-certified preservative, for example, benzyl alcohol.

As used herein, a "pH adjuster" is any compound, typically an acid or a base, that is capable of changing the pH of the provided compositions, for example, to reduce the pH of the composition or to increase the pH of the composition, typically without altering other properties of the composition, or without substantially altering other properties. pH adjusters are well known. Exemplary of the pH adjusters are acids, for example, citric acid and phosphoric acid, and bases.

As used herein, "flavor" is any ingredient that changes, typically improves, the taste and/or smell of the provided composition, for example, the aqueous liquid dilution compositions, for example, beverages.

As used herein, "co-surfactant" is used to refer to a surfactant, typically a phospholipid, that is used, in the provided compositions, in combination with a surfactant (e.g., a primary surfactant), for example, to improve the emulsification of the provided compositions and/or compounds, for example, to emulsify the ingredients. In one example, the provided compositions contain at least one surfactant and at least one co-surfactant. Typically, the co-surfactant is a lipid, for example, a phospholipid, for example, phosphatidylcholine. In one example, the co-surfactant has an HLB value of between 7 or about 7 and 8 or about 8. Typically, the co-surfactant represents a lower percent, by weight (w/w), of the provided compositions, compared to the surfactant. Thus, the provided compositions typically have a lower concentration of the co-surfactant(s) than of the surfactant.

As used herein, "emulsion stabilizer" refers to compounds that stabilize and/or emulsify and/or change the viscosity of the provided compositions, for example, the liquid emulsion concentrate and/or the aqueous compositions containing the concentrates. For example, the emulsion stabilizer prevents separation of the oil and water phases. Exemplary of emulsion stabilizers that can be used in the provided compositions are fatty acid-modified carbohydrate-based macromolecule emulsion stabilizers, such as fatty-acid modified gums and starches. Exemplary of such emulsion stabilizers are modified gum acacias, for example, the modified gum acacia sold under the name Tic Pretested® Ticamulsion® A-2010 Powder, by Tic Gums, Inc., Belcamp, Md.; ester gums, for example, the ester gum sold under the name Ester Gum 8BG by Pinova/Hercules, Brunswick, Ga. (its preparation is described in U.S. Pat. No. 6,455,512).

As used herein, a "phospholipid" is an amphipathic, phosphate-containing lipid, for example, a molecule containing one phosphate, a glycerol and one or more fatty acids. In one example, one or more phospholipids is used as a co-surfactant in the provided compositions. Exemplary of the phospholipids used in the provided compositions are lecithin, including phosphatidylcholine (PC), phosphatidylethanolamine (PE), distearoylphosphatidylcholine (DSPC), phosphatidylserine (PS), phosphatidylglycerol (PG), phosphatidic acid (PA), phosphatidylinositol (PI), sphingomyelin (SPM) or a combination thereof. Typically, the phospholipid is phosphatidylcholine (PC), which sometimes is referred to by the general name "lecithin." Exemplary of the phospholipids that can be used as co-surfactants in the provided compositions are the phospholipids sold by Lipoid, LLC, Newark, N.J., for example, Purified Egg Lecithins, Purified Soybean Lecithins, Hydrogenated Egg, Soybean Lecithins, Egg Phospholipids, Soybean Phospholipids, Hydrogenated Egg and Soybean Phospholipids, Synthetic Phospholipids, PEG-ylated Phospholipids and phospholipid blends sold by Lipoid, LLC. Exemplary of the phosphatidylcholine that can be used as a co-surfactant in the provided compositions is the phosphatidylcholine composition sold by Lipoid, LLC, under the name Lipoid S100, which is derived from soy extract and contains greater than 95% or greater than about 95% phosphatidylcholine.

As used herein, "stability" refers to a desirable property of the provided compositions, for example, the ability of the provided compositions to remain free from one or more changes over a period of time, for example, at least or over 1, 2, 3, 4, 5, 6 or more days, at least or over 1, 2, 3, 4, or more weeks, at least or over 1, 2, 3, 4, 5, 6, 7, 8, 9, 10, 11, 12 or more months, or at least or over 1, 2, 3, 4 or more years. In one example, the composition is stable if it is formulated such that it remains free from oxidation or substantial oxidation over time. In another example, the stable compositions remain clear over time. In another example, the stable compositions remain safe and/or desirable for human consumption over time. In one example, stability refers to the lack of precipitates forming in the compositions over the period of time. In a related example, stability refers to the lack of "ringing" over the period of time. In another example, the composition is stable if it does not exhibit any visible phase separation, flocculation, creaming, coagulation or sedimentation over a period of time, for example, after 24 hours, after one week or after one month. In one example, the compositions are stable if they exhibit one or more of these described characteristics, over time, when kept at a particular temperature. In one example, the compositions remain stable at room temperature, for example, 25° C. or about 25° C. In another example, the compositions remain stable at between 19° C. and 25° C. In another example, the compositions remain stable at refrigerated temperatures, for example, 4° C. or about 4° C., or at frozen temperature, for example, at −20° C. or about −20° C. Typically, stability means that the shelf life of food or beverage that contains the concentrates provided herein is the same or about the same or longer than as it is without the concentrate. Any or all of the above properties, particularly the stability of the emulsion is retained for the shelf-life of the food or beverage without the non-polar active ingredient(s) under conditions in which the food or beverage is normally stored. Generally foods and beverages containing the concentrate will have emulsion active ingredient and flavor retention for at least 6 months unless the food or beverage without the concentrate has a shorter shelf life. The mixture of the food or beverage with the concentrate will be retained without phase separation, flocculation, creaming, coagulation or sedimentation of the concentrate or components thereof for this period of time.

As used herein, "stabilize" means to increase the stability of one of the provided compositions or render such composition stable.

As used herein, "shelf life" refers to a time period within which the provided compositions remain stable, for example, the ability of the provided compositions to remain stable, i.e., free from one or more changes over a period of time, for example, for at least or over 1, 2, 3, 4, 5, 6 or more days, at least or over 1, 2, 3, 4, or more weeks, at least or over 1, 2, 3, 4, 5, 6, 7, 8, 9, 10, 11, 12 or more months, or at least or over 1, 2, 3, 4 or more years. In one example, the compositions are stable if they exhibit one or more of these described characteristics, over time, when kept at a particular temperature. In one example, the compositions remain stable at room temperature, for example, 25° C. or about 25° C. In another example, the compositions remain stable at between 19° C. and 25° C. In another example, the compositions remain stable at refrigerated temperatures, for example, 4° C. or about 4° C., or at frozen temperature, for example, at −20° C. or about −20° C.

As used herein, "oxidative stability" refers to accumulation of by products produced by peroxidation or addition of oxygen atoms to the fatty acids contained within fish oil triglyceride molecules. The accumulation of such oxidative by-products can be measured by a variety of methods known to those skilled in the art, including, for example, organoleptic evaluation methods by which rancidity becomes detectable by taste and/or smell and chemical, as well as chemical analytical methods.

As used herein, "phase separation" refers to the physical separation of a homogenous emulsion, for example, the separation of the oil and water phases of an emulsion, into two separate visible heterogeneous layers.

As used herein, "flocculation" or "floc" refers to the process by which colloids come out of suspension in the form of floc or flakes. For example, flocculation refers to the process by which fine particulates are caused to clump together into floc, which can float to the top or bottom of a liquid and or foodstuff. Generally, floc are visible when viewing the food or beverage with the naked eye (e.g., without magnification). The presence or absence of flocculation typically is determined by empirical observation and can be observed by the artisan formulating the compositions, for example, the concentrates or the compositions containing the concentrates. In one example, the provided compositions do not exhibit flocculation. In another example, the compositions exhibit small amounts of flocculation, for example, no more flocculation than another food or beverage. Flocculation can, in some examples, lead to phase separation.

As used herein, "creaming" and "sedimentation" refer synonymously to the process by which the dispersed phase of an emulsion migrates, under the influence of buoyance to either the top or the bottom of the continuous phase, resulting in visible phase separation. Generally, creaming is visible when viewing the food or beverage with the naked eye (e.g., without magnification).

As used herein, "coagulation" refers to the process by which colloids come out of suspension and is synonymous with flocculation. Generally, coagulation is visible when viewing the food or beverage with the naked eye (e.g., without magnification).

As used herein, "ringing" refers to the formation of a whitish or opaque ring around a container containing a liquid, for example, an aqueous liquid, for example a beverage, for example, a liquid dilution composition containing an emulsion or emulsion. Typically, the ring forms around the perimeter of the container, typically at the surface level of the liquid in the container, for example, at the neck of the container. Ringing can occur over time and, if it occurs over a short period of time, can be a sign of instability. Ringing typically is undesirable, particularly in the case of a liquid for human consumption, for example, a beverage. Typically, the provided compositions do not exhibit "ringing" or are stable, without ringing, for a long period of time, for example, days, weeks, months or years. In one example, the compositions are free from ringing over time, when kept, for example, at room temperature, refrigerated and/or frozen.

As used herein, "free from oxidation" and "oxidative stability" refer synonymously to the ability of a composition containing an oil, for example, a polyunsaturated fatty acid, for example, a fish oil, to remain free from oxidation, or formation of peroxides, for a long period of time, for example, days, weeks, months or years. In one example, the compositions are oxidatively stable over time, when kept, for example, at room temperature, refrigerated and/or frozen.

As used herein, "particle size" and "average particle size" refer synonymously to the average diameter of particles in a provided liquid, for example, the droplet diameter or micelle diameter in an emulsion. Typically, the provided emulsion concentrates, and the food or beverage dilution compositions made from the concentrates, have a particle size of less than about 1000 nm, typically, less than 500 nm or less than about 500 nm, typically less than 300 nm or about 300 nm, for example, less than 250 nm or about 250 nm, for example, less than 200 nm or less than about 200 nm, for example, less than or less than about 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm. In one example, the dilution compositions yielded by diluting the liquid emulsion concentrates have a particle size between 10 nm or about 10 nm and 1000 nm or about 1000 nm, for example, between 15 nm or about 15 nm and 500 nm or about 500 nm, for example, between 15 nm or about 15 nm and 300 nm or about 300 nm, for example, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, 200 nm or more. Typically, the provided liquid emulsion concentrates are formulated such that, dilution of the liquid emulsion concentrates in a food or beverage yields a liquid dilution composition having an appropriate particle size, for example, between 15 nm or about 15 nm and 500 nm or about 500 nm. Information about particles in the compositions, alternatively, can be expressed in terms of particle density, for example, ppm (parts per million) or percent solids, in the liquids.

As used herein, "visible particles" are particles, for example, in a liquid, for example, an emulsion, that are visible when viewing the liquid with the naked eye (e.g., without magnification). In one example, the visible particles are particles that are observed by the artisan formulating the compositions, for example, the concentrates or the compositions containing the concentrates. In one example, the provided compositions contain no visible particles. In another example, the compositions contain few visible particles, for example, no more visible particles than another liquid, for example, a beverage. The presence of visible particles and the number of visible particles is determined by empirical observation.

As used herein, "visible crystals" are crystals that are visible when viewing a liquid with the naked eye (e.g., without magnification). The presence or absence of visible crystals typically is determined by empirical observation and can be observed by the artisan formulating the compositions, for example, the concentrates or the compositions containing the concentrates. In one example, the provided compositions contain no visible crystals. In another example, the compositions contain few visible crystals, for example, no more visible crystals than are contained in another liquid, for example, a beverage.

As used herein, "turbidity" is a measure of the cloudiness or haziness of a liquid, caused by particles in suspension in the liquid. Turbidity can measured optically, for example, using a nephelometer, an instrument with a light and a detector. The nephelometer measures turbidity by detecting scattered light resulting from exposure of the liquid to an incident light. The amount of scattered light correlates to the amount of particulate matter in the liquid. For example, a beam of light will pass through a sample with low turbidity with little disturbance. Other methods for measuring turbidity are well known and can be used with the provided methods and compositions. The units of a turbidity value measured with a nephelometer are Nephelometric Turbidity Units (NTU). In one example, the provided compositions, e.g., the aqueous liquid dilution compositions containing the emulsion concentrates, have low turbidity, for example, a turbidity value (NTU) of 30 or about 30; or an NTU value of less than 30 or about 30, for example, less than 29 or about 29, less than 28 or about 28, less than 27 or about 27, less than 26 or about 26, less than 25 or about 25, less than 24 or about 24, less than 23 or about 23, less than 22 or about 22, less than 21 or about 21, less than 20 or about 20, less than 19 or about 19, less than 18 or about 18, less than 17 or about 17, less than 16 or about 16, less than 15 or about 15, less than 14 or about 14, less than 13 or about 13, less than 12 or about 12, less than 11 or about 11, less than 10 or about 10, less than 9 or about 9, less than 8 or about 8, less than 7 or about 7, less than 6 or about 6, less than 5 or about 5, less than 4 or about 4, less than 3 or about 3, less than 2 or about 2, less than 1 or about 1; or 29 or about 29, 28 or about 28, 27 or about 27, 26 or about 26, 25 or about 25, 24 or about 24, 23 or about 23, 22 or about 22, 21 or about 21, 20 or about 20, 19 or about 19, 18 or about 18, 17 or about 17, 16 or about 16, 15 or about 15, 14 or about 14, 13 or about 13, 12 or about 12, 11 or about 11, 10 or about 10, 9 or about 9, 8 or about 8, 7 or about 7, 6 or about 6, 5 or about 5, 4 or about 4, 3 or about 3, 2 or about 2, 1 or about 1, or 0 or about 0. In another example, the turbidity value of the aqueous liquid dilution composition is less than 1000 or less than about 1000, less than 500 or less than about 500, less than 300 or less than about 300, less than 250 or less than about 250, 200 or less than about 200, for example, 200, 175, 150, 100, 50, 25 or less.

As used herein, a turbid liquid is one that is thick or opaque with visible particles in suspension, for example, a liquid that is cloudy or muddy in appearance.

As used herein, "clear" can be used to describe a composition as provided herein, for example, an aqueous liquid dilution composition containing the emulsion concentrates and/or the emulsion concentrates themselves. In one example, a clear liquid is one that does not appear cloudy by empirical observation (e.g., to the naked eye) and/or does not contain particles or crystals that are visible to the naked eye, or that does not exhibit "ringing." In another example, a clear liquid is one that has a low or relatively low turbidity value, for example an NTU value, that is less than or equal to a desired NTU value. In one example, a clear liquid has an NTU value of less than 300 or less than about 300, typically less than 250 or less than about 250, typically less than 200 or less than about 200, for example, 200, 175, 150, 100, 50, 25 or less. In another example, a liquid is clear if it has a turbidity value (NTU) of 30 or about 30; or an NTU value of less than 30 or about 30, for example, less than 29 or about 29, less than 28 or about 28, less than 27 or about 27, less than 26 or about 26, less than 25 or about 25, less than 24 or about 24, less than 23 or about 23, less than 22 or about 22, less than 21 or about 21, less than 20 or about 20, less than 19 or about 19, less than 18 or about 18, less than 17 or about 17, less than 16 or about 16, less than 15 or about 15, less than 14 or about 14, less than 13 or about 13, less than 12 or about 12, less than 11 or about 11, less than 10 or about 10, less than 9 or about 9, less than 8 or about 8, less than 7 or about 7, less than 6 or about 6, less than 5 or about 5, less than 4 or about 4, less than 3 or about 3, less than 2 or about 2, less than 1 or about 1; or 29 or about 29, 28 or about 28, 27 or about 27, 26 or about 26, 25 or about 25, 24 or about 24, 23 or about 23, 22 or about 22, 21 or about 21, 20 or about 20, 19 or about 19, 18 or about 18, 17 or about 17, 16 or about 16, 15 or about 15, 14 or about 14, 13 or about 13, 12 or about 12, 11 or about 11, 10 or about 10, 9 or about 9, 8 or about 8, 7 or about 7, 6 or about 6, 5 or about 5, 4 or about 4, 3 or about 3, 2 or about 2, 1 or about 1, or 0 or about 0. In another example, a clear liquid is one that has a small or relatively small average particle size (e.g., less than 1000 nm or about 1000 nm, typically less than 500 nm or less than about 500 nm, typically less than 300 nm or about 300 nm, typically less than 250 nm or about 250 nm, typically less than 200 nm or about 200 nm, for example, less than 150 nm or about 150 nm, less than 100 nm or about 100 nm, less than 75 nm or about 75 nm, less than 50 nm or about 50 nm, less than 25 nm or about 25 nm or less than 10 nm or about 10 nm), for example, less than or less than about 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm.

In another example, clarity is expressed relatively. For example, it can be desired that a particular composition is equally as clear, about as clear, or more clear than another composition (as measured empirically, or by measuring turbidity value or particle size). For example, clarity can be assessed relative to another aqueous liquid dilution composition, for example, a beverage. In one example, a liquid is clear if it is similar in appearance to another clear liquid, for example, a beverage, for example, water. For example, it can be desired that a composition has a particle size that is less than or equal to another liquid, for example, a beverage. In another example, it can be desired that a composition has a turbidity value that is less than or equal to another liquid, for example, a beverage. In another example, it can be desired that a composition appears more clear or as clear as another liquid, for example, a beverage, for example, by having no more visible particles, no more crystal formation and/or no more cloudiness than the other liquid. In one example, the provided compositions are clear. In another example, they are relatively clear or as clear as or about as clear as another composition, for example, a beverage that does not contain the non-polar compound or liquid emulsion concentrate.

As used herein, an "additive" includes anything that one can add to a food, beverage, or other human consumable, to enhance one or more of its nutritional, pharmaceutical, dietary, health, nutraceutical, health benefit, energy-providing, treating, holistic, or other properties. For example, provided herein are compositions and methods for preparing foods, beverages and other aqueous human consumables, that include one or more additives, typically oil based additives (e.g., non-polar compounds), such as nutraceuticals, pharmaceuticals, vitamins, typically oil soluble vitamins, for example, Vitamin D, Vitamin E, and Vitamin A, minerals, fatty acids, such as essential fatty acids, e.g., polyunsaturated fatty acids, for example, omega-3 fatty acids, omega-6 fatty acids and omega-9 fatty acids, for example, alpha-linolenic acid (ALA), docosahexaenoic acid (DHA), eicosapentaenoic acid (EPA), gamma-linolenic acid (GLA), conjugated linoleic acid (CLA), oleic acid, saw palmetto extract, flaxseed oil, fish oil, algae oil, phytosterols, resveratrol, lipoic acid, carotenoids, for example lutein, zeaxanthin and lycopene, and coenzymes, for example, Coenzyme Q10 and other additives.

As used herein, an "effective amount" of an additive, such as a non-polar compound, such as a non-polar active ingredient, refers to the quantity and/or concentration of the additive necessary for preventing, curing, ameliorating, arresting or partially arresting a symptom of a disease or disorder, or the quantity and/or concentration desired by an individual for intake, such as daily intake, and/or nutritional supplementation, for example, an amount sufficient to enhance the nutritional, pharmaceutical, nutraceutical, health or energy property of a food, beverage, or other consumable. In some examples, it is desired that the provided compositions, for example, the liquid emulsion concentrates and/or the dilution compositions, contain an effective amount of a particular non-polar compound, for example, a particular amount per volume or weight of the composition.

In one example, an effective amount is an amount of liquid emulsion concentrate that provides between at or about 1.5 to at or about 3.0 grams (g) of omega-6 fatty acids per serving, between at or about 16 to at or about 220 milligrams (mg), for example, between at or about 32 to at or about 220 mg docosahexaenoic acid (DHA) and eicosapentaenoic acid (EPA) per serving; between at or about 100 and at or about 500 mg phytosterols per serving; between at or about 10 and at or about 200 mg, for example, between at or about 50 and at or about 200 mg Coenzyme Q10 per serving; between at or about 40 and at or about 400 micrograms (mcg) Vitamin A per serving; or between at or about 200 and at or about 2000 international units (IU), for example between at or about 400 and at or about 800 IU Vitamin D3 per serving of a food or beverage, for example, per 8 ounces of a beverage.

In one example, an effective amount is a concentration or amount of a liquid emulsion composition where at least 25 mg or about 25 mg, typically at least 35 mg, for example, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000, 2500, 3000 mg, or more, of the non-polar active ingredient, is contained in at least one serving of a food or beverage, for example, 8 fluid ounces of an aqueous medium, e.g., a beverage.

As used herein, a "serving" of a food or beverage refers to a typical serving or the food or beverage, as determined by the USDA Center for Nutrition Policy and Promotion, typically for example, 1 teaspoon (0.166667 ounce, 4.7249 g), 1 tablespoon (0.5 fluid ounce, 14.1747 g), 2 tablespoons (1 fluid ounce, 28.3495 g), 0.25 cup (2 fluid ounces, 56.6990 g), 0.5 cup (4 fluid ounces, 113.398 g), 0.75 cup (6 fluid ounces, 170.097 g) or 1 cup (8 fluid ounces, 226.796 g), of the food or beverage, for example, 8 fluid ounces of an aqueous medium, 2 tablespoons of a mayonnaise, or 4 ounces of a pasta sauce.

As used herein, "water-based finished food or beverage" refers to any food or beverage that is typically an aqueous based food or beverage, for example, having greater solubility in aqueous liquids, for example, water, than in fats and oils. Exemplary water-based finished foods and beverages, include, but are not limited to, tomato-paste based products, dairy-based products, creams, sauces, soups, pastes, dressings, water, flavored water, soda, milk, juices, including fruit juices, sauces, syrups, sports drinks, fitness drinks, nutritional beverages, nutritional supplement, energy drinks and vitamin-fortified beverages.

As used herein, "water insoluble" refers to a property of a compound, none of which dissolves when the compound is mixed with water, for example, when mixed with water at room temperature, for example, between 19° C. and 25° C. or between about 19° C. and 25° C. In one example, the non-polar compounds are water insoluble. In another example, the non-polar compounds in the provided compositions are slightly soluble in water, for example, having low water solubility.

As used herein, low water solubility refers water solubility of less than 30 or about 30 mg/mL, typically less than 20 mg/mL or about 20 mg/mL, typically, less than 10 mg/mL or about 10 mg/mL, typically less than 1 mg/mL or about 1 mg/mL, for example, solubility in water of 30, 29, 28, 27, 26, 25, 24, 23, 22, 21, 20, 19, 18, 17, 16, 15, 14, 13, 12, 11, 10, 9, 8, 7, 6, 5, 4, 3, 2, 1 mg/mL or less, for example, when mixed with water at room temperature, for example, between 19° C. and 25° C. or between about 19° C. and 25° C. As used herein, poorly water soluble can be used to refer to compounds, for example, non-polar compounds that are water insoluble or have low water solubility.

As used herein, "concentrate", "liquid concentrate" and "liquid emulsion concentrate", are used synonymously to refer to provided compositions that contain the non-polar compounds, are liquid at room temperature, for example at 25° C. or about 25° C., or at a temperature of between 19° C. or about 19° C. and 25° C. or about 25° C., and can be diluted in a food or beverage to form the provided dilution compositions. Typically, the liquid emulsion concentrate is an emulsion concentrate that has a particle (droplet) size (or can be diluted to form a dilution composition having a particle size) that is less than 1000 or about 1000, typically less than 500 or about 500, typically less than 300 or about 300 nm, typically less than 250 or about 250 nm, for example, less than 200 or about 200, for example, less than 150 or about 150 nm, for example, a particle size equal to, less than or less than about 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm.

Reference to a concentrate herein includes compositions containing a one or more non-polar compounds in higher than single dosage concentrations so that the concentrate compositions are diluted for, or prior to, ingestion.

As used herein, "liquid composition" is used to refer to any liquid, for example, a composition that is a liquid at room temperature, for example, at 25° C. or about 25° C., or at a temperature of between 19° C. or about 19° C. and 25° C. or about 25° C. Exemplary of the provided liquid dilution compositions are aqueous liquid dilution compositions into which one or more liquid emulsion concentrate has been diluted, for example, aqueous liquid dilution compositions containing the concentrates. In this example, the non-polar compound and other lipophilic compounds in the concentrate form the dispersion phase within the aqueous liquid, which is an emulsion (e.g., emulsion).

As used herein, "dilution composition" is used to refer to any composition that contains one or more of the provided liquid emulsion concentrates (e.g., the liquid emulsion concentrates containing the non-polar compound(s)), diluted in a food or beverage, for example a water-based finished food or beverage. Exemplary of the provided dilution composition are tomato-paste based products, dairy-based products, creams, sauces, soups, pastes, dressings, water, flavored water, soda, milk, juices, including fruit juices, sauces, syrups, sports drinks, fitness drinks, nutritional beverages, nutritional supplement, energy drinks, vitamin-fortified beverages and other food and beverages containing the concentrates.

As used herein, "liquid dilution composition" and "liquid dilution" are used synonymously to refer to a composition that contains one or more of the provided liquid emulsion concentrates (e.g., the liquid emulsion concentrates containing the non-polar compound(s)), diluted in a liquid, for example, an aqueous medium. Exemplary of the provided liquid dilution compositions are aqueous liquid dilution compositions, for example, beverages or other liquids containing the liquid emulsion concentrates, for example, water, sauces, soups, syrups, soda, juice, for example, fruit juice, milk, coffee, tea, nutritional beverages, sports drinks, energy drinks, vitamin-fortified beverages, flavored water, and other beverages containing the concentrates.

As used herein, "aqueous liquid dilution compositions" are liquid dilution compositions that are primarily aqueous, for example, a composition containing a liquid emulsion concentrate diluted in an aqueous medium, for example, water or other beverage. It is not necessary that the aqueous liquid dilution composition is completely aqueous. For example, the aqueous liquid dilution compositions can contain an aqueous portion, for example, an aqueous continuous phase, as well as an additional portion, for example, a dispersion phase, for example, a lipophilic dispersion phase. Typically, the lipophilic dispersion phase contains one or more lipophilic substances, for example, one or more non-polar compounds, for example, non-polar active ingredients. Exemplary of the provided aqueous liquid dilution compositions are beverages containing the active ingredients, for example, water, soda, juice, for example, fruit juice, milk, coffee, tea, nutritional beverages, sports drinks, energy drinks, vitamin-fortified beverages, flavored water, and other beverages. Typically, the aqueous liquid dilution compositions are beverages including the non-polar compound, for example, beverages containing the concentrates.

As used herein, "oil phase" is used to refer to the portion (or phase) of a composition such as those provided herein that contains one or more lipophilic ingredients and/or amphiphilic ingredients (oil phase ingredients) and is, in general, the lipid-soluble phase. In the provided emulsion compositions (e.g., the emulsion concentrates and the dilution compositions), the oil phase typically represents the dispersion phase. "Oil phase" also can be used to refer to the liquid containing the oil phase ingredients that is generated, typically in an oil phase vessel, while carrying out the methods for making the liquid emulsion concentrates. For example, oil phase can refer to the mixture of the components (oil phase ingredients) that are combined, mixed and heated, for example, in the oil phase vessel (e.g., tank), prior to mixing with the water phase. "Oil phase" can refer to the oil phase mixture that is formed after all the ingredients are dissolved; alternatively, it can refer to the forming mixture, for example, as it is being mixed/heated.

As used herein, oil phase ingredient(s) refers to the components of the provided compositions that are included in the oil phase in the provided methods for making the compositions. Typical oil phase ingredients include non-polar compounds, e.g., non-polar active ingredients; modified food starches; surfactants; co-surfactants; oils, such as non-polar solvents; preservatives; and emulsion stabilizers. Other lipophilic and/or amphiphilic ingredients can be included in the oil phase.

As used herein, "water phase" is used to refer to the portion (phase) of a composition such as those provided herein that contains one or more hydrophilic ingredients and/or amphiphilic ingredients (water phase ingredients) and is, in general, the water-soluble phase. Typically, in the provided emulsion compositions, for example, the emulsion concentrates and the dilution compositions, the water phase is the continuous phase. "Water phase" also is used to refer to the liquid containing the water phase ingredients that is generated while carrying out the methods for making the liquid emulsion concentrates. For example, water phase can refer to the mixture of the components (water phase ingredients) that are combined, mixed and heated, for example, in the water phase tank, prior to mixing with the oil phase. "Water phase" can refer to the water phase mixture that is formed after all the ingredients are dissolved; alternatively "water phase" can refer to the forming mixture, for example, as it is being mixed/heated.

As used herein, water phase ingredient(s) refers to the components of the provided compositions that are included in the water phase (e.g., added to the water phase vessel) in the provided methods for making the compositions. Typical water phase ingredients include, but are not limited to, polar solvents, typically polar protic solvents, such as water and alcohols, typically alcohols having more than one hydroxy group such as dihydroxy and trihydroxy alcohols, e.g., glycerol and propylene glycol; modified food starches; surfactants; co-surfactants; preservatives; soluble fiber; and emulsion stabilizers. Other hydrophilic and/or amphiphilic ingredients can be included in the water phase.

As used herein, an initial concentrate is a concentrate (e.g., liquid emulsion concentrate) that is made in the provided methods of formulating the provided concentrates, typically by selecting ingredients, for example, surfactant(s), non-polar compound(s), polar solvent, and, optionally, other ingredients, and selecting starting concentrations of the ingredients from an appropriate concentration range as described herein.

As used herein, "room temperature" and "ambient temperature" are used to describe a temperature that is common in one or more enclosed spaces in which human beings typically are or reside. Room temperature can vary, but generally refers to temperatures between 19° C. or about 19° C. and 25° C. or about 25° C. When a composition is stored at room temperature, it should be understood it is generally kept at a temperature within this range or about within this range.

As used herein, "refrigerated temperature" refers to a temperature that is common in a refrigerator, for example, a household or restaurant refrigerator, for example, a temperature that is cooler than room temperature, but typically a few degrees above the freezing point of water (32° F. or about 32° F., or 0° C. or about 0° C.). Typically, refrigerated temperatures are between about 10° C. or about 10° C. and 0° C. or about 0° C., for example, 4° C. or about 4° C. When a composition is stored at a refrigerated temperature, it should be understood that it is kept at a temperature common to household or industrial refrigerators.

As used herein, "frozen temperature" refers to a temperature around or below the freezing point of water, e.g., a temperature commonly used in a household freezer, for example, 0° F. or about 0° F., for example, −19° C. or about −19° C. or −20° C. or about −20° C., or colder.

As used herein, "w/w," "weight per weight," "by weight," "% by weight" and "weight percent" are used synonymously used to express the ratio of the mass of one component of a composition compared to the mass of the entire composition. For example, when the amount of a particular ingredient represents 1%, by weight (w/w), of a concentrate, the mass of that ingredient is 1% of the mass of the entire concentrate. Similarly, when the amount of an ingredient is 50% (w/w) of the concentrate, the mass of that ingredient is 50% of the entire mass of the concentrate. Similarly, when a composition and/or a compound contains 10%, by weight, of an ingredient, the mass of the ingredient is 10% of the total mass of the composition or compound. When only a concentration, amount, or percentage (without units) is listed, it is to be understood that the concentration or percentage is a concentration or percentage, by weight.

Similarly, as used herein "v/v", "volume per volume", "percent by volume" and "volume percent" are used synonymously to express the ratio of the volume of one component of a composition and the volume of the entire composition.

As used herein, "not more than" and "NMT" refer to a quantity that is less than or equal to the listed quantity. Similarly, "not less than" and "NLT" refer to a quantity that is greater than or equal to the listed quantity.

As used herein, natural is used to refer to a composition, and/or ingredients in the composition, that can be found in nature and is not solely man-made. For example, benzyl alcohol is a natural preservative. In one example, the natural composition/ingredient is GRAS and/or Kosher—certified. Typically, the provided compositions are natural, semi-natural and/or contain one or more natural ingredients.

As used herein, "G.R.A.S." and "GRAS" are used synonymously to refer to compounds, compositions and ingredients that are "Generally Regarded as Safe" by the USDA, FDA for use as additives, for example, in foods, beverages and/or other substance for human consumption, for example, any substance that meets the criteria of sections 201(s) and 409 of the U.S. Federal Food, Drug and Cosmetic Act. Typically, the compositions provided herein are GRAS certified.

As used herein, "kosher" is used to refer to substances that conform to Jewish Kosher dietary laws, for example, substances that do not contain ingredients derived from non-kosher animals or ingredients that were not made following kosher procedures. Typically, the compositions provided herein are Kosher certified.

As used herein, "vessel" refers to any container, for example, tanks, pots, vials, flasks, cylinders and beakers, that can be used to contain the ingredients and/or phases of the provided compositions, during the methods for making the compositions. In one example (e.g., for the provided scaled-up methods), the vessel is a tank, which is used to mix and/or heat one or more ingredients and/or phases of the compositions, for example, water phase tanks and oil phase tanks. Typically, the oil and the water phases are mixed and heated in separate tanks, before combining the phases to form an emulsion. In another example, the tank is a packaging or holding tank, which holds the provided compositions after forming the compositions, for example, the emulsions. A number of tanks are available for mixing ingredients. Typically, the tanks are cleaned, for example, rinsed, soaped and/or sanitized according to known procedures, prior to use and between uses. Typically, the tanks are equipped with one or more mixers, for example, a standard mixer and/or homogenizer, which are used to mix the ingredients added to the tank. In one example, the tank further is equipped with a heating and/or cooling device. For example, the tank can be a water-jacketed tank. The temperature of the water-jacketed tank is controlled through the water-jacket, for example, to heat the contents, for example, while mixing.

As used herein, a water phase vessel refers to the vessel used to mix and/or heat the water phase ingredients to generate the water phase of the provided compositions. In one example (e.g., for the scaled-up methods), the water phase vessel is a water phase tank. In one example, the water phase tank is a water-jacketed tank.

As used herein, an oil phase vessel refers to the vessel used to mix and/or heat the oil phase ingredients to generate the oil phase of the provided compositions. Typically, the oil phase vessel is an oil phase tank. In one example, the oil phase tank is a water jacketed tank.

As used herein, "transfer means" refers to any equipment, combination of equipment and/or system that can be used to transfer liquid, for example, from one tank to another tank, in the provided methods for making the compositions. Exemplary of the transfer means are a transfer pump and appropriate fittings, for example, sanitary fittings, ball valves and transfer hoses, for example, food grade hoses.

As used herein, a "mixer" is any piece of equipment or combination of equipment that can be used to mix ingredients in the provided methods for making the compositions, for example, standard mixers and homogenizers (shears). For example, mixers can be used to mix the ingredients of the water phase, the oil phase, and/or to mix the additional ingredients.

As used herein, "standard mixers" are mixers that are used to combine a group of ingredients, for example, the oil phase ingredients or the water phase ingredients, or to mix one or more ingredients with a liquid, for example, with an emulsion, for example, to mix additional ingredients with the emulsion. Standard mixers can be any mixers that move the material, for example, the ingredients, during heating, for example, to promote dissolving of the ingredients.

As used herein, "homogenizer" and "shear" are used to refer to mixers that typically have high shear, which can be used, for example, to form an emulsion, for example, to emulsify the water phase and the oil phase, in the provided methods. The homogenizers typically are capable of high-shear mixing, which emulsifies the phases.

As used herein, a "cooling apparatus" is any piece of equipment or combination of equipment that can be used with the provided methods to cool the compositions and phases and ingredients thereof, for example, during mixing and/or homogenizing, for example, to chill the mixture while emulsifying the oil and water phases. Exemplary of the cooling apparatuses are coolers (chillers), for example, recirculating coolers which can be attached, for example, to the tanks used in the provided methods, for example, remotely or by a tank mounted in the cooler, to recirculate fluid from the tank, through the chiller and back to the tank, in order to rapidly cool and maintain the temperature of the mixture during mixing. Typically, the cooling apparatus can be used to cool the liquid to between 25° C. or about 25° C. and 45° C. or about 45° C., for example, 25, 26, 27, 28, 29, 30, 31, 32, 33, 34, 35, 36, 37, 38, 39, 40, 41, 42, 43, 44 or 45° C., typically between 25° C. and 43° C., for example, 26.5° C.

As used herein, rapid cooling refers to a process by which a composition, for example, a liquid composition, for example, a forming emulsion, is cooled to a desired temperature, for example, between 25° C. or about 25° C. and 45° C. or about 45° C., typically between 25° C. and 43° C., for example, 26.5° C., in less than 2 hours or about 2 hours, typically less than 1 hour or about 1 hour, for example, in at least between 30 minutes or about 30 minutes and 60 minutes or about 60 minutes, for example, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 minutes.

As used herein, low heat refers to a temperature between 45° C. or about 45° C. and 85° C. or about 85° C., for example, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84 or 85° C., for example, not more than 85° C. or about 85° C., typically not more than 60° C. or about 60° C., typically, 60° C. or about 60° C. In the provided methods for making the liquid emulsion concentrates, the oil phase and water phase ingredients typically are heated, using low heat, in order to preserve the ingredients, for example, in order to prevent oxidation of the ingredients, for example, the non-polar active ingredients, for example, the omega-3 containing compounds, for example, the DHA.

As used herein, unit dose form refers to physically discrete units suitable for human and animal subjects and packaged individually as is known in the art.

As used herein, a "subject" includes an animal, typically a mammal, typically a human.

As used herein, "consisting essentially of," means containing the following list of ingredient(s), and not including any additional active ingredient, for example, not including any additional active drug or pharmaceutical. For example, a composition, for example, a liquid emulsion, consisting essentially of a listed plurality of ingredients contains those particular ingredients and does not contain any additional active drug or pharmaceutical.

As used herein, the singular forms "a", "an" and "the" include plural referents unless the context clearly dictates otherwise. Thus, for example, reference to compound a composition comprising a surfactant includes compositions that contain one surfactant (not including the emulsion stabilizer component) and compositions containing a plurality thereof.

As used herein, ranges and amounts can be expressed as "about" a particular value or range. About also includes the exact amount. Hence "about 5 grams" means "about 5 grams" and also "5 grams.' It also is understood that ranges expressed herein include whole numbers within the ranges and fractions thereof. For example, a range between 5 grams and 20 grams includes whole number values such as 5, 6, 7, 8, 9, 10, 11, 12, 13, 14, 15, 16, 17, 18, 19 and 20 grams, and fractions within the range, for example, but not limited to, 5.25, 6.72, 8.5, and 11.95 grams.

As used herein, "optional" or "optionally" means that the subsequently described event or circumstance does or does not occur and that the description includes instances where said event or circumstance occurs and instances where it does not. For example, an optionally variant portion means that the portion is variant or non-variant. In another example, an optional ligation step means that the process includes a ligation step or it does not include a ligation step.

B. Compositions Containing Modified Food Starches

Provided herein are compositions containing a modified food starch and a non-polar compound. Non-polar compounds are poorly water soluble (e.g., having low water solubility or being water-insoluble). Thus, it generally can be difficult to formulate non-polar compounds into compositions for human consumption, particularly aqueous compositions, for example, foods and beverages. Poor water solubility of non-polar compounds also can contribute to their poor bioavailability. Improved methods and compositions for formulating non-polar compounds are provided herein.

Also provided herein are compositions containing a modified food starch, a PEG-derivative of vitamin E surfactant and a non-polar compound. Exemplary compositions provided herein contain a modified food starch, a PEG-derivative of vitamin E surfactant that is a water-soluble derivative of vitamin E mixture and a non-polar compound. Typically, the water-soluble derivative of vitamin E mixture is a high dimer water-soluble derivative of vitamin E mixture.

Addition of high dimer water soluble derivative of vitamin E mixture, such as a PEG-derivative of vitamin E mixture, to a composition containing one or more non-polar compounds, including compositions that contain modified food starch, results in advantageous properties, compared to the food starch alone and/or compared to the same composition with a vitamin E derivative that does not contain higher amounts of dimer form, such as a commercially available PEG-derivative of vitamin E, such as a commercially available TPGS. For example, dilution compositions to which concentrates containing the high dimer mixtures, are more clearer than a dilution composition formed from the same composition except containing vitamin E derivative that does not contain the high concentration of dimer. In addition, a dilution composition that contains a concentrate with any vitamin E derivative, whether high dimer (more than 12%, 20%, 25%, 29%, 35%, 48%, 52%, 55%), or high monomer (87% or more) is more clear than a dilution composition produced by adding a concentrate that does not contain the water-soluble vitamin E derivative, but only contains modified food starch.

Compositions provided herein include concentrates, such as liquid emulsion concentrates, liquid dilution compositions containing the concentrates and compositions for direct consumption, such as beverages. Also provided herein are food and beverage products. In some examples, the food and beverage products contain a concentrate, such as a liquid emulsion concentrate, provided herein. In other examples, the food and beverage products contain a modified food starch and a non-polar compound, or a modified food starch, a non-polar compound and a PEG-derivative of vitamin E surfactant, such as a water-soluble derivative of vitamin E mixture.

Compositions provided herein include concentrates containing a modified food starch and a non-polar compound or concentrates containing a modified food starch, a non-polar compound, and a PEG-derivative of vitamin E surfactant, such as a water-soluble derivative of vitamin E mixture. Typically, the concentrates provided herein are emulsion concentrates, such as liquid emulsion concentrates. Thus, provided herein are liquid emulsion concentrates containing a modified food starch and a non-polar compound. Also provided herein are liquid emulsion concentrates containing a modified food starch, a non-polar compound, and a PEG-derivative of vitamin E surfactant, such as a water-soluble derivative of vitamin E mixture. In general, emulsions (e.g., oil-in-water emulsions) are colloidal dispersions of two immiscible liquids (e.g., oil and water or other aqueous liquid), containing a continuous and a dispersed phase. Emulsions can be used to disperse non-polar compounds in aqueous liquids. In an oil-in-water emulsion, the dispersed phase is an oil phase and the continuous phase is an aqueous (water) phase. There is a need for emulsions (e.g., oil-in-water emulsions) containing non-polar compounds in aqueous liquids and methods and compositions for generating the dilutions compositions, such as beverages, that are clear and stable. In particular, emulsions are needed that are more suitable and desirable for human consumption of the non-polar compounds, for example, in foods and beverages. For example, emulsions having improved clarity (e.g., small particle size, low turbidity), stability (e.g., lack of separation), taste and smell, particularly when diluted into a beverage to provide a desired dosage of an active ingredient are needed and are provided herein.

Among the provided compositions are such improved emulsions. For example, emulsions are provided that contain the non-polar compounds dispersed in aqueous liquid and have desirable properties, including improved clarity, stability, smell and taste. The provided compositions (and methods for making the compositions) can be used to formulate any non-polar compound in aqueous compositions, including the non-polar compounds (e.g., non-polar active ingredients) described herein and other known non-polar compounds.

Typically, the provided emulsions containing the non-polar compounds are emulsions having dispersed droplets (particles) with diameters less than 1000 nm or less than about 1000 nm, typically, less than 500 nm or less than about 500 nm, typically less than 300 nm or about 300 nm, typically less than 250 or less than about 250 nm, typically less than 200 nm or less than about 200 nm, for example, less than or less than about 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm. Typically, the provided emulsion compositions are oil-in-water emulsions, containing the non-polar compounds dispersed in aqueous liquid.

The provided emulsion compositions are stabilized by one or more modified food starches and/or surfactants and/or co-surfactants and/or emulsion stabilizers. Modified food starches and/or surfactants form an interfacial film in the emulsion, between the oil and water phase, providing stability. Typically, the nanoemulsions of the provided compositions contain micelles, in which one or more modified food starch and/or surfactants surround the non-polar active compound. The micelles are dispersed in the water phase.

Also provided herein are dilution compositions, such as finished food product, beverage or liquid dilution compositions, containing the concentrates provided herein. For example, the provided emulsion compositions including liquid emulsion concentrates containing the non-polar compounds, can be diluted to provide non-polar compounds in aqueous compositions, such as beverages. The liquid emulsion concentrates can be diluted into a medium, for example, an aqueous medium for example, a beverage, to form a liquid dilution composition (e.g., aqueous liquid dilution composition or beverage) containing the non-polar compound. The liquid emulsion concentrates can be diluted into a food product to form a food product containing the non-polar compound. Also exemplary of the provided compositions are the liquid dilution compositions (e.g., aqueous liquid dilution compositions or beverages, which can be clear) made by diluting the liquid emulsion concentrates in the medium.

Compositions provided herein include compositions for direct consumption, such as beverages or food products containing a modified food starch and a non-polar compound or compositions for direct consumption, such as beverages or food products, containing a modified food starch, a non-polar compound, and a PEG-derivative of vitamin E surfactant, such as a water-soluble derivative of vitamin E mixture. In some examples, compositions for direct consumption include a stabilizing system, such as a stabilizing system described herein below containing a bicarbonate or carbonate, an ingestible acid and an antioxidant. The carbonates, bicarbonates, acids and antioxidants can be included in the compositions for direct consumption as they stabilize the compositions as consumed and packaged. Such compositions also are packaged in a sealed container, which contains nitrogen to displace air in the container to oxygen from the sealed container. Such compositions include, but are not limited to juice, water, sports drink and sodas.

The compositions provided herein can be made using any non-polar compound. The non-polar compounds typically are non-polar active ingredients, for example, pharmaceuticals, nutraceuticals, vitamins and minerals. The non-polar active ingredients include, but are not limited to, Polyunsaturated Fatty Acids (PUFA)-containing compounds, for example, omega-3-containing active ingredients, for example, compounds containing ALA, DHA and/or EPA, for example, oils derived from fish and microalgae, hill and/or flaxseed extract, and omega-6-containing non-polar active ingredients, for example, gamma-linolenic acid (GLA)-containing compounds, for example, borage oil; saw palmetto oil-containing compounds; conjugated fatty acid containing-ingredients, for example, Conjugated Linoleic acid (CLA)-containing compounds; medium chain triglycerides; coenzyme Q-containing active ingredients, for example, Coenzyme Q10 (CoQ10), typically oxidized CoQ10 (ubidecarenone)-containing compounds; and compounds containing phytosterols (plant sterols). Additional exemplary non-polar active ingredients are described herein. Any non-polar compound can be used in the provided compositions.

Provided herein are compositions containing a modified food starch in an amount between 1% or about 1% and 70% or about 70%, by weight, of the composition, a PEG-derivative of vitamin E surfactant that is a water-soluble derivative of vitamin E mixture in an amount between 1% or about 1% and 98% or about 98%, by weight, of the composition and a non-polar compound. Exemplary of a water-soluble derivative of vitamin E mixture is a high dimer water-soluble derivative of vitamin E mixture. In some examples the composition further contains a polar solvent that is present in an amount up to at or about 80%, by weight, of the composition. In some examples, the provided compositions are formulated as a concentrate, such as an emulsion concentrate, and in other examples, the provided compositions are formulated for direct consumption.

1. Concentrates

Provided herein are concentrates containing a modified food starch and one or more non-polar compounds, such as, but not limited to, the exemplary non-polar compounds described herein below. Also provided herein are concentrates containing a modified food starch, one or more non-polar compounds and a PEG-derivative of vitamin E surfactant that is a water-soluble derivative of vitamin E mixture, e.g., a high dimer water-soluble derivative of vitamin E mixture. The concentrates can additionally contain a polar solvent, such as water, glycerol or glycerin.

Typically, the non-polar compound is a non-polar active ingredient, for example, an oil-based active ingredient such as a polyunsaturated fatty acid (PUFA), a coenzyme Q or a phytochemical. The non-polar compound can be present in the concentrate with a concentration range of between 2% or about 2% and 50% or about 50%, by weight, of the concentrate, for example, such as between 2% or about 2% and 45% or about 45%, between 2% or about 2% and 40% or about 40%, between 2% or about 2% and 35% or about 35%, between 2% or about 2% and 30% or about 30%, between 2% or about 2% and 25% or about 25%, between 5% or about 5% and 50% or about 50%, between 5% or about 5% and 45% or about 45%, between 5% or about 5% and 40% or about 40%, between 5% or about 5% and 35% or about 35%, between 5% or about 5% and 30% or about 30%, between 5% or about 5% and 25% or about 25%, between 8% or about 8% and 50% or about 50%, between 8% or about 8% and 45% or about 45%, between 8% or about 8% and 40% or about 40%, between 8% or about 8% and 35% or about 35%, between 8% or about 8% and 30% or about 30%, between 8% or about 8% and 25% or about 25%, between 10% or about 10% and 50% or about 50%, between 10% or about 10% and 45% or about 45%, between 10% or about 10% and 40% or about 40%, between 10% or about 10% and 35% or about 35%, between 10% or about 10% and 30% or about 30%, between 10% or about 10% and 25% or about 25%, between 15% or about 15% and 50% or about 50%, between 15% or about 15% and 45% or about 45%, between 15% or about 15% and 40% or about 40%, between 15% or about 15% and 35% or about 35%, between 15% or about 15% and 30% or about 30%, between 15% or about 15% and 25% or about 25%, by weight, of the concentrate, or at or about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50%, by weight, of the concentrate.

Each of the provided concentrates contains a modified food starch, such as, but not limited to, the exemplary modified food starches described herein below. The modified food starch can be present in the concentrate with a concentration range of between 2% or about 2% and 30% or about 30%, by weight, of the concentrate, such as, for example, between 2% or about 2% and 25% or about 25%, between 2% or about 2% and 20% or about 20%, between 2% or about 2% and 15% or about 15%, between 5% or about 5% and 30% or about 30%, between 5% or about 5% and 25% or about 25%, between 5% or about 5% and 20% or about 20%, between 5% or about 5% and 15% or about 15%, between 8% or about 8% and 30% or about 30%, between 8% or about 8% and 25% or about 25%, between 8% or about 8% and 20% or about 20%, between 8% or about 8% and 15% or about 15%, between 10% or about 10% and 30% or about 30%, between 10% or about 10% and 25% or about 25%, between 10% or about 10% and 20% or about 20%, between 10% or about 10% and 15% or about 15%, between 15% or about 15% and 30% or about 30%, between 15% or about 15% and 25% or about 25%, between 15% or about 15% and 20% or about 20%, by weight, of the concentrate, or at or at about 2, 3, 4, 5, 6, 7, 8, 9, 10, 11, 12, 13, 14, 15, 16, 17, 18, 19, 20, 21, 22, 23, 24, 25, 26, 27, 28, 29 or 30%, by weight, of the concentrate, such as at or about 5%, 10.2%, 13.2% or 15.2%, by weight, of the concentrate.

In some examples, the concentrate contains a PEG-derivative of vitamin E surfactant and a modified food starch. In such examples, the modified food starch is present in an amount between at or between about 5% or about 5% and 25% or about 25%, between 10% or about 10% and 18% or about 18%, between 10% or about 10% and 15% or about 15%, by weight, of the concentrate, for example, the modified food starch is present in an amount of at or about 5, 6, 7, 8, 9, 10, 11, 12, 13, 14, 15, 15.2, 16, 17, 18, 19, 20, 21, 22, 23, 24 or 25%, by weight, of the concentrate, such as at or about 15.2%, by weight, of the concentrate.

The one or more modified food starches can be added to the water phase, the oil phase, and typically to the water and the oil phase, during formation of the liquid concentrates. In one example, the modified food starch is added to the water phase in an amount between 5% or about 5% and 20% or about 20%, by weight, of the concentrate, such as between at or about 8% and at or about 15%, by weight, of the concentrate, for example, in an amount of at or about 5%, 6%, 7%, 8%, 9%, 10%, 10.2%, 11%, 12%, 13%, 13.2%, 14%, 15%, 16%, 17%, 18%, 19% or 20%, by weight, of the concentrate. In one example, the modified food starch is added to the oil phase in an amount between 2% or about 2% and 15% or about 15%, by weight, of the concentrate, such as between at or about 2% and at or about 10%, by weight, of the concentrate, for example, in an amount of at or about 2%, 3%, 4%, 5%, 6%, 7%, 8%, 9%, 10%, 11, %12%, 13%, 14%, 15%, by weight, of the concentrate.

In one example, additional modified food starch is added, during formulation, after evaluation of an initial concentrate, particularly if the oil and water phases of the initial concentrate (or the dilution composition resulting from dilution of the initial concentrate) appear to be separating. Addition of the modified food starch prevents separation of the oil and water phases.

In some examples, each of the provided concentrates contains a surfactant that is a PEG-derivative of vitamin E surfactant, such as a water-soluble derivative of vitamin E mixture described herein below. The surfactant can be present in the concentrate with a concentration range of between 2% or about 2% and 20% or about 20%, by weight, of the concentrate, such as, for example, between 2% or about 2% and 15% or about 15%, between 5% or about 5% and 20% or about 20%, between 5% or about 5% and 15% or about 15%, between 8% or about 8% and 20% or about 20%, between 8% or about 8% and 15% or about 15%, between 10% or about 10% and 20% or about 20%, between 10% or about 10% and 15% or about 15%, between 15% or about 15% and 20% or about 20%, by weight, of the concentrate, or at or about 2, 3, 4, 5, 6, 7, 8, 9, 10, 11, 12, 13, 14 or 15%, by weight, of the concentrate.

Typically, each of the provided concentrates contains a polar solvent, such as water, that is can be present in the provided composition with a concentration range of between 40% or about 40% and 90% or about 90%, by weight, of the concentrate, such as, for example, between 40% or about 40% and 85% or about 85%, between 40% or about 40% and 80% or about 80%, between 40% or about 40% and 75% or about 75%, between 40% or about 40% and 70% or about 70%, between 45% or about 45% and 90% or about 90%, between 45% or about 45% and 85% or about 85%, between 45% or about 45% and 80% or about 80%, between 45% or about 45% and 75% or about 75%, between 45% or about 45% and 70% or about 70%, between 50% or about 50% and 90% or about 90%, between 50% or about 50% and 85% or about 85%, between 50% or about 50% and 80% or about 80%, between 50% or about 50% and 75% or about 75%, between 50% or about 50% and 70% or about 70%, between 55% or about 55% and 90% or about 90%, between 55% or about 55% and 85% or about 85%, between 55% or about 55% and 80% or about 80%, between 55% or about 55% and 75% or about 75%, between 60% or about 60% and 90% or about 90%, between 60% or about 60% and 85% or about 85%, between 60% or about 60% and 80% or about 80%, between 60% or about 60% and 75% or about 75%, between 65% or about 65% and 90% or about 90%, between 65% or about 65% and 85% or about 85%, between 65% or about 65% and 80% or about 80%, by weight, of the concentrate, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90%, by weight, of the concentrate.

Exemplary of other additional ingredients that can be added to the concentrates, including the initial concentrates, are emulsion stabilizers, for example, a blend of gums; a non-polar solvent for the non-polar compound, for example, an oil other than the non-polar compound, for example, vitamin E oil or flax seed oil; a pH adjuster, for example, citric acid or phosphoric acid; one or more flavoring agents, for example, D-limonene or lemon oil; a co-surfactant, for example, a phospholipid (e.g., phosphatidylcholine).

The appropriate concentration ranges for the additional ingredients are described in individual sections below. Typically, the concentration of the additional ingredients depends, in part, on the concentrations of the non-polar active ingredient, the modified food starch and the polar solvent. Typically, the concentrations of these three ingredients (modified food starch, polar solvent and non-polar compound) are the focus of the formulating methods. For example, when it is determined that modifications to ingredient concentrations in the initial concentrate should be made, it typically is the concentrations of one or more of these three ingredients that are adjusted.

In one example, it can be desirable to add one or more of the additional ingredients after evaluation of the initial concentrate, for example, in order to improve the concentrate with respect to one or more desired properties.

a. Liquid Emulsion Concentrates

Provided herein are liquid emulsion concentrates (also called "concentrates" or "liquid concentrates") containing one or more non-polar compounds. The concentrates can be diluted into aqueous media to form aqueous liquid dilution compositions (also called "beverages") containing the non-polar compounds. The liquid concentrates are formulated based on one or more desirable properties, for example, clarity; safety; taste; smell; stability, for example, lack of phase separation, "ringing" and/or precipitation over time, and/or bioavailability of the concentrate and/or the aqueous liquid dilution compositions containing the concentrate. In one example, the desirable property is the ability of the provided concentrate to yield a clear or partially clear aqueous liquid dilution composition when it is diluted into aqueous medium, for example, a beverage such as water. In another example, the desirable property relates to the safety of the concentrates and/or the desirability of the concentrates for human consumption, for example, in foods and beverages. In another example, it can be desirable that the concentrate contains less than or equal to a particular concentration of one or more ingredients. In another example, it can be desirable that the concentrate contains greater than or equal to a particular concentration of one or more ingredients.

In addition to the non-polar compounds, the concentrates contain at least a modified food starch. Any modified food starch known to one of skill in the art can be used in the provided compositions, including the provided concentrates. Typically, the modified food starch is an octenyl succinate starch, such as an octenyl succinate waxy corn starch (e.g., N-Creamer 46).

The liquid concentrates further contain a polar solvent, such as water (e.g., filtered water or deionized water), or other edible aqueous liquid (e.g., propylene glycol or glycerin), or any combination thereof.

Provided herein are liquid emulsion concentrates containing one or more non-polar compounds, a modified food starch and a polar solvent. Typically, the concentrates further contain one or more additional ingredients. Exemplary of additional ingredients that can be included in the concentrates are surfactants, preservatives, non-polar solvents, co-surfactants, emulsion stabilizers, pH adjusters and flavoring agents. For example, provided herein are liquid emulsion concentrates containing one or more non-polar compounds, a modified food starch, a polar solvent and a preservative. In another example, provided herein are liquid emulsion concentrates containing one or more non-polar compounds, a modified food starch, a polar solvent, a preservative and a pH adjuster.

Also provided herein are liquid emulsion concentrates containing one or more non-polar compounds, a modified food starch and a surfactant. Typically, the surfactant is a PEG-derivative of vitamin E, for example, a tocopherol polyethylene glycol succinate (TPGS). Exemplary of a PEG-derivative of vitamin E surfactant is a water-soluble derivative of vitamin E mixture containing a high amount of dimer, e.g., a high dimer water-soluble derivative of vitamin E mixture (as described in further detail below).

Provided herein are liquid emulsion concentrates containing one or more non-polar compounds, a modified food starch and a PEG-derivative of vitamin E surfactant. Typically, the concentrates further contain one or more additional ingredients. Exemplary of additional ingredients that can be included in the concentrates are polar solvents, preservatives, non-polar solvents, co-surfactants, emulsion stabilizers, pH adjusters and flavoring agents. For example, provided herein are liquid emulsion concentrates containing one or more non-polar compounds, a modified food starch, a PEG-derivative of vitamin E surfactant and a polar solvent. In another example, provided herein are liquid emulsion concentrates containing one or more non-polar compounds, a modified food starch, a PEG-derivative of vitamin E surfactant, a polar solvent and a preservative. In yet another example, provided herein are liquid emulsion concentrates containing one or more non-polar compounds, a modified food starch, a PEG-derivative of vitamin E surfactant, a polar solvent, a preservative and a pH adjuster.

The non-polar compounds in the concentrates and dilution compositions are contained in micelles. These micelles, containing the non-polar compound surrounded by the one or more modified food starches or modified food starches and surfactants, allow dispersion of the non-polar compound among polar solvents, for example, when the concentrates are diluted to form aqueous liquid dilution compositions. The micelles containing the non-polar compounds typically have a small or relatively small particle size, for example, less than 1000 nm or about 1000 nm, less than 500 nm or about 500 nm, typically less than 300 nm or about 300 nm, typically less than 200 nm or about 200 nm, for example, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100, 125, 150 or 200 nm. Smaller particle size correlates with clarity of the aqueous liquid dilution compositions containing the diluted concentrates. For example, a liquid with a smaller particle size is more clear than a liquid with a larger particle size. Small particle size also can contribute to other desirable properties, for example, stability.

A number of factors, including ingredients, their relative concentrations, and methods for making the concentrates, affect the particle size of the compositions, and other desirable properties of the compositions, such as clarity. In particular, the nature of the modified food starch and the relative concentrations of polar solvent (e.g., water), modified food starch and the non-polar compound, contribute to small particle size, and the clarity of the aqueous liquid dilution compositions. In some examples, the concentrates additionally contain a surfactant that contributes to small particle size, and to the clarity of the aqueous liquid dilution compositions. Typically, several of these parameters and properties are related to one another. For example, several of the parameters contribute to the particle size, typically small particle size, of the compositions. Particle size contributes directly to clarity of the aqueous liquid dilution compositions containing the concentrates. Particle size also can relate to other properties, for example, stability, lack of "ringing" and/or precipitate formation of the aqueous liquid dilution compositions containing the concentrates.

Accordingly, properties of the ingredients and their relative concentrations in the concentrates are important for the ability of the concentrate to yield desirable dilution compositions. Provided are methods for formulating the liquid nanoemulsion concentrates. Determining the appropriate ingredients, and relative concentrations thereof, that will yield dilution compositions having desirable properties, is performed using provided methods for formulating the liquid concentrates.

i. Formulating the Liquid Concentrates

In the provided formulation methods, the concentrates are formulated by selecting ingredients and concentration ratios of the ingredients that yield compositions having one or more desired properties. When formulating the concentrates, selected ingredients and starting concentrations are used to make initial concentrates, which are evaluated and modified, if necessary.

As a first step in formulating the provided concentrates, one or more initial concentrates are made and evaluated for desired properties. For this step, ingredients are selected, for example, from among the ingredients described herein. The ingredients generally include modified food starches, polar solvents, non-polar compounds containing non-polar active ingredients, and other ingredients. In some examples, the ingredients generally include modified food starches, surfactants, polar solvents, non-polar compounds containing non-polar active ingredients, and other ingredients. A starting concentration (weight percentage) of each selected ingredient is selected from within the appropriate concentration range for that ingredient or category of ingredient, for example, the appropriate concentration range for the surfactant. In some cases, the initial concentrate is formulated based on the ingredients, and concentrations thereof, of an existing concentrate, having one or more desired properties.

The initial concentrate(s) then is/are made, using the methods for making the concentrates, provided below, adding each ingredient at its starting concentration at the appropriate step. In one example, more than one initial concentrate, e.g., multiple initial concentrates, each having a different concentration of one or more ingredients, is made, and compared. In one example, multiple initial concentrates are produced to test various representative concentrations within an appropriate concentration range for one or more particular ingredient.

In a typical example, the initial concentrate is made by including at least one modified food starch, such as from among the modified food starches described herein, at a starting concentration within the concentration range of between 15% or about 15% and 25% or about 25%, by weight (w/w), of the concentrate; at least one non-polar compound, at a starting concentration within the concentration range of between 5% or about 5% and 20% or about 20%, by weight (w/w), of the concentrate; and a polar solvent, at a starting concentration of between 55% or about 55% and 85% or about 85%, by weight (w/w), of the concentrate. In one example, the initial concentrate further includes other ingredients, for example, surfactants, preservative(s), co-surfactant(s), and/or other ingredients as described herein.

In another typical example, the initial concentrate is made by including at least one modified food starch, such as from among the modified food starches described herein, at a starting concentration within the concentration range of between 5% or about 5% and 25% or about 25%, by weight (w/w), of the concentrate; at least one non-polar compound, at a starting concentration within the concentration range of between 5% or about 5% and 30% or about 30%, by weight (w/w), of the concentrate; at least one surfactant, at a starting concentration of between 1% or about 1% and 30% or about 30%, by weight, of the concentrate; and a polar solvent, at a starting concentration of between 40% or about 40% and 85% or about 85%, by weight (w/w), of the concentrate. In one example, the initial concentrate further includes other ingredients, for example, preservative(s), co-surfactant(s), and/or other ingredients as described herein.

After making the initial concentrate(s), the concentrate(s) is/are evaluated for one or more desired properties, for example, the ability to form dilution compositions (e.g., clear dilution compositions or dilution compositions having a particular turbidity value, particle size or other property). The ability to form dilution compositions having one or more properties is determined by diluting the concentrate in aqueous medium, for example, diluting the concentrate in the aqueous medium at a dilution factor of between 1:10 or about 1:10 and at most 1:1000 or about 1:1000, typically between 1:10 or about 1:10 and 1:500 or about 1:500, for example, at a dilution between 1:10 or about 1:10 and up to 1:250 or about 1:250, for example, diluted between 1:10 or about 1:10, 1:20 or about 1:20, 1:25 or about 1:25, 1:50 or about 1:50, 1:100 or about 1:100, 1:200 or about 1:200, 1:250 or about 1:250, or up to 1:500 or about 1:500, for example, 1:10, 1:20, 1:25, 1:30, 1:35, 1:40, 1:50, 1:55, 1:60, 1:65, 1:70, 1:75, 1:80, 1:85, 1:90, 1:95, 1:100, 1:110, 1:120, 1:130, 1:140, 1:150, 1:160, 1:170, 1:180, 1:190, 1:200, 1:210, 1:220, 1:230, 1:240, 1:250, 1:260, 1:270, 1:280, 1:290, 1:300, 1:350, 1:400, 1:500, or according to other dilutions provided herein, and assessing the clarity, turbidity value, particle size, color, smell, taste, safety, stability, "ringing" or forming of precipitates, presence of crystals or other desired property of the resulting dilution composition.

After evaluation, the ingredients, and/or concentrations thereof, can be adjusted in order to generate the desired properties in the final concentrate. Typically, the concentration of the non-polar compound, the surfactant, and/or the polar solvent is the concentration that is adjusted after evaluating the initial concentrate. Similarly, when formulating multiple initial concentrates, one or more of the non-polar compound, surfactant and polar solvent concentration is/are varied among the multiple initial concentrates. In some cases, following evaluation, it can be determined that additional ingredients (not included in the initial formulation) are needed or desirable for achieving the desired properties of a particular concentrate. This process can be repeated until a concentrate having the desired property or properties is generated.

ii. Common Ingredients and Typical Concentration Ranges

Each of the provided concentrates contains a non-polar compound, such as, but not limited to, the exemplary non-polar compounds described herein below. Typically, the non-polar compound is a non-polar active ingredient, for example, an oil-based active ingredient such as a polyunsaturated fatty acid (PUFA), a coenzyme Q or a phytochemical. For formulating the initial concentrate, the starting concentration of the non-polar compound typically is a concentration chosen from within a concentration range of between 5% or about 5% and 30% or about 30% (w/w) of the concentrate, such as a starting concentration of 5% or about 5%, 6% or about 6%, 7% or about 7%, 8% or about 8%, 9% or about 9%, 10% or about 10%, 11% or about 11%, 12% or about 12%, 13% or about 13%, 14% or about 14%, 15% or about 15%, 16% or about 16%, 17% or about 17%, 18% or about 18%, 19% or about 19%, 20% or about 20%, 21% or about 21%, 22% or about 22%, 23% or about 23%, 24% or about 24%, 25% or about 25%, 26% or about 26%, 27% or about 27%, 28% or about 28%, 29% or about 29% or 30% or about 30% (w/w) of the concentrate. The non-polar compound typically is added as part of an oil phase, according to the provided methods for making the concentrate. In one example, when the concentrate contains a surfactant, such as a water-soluble derivative of vitamin E mixture, the concentration range of the non-polar compound is between 5% or about 5% and 30% or about 30%, by weight (w/w), of the concentrate. In another example, the concentration range of the non-polar compound is between 5% or about 5% and 20% or about 20%, or between 5% or about 5% and 15% or about 15%, or between 5% or about 5% and 12% or about 12%, by weight (w/w), of the concentrate. Exemplary of the total amount of non-polar compound concentrations within the appropriate range are 5.65%, 8.75%, 10.5%, 11.5% and 20.5% (w/w) of the concentrate.

The initial concentrate further contains at least one modified food starch, which can be added to the water phase, the oil phase or to the water phase and the oil phase. The starting concentration of the modified food starch typically is a concentration chosen from within a concentration range of between 5% or about 5% and 25% or about 25% (w/w) of the concentrate, such as a starting concentration of 5% or about 5%, 6% or about 6%, 7% or about 7%, 8% or about 8%, 9% or about 9%, 10% or about 10%, 11% or about 11%, 12% or about 12%, 13% or about 13%, 14% or about 14%, 15% or about 15%, 16% or about 16%, 17% or about 17%, 18% or about 18%, 19% or about 19%, 20% or about 20%, 21% or about 21%, 22% or about 22%, 23% or about 23%, 24% or about 24% or 25% or about 25% (w/w) of the concentrate. In one example, when the concentrate contains a surfactant, such as a water-soluble derivative of vitamin E mixture, the concentration range of the modified food starch is between 8% or about 8% and 20% or about 20%, or between 10% or about 10% and 20% or about 20%, by weight (w/w), of the concentrate. In another example, the concentration range of the modified food starch is between 15% or about 15% and 25% or about 25%, or between 15% or about 15% and 20% or about 20%, or between 16% or about 16% and 19% or about 19%, by weight (w/w), of the concentrate.

The concentrates further contain polar solvents (e.g., water, or other edible polar solvent, e.g., propylene glycol and glycerin), typically a high concentration of the polar solvent, which is added to the water phase. Typically, the starting concentration of polar solvent is chosen from within a concentration range of between 40% or about 40% and 85% or about 85% (w/w) of the concentrate, for example, 40% or about 40%, 41% or about 41%, 42% or about 42%, 43% or about 43%, 44% or about 44%, 45% or about 45%, 46% or about 46%, 47% or about 47%, 48% or about 48%, 49% or about 49%, 50% or about 50%, 51% or about 51%, 52% or about 52%, 53% or about 53%, 54% or about 54%, 55% or about 55%, 56% or about 56%, 57% or about 57%, 58% or about 58%, 59% or about 59%, 60% or about 60%, 61% or about 61%, 62% or about 62%, 63% or about 63%, 64% or about 64%, 65% or about 65%, 66% or about 66%, 67% or about 67%, 68% or about 68%, 69% or about 69%, 70% or about 70%, 71% or about 71%, 72% or about 72%, 73% or about 73%, 74% or about 74%, 75% or about 75%, 76% or about 76%, 77% or about 77%, 78% or about 78%, 79% or about 79%, 80% or about 80%, 81% or about 81%, 82% or about 82%, 83% or about 83%, 84% or about 84% or 85% or about 85% (w/w) of the concentrate. In one example, when the concentrate contains a surfactant, such as a water-soluble derivative of vitamin E mixture, the concentration range of the polar solvent is between 40% or about 40% and 85% or about 85% (w/w) of the concentrate, more typically between 45% or about 45% and 80% or about 80%, by weight, of the concentrate, for example, between 45% or about 45% and 80% or about 80%, or between 55% or about 55% and 70% or about 70%, by weight, of the concentrate. In another example, the concentration range of the polar solvent is between 55% or about 55% and 80% or about 80% (w/w), or 65% or about 65% and 80% or about 80%, or between 68% or about 68% and 76% or about 76%, of the concentrate.

One or more, typically more than one, additional ingredients can be added to the initial concentrate. For example, the concentrates typically contain at least one preservative, typically a natural preservative, for example, benzyl alcohol. In some examples, the initial concentrate optionally contains at least one surfactant, which can be added to the water phase or the oil phase, and typically has an HLB value of between 14 or about 14 and 20 or about 20, for example, 14, 15, 16, 17, 18, 19, or 20, or about 14, about 15, about 16, about 17, about 18, about 19, about 20, typically between at or about 15 and at or about 18, including, but not limited to PEG-derivative of vitamin E surfactants and analogs and derivatives thereof, which is safe and/or approved for human consumption. Typically, the starting concentration of the surfactant is chosen from within a concentration range of between 1% or about 1% and 30% or about 30% (w/w), for example, 1% or about 1%, 2% or about 2%, 3% or about 3%, 4% or about 4%, 5% or about 5%, 6% or about 6%, 7% or about 7%, 8% or about 8%, 9% or about 9%, 10% or about 10%, 11% or about 11%, 12% or about 12%, 13% or about 13%, 14% or about 14%, 15% or about 15%, 16% or about 16%, 17% or about 17%, 18% or about 18%, 19% or about 19%, 20% or about 20%, 21% or about 21%, 22 or about 22%, 23% or about 23%, 24% or about 24%, 25% or about 25%, 26% or about 26%, 27% or about 27%, 28% or about 28%, 29% or about 29% or 30% or about 30%, by weight (w/w), of the concentrate, such as 5% or about 5%, by weight, of the concentrate. In one example, the concentration range of the surfactant is between 2% or about 2% and 30% or about 30%, between 2% or about 2% and 20% or about 20%, or between 2% or about 2% and 10% or about 10%, by weight, of the concentrate.

Exemplary of other additional ingredients that can be added to the concentrates, including the initial concentrates, are emulsion stabilizers, for example, a blend of gums; a non-polar solvent for the non-polar compound, for example, an oil other than the non-polar compound, for example, vitamin E oil or flax seed oil; a pH adjuster, for example, citric acid or phosphoric acid; one or more flavoring agents, for example, D-limonene or lemon oil; a co-surfactant, for example, a phospholipid (e.g., phosphatidylcholine).

The appropriate concentration ranges for the additional ingredients are described in individual sections below. Typically, the concentration of the additional ingredients depends, in part, on the concentrations of the non-polar active ingredient, the modified food starch and the polar solvent. Typically, the concentrations of these three ingredients (modified food starch, polar solvent and non-polar compound) are the focus of the formulating methods. For example, when it is determined that modifications to ingredient concentrations in the initial concentrate should be made, it typically is the concentrations of one or more of these three ingredients that are adjusted.

In one example, it can be desirable to add one or more of the additional ingredients after evaluation of the initial concentrate, for example, in order to improve the concentrate with respect to one or more desired properties.

b. Dilution Compositions Containing the Liquid Emulsion Concentrates

Among the compositions provided herein are food and beverage compositions, typically water-based finished food or beverages, containing the non-polar compounds and modified food starch. The dilution compositions are made by diluting the liquid emulsion concentrates into a variety of foods and beverages. For example, the liquid emulsion concentrates are diluted into a variety of foods including, but not limited to, dairy compositions, e.g., butter, milk, yogurt, and cheese, savory food compositions, sweet food compositions, frozen food, egg products, margarines, spreads, peanut butter, almond butter, sauces and dressings, e.g., mayonnaise, thousand island, ranch and tartar sauce, soups, dips, fillings for cakes and cookies, confections, whipped desserts, e.g., mousse, custard, chiffon, meringue, and whipped topping, frozen desserts, e.g., frozen yogurt and ice cream, candies, baby foods, e.g., infant formula, pet food or any food product, and beverages, for example, water, flavored water, soda, milk, juices, including fruit juices, sauces, syrups, soups, sports drinks, nutritional beverages, energy drinks, vitamin-fortified beverages, or any beverage. More typically, the liquid emulsion concentrates are diluted into a variety of water-based foods and beverages including, but not limited to, tomato-paste based products, dairy-based products, creams, sauces, soups, pastes, dressings, water, flavored water, soda, milk, juices, including fruit juices, sauces, syrups, sports drinks, fitness drinks, nutritional beverages, nutritional supplement, energy drinks and vitamin-fortified beverages.

In one example, the liquid emulsion concentrates are diluted into tomato-paste based products, such as tomato sauce and vegetable juice. In another example, the liquid emulsion concentrates are diluted into dairy products, such as fat free milk and fat free sour cream. In yet another example, the liquid emulsion concentrates are diluted into beverages, for example, juices, for example, nectar juices and orange juice, or tinted nutritional beverages. In further examples, the liquid emulsion concentrates are diluted into mayonnaise, salsa, queso cheese, and salad dressing, for example, ranch dressing.

The dilution compositions are typically made by diluting the liquid emulsion concentrates into a variety of foods and beverages, such that the food and beverage dilution compositions contain a specific amount of non-polar active ingredient per serving of the food or beverage, such as, for example, the dietary reference intake for a particular non-polar active ingredient. For example, the food and beverage dilution compositions provided herein contain between at or about 1.5 to at or about 3.0 grams (g) of omega-6 fatty acids, between at or about 16 to at or about 220 milligrams (mg), for example, between at or about 32 to at or about 220 mg docosahexaenoic acid (DHA) and eicosapentaenoic acid (EPA), between at or about 100 and at or about 500 mg phytosterols, between at or about 10 and at or about 200 mg, for example, between at or about 50 and at or about 200 mg Coenzyme Q10, between at or about 40 and at or about 400 micrograms (mcg) Vitamin A, or between at or about 200 and at or about 2000 international units (IU), for example between at or about 400 and at or about 800 IU Vitamin D3, per serving of the food or beverage, for example, 1 teaspoon (0.166667 ounce, 4.7249 g), 1 tablespoon (0.5 fluid ounce, 14.1747 g), 2 tablespoons (1 fluid ounce, 28.3495 g), 0.25 cup (2 fluid ounces, 56.6990 g), 0.5 cup (4 fluid ounces, 113.398 g), 0.75 cup (6 fluid ounces, 170.097 g) or 1 cup (8 fluid ounces, 226.796 g), for example, per 8 ounces of a beverage.

Properties of the provided liquid emulsion concentrates that are diluted into the food or beverage contribute to various properties of the provided resulting dilution compositions, for example, stability, for example, lack of phase separation, flocculation, creaming, oxidation, "ringing" and/or precipitation over time; desirability for human consumption, for example, pleasant taste, and/or smell, for example, lack of "fishy" taste/smell, lack of "ringing" and lack of crystal formation; clarity; and safety for human consumption. As described above, the liquid emulsion concentrates are formulated according to the desired properties of the food and beverage dilution compositions containing the concentrates.

Among the products provided herein are liquid dilution compositions, typically aqueous liquid dilution compositions (i.e., beverages), containing the described concentrates containing the modified food starch and non-polar compounds. The aqueous liquid dilution compositions are made by diluting the provided liquid nanoemulsion concentrates into aqueous media, for example, beverages, for example, water, flavored water, soda, milk, juices, including fruit juices, sauces, syrups, soups, sports drinks, nutritional beverages, energy drinks, vitamin-fortified beverages, or any beverage. Any beverage can be prepared or modified using the water-soluble vitamin E derivative mixtures (compositions) described herein and other water-soluble vitamin E derivative mixtures (compositions), for example, see U.S. Pub. No. 2008-0254188 and U.S. Pat. No. 6,045,826.

In one example, the aqueous liquid dilution composition contains between 0.05 grams (g) or about 0.05 g and 10 g or about 10 g, typically between 0.05 g and 5 g, of the concentrate per 8 fluid ounces or about 8 fluid ounces, at least 8 fluid ounces or at least about 8 fluid ounces, or less than 8 fluid ounces or less than about 8 fluid ounces, or per serving size, of the aqueous medium, for example, 0.05 g, 0.06 g, 0.07 g, 0.08 g, 0.09 g, 0.1 g, 0.2 g, 0.3 g, 0.4 g, 0.5 g, 0.6 g, 0.7 g, 0.8 g, 0.9 g, 1 g, 2 g, 3 g, 4 g, 5 g, 6 g, 7 g, 8 g, 9 g, or 10 g of the concentrate per 8 fluid ounces, about 8 fluid ounces, or at least 8 fluid ounces or at least about 8 fluid ounces of the aqueous medium, for example 8, 9, 10, 11, 12, 13, 14, 15, 16, 17, 18, 19, 20, 25, 30, 35, 40, 45, 50, 100, 200 or more fluid ounces, of aqueous medium.

In another example, the aqueous liquid dilution composition contains between 1 mL or about 1 mL and 10 mL or about 10 mL of the concentrate, for example, 1 mL, 2 mL, 3 mL, 4 mL, 5 mL, 6 mL, 7 mL, 8 mL, 9 mL or 10 mL of the concentrate, per 8 fluid ounces, about 8 fluid ounces, at least 8 fluid ounces or at least about 8 fluid ounces, or less than 8 fluid ounces or less than about 8 fluid ounces, or per serving size, of the aqueous medium, for example 8, 9, 10, 11, 12, 13, 14, 15, 16, 17, 18, 19, 20, 25, 30, 35, 40, 45, 50, 100, 200 or more fluid ounces, of aqueous medium.

In another example, the aqueous liquid dilution composition contains at least 10 mg or about 10 mg, typically at least 25 mg or about 25 mg, typically at least 35 mg, of the non-polar compound, for example, the non-polar active ingredient, per 8 fluid ounces or about 8 fluid ounces, at least 8 fluid ounces or at least about 8 fluid ounces of the aqueous medium, or less than 8 ounces or less than about 8 ounces, or per serving size, of the aqueous medium; for example, 10, 11, 12, 13, 14, 15, 16, 17, 18, 19, 20, 21, 22, 23, 25, 25, 26, 27, 28, 29, 30, 31, 32, 33, 34, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000 mg, or more, of the non-polar compound per at least 8 fluid ounces or at least about 8 fluid ounces of aqueous medium. In another example, the aqueous liquid dilution composition contains the concentrate diluted at a dilution factor of between 1:10 or about 1:10 and 1:1000 or about 1:1000 or more, typically between 1:10 or about 1:10 and 1:500 or about 1:500 or more, for example, diluted not more than 1:10 or about 1:10, 1:20 or about 1:20, 1:25 or about 1:25, 1:50 or about 1:50, 1:100 or about 1:100, 1:200 or about 1:200, 1:250 or about 1:250, 1:300 or about 1:300, 1:400 or about 1:400, 1:500 or about 1:500, for example, 1:10, 1:20, 1:25, 1:30, 1:35, 1:40, 1:50, 1:55, 1:60, 1:65, 1:70, 1:75, 1:80, 1:90, 1:100, 1:110, 1:120, 1:130, 1:140, 1:150, 1:160, 1:170, 1:180, 1:190, 1:200, 1:210, 1:220, 1:230, 1:235, 1:240, 1:250, 1:260, 1:270, 1:280, 1:290, 1:300, 1:350, 1:400, 1:450, 1:500 or more. In another example, the aqueous liquid dilution compositions contain the liquid concentrate diluted to any amount. In another example the dilution is less than 1:10 or about 1:10.

Properties of the provided concentrates that are diluted into the aqueous medium contribute to various properties of the provided resulting aqueous liquid dilution compositions, for example, clarity; desirability for human consumption, for example, pleasant taste, and/or smell, for example, lack of "fishy" taste/smell, lack of "ringing" and lack of crystal formation; stability, for example, lack of oxidation, "ring-ing" and/or precipitation over time; and safety for human consumption. As described herein, the liquid concentrates are formulated according to the desired properties of the aqueous liquid dilution compositions containing the concentrates.

c. Evaluation of the Initial Concentrates and Dilution Compositions

The formulation methods further include analysis of the initial concentrate based on one or more desired properties, for example, properties of a dilution composition containing the concentrate, for example, stability, presence of flocculation, creaming, "ringing" or forming of precipitates, clarity, turbidity value, particle size, color, smell, taste, safety and/or the presence of crystals. For example, the methods typically include analyzing the ability of the initial concentrate to form a stable composition upon dilution into a water-based finished food or beverage. Stability upon dilution into a beverage, such as an aqueous medium, is typically determined by analysis of the clarity/turbidity of the resulting aqueous liquid dilution composition containing the initial concentrate. Stability upon dilution into a food product, such as a non-clear liquid, a sauce, soup, dressing or cream, is typically determined by lack of phase separation of the resulting dilution composition containing the initial concentrate.

For evaluation of properties of the dilution composition, the initial concentrate is diluted into a water-based finished food or beverage, typically a beverage, such as water, a tinted nutritional beverage or a juice, or a food, such as a tomato-based food product, such as tomato sauce or vegetable juice, a dairy-based food product, such as fat free milk or sour cream, mayonnaise, salsa, queso cheese, a soup, a cream or a dressing, such as ranch dressing, for example, at a dilution factor of between 1:10 or about 1:10 and at most 1:1000 or about 1:1000, typically between 1:10 or about 1:10 and 1:500 or about 1:500, for example, at a dilution between 1:10 or about 1:10 and up to 1:250 or about 1:250, for example, diluted between 1:10 or about 1:10, 1:20 or about 1:20, 1:25 or about 1:25, 1:50 or about 1:50, 1:100 or about 1:100, 1:200 or about 1:200, 1:250 or about 1:250, or up to 1:500 or about 1:500, for example, 1:10, 1:20, 1:25, 1:30, 1:35, 1:40, 1:50, 1:55, 1:60, 1:65, 1:70, 1:75, 1:80, 1:85, 1:90, 1:95, 1:100, 1:110, 1:120, 1:130, 1:140, 1:150, 1:160, 1:170, 1:180, 1:190, 1:200, 1:210, 1:220, 1:230, 1:240, 1:250, 1:260, 1:270, 1:280, 1:290, 1:300, 1:350, 1:400, 1:500, or any other dilution, such as others provided herein. Typically, stability of the dilution composition containing the initial concentrate is evaluated using one or more approaches. Additionally, other properties can be evaluated, for example, smell and/or taste properties of the dilution composition, for example, when the non-polar compound is a polyunsaturated fatty acid (PUFA), particularly fish oil or algae oil, whether the dilution composition smells "fishy" can be evaluated empirically.

i. Stability

In one example, dilution of the provided concentrates in a finished food or beverage yields a stable dilution composition. The stability of the dilution composition containing the initial concentrate can be evaluated by one or more of a plurality of approaches, such as by empirical observation, for example, sensory tasting tests or qualitative assessment and/or by measuring oxidative stability.

In one example, the concentrates can be diluted to form stable food or beverage products, by adding between 0.05 grams (g) or about 0.05 g and 10 g or about 10 g of the concentrate, typically between 0.05 g and 5 g, for example, 0.05 g, 0.06 g, 0.07 g, 0.08 g, 0.09 g, 0.1 g, 0.2 g, 0.3 g, 0.4 g, 0.5 g, 0.6 g, 0.7 g, 0.8 g, 0.9 g, 1 g, 2 g, 3 g, 4 g, 5 g, 6 g, 7 g, 8 g, 9 g, or 10 g of the concentrate to a serving, about a serving, or at least a serving, for example 1, 2, 3, 4, 5, 6, 7, 8, 9, 10, 11, 12, 13, 14, 15, 16 or more, servings of a food or beverage, for example, a food, such as a tomato-paste based product, dairy-based product, salsa, salsa queso, cream, soup or dressing or a beverage, such as juice, nutritional beverage or milk, forming a stable food or beverage dilution composition containing the non-polar compound. In another example, the concentrates can be diluted to form stable liquid dilution compositions by adding between 1 mL or about 1 mL and 10 mL or about 10 mL of the concentrate, for example, 1 mL, 2 mL, 3 mL, 4 mL, 5 mL, 6 mL, 7 mL, 8 mL, 9 mL or 10 mL of the concentrate to a serving, about a serving, or at least a serving, for example 1, 2, 3, 4, 5, 6, 7, 8, 9, 10, 11, 12, 13, 14, 15, 16 or more, servings of a finished food or beverage, forming a stable food or beverage that contains the non-polar compound.

In another example, the concentrates can be diluted in a food or beverage to form stable dilution compositions when at least 25 mg or about 25 mg, typically at least 35 mg, for example, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000, 2500, 3000 mg, or more, of the non-polar active ingredient, is contained in at least a serving or about a serving of the food or beverage.

In another example, the concentrate can be diluted in a water-based finished food or beverage to form a stable liquid dilution composition at a dilution factor of between 1:10 or about 1:10 and at most 1:1000 or about 1:1000, typically between 1:10 or about 1:10 and 1:500 or about 1:500, for example, at a dilution between 1:10 or about 1:10 and up to 1:250 or about 1:250, for example, diluted between 1:10 or about 1:10, 1:20 or about 1:20, 1:25 or about 1:25, 1:50 or about 1:50, 1:100 or about 1:100, 1:200 or about 1:200, 1:250 or about 1:250, or up to 1:500 or about 1:500, for example, 1:10, 1:20, 1:25, 1:30, 1:35, 1:40, 1:50, 1:55, 1:60, 1:65, 1:70, 1:75, 1:80, 1:85, 1:90, 1:95, 1:100, 1:110, 1:120, 1:130, 1:140, 1:150, 1:160, 1:170, 1:180, 1:190, 1:200, 1:210, 1:220, 1:230, 1:240, 1:250, 1:260, 1:270, 1:280, 1:290, 1:300, 1:350, 1:400 or at most 1:500. In another example, the stable dilution composition is formed at dilutions less dilute than 1:10 of the concentrate.

The provided liquid emulsion concentrates can be formulated using any non-polar compound for dilution in a food or beverage. In one example, the concentrates can be diluted in food or beverage, for example, over a wide dilution range to form stable compositions, for example, at a dilution factor of between 1:10 or about 1:10 and at most 1:1000 or about 1:1000, typically between 1:10 or about 1:10 and 1:500 or about 1:500, for example, at a dilution between 1:10 or about 1:10 and up to 1:250 or about 1:250, for example, diluted between 1:10 or about 1:10, 1:20 or about 1:20, 1:25 or about 1:25, 1:50 or about 1:50, 1:100 or about 1:100, 1:200 or about 1:200, 1:250 or about 1:250, or up to 1:500 or about 1:500, for example, 1:10, 1:20, 1:25, 1:30, 1:35, 1:40, 1:50, 1:55, 1:60, 1:65, 1:70, 1:75, 1:80, 1:85, 1:90, 1:95, 1:100, 1:110, 1:120, 1:130, 1:140, 1:150, 1:160, 1:170, 1:180, 1:190, 1:200, 1:210, 1:220, 1:230, 1:240, 1:250, 1:260, 1:270, 1:280, 1:290, 1:300, 1:350, 1:400 or at most 1:500.

Stability of a food or beverage dilution composition can be evaluated using one or more of a plurality of approaches, for example, quantitatively, for example, by measuring oxidative stability or qualitatively, by empirical evaluation. In one example, a particular quantitative or qualitative stability value is desired. In another example, it is desired that the dilution composition is as stable as, about as stable or more stable than another food or beverage, for example, a food or beverage dilution composition made according to the provided methods or a food or beverage, for example, a food or beverage that does not contain the concentrate. For example, a food or beverage dilution composition, containing the liquid concentrate diluted in a food or beverage, can be as stable or about as stable as the same food or beverage, containing no concentrate. The evaluation can be done qualitatively, for example by empirical observation, or quantitatively, for example, by measuring oxidative stability.

Typically, the provided dilution compositions containing the concentrates are stable, for example, free from one or more changes over a period of time, for example, 1, 2, 3, 4, 5, 6, 7, 8, 9, 10, 11 or 12 months, 1, 2, 3, 4 or more years.

In one example, the compositions are stable because they are free from oxidation or substantial oxidation over time. In another example, they are stable because they remain clear over time. In another example, the stable compositions remain safe and/or desirable for human consumption over time. In one example, stability refers to the lack of precipitates forming in the compositions over the period of time. In a related example, the compositions are stable because they do not exhibit "ringing," formation of a whitish or opaque ring around the perimeter of the container holding the liquid, typically at the surface of the liquid. Ringing typically is undesirable, particularly in the case of a liquid for human consumption, for example, a beverage. In yet another example, the compositions are stable because they do not exhibit flocculation over time.

In another example, the composition is stable if it does not exhibit any visible phase separation or creaming over a period of time, for example, after 24 hours, after one week or after one month. In one example, the compositions are stable if they exhibit one or more of these described characteristics, over time, when kept at a particular temperature. In one example, the compositions remain stable at room temperature, for example, 25° C. or about 25° C. In another example, the compositions remain stable at between 19° C. and 25° C. In another example, the compositions remain stable at refrigerated temperatures, for example, 4° C. or about 4° C., or at frozen temperature, for example, at −20° C. or about −20° C.

Stability refers to a desirable property of the provided compositions, for example, the ability of the provided compositions to remain free from one or more changes over a period of time, for example, 1, 2, 3, 4, 5, 6, 7, 8, 9, 10, 11 or 12 months, 1, 2, 3, 4 or more years. In one example, the composition is stable if it is formulated such that it remains free from oxidation or substantial oxidation over time. In another example, the stable compositions remain clear over time. In another example, the stable compositions remain safe and/or desirable for human consumption over time. In one example, stability refers to the lack of precipitates forming in the compositions over the period of time. In a related example, stability refers to the lack of "ringing" over the period of time. In another example, the composition is stable if it does not exhibit any visible phase separation over a period of time, for example, after 24 hours, after one week or after one month. In one example, the compositions are stable if they exhibit one or more of these described characteristics, over time, when kept at a particular temperature.

In one example, the compositions are stable at room temperature, for example, 25° C. or about 25° C. In another example, the compositions remain stable at between 19° C.

and 25° C. In another example, the compositions remain stable at refrigerated temperatures, for example, 4° C. or about 4° C., or at frozen temperature, for example, at −20° C. or about −20° C.

1. Stability Determined by Empirical Evaluation

In one example, the stability, or shelf life, of a dilution composition containing the initial concentrate can be assessed qualitatively by observation. For example, a food or beverage dilution composition is considered stable if it does not exhibit phase separation, flocculation, precipitation, creaming, coagulation and/or sedimentation when looking at the food or beverage with the naked eye. Stability can be assessed empirically by comparison with other foods or beverages. For example, it can be desirable that the food or beverage is as stable as another food or beverage not containing the initial concentrate. In a related example, it can be desired that there is no substantial difference, for example, no observable difference, between the food or beverage dilution composition containing the concentrate and the food or beverage without the concentrate.

In another example, stability is determined by evaluating sensory attributes of the food or beverage compositions containing the initial concentrates. For example, the food or beverage dilution compositions can be evaluated for a variety of different sensory attributes by a tasting panel. Sensory attributes include, for example, appearance, taste, aroma and flavor, for example, "fishiness", feeling factors, such as burning or irritation by smelling, texture, such as viscosity or oily mouth feeling, aftertaste, and any other attribute that is warranted. Evaluation of sensory attributes can be assessed empirically for the food or beverage dilution compositions alone, or alternatively by comparison of the dilution compositions to a food or beverage not containing the non-polar compounds. In one example, the food or beverage dilution composition has desirable sensory attributes, such as a lack of "fishy" smell or taste. In another example, there is no difference between the evaluated sensory attributes of the food or beverage dilution composition as compared to a food or beverage not containing the initial concentrate. Typically, the food or beverage dilution compositions are considered stable if they retain desired sensory attributes over a period of time, for example, 1, 2, 3, 4, 5, 6, 7, 8, 9, 10, 11 or 12 months, 1, 2, 3, 4 or more years.

2. Oxidative Stability

In one example, the shelf life of a food or beverage dilution composition containing the initial concentrate is assessed quantitatively, for example, by measuring oxidative stability of polyunsaturated fatty acids. Oxidative deterioration can be assessed by chemical methods such as determining peroxide value (PV), which measures peroxides resulting from primary oxidation, or p-anisidine value (AV), which measures 2-alkenals (aldehydes) resulting from secondary oxidation. Peroxide value typically is measured by reaction of the peroxide with an iodide ion followed by determination of the amount of oxidation, either directly or indirectly. For example, PV can be determined by measuring the amount of iodine formed by the reaction of peroxides with iodide ion in the presence of an indicator ion, for example, sodium thiosulfate. In another example, PV is determined by reaction with $Fe^{+++}$ followed by direct measurement of colorimetric intensity at a wavelength of 505 nm. A p-anisidine value test measures the amount of aldehydes formed from secondary oxidation of fatty substances upon reaction with p-anisidine by measuring absorption at 366 nm. Any method known to one of skill in the art can be used to determine oxidative deterioration. Typically, the food or beverage dilution compositions are considered stable if they remain free from oxidative deterioration over a period of time, for example, 1, 2, 3, 4, 5, 6, 7, 8, 9, 10, 11 or 12 months, 1, 2, 3, 4 or more years.

i. Clarity

In one example, dilution of the provided concentrates in aqueous media yield clear liquids. The clarity of the aqueous liquid dilution composition containing the initial concentrate can be evaluated by one or more of a plurality of approaches, such as by empirical observation, by measuring particle size and/or by measuring the turbidity value of the liquid.

In one example, the concentrates can be diluted to form clear liquids (or liquids that are equal in clarity to known liquids), by adding between 0.05 grams (g) or about 0.05 g and 10 g or about 10 g of the concentrate, typically between 0.05 g and 5 g, for example, 0.05 g, 0.06 g, 0.07 g, 0.08 g, 0.09 g, 0.1 g, 0.2 g, 0.3 g, 0.4 g, 0.5 g, 0.6 g, 0.7 g, 0.8 g, 0.9 g, 1 g, 2 g, 3 g, 4 g, 5 g, 6 g, 7 g, 8 g, 9 g, or 10 g of the concentrate, to 8 fluid ounces, about 8 fluid ounces, or at least 8 fluid ounces or at least about 8 fluid ounces, for example 8, 9, 10, 11, 12, 13, 14, 15, 16, 17, 18, 19, 20, 25, 30, 35, 40, 45, 50, 100, 200 or more fluid ounces, of aqueous medium, for example, water, forming a clear aqueous liquid dilution composition that contains the non-polar compound. In another example, the concentrates can be diluted to form clear aqueous liquid dilution compositions by adding between 1 mL or about 1 mL and 10 mL or about 10 mL of the concentrate, for example, 1 mL, 2 mL, 3 mL, 4 mL, 5 mL, 6 mL, 7 mL, 8 mL, 9 mL or 10 mL of the concentrate to 8 fluid ounces, about 8 fluid ounces, or at least 8 fluid ounces or at least about 8 fluid ounces, for example 8, 9, 10, 11, 12, 13, 14, 15, 16, 17, 18, 19, 20, 25, 30, 35, 40, 45, 50, 100, 200 or more fluid ounces, of aqueous medium, for example, water, forming a clear aqueous liquid dilution composition that contains the non-polar compound.

In another example, the concentrate can be diluted in aqueous medium to form a clear aqueous liquid dilution composition when at least 25 mg or about 25 mg, typically at least 35 mg, for example, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000, 2500, 3000 mg, or more, of the non-polar active ingredient, is contained in at least 8 fluid ounces or at least about 8 fluid ounces of aqueous liquid dilution composition, for example, a beverage, for example, water.

In another example, the concentrate can be diluted in an aqueous medium to form a clear aqueous liquid dilution composition at a dilution factor of between 1:10 or about 1:10 and at most 1:1000 or about 1:1000, typically between 1:10 or about 1:10 and 1:500 or about 1:500, for example, at a dilution between 1:10 or about 1:10 and up to 1:250 or about 1:250, for example, diluted between 1:10 or about 1:10, 1:20 or about 1:20, 1:25 or about 1:25, 1:50 or about 1:50, 1:100 or about 1:100, 1:200 or about 1:200, 1:250 or about 1:250, or up to 1:500 or about 1:500, for example, 1:10, 1:20, 1:25, 1:30, 1:35, 1:40, 1:50, 1:55, 1:60, 1:65, 1:70, 1:75, 1:80, 1:85, 1:90, 1:95, 1:100, 1:110, 1:120, 1:130, 1:140, 1:150, 1:160, 1:170, 1:180, 1:190, 1:200, 1:210, 1:220, 1:230, 1:240, 1:250, 1:260, 1:270, 1:280, 1:290, 1:300, 1:350, 1:400 or at most 1:500. In another example, the clear liquid is formed at dilutions less dilute than 1:10 of the concentrate.

The provided liquid emulsion concentrates can be formulated using any non-polar compound for dilution in an aqueous medium. In one example, the concentrates can be diluted in aqueous medium, for example, over a wide dilution range to form clear liquids, for example, at a dilution factor of between 1:10 or about 1:10 and at most 1:500 or about 1:500, typically between 1:10 or about 1:10 and at most 1:1000 or about 1:1000, typically between 1:10 or about 1:10 and 1:500 or about 1:500, for example, at a dilution between 1:10 or about 1:10 and up to 1:250 or about 1:250, for example, diluted between 1:10 or about 1:10, 1:20 or about 1:20, 1:25 or about 1:25, 1:50 or about 1:50, 1:100 or about 1:100, 1:200 or about 1:200, 1:250 or about 1:250, or up to 1:500 or about 1:500, for example, 1:10, 1:20, 1:25, 1:30, 1:35, 1:40, 1:50, 1:55, 1:60, 1:65, 1:70, 1:75, 1:80, 1:85, 1:90, 1:95, 1:100, 1:110, 1:120, 1:130, 1:140, 1:150, 1:160, 1:170, 1:180, 1:190, 1:200, 1:210, 1:220, 1:230, 1:240, 1:250, 1:260, 1:270, 1:280, 1:290, 1:300, 1:350, 1:400 or at most 1:500.

Clarity of an aqueous liquid dilution composition can be evaluated using one or more of a plurality of approaches, for example, quantitatively, for example, by measuring particle size and/or by measuring the turbidity value of the liquid, or qualitatively, by empirical evaluation. In one example, a particular quantitative or qualitative clarity value is desired. In another example, it is desired that the aqueous liquid dilution composition is as clear as, less clear or more clear than another liquid, for example, an aqueous liquid dilution composition made according to the provided methods or a beverage, for example, a beverage or other aqueous medium that does not contain the concentrate. For example, an aqueous liquid dilution composition, containing the liquid concentrate diluted in a beverage, can be as clear or about as clear as the same beverage, containing no concentrate. The evaluation can be done qualitatively, for example by empirical observation, or quantitatively, for example, by calculating particle size and/or turbidity value (NTU) for the liquid (s).

In one example, the dilution compositions are clear aqueous liquid dilution compositions or non-turbid aqueous liquid dilution compositions, for example, as determined, as described below, empirically or by measuring turbidity and/or particle size. In another example, the aqueous liquid dilution compositions are not clear, or not completely clear. The liquids can be more or less clear, or have the same clarity as another liquid, for example, an aqueous liquid dilution composition made according to the provided methods or a beverage, for example, a beverage that does not contain the diluted concentrate. Properties of the liquid concentrates can affect the clarity of the liquid. A number of parameters can vary the clarity of the liquids, for example, the relative concentration of surfactant, non-polar compound and/or water; the type of non-polar ingredient; the concentration of excipient(s) in the particular non-polar compound; and the purity of the non-polar compound, for example, whether it has been standardized to a high purity, or whether it is an extract or a filtered extract. For example, an aqueous liquid dilution composition made by diluting a concentrate containing a non-polar active ingredient that contains lecithin, for example a high amount of lecithin, can be less clear than one made with a concentrate containing a non-polar compound that does not contain lecithin. In another example, a liquid concentrate containing a non-polar compound that is a filtered extract can produce a clearer aqueous liquid dilution composition when diluted than a concentrate containing a crude extract.

1. Clarity Determined by Empirical Evaluation

In one example, the clarity/turbidity of the aqueous liquid dilution composition containing the diluted concentrate is evaluated qualitatively by observation. In one example, a liquid can be considered clear if it does not have a cloudy appearance and/or if no or few particles are visible when viewing the liquid with the naked eye or if it is the same or substantially similar in clarity to another liquid, for example, a beverage, for example, water, fruit juice, soda or milk. In some cases, the aqueous liquid dilution composition is as clear or about as clear as water or another liquid, for example a beverage. For example, the liquid (containing the liquid concentrate diluted in an aqueous medium, for example, a beverage) can be as clear or about as clear as the aqueous medium not containing the liquid concentrate. In a related example, there is no substantial difference, for example, no observable difference, between the aqueous liquid dilution composition containing the concentrate and the aqueous medium without the concentrate. A clear liquid is not necessarily colorless, for example, a yellow liquid that contains no visible particles or cloudiness can be considered clear. In another example, the liquid is clear or partially clear or substantially clear if no crystals are visible and/or if no "ringing" is observed on the container containing the liquid.

2. Clarity Determined by Particle Size or Number of Particles

In another example, clarity of the aqueous liquid dilution composition is evaluated by measuring the particle size and/or number of particles of the liquid.

In one example, the aqueous liquid dilution compositions have a particle size less than 200 nm or less than about 200 nm, for example, 5, 10, 15, 20, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm. In another example, the aqueous liquid dilution composition has a particle size less than 100 nm or about 100 nm, less than 50 nm or about 50 nm or less than 25 nm or about 25 nm. Typically, the particle size of the aqueous liquid dilution composition is between 5 nm or about 5 nm and 200 nm or about 200 nm, or between 5 nm or about 5 nm and 50 nm or about 50 nm.

Typically, the particle size of the provided aqueous liquid dilution composition containing the liquid concentrate, which contains the non-polar compound, is smaller than the particle size of a liquid containing the non-polar compound (not formulated in a liquid concentrate).

3. Turbidity

In another example, the clarity of the liquid is evaluated and/or expressed using a turbidity measurement, for example, Nephelometric Turbidity Units (NTU), as measured using the provided methods, described below. In this example, turbidity is measured optically, to get value indicating the cloudiness or haziness of the liquid, which correlates with particles in suspension in the liquid. The more clear a liquid is, the lower its turbidity value.

In one example, the clear aqueous liquid dilution composition has a turbidity value (NTU) of 30 or about 30; or an NTU value of less than 30 or about 30, for example, less than 29 or about 29, less than 28 or about 28, less than 27 or about 27, less than 26 or about 26, less than 25 or about 25, less than 24 or about 24, less than 23 or about 23, less than 22 or about 22, less than 21 or about 21, less than 20 or about 20, less than 19 or about 19, less than 18 or about 18, less than 17 or about 17, less than 16 or about 16, less than 15 or about 15, less than 14 or about 14, less than 13 or about 13, less than 12 or about 12, less than 11 or about 11, less than 10 or about 10, less than 9 or about 9, less than 8 or about 8, less than 7 or about 7, less than 6 or about 6, less than 5 or about 5, less than 4 or about 4, less than 3 or about 3, less than 2 or about 2, less than 1 or about 1; or 29 or about 29, 28 or about 28, 27 or about 27, 26 or about 26, 25 or about 25, 24 or about 24, 23 or about 23, 22 or about 22, 21 or about 21, 20 or about 20, 19 or about 19, 18 or about 18, 17 or about 17, 16 or about 16, 15 or about 15, 14 or about 14, 13 or about 13, 12 or about 12, 11 or about 11, 10 or about 10, 9 or about 9, 8 or about 8, 7 or about 7, 6 or about 6, 5 or about 5, 4 or about 4, 3 or about 3, 2 or about 2, 1 or about 1, or 0 or about 0.

In another example, the turbidity value of the aqueous liquid dilution composition is less than 200 or less than about 200, for example, 200, 175, 150, 100, 50, 25 or less.

In another example, it is desirable that the aqueous liquid dilution composition contains a turbidity value that is comparable, for example, about the same as, the same as, or less than or greater than, the turbidity value of another liquid, for example, a beverage not containing the liquid concentrate or an aqueous liquid dilution composition made by the provided methods.

iii. Empirical Evaluation

The stability, or shelf life, of a dilution composition containing the initial concentrate can be assessed qualitatively by observation. In one example, a food or beverage dilution composition is considered stable if it does not exhibit phase separation, flocculation, precipitation, creaming, coagulation and/or sedimentation when looking at the food or beverage with the naked eye. Stability can be assessed empirically by comparison with other foods or beverages. For example, it can be desirable that the food or beverage is as stable as another food or beverage not containing the initial concentrate. In a related example, it can be desired that there is no substantial difference, for example, no observable difference, between the food or beverage dilution composition containing the concentrate and the food or beverage without the concentrate.

Stability can also be determined by evaluating sensory attributes of the food or beverage compositions containing the initial concentrates. For example, the food or beverage dilution compositions can be evaluated for a variety of different sensory attributes by a tasting panel. Sensory attributes include, for example, appearance, taste, aroma and flavor, for example, "fishiness", feeling factors, such as burning or irritation by smelling, texture, such as viscosity or oily mouth feeling, aftertaste, and any other attribute that is warranted. Evaluation of sensory attributes can be assessed empirically for the food or beverage dilution compositions alone, or by comparison of the dilution compositions to a food or beverage not containing the non-polar compounds. In one example, the food or beverage dilution composition has desirable sensory attributes, such as a lack of "fishy" smell or taste. In another example, there is no difference between the evaluated sensory attributes of the food or beverage dilution composition as compared to a food or beverage not containing the initial concentrate.

The relative clarity/turbidity of an aqueous liquid dilution composition containing the concentrate can be assessed qualitatively by observation. In one example, a liquid is considered clear if it does not have a cloudy appearance and/or if no particles are visible when looking at the liquid with the naked eye. Clarity can be assessed empirically by comparison to other liquids, for example, water, fruit juice, soda and/or milk. For example, it can be desirable that the liquid is as clear or about as clear as water or another liquid, for example a beverage. For example, it can be desirable that the liquid (containing the liquid concentrate diluted in an aqueous medium, for example, a beverage) is as clear or about as clear as the aqueous medium not containing the initial concentrate. In a related example, it can be desired that there is no substantial difference, for example, no observable difference, between the aqueous liquid dilution composition containing the concentrate and the aqueous medium without the concentrate. A clear liquid is not necessarily colorless, for example, a yellow liquid that contains no visible particles or cloudiness can be considered clear.

iv. Oxidative Stability

Alternatively, the stability, or shelf life, of a food or beverage dilution composition containing the initial concentrate can be assessed quantitatively, for example, by measuring oxidative stability of polyunsaturated fatty acids. Oxidative deterioration can be assessed by chemical methods such as determining peroxide value (PV), which measures peroxides resulting from primary oxidation, or p-anisidine value (AV), which measures 2-alkenals resulting from secondary oxidation. Typically it is desired that the food or beverage dilution compositions remain free from oxidative deterioration over a period of time, for example, 1, 2, 3, 4, 5, 6, 7, 8, 9, 10, 11 or 12 months, 1, 2, 3, 4 or more years. In one example, the composition is stable if it is formulated such that it remains free from oxidation or substantial oxidation over time.

v. Particle Size

Alternatively, the clarity of the aqueous liquid dilution composition containing the initial concentrate can be assessed by measuring the particle size of the liquid. Methods for measuring particle size are known and any method for measuring particle size that can measure particle sizes in the appropriate ranges as described below, can be used.

Particle size can be analyzed by commercial services, for example, from Delta Analytical Instruments, Inc, such as using a light-scattering analyzer, for example, a dynamic light scattering analyzer, for example, the Horiba® LB-550, which can measure particle sizes within a range of 0.001 microns to 6 microns and uses a Fourier-Transform/Iterative Deconvolution technique for reporting data and can measure sample concentrations from ppm to 40% solids; the Horiba® LA-920, which is a laser light-scattering instrument having an He—Ne laser and a tungsten lamp and can determine particle sizes from 0.02 microns to 2000 microns using Mie Theory; or other analyzers available from Delta Analytical Instruments, Inc.

Alternatively, the particle size can be measured microscopically, for example, by viewing the liquid under a microscope, for example, at 640× magnification. With this method, particle size can be quantified by comparing to a measuring device, for example, a ruler, which is visible when viewing the liquid under the microscope. If any particles are observable at this magnification, they are measured by comparison to the measuring device. At a magnification of 640×, for example, any particle that is about 25 nm, 25 nm, or greater than 25 nm are visible, while particle sizes smaller than 25 nm typically are not visible.

Typically, it is desired that the aqueous liquid dilution compositions have a particle size less than 200 nm or less than about 200 nm, for example, 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm. Typically, it is desired that the aqueous liquid dilution compositions have a particle size less than 100 nm or about 100 nm, less than 50 nm or about 50 nm, or less than 25 nm or about 25 nm. Typically, the particle size of the aqueous liquid dilution composition containing the concentrate is between 5 nm or about 5 nm and 200 nm or about 200 nm, typically between 5 nm or about 5 nm and 50 nm or about 50 nm.

vi. Turbidity Measurement

Alternatively, clarity of a liquid dilution composition can be analyzed by taking optical turbidity measurements, which indicates the level of cloudiness or haziness of a liquid, which correlates to the size/number of particles in suspension in the liquid. The more clear a particular liquid, the lower its turbidity value.

Turbidity can measured optically, for example, by using a nephelometer, an instrument with a light and a detector. The nephelometer measures turbidity by detecting scattered light resulting from exposure of the liquid to an incident light. The amount of scattered light correlates to the amount of particulate matter in the liquid. For example, a beam of light will pass through a sample with low turbidity with little disturbance. Other methods for measuring turbidity are well known and can be used with the provided methods and compositions.

The units of a turbidity value measured with a nephelometer are Nephelometric Turbidity Units (NTU). In one example, it is desired that the aqueous liquid dilution composition containing the diluted concentrate has low turbidity, for example, a turbidity value (NTU) of 30 or about 30; or an NTU value of less than 30 or about 30, for example, less than 29 or about 29, less than 28 or about 28, less than 27 or about 27, less than 26 or about 26, less than 25 or about 25, less than 24 or about 24, less than 23 or about 23, less than 22 or about 22, less than 21 or about 21, less than 20 or about 20, less than 19 or about 19, less than 18 or about 18, less than 17 or about 17, less than 16 or about 16, less than 15 or about 15, less than 14 or about 14, less than 13 or about 13, less than 12 or about 12, less than 11 or about 11, less than 10 or about 10, less than 9 or about 9, less than 8 or about 8, less than 7 or about 7, less than 6 or about 6, less than 5 or about 5, less than 4 or about 4, less than 3 or about 3, less than 2 or about 2, less than 1 or about 1; or 29 or about 29, 28 or about 28, 27 or about 27, 26 or about 26, 25 or about 25, 24 or about 24, 23 or about 23, 22 or about 22, 21 or about 21, 20 or about 20, 19 or about 19, 18 or about 18, 17 or about 17, 16 or about 16, 15 or about 15, 14 or about 14, 13 or about 13, 12 or about 12, 11 or about 11, 10 or about 10, 9 or about 9, 8 or about 8, 7 or about 7, 6 or about 6, 5 or about 5, 4 or about 4, 3 or about 3, 2 or about 2, 1 or about 1, or 0 or about 0. In another example, the turbidity value of the aqueous liquid dilution composition is less than 200 or less than about 200, for example, 200, 175, 150, 100, 50, 25 or less.

In another example, it is desirable that the aqueous liquid dilution composition contains a turbidity value that is comparable, for example, about the same as, the same as, or less than or greater than, the turbidity value of another liquid, for example, a beverage not containing the liquid concentrate or an aqueous liquid dilution composition made by the provided methods.

vii. Desirable Characteristics for Human Consumption

In one example, the dilution composition is desirable for human consumption, for example, for use in a food or beverage. Different properties of the dilution composition can contribute to its desirability as a consumable product. For example, taste, smell, clarity, color, crystal formation, precipitation and "ringing," all can relate to desirability.

In one example, the dilution composition has a pleasant taste and/or smell, for example, due to one or more flavors added to the concentrate and/or to the aqueous medium. In another example, the dilution composition containing the concentrate is free from an unpleasant taste or smell, for example, a "fishy" taste or smell. In one example, the concentrate smells or tastes less unpleasant, for example, less fishy, compared to another dilution composition.

In one example, the aqueous liquid dilution composition is desirable because it does not have crystals or has fewer crystals compared with another aqueous liquid dilution composition. In another example, the dilution composition is desirable because it does not exhibit ringing. In a further example, the dilution composition is desirable because it does not exhibit phase separation, or flocculation.

viii. Safety

Typically, the dilution compositions containing the concentrates are safe for human consumption, for example, containing only ingredients approved by the FDA for human consumption, for example GRAS-certified ingredients. In one example, one or more of the ingredients, for example, all the ingredients, are Kosher-certified. Safety of the compositions also relates to stability over time. Lack of or minimum oxidation of the compositions over time can contribute to the safety of the compositions.

ix. Oral Bioavailability

In one example, the non-polar compounds, for example, the non-polar active ingredients, contained in the dilution compositions exhibit a high or relatively high bioavailability, for example, a bioavailability that is higher than a composition containing the non-polar active ingredient alone (i.e., not formulated in the liquid concentrate). Bioavailability relates to the ability of the body to absorb the non-polar active ingredient into a particular space, tissue cell and/or cellular compartment. Typically, non-polar active ingredients in liquids having small particle sizes are better absorbed than those with larger particle sizes.

d. Selecting a Formulation and Modifying Formulations

After evaluating a concentrate, e.g., a liquid emulsion concentrate, or a dilution composition, either a particular formula can be chosen or one or more modifications can be made to the initial concentrate formula based on the results of the evaluation. When an initial concentrate does not display one or more desired properties, e.g., to the desired extent, based on the evaluation, the concentration of one or more ingredients can be adjusted and another initial concentrate made. The process can be repeated until a concentrate with the desired properties is made. For modification of the initial concentrate, the amount of the modified food starch, polar solvent (in the liquid nanoemulsion concentrates), surfactant, e.g., water-soluble derivative of vitamin E mixture, and/or non-polar active ingredient can be adjusted, for example, by adjusting the concentration within the appropriate concentration range. Additional ingredients also can be chosen. For example, modification of the initial concentrates can involve the addition of one or more additional ingredients. For example, if evaluation reveals that the oil and water phases of the concentrate or aqueous liquid dilution composition containing the diluted concentrate are separating, an emulsion stabilizer can be added to the formulation. In another example, a co-surfactant can be added to help emulsify the components of the concentrate. In another example, the phase (oil phase or water phase), to which a particular ingredient is added, can be modified. For example, the formulation can be modified to change whether an ingredient is added to the oil phase or the water phase.

When evaluation of the initial concentrate, e.g., the pre-emulsion concentrates and/or the liquid nanoemulsion concentrates, reveals that it has the desired properties, no modifications are made. In this example, the formula of the initial concentrate is used for making the concentrate. When two or more initial concentrates are made, for example, with increasing concentrations of an ingredient, the formula of one of the initial concentrates can be chosen. Which formula is chosen can be based on which formula has the most desirable properties. Alternatively, desirable properties can be balanced with relative amounts of ingredients. For example, it may be desirable to choose a formulation that uses the lowest or the highest concentration of a particular ingredient but still provides a concentrate that yields a clear liquid upon dilution in an aqueous medium, for example, when formulating a liquid dilution composition. The desired formulation may be the formulation that has the lowest concentration of the surfactant, e.g., the water-soluble derivative of vitamin E mixtures described herein, while still providing a concentrate that yields a clear liquid upon dilution in an aqueous medium, for example, when formulating a liquid dilution composition. Or the desired formulation may be the formulation that has the highest concentration of the non-polar active ingredient, while still providing a concentrate that yields a clear liquid upon dilution into an aqueous medium, for example, when formulating a liquid dilution composition. In some examples, the formulation that yields the clearest liquid is desired.

Modifications can be made to the formula even if the initial concentrate, e.g., the liquid nanoemulsion concentrates, possess the desired properties. For example, upon determining that a particular concentrate formulation results in desired properties, it can be desirable to modify the concentration of one or more ingredients to determine whether the same desired properties can be achieved if a higher or lower concentration of the ingredient is used. For example, it can be desirable to determine the lowest concentration of surfactant that can be used, while still generating a concentrate with a desired property, for example, the ability to form a clear liquid upon dilution in an aqueous medium. In another example, it can be desirable to determine the highest concentration of the non-polar ingredient that can be incorporated into a concentrate, while still maintaining the desired property, for example, the ability of the concentrate to form a clear liquid upon dilution in an aqueous medium. In another example, one or more additional ingredients can be added after making an initial concentrate with desirable properties, for example, flavoring agents and/or pH adjusting agents.

2. Compositions for Direct Consumption

Among the products provided herein are compositions that can be directly consumed without dilution. As such, they typically provide a single dosage or effective amount of an active compound, typically a non-polar compound, in an aqueous-based composition that contains 0.1-25%, generally 0.1-10%, 0.1-5%, 1%-5%, 1%-2% of the soluble vitamin E derivative with high dimer concentration (13%-29%) and any other ingredients of interest, including flavorings to render the composition palatable.

The compositions for direct consumption include any described above as concentrates, where the amount of active ingredient is suitable for direct consumption. Also included are the dilution compositions. All of the compositions for direct consumption can include the ingredients described below. In particular, compositions for direct consumption including flavorings or other ingredients, such as sweeteners, that render them palatable. Compositions for direct consumption can include a stabilizing system, such as a stabilizing system containing a bicarbonate or carbonate, an ingestible acid and/or an antioxidant. The compositions for direct consumption can be formulated for single serving (single shot) ingestion or multiple servings. A single serving size depends upon the purpose of the composition as well as size, and appetite of the consumer. For example, a single serving can be at least 1 mL, 4 mL, 10 mL, 100 mL, 200 mL or more. The compositions can be provided in sealed containers, such as bottles and ampoules, and can contain other components to preserve freshness, such as bicarbonate, liquid nitrogen and other such components.

The compositions for direct consumption provided herein can be formulated in a variety of volumes and sizes, including, but not limited to, a single-serving shot or beverage. The composition is intended for consumption as a single serving, typically 1-200 mL, particularly smaller amounts, such as 1-10 mL, such as 4-5 mL. The compositions can be packaged in an ampoule or other sealed container. Thus, the compositions are single-serving beverage compositions, e.g., single-serving shots, that contain the water-soluble vitamin E derivative mixtures (compositions) provided herein and non-polar compounds and/or other active ingredients. Also provided herein are methods for formulating the compositions for direct consumption.

The compositions for direct consumption provided herein can be formulated for a single serving, for example, a single-serving shot. Typically, the compositions for direct consumption are formulated by diluting the non-polar compound or other active ingredient into an aqueous media, for example, a beverage, for example, water, flavored water, soda, milk, juice, including fruit juice, sauce, syrup, soup, a sports drink, a nutritional beverage, an energy drink, a vitamin-fortified beverage, or any beverage. Any beverage and concentration can be prepared or modified using the water-soluble vitamin E derivative mixtures (compositions) described herein and other water-soluble vitamin E derivative mixtures (compositions), for example, see U.S. Pub. No. 2008-0254188 and U.S. Pat. No. 6,045,826.

The provided beverage compositions include compositions for direct consumption, e.g., single-serving beverage compositions, such as single-serving shots. The compositions for direct consumption contain effective amounts of the non-polar active ingredient or other active ingredient, e.g., any of the non-polar ingredients described herein. For example, the compositions for direct consumption, e.g., single-serving beverage compositions, include beverage compositions having a total volume of at or about, or less than at or about 400 mL, 350 mL, 300 mL, 250 mL, 200 mL, 150 mL, 100 mL, 75 mL, 50 mL, 40 mL, 30 mL, 20 mL, 19 mL, 18 mL, 17 mL, 16 mL, 15 mL, 14 mL, 13 mL, 12 mL, 11 mL, 10 mL, 9 mL, 8 mL, 7 mL, 6 mL, 5 mL, 4 mL, 3 mL, 2 mL, 1 mL, or less, that contain an effective amount of the non-polar compound containing the non-polar active ingredient. Typically, the amount of non-polar active ingredient as a percentage (%) by weight of the compositions for direct consumption, e.g., single-serving beverage compositions, can be, e.g., between 0.001% or about 0.001% and 30% or about 30%, by weight, of the beverage composition, and typically is between at or about 0.1% and at or about 20%, such as at or about 0.001%, 0.002%, 0.003%, 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 21%, 22%, 23%, 24%, 25%, 26%, 27%, 28%, 29% or 30%, by weight, of the beverage composition.

In one example, the composition for direct consumption has a serving size of between 1 mL or about 1 mL and 10 mL or about 10 mL, inclusive, for example, 1 mL, 2 mL, 3 mL, 4 mL, 5 mL, 6 mL, 7 mL, 8 mL, 9 mL or 10 mL. In some examples, the beverage composition contains between at or about 1 mg and at or about 1000 mg non-polar active ingredient or other active ingredient per mL or per serving, such as a 4 mL serving of the beverage composition. For example, the compositions for direct consumption can contain, e.g., at or about 1000 mg, 800 mg, 600 mg, 500 mg, 400 mg, 300 mg, 200 mg, 180 mg, 150 mg, 125 mg, 100 mg, 80 mg, 75 mg, 50 mg or 25 mg or less non-polar active ingredient or other active ingredient per serving of the beverage composition, e.g., per 4 mL of the beverage composition.

Common Ingredients and Typical Concentration Ranges

Each of the provided compositions for direct consumption contains a non-polar compound, such as, but not limited to, the exemplary non-polar compounds described herein below. Typically, the non-polar compound is a non-polar active ingredient, for example, an oil-based active ingredient such as a polyunsaturated fatty acid (PUFA), a coenzyme Q or a phytochemical. The non-polar compound can be present in the composition with a concentration range of between 0.001% or about 0.001% and 30% or about 30%, by weight, of the composition, such as between 0.001% or about 0.001% and 20% or about 20%, 0.001% or about 0.001% and 15% or about 15%, 0.001% or about 0.001% and 10% or about 10%, 0.001% or about 0.001% and 5% or about 5%, 0.001% or about 0.001% and 1% or about 1%, 0.01% or about 0.01% and 25% or about 25%, between 0.01% or about 0.01% and 20% or about 20%, between 0.01% or about 0.01% and 15% or about 15%, between 0.01% or about 0.01% and 10% or about 10%, between 0.01% or about 0.01% and 5% or about 5%, between 0.01% or about 0.01% and 1% or about 1%, between 0.1% or about 0.1% and 25% or about 25%, between 0.1% or about 0.1% and 20% or about 20%, between 0.1% or about 0.1% and 15% or about 15%, between 0.1% or about 0.1% and 10% or about 10%, between 0.1% or about 0.1% and 5% or about 5%, between 0.5% or about 0.5% and 25% or about 25%, between 0.5% or about 0.5% and 20% or about 20%, between 0.5% or about 0.5% and 15% or about 15%, between 0.5% or about 0.5% and 10% or about 10%, between 0.5% or about 0.5% and 5% or about 5%, between 1% or about 1% and 25% or about 25%, between 1% or about 1% and 20% or about 20%, between 1% or about 1% and 15% or about 15%, between 1% or about 1% and 10% or about 10%, between 1% or about 1% and 5% or about 5%, by weight, of the composition, such as at or about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24 or 25%, by weight, of the composition. In some examples, a composition for direction consumption contains a small amount of a non-polar compound such as an amount between 0.001% or about 0.001% and 5% or about 5%, or between 0.01% or about 0.01% and 5% or about 5%, by weight, of the composition. In other examples, composition for direction consumption contains a higher amount of a non-polar compound such as an amount between 1% or about 1% and 25% or about 25%, or between 1% or about 1% and 10% or about 10%, by weight, of the composition.

Each of the provided compositions for direct consumption contains a modified food starch, such as, but not limited to, the exemplary modified food starches described herein below. The modified food starch can be present in the composition with a concentration range of between 0.1% or about 0.1% and 35% or about 35%, by weight, of the concentrate, for example, between 0.1% or about 0.1% and 20% or about 20%, between 0.1% or about 0.1% and 15% or about 15%, between 0.1% or about 0.1% and 10% or about 10%, between 0.5% or about 0.5% and 35% or about 35%, between 0.5% or about 0.5% and 30% or about 30%, between 0.5% or about 0.5% and 25% or about 25%, between 0.5% or about 0.5% and 20% or about 20%, between 0.5% or about 0.5% and 15% or about 15%, between 0.5% or about 0.5% and 10% or about 10%, between 1% or about 1% and 35% or about 35%, between 1% or about 1% and 30% or about 30%, between 1% or about 1% and 25% or about 25%, between 1% or about 1% and 20% or about 20%, between 1% or about 1% and 15% or about 15%, between 1% or about 1% and 10% or about 10%, between 5% or about 5% and 35% or about 35%, between 5% or about 5% and 30% or about 30%, between 5% or about 5% and 25% or about 25%, between 5% or about 5% and 20% or about 20%, between 5% or about 5% and 15% or about 15%, between 10% or about 10% and 35% or about 35%, between 10% or about 10% and 30% or about 30%, between 10% or about 10% and 25% or about 25%, between 10% or about 10% and 20% or about 20%, between 10% or about 10% and 15% or about 15%, between 15% or about 15% and 35% or about 35%, between 15% or about 15% and 30% or about 30%, between 15% or about 15% and 25% or about 25%, between 15% or about 15% and 20% or about 20%, between 20% or about 20% and 35% or about 35%, between 20% or about 20% and 30% or about 30%, between 20% or about 20% and 25% or about 25%, between 25% or about 25% and 35% or about 35%, between 25% or about 25% and 30% or about 30%, between 30% or about 30% and 35% or about 35%, by weight, of the composition, such as at or about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 or 35%, by weight, of the composition.

In some examples, each of the provided compositions for direct consumption contains a surfactant that is a PEG-derivative of vitamin E surfactant, such as a water-soluble derivative of vitamin E mixture described herein below. The surfactant can be present in the composition with a concentration range of between 0.1% or about 0.1% and 35% or about 35%, by weight, of the concentrate, for example, between 0.1% or about 0.1% and 20% or about 20%, between 0.1% or about 0.1% and 15% or about 15%, between 1% or about 1% and 35% or about 35%, between 1% or about 1% and 30% or about 30%, between 1% or about 1% and 25% or about 25%, between 1% or about 1% and 20% or about 20%, between 1% or about 1% and 15% or about 15%, between 5% or about 5% and 35% or about 35%, between 5% or about 5% and 30% or about 30%, between 5% or about 5% and 25% or about 25%, between 5% or about 5% and 20% or about 20%, between 5% or about 5% and 15% or about 15%, between 10% or about 10% and 35% or about 35%, between 10% or about 10% and 30% or about 30%, between 10% or about 10% and 25% or about 25%, between 10% or about 10% and 20% or about 20%, between 10% or about 10% and 15% or about 15%, between 15% or about 15% and 35% or about 35%, between 15% or about 15% and 30% or about 30%, between 15% or about 15% and 25% or about 25%, between 15% or about 15% and 20% or about 20%, between 20% or about 20% and 35% or about 35%, between 20% or about 20% and 30% or about 30%, between 20% or about 20% and 25% or about 25%, between 25% or about 25% and 35% or about 35%, between 25% or about 25% and 30% or about 30%, between 30% or about 30% and 35% or about 35%, by weight, of the composition, such as at or about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 or 35%, by weight, of the composition.

Typically, each of the provided compositions for direct consumption contains a polar solvent, such as water, that is can be present in the provided composition with a concentration range of between 1% or about 1% and 99% or about 99%, by weight, of the concentrate, for example, between 1% or about 1% and 95% or about 95%, between 1% or about 1% and 90% or about 90%, between 1% or about 1% and 85% or about 85%, between 1% or about 1% and 80% or about 80%, between 5% or about 5% and 99% or about 99%, between 5% or about 5% and 95% or about 95%, between 5% or about 5% and 90% or about 90%, between 5% or about 5% and 85% or about 85%, between 5% or about 5% and 80% or about 80%, between 10% or about 10% and 99% or about 99%, between 10% or about 10% and 95% or about 95%, between 10% or about 10% and 90% or about 90%, between 10% or about 10% and 85% or about 85%, between 10% or about 10% and 80% or about 80%, between 15% or about 15% and 99% or about 99%, between 15% or about 15% and 95% or about 95%, between 15% or about 15% and 90% or about 90%, between 15% or about 15% and 85% or about 85%, between 15% or about 15% and 80% or about 80%, between 20% or about 20% and 99% or about 99%, between 20% or about 20% and 95% or about 95%, between 30% or about 30% and 99% or about 99%, between 30% or about 30% and 95% or about 95%, between 40% or about 40% and 99% or about 99%, between 40% or about 40% and 95% or about 95%, between 50% or about 50% and 99% or about 99%, between 50% or about 50% and 95% or about 95%, between 60% or about 60% and 99% or about 99%, between 60% or about 60% and 95% or about 95%, by weight, of the composition, or at or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99%, by weight, of the composition. Typically, the polar solvent is present in a high amount of the composition, such as between 40% or about 40% and 99% or about 99%, or between 50% or about 50% and 99% or about 99%, or between 60% or about 60% and 99% or about 99%, by weight, of the composition.

Exemplary of other additional ingredients that can be added to the compositions for direct consumption are emulsion stabilizers, for example, a blend of gums; a non-polar solvent for the non-polar compound, for example, an oil other than the non-polar compound, for example, vitamin E oil or flax seed oil; a pH adjuster, for example, citric acid or phosphoric acid; one or more flavoring agents, for example, D-limonene or lemon oil; a co-surfactant, for example, a phospholipid (e.g., phosphatidylcholine), bicarbonates or carbonates, an ingestible acid and antioxidants.

The appropriate concentration ranges for the additional ingredients are described in individual sections below. Typically, the concentration of the additional ingredients depends, in part, on the concentrations of the non-polar active ingredient, the modified food starch and the polar solvent. Typically, the concentrations of these three ingredients (modified food starch, polar solvent and non-polar compound) are the focus of the formulating methods. For example, when it is determined that modifications to ingredient concentrations in the initial concentrate should be made, it typically is the concentrations of one or more of these three ingredients that are adjusted.

In one example, it can be desirable to add one or more of the additional ingredients after evaluation of the initial composition, for example, in order to improve the composition with respect to one or more desired properties.

3. Powder Forms of the Compositions

The compositions also can be provided in powder form, i.e., powder that is made by converting the provided emulsion concentrates into a powder, using one of several well-known methods (e.g., spray-drying and/or milling). The powder compositions include, but are not limited to, coated or uncoated swallowable or chewable tablets, dry powders in hard or soft gelatin capsules, and dry powders in individual or multiple use packages for reconstituted suspensions or sprinkles. Exemplary solid dosage forms include coated or uncoated swallowable or chewable tablets. Suitable methods for manufacturing the powder compositions are known in the art.

Additionally, the powder composition can further contain at least one excipient. Excipients include, but are not limited to, diluents (sometimes referred to as fillers) including, for example, microcrystalline cellulose, mannitol, lactose, calcium phosphate, dextrates, maltodextrin, starch, sucrose, and pregelatinized starch; disintegrants including, for example, crospovidone, sodium starch glycolate, croscarmellose sodium, starch, pregelatinized starch, and carboxymethylcellulose sodium; binders including, for example, starch, hydroxypropyl cellulose, hydroxypropylmethyl cellulose, pregelatinized starch, guar gum, alginic acid, acacia, carboxymethylcellulose sodium, and polyvinyl pyrrolidone; glidants including, for example, colloidal silicon dioxide and talc; and lubricants/anti-adherents including, for example, magnesium stearate, calcium stearate, stearic acid, sodium stearyl fumarate, glyceryl monostearate, hydrogenated vegetable oil, and talc. In one particular example, the excipients are selected from any one or more of maltodextrin and gum acacia.

The powder forms can be used for any convenient dosage amount of the non-polar compound. Generally, the level of non-polar compound can be increased or decreased according to the judgment of the physician, pharmacist, pharmaceutical scientist, or other person of skill in the art. The amount of the remaining non-active ingredients can be adjusted as needed.

Typically, the concentration of the excipients is within a concentration range of between 50% or about 50% and 85% or about 85%, for example, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85 or more, %, by weight, of the free flowing powder.

In one example, the powder form is a free-flowing powder. Free-flowing powders can be obtained using techniques well known in the art, such as, but not limited to, spray drying, freeze drying or absorption plating. In one example, in order to achieve a free flowing powder, the protein derivative is formulated with an excipient such as lactose or starch. For example, the formulation can be a spray dried lactose formulation (see e.g., U.S. Pat. No. 4,916,163).

The methods for forming the powders include spray drying. Spray drying processes and spray drying equipment are described generally in Perry's Chemical Engineers' Handbook, pages 20-54 to 20-57 (Sixth Edition 1984). More details on spray drying processes and equipment are reviewed by Marshall, "Atomization and Spray-Drying," 50 Chem. Eng. Prog. Monogr. Series 2 (1954), and Masters, Spray Drying Handbook (Fourth Edition 1985). Methods for spray drying are well known (see, e.g. U.S. Pat. Nos. 5,430,021 and 6,534,085 and U.S. Patent Publication No.

US 2007/0184117). In general, spray drying is used to dry a heated liquid by passing it through hot gas. One or more spray nozzles is used to atomize the liquid in a cooling tower or chamber. As the material is atomized (sprayed), the surface tension causes a uniform spherical particle to form, which is passed through the cooling chamber and hardens into a solid intact sphere. The spray dried particles can be between at or about 0.5 microns and at or about 100 microns, and typically are less than at or about 10 microns, typically less than at or about 5 microns, and typically less than at or about, or at or about, 1 micron.

Provided are methods for spray drying the liquid emulsion compositions to form powder compositions. In the spray drying methods, the liquid emulsion compositions can be heated, e.g. to a temperature between at or about 100 and at or about 150° F., typically between 110° F. and 140° F., e.g. at or about 110, 115, 120, 125, 130, 135 or 140° F. The compositions can be mixed while heating, such as with any of the mixers described herein, for example, homogenizers (e.g. reversible homogenizers and piston-driven homogenization).

For spray drying, one or more excipients are mixed with a polar solvent, typically water, and heated, e.g. to a temperature between at or about 100° F. and at or about 150° F., typically between 110° F. and 140° F., e.g. at or about 110, 115, 120, 125, 130, 135 or 140° F. In one example, the excipient is mixed with water in an amount of one part excipient (by weight) to two parts water (by weight). The excipient-solvent (e.g. water) mixture can be mixed while heating, e.g. using any of the mixers described herein, for example, homogenizers (e.g. reversible homogenizers and piston-driven homogenizers) with heating during the mixing. The heated liquid emulsion composition and the heated water-excipient mixture then are mixed together, such as by transferring one mixture to the other, e.g. by any of the transfer means provided herein. Typically, the two mixtures are homogenized, e.g. with a reversible homogenizer or piston-driven homogenizer or any other homogenizer. The homogenized mixture then is subject to spray drying using a spray dryer.

Exemplary of the spray dryers are cyclone spray dryers. During spray drying with cyclone spray dryers, the homogenized mixture is pumped into an atomizing device where it is broken into small droplets. Upon contact with a stream of hot air, the moisture is removed very rapidly from the droplets while still suspended in the drying air. The dry powder is separated from the moist air in cyclones by centrifugal action. The centrifugal action is caused by the great increase in air speed when the mixture of particles and air enters the cyclone system. The dense powder particles are forced toward the cyclone walls while the lighter, moist air is directed away through the exhaust pipes. The powder settles to the bottom of the cyclone where it is removed through a discharging device. Sometimes the air-conveying ducts for the dry powder are connected with cooling systems which admit cold air for transport of the product through conveying pipes. Cyclone dryers have been designed for large production schedules capable of drying ton-lots of powder per hour.

As will be appreciated by one of skill in the art, the inlet temperature and the outlet temperature of the spray drier are not critical but will be of such a level to provide the desired particle size, of less than at or about 1 micron, and to result in a powder that has a desired property. Typically, the ability of the free flowing powder to yield a clear (or relatively clear) liquid dilution composition upon dilution in an aqueous medium is the desired property that is evaluated. In this regard, the inlet and outlet temperatures are adjusted depending on the melting characteristics of the liquid emulsion components and the composition of the homogenized liquid emulsion concentrate/excipient mixture. The inlet temperature is between at or about 60° C. and at or about 170° C. with outlet temperatures between at or about 40° C. to at or about 120° C. Typically inlet temperatures are from at or about 90° C. to at or about 120° C. and outlet temperatures are from at or about 60° C. to at or about 90° C. The flow rate which is used in the spray drying equipment will generally be at or about 3 mL per minute to at or about 15 mL per minute. The atomizer air flow rate will vary between values of at or about 25 L per minute to at or about 50 L per minute. Commercially available spray dryers are well known to those of skill in the art, and suitable settings for any particular dispersion can be readily determined by one of skill in the art without undue experimentation. Operating conditions such as inlet temperature and outlet temperature, feed rate, atomization pressure, flow rate of the drying air, and nozzle configuration can be adjusted in accordance with the manufacturer's guidelines.

In some examples, the dry powder is stored into a capsule form or is pressed into a tablet. For use as tablets, the compositions typically contain multiple other excipients. These excipients include tablet disintegrants, such as corn starch, glidants, such as silicon dioxide, and lubricants such as magnesium stearate. Ordinarily these compositions contain minor amounts by weight of glidants and lubricants, e.g., each two percent (2%) or less by weight. Tablet disintegrants are optionally present, and, if present, are included in sufficient amounts to assure that the tablet disintegrates upon ingestion. For example, disintegrants, such as corn starch, can be employed at concentrations of from about zero to about 30 percent by weight of the composition.

Free flowing powders also can be used to administer the active agent by inhalation using a dry powder inhaler. Such dry powder inhalers typically administer the active agent as a free-flowing powder that is dispersed in a patient's airstream during inspiration. In order to achieve a free flowing powder, the active agent is typically formulated with a suitable excipient such as lactose or starch. For example, such a dry powder formulation can be made, for example, by combining the lactose with the active agent and then dry blending the components. Alternatively, if desired, the active agent can be formulated without an excipient. The pharmaceutical composition is then typically loaded into a dry powder dispenser, or into inhalation cartridges or capsules for use with a dry powder delivery device. Examples of dry powder inhaler delivery devices include Diskhaler (GlaxoSmithKline, Research Triangle Park, N.C.) (see, e.g., U.S. Pat. No. 5,035,237); Diskus (GlaxoSmithKline) (see, e.g., U.S. Pat. No. 6,378,519; Turbuhaler (AstraZeneca, Wilmington, Del.) (see, e.g., U.S. Pat. No. 4,524,769); Rotahaler (GlaxoSmithKline) (see, e.g., U.S. Pat. No. 4,353,365) and Handihaler (Boehringer Ingelheim). Further examples of suitable DPI devices are described in U.S. Pat. Nos. 5,415,162, 5,239,993, and 5,715,810 and references cited therein.

4. Exemplary Ingredients and Concentration Ranges

The following sections describe ingredients used in the provided concentrates, e.g., liquid emulsion concentrates, dilution compositions, e.g., liquid dilution compositions or food-based dilution compositions, compositions for direct consumption and other forms of concentrates and beverage compositions provided herein. Concentrates typically are intended for dilution prior to consumption, and, thus, can contain active ingredients in higher concentrations than in compositions for direct consumption.

a. Non-Polar Compounds

The compositions provided herein, including concentrates, such as liquid emulsion concentrates, dilution compositions containing the concentrates and compositions for direct consumption, contain one or more non-polar compounds. Non-polar compounds include any lipophilic or lipid soluble compounds, for example, active ingredients, that have greater solubility in organic solvents (e.g., ethanol, methanol, ethyl ether, acetone, and benzene) and in fats and oils, than in aqueous liquids, for example, water. Typically, the non-polar compounds are poorly water soluble, for example, water insoluble or compounds having low water solubility. The non-polar compounds include, but are not limited to, drugs, hormones, vitamins, nutrients and other lipophilic compounds. Exemplary non-polar compounds are listed herein below. The provided compositions and methods can be used to dilute (e.g., dissolve/disperse) any non-polar compound in a water-based finished food or beverage. In one example, the non-polar compound differs from the surfactant, for example, is not a Vitamin E.

Exemplary norm-polar compounds containing essential fatty acids, for example, include, but are not limited to: polyunsaturated fatty acids (PUFAs), for example, gamma-linolenic acid (GLA), for example, borage oil and evening primrose (*Oenothera biennis*) oil, blackcurrant seed oil, hemp seed oil, cannabinoids, and spirulina extract; compounds containing omega-3 fatty acids, for example, natural and synthetic omega-3 fatty acids, for example, compounds containing omega-3 polyunsaturated long-chain fatty acids, including Eicosapentaenoic acid (EPA) (20:5ω3); Docosahexaenoic acid (DHA) (22:6ω3); Eicosatetraenoic acid (24:4ω3); Docosapentaenoic acid (DPA, Clupanodonic acid) (22:5ω3); 16:3 ω3; 24:5 ω3 and/or nisinic acid (24:6ω3), for example, fish oil, algae oil, hill oil, canola oil, flaxseed oil, soybean oil and walnut oil; compounds containing short-chain omega-3 fatty acids, for example, Alpha-Linolenic acid (α-Linolenic acid; ALA) (18:30ω3) and Stearidonic acid (18:4ω3), esters of an omega-3 fatty acid and glycerol, for example, monoglycerides, diglycerides and triglycerides, esters of an omega-3 fatty acid and a primary alcohol, for example, fatty acid methyl esters and fatty acid esters, precursors of omega-3 fatty acid oils, for example, EPA precursor, DHA precursor, derivatives such as polyglycolized derivatives or polyoxyethylene derivatives, oils containing the omega-3 fatty acids, for example, fish oil (marine oil), for example, highly purified fish oil concentrates, *perilla* oil, hill oil, and algae oil, for example, microalgae oil; compounds containing omega-6 fatty acids, for example, compounds containing Linoleic acid (18:2ω6) (a short-chain fatty acid); Gamma-linolenic acid (GLA) (18:30ω6); Dihomo gamma linolenic acid (DGLA) (20:3ω6); Eicosadienoic acid (20:2ω6); Arachidonic acid (AA) (20:4ω6); Docosadienoic acid (22:2ω6); Adrenic acid (22:4ω6); and/or Docosapentaenoic acid (22:5ω6), for example, borage oil, corn oil, cottonseed oil, grapeseed oil, peanut oil, primrose oil, for example, evening primrose *Oenothera biennis*) oil, blackcurrant seed oil, hemp seed oil, spirulina extract, safflower oil, sesame oil and soybean oil;

Other fatty acids, for example, triglycerides, including medium chain triglycerides, for example MCT oil, polar lipids, for example, ether lipids, phosphoric acid, choline, fatty acids, glycerol, glycolipids, triglycerides, and phospholipids (e.g., phosphatidyl-choline (lecithin), phosphatidylethanolamine, and phosphatidylinositol), saw palmetto extract; ethyl linoleate, herb oils, for example, garlic oils and scordinin, short-chain saturated fatty acids (4:0-10:0), Lauric acid (12:0), Myristic acid (14:0), Pentadecanoic acid (15:0), Palmitic acid (16:0), Palmitoleic acid (16:1 ω7), Heptadecanoic acid (17:0), Stearic acid (18:0), Oleic acid (18:1 ω9), and Arachidic acid (20:0);

Micronutrients, for example, vitamins, minerals, co-factors, for example, Coenzyme Q10 (CoQ10, also called ubiquinone), ubiquinol, tumeric extract (cucuminoids), saw palmetto lipid extract (saw palmetto oil), echinacea extract, hawthorn berry extract, ginseng extract, lipoic acid (thioctic acid), ascorbyl palmitate, kava extract, St. John's Wort (hypericum, Klamath weed, goat weed), extract of quercitin, dihydroepiandrosterone, and indol-3-carbinol;

Carotenoids, including hydrocarbons and oxygenated, alcoholic derivatives of hydrocarbons, for example, beta carotene, mixed carotenoids complex, lutein, lycopene, Zeaxanthin, Cryptoxanthin, for example, beta-cryptoxanthin, beta carotene, mixed carotenoids complex, astaxanthin, bixin, canthaxanthin, capsanthin, capsorubin, apo-carotenal, beta-12'-apo-carotenal, "Carotene" (mixture of alpha and beta-carotene), gamma carotene, ciolerythrin, zeaxanthin, and esters of hydroxyl- or carboxyl-containing members thereof;

Fat-soluble vitamins, for example, Vitamins A, D, particularly $D_3$, E and K, and corresponding provitamins and vitamin derivatives such as esters with an action resembling that of vitamin A, D, E or K for example, retinol (vitamin A) and pharmaceutically acceptable derivatives thereof, for example, palmitate ester of retinol and other esters of retinol, for example, Vitamin A Palmitate, and calciferol (vitamin D) and pharmaceutically acceptable derivatives thereof and precursors of vitamin D, d-alpha tocopherol (vitamin E) and derivatives thereof, including pharmaceutical derivatives thereof, for example, Tocotrienols, d-alpha tocopherol acetate and other esters of d-alpha tocopherol, and ascorbyl palmitate, a fat-soluble version of vitamin C;

Phytochemicals, including phytoestrogens, for example, genistein and daidzein, for example, isoflavones, for example, soy isoflavones, flavonoids, phytoalexins, for example, Resveratrol (trans-3,5,4'-trihydroxystilbene), red clover extract, Beta Carophyllene (BCP) and other cannabinoids and phytosterols;

Lipid-soluble drugs, including natural and synthetic forms of immunosuppressive drugs, such as Cyclosporin, protease inhibitors such as Ritonavir, macrolide antibiotics and oil soluble anesthetics such as Propofol, natural and synthetic forms of steroidal hormones, for example, estrogens, estradiols, progesterone, testosterone, cortisone, phytoestrogens, dehydroepiandrosterone (DHEA), growth hormones and other hormones; and Oil-soluble acids and alcohols, for example, tartaric acid, lactylic acid, butylated hydroxyanisole, butylated hydroxytoluene, lignin, sterols, polyphenolic compounds, oryzanol, cholesterol, phytosterols, flavonoids, such as quercetin and resveratrol, and diallyl disulfides.

The compositions provided herein contain one or more non-polar compound(s), such that the total amount of the one or more non-polar compound(s) typically is between 0.001% or about 0.001% and 50% or about 50%, by weight, of the composition, for example, for example, at a concentration of 0.001% or about 0.001%, 0.002% or about 0.002%, 0.003% or about 0.003%, 0.004% or about 0.004%, 0.005% or about 0.005%, 0.006% or about 0.006%, 0.007% or about 0.007%, 0.008% or about 0.008%, 0.009% or about 0.009%, 0.01% or about 0.01%, 0.02% or about 0.02%, 0.03% or about 0.03%, 0.04% or about 0.04%, 0.05% or about 0.05%, 0.06% or about 0.06%, 0.07% or about 0.07%, 0.08% or about 0.08%, 0.09% or about 0.09%, 0.1% or about 0.1%, 0.2% or about 0.2%, 0.3% or about 0.3%, 0.4% or about 0.4%, 0.5% or about 0.5%, 0.6% or about 0.6%, 0.7% or about 0.7%, 0.8% or about 0.8%, 0.9% or about 0.9%, 1% or about 1%, 2% or about 2%, 3% or about 3%, 4% or about 4%, 5% or about 5%, 6% or about 6%, 7% or about 7%, 8% or about 8%, 9% or about 9%, 10% or about 10%, 11% or about 11%, 12% or about 12%, 13% or about 13%, 14% or about 14%, 15% or about 15%, 16% or about 16%, 17% or about 17%, 18% or about 18%, 19% or about 19%, 20% or about 20%, 21% or about 21%, 22% or about 22%, 23% or about 23%, 24% or about 24%, 25% or about 25%, 26% or about 26%, 27% or about 27%, 28% or about 28%, 29% or about 29%, 30% or about 30%, 31% or about 31%, 32% or about 32%, 33% or about 33%, 34% or about 34%, 35% or about 35%, 36% or about 36%, 37% or about 37%, 38% or about 38%, 39% or about 39%, 40% or about 40%, 41% or about 41%, 42% or about 42%, 43% or about 43%, 44% or about 44%, 45% or about 45%, 46% or about 46%, 47% or about 47%, 48% or about 48%, 49% or about 49% or 50% or about 50%, (w/w) of the composition. In some examples, the concentration of the total amount of non-polar compounds is between at or about 5% and at or about 30%, or between at or about 5% and at or about 20%, by weight, of the composition.

Typically, the amount of each individual non-polar compound within the provided compositions is added at a concentration such that the total concentration of the one or more non-polar compounds (non-polar active ingredients) is within a concentration range of between 2% or about 2% and 35% or about 35% (w/w) of the concentrate, more typically within a range of between 5% or about 5% and 30% or about 30%, for example, between at or about 5% and at or about 25%, between at or about 5% and at or about 20%, or between at or about 5% and at or about 15%, (w/w) of the concentrate. For example, when the composition is a concentrate that contains a polyunsaturated fatty acid-containing active ingredient, the PUFA-containing compound is typically present in an amount between 3% or about 3% and 30% or about 30%, (w/w) of the concentrate, more typically at an amount between at or about 5% and at or about 25%, or between at or about 5% and at or about 20%, or between at or about 5% and at or about 15%, or between at or about 5% and at or about 13%, such as, for example, 5.65%, 8.75%, and 11.5%, (w/w) of the concentrate. In some examples, when the composition is a concentrate that contains a vitamin non-polar active ingredient, the vitamin non-polar compound is typically present in an amount between 0.0001% or about 0.0001% and 15% or about 5%, by weight, of the concentrate, more typically between at or about 0.001% and at or about 0.1%, or between 1% or about 1% and 15% or about 15%, or between 5% or about 5% and 15% or about 15%, such as at or about 10.5%, by weight, of the concentrate. In other examples, when the composition is a concentrate that contains a phytochemical-, carotenoid-, or coenzyme Q-containing active ingredient, the phytochemical-, carotenoid-, or coenzyme Q-containing compounds are typically present in an amount between 5% or about 5% and 30% or about 30%, more typically between at or about 5% and at or about 25%. In other example, when the composition is a concentrate that contains a lipoic acid containing active ingredient, the lipoic acid compound is typically present in an amount between 5% or about 5% and 30% or about 30%, more typically between at or about 5% and at or about 25%.

Typically, the concentrates provided herein contain one or more non-polar compounds, at an amount such that upon dilution of the concentrate in a water-based finished food or beverage, a serving of the food or beverage provides a specific amount of non-polar active ingredient. For example, the concentrates provided herein provide between at or about 1.5 to at or about 3.0 grams (g) of omega-6 fatty acids per serving; between at or about 16 to at or about 220 milligrams (mg), for example, between at or about 32 to at or about 220 mg docosahexaenoic acid (DHA) and eicosapentaenoic acid (EPA) per serving; between at or about 100 and at or about 500 mg phytosterols per serving; between at or about 10 and at or about 200 mg, for example, between at or about 50 and at or about 200 mg Coenzyme Q10 per serving; between at or about 40 and at or about 400 micrograms (mcg) Vitamin A per serving; or between at or about 200 and at or about 2000 international units (IU), for example between at or about 400 and at or about 800 IU Vitamin D3 per serving of food or beverage, for example, per 8 ounces of a beverage.

i. Polyunsaturated Fatty Acid (PUFA)-Containing Active Ingredients

Exemplary of the non-polar compounds contained in the compositions are compounds containing fatty acids, for example, active ingredients containing polyunsaturated fatty acids (PUFAs). Fatty acids are straight-chain hydrocarbon molecules with a carboxyl (COOH) group at one end of the chain. PUFAs are fatty acids that contain more than one carbon-carbon double bond in the carbon chain of the fatty acid. PUFAs, particularly essential fatty acids, are useful as dietary supplements.

Different nomenclatures can be used to describe fatty acid molecules. Lipid nomenclature, for example, 18:3 ω-3, indicates the carbon chain length, number of double bonds and the position along the carbon chain of the first carbon-carbon double bond in a fatty acid. Using this nomenclature, each carbon along the chain is labeled according to its position relative to one end of the chain. For example, the first carbon away from the carboxylate end is named α, the second is named β, and so forth. The last carbon in the molecule (furthest from the carboxy group) always is labeled ω (or omega, or n). The number of carbons and the number of double bonds are listed first in the lipid name of a fatty acid, separated by a colon. For example, the name "18:3" indicates that the molecule has eighteen (18) carbons and three (3) double bonds. Following these numbers, the position at which the first double bond appears, relative to the last (ω) carbon, is listed. For example, the nomenclature, 18:3 ω-3 (or 18:3 omega-3; or 18:3 n-3), describes a fatty acid with eighteen (18) carbons and three (3) double bonds, the first of which occurs at the third carbon away from the omega carbon.

Alternatively, chemical nomenclature can be used. The chemical name of a fatty acid describes the position of each double bond. In the chemical naming, the carbons are numbered, beginning with 1, starting with the carbon that is part of the carboxy (COOH) group. Thus, with this numbering system, the α carbon is labeled "2." The chemical name of the fatty acid lists the first carbon (from the COOH end) to participate in each double bond.

Certain PUFAs are called essential fatty acids because mammals, including humans, cannot synthesize them using any known chemical pathway, and must obtain them from diet or by supplementation (see, e.g., U.S. Pat. No. 6,870,077; Covington (2004) *American Family Physician* 70(1): 133-140). The essential PUFAs are the omega-3 (ω3; n-3) fatty acids and the omega-6 (ω-6; n-6) fatty acids. Omega-3 and omega-6 fatty acids are methylene interrupted polyenes, which have two or more cis double bonds, separated by a single methylene group. Exemplary of omega-3 fatty acids are Alpha-Linolenic acid (α-Linolenic acid; ALA) (18:3 ω3) (a short-chain fatty acid); Stearidonic acid (18:4ω3) (a short-chain fatty acid); Eicosapentaenoic acid (EPA) (20:5 ω3); Docosahexaenoic acid (DHA) (22:6 ω3); Eicosatetraenoic acid (24:4 ω3); Docosapentaenoic acid (DPA, Clupanodonic acid) (22:5 ω3); 16:3 ω3; 24:5 ω3; and nisinic acid (24:6 ω3). Longer chain Omega-3 fatty acids can be synthesized from ALA (the short-chain omega-3 fatty acid). Exemplary of omega-6 fatty acids are Linoleic acid (18:2 ω6) (a short-chain fatty acid); Gamma-linolenic acid (GLA) (18:3 ω6); Dihomo gamma linolenic acid (DGLA) (20:3 ω6); Eicosadienoic acid (20:2 ω6); Arachidonic acid (AA) (20:4 ω6); Docosadienoic acid (22:2 ω6); Adrenic acid (22:4 ω6); and Docosapentaenoic acid (22:5 ω6).

While the longer chain omega-3 and omega-6 essential fatty acids can be synthesized from ALA (the short-chain omega-3 fatty acid) and Linolenic acid (LA), respectively, evidence suggests that conversion of these short chain fatty acids in humans is slow. Thus, a major source of long chain essential PUFAs is dietary (see e.g., Ross et al. (2007) *Lipids in Health and Disease* 6:21; Lands (1992) *FASEB* 6(8): 2530). Dietary supplements containing PUFAs, particularly essential PUFAs, are desirable for protection against cardiovascular disease, inflammation and mental illnesses (see e.g., Ross et al. (2007) *Lipids in Health and Disease* 6:21; Lands (1992) *FASEB* 6(8): 2530; U.S. Pat. No. 6,870,077). Evidence suggests that essential fatty acids, particularly EPA and DHA, in the form of food and nutritional supplements, play a role in preventing a number of disease states, including cardiovascular diseases, inflammation, mental health and behavioral diseases and disorders (see e.g., Ross et al. (2007) *Lipids in Health and Disease* 6:21; Lands (1992) *FASEB* 6(8): 2530; U.S. Pat. No. 6,870,077; Covington (2004) *American Family Physician* 70(1): 133-140).

Omega-9 fatty acids are non-essential PUFAs. Exemplary of omega-9 fatty acids are Oleic acid (which is monounsaturated) (18:1 ω9); Eicosenoic acid (20:1 ω9); Mead acid (20:3 ω9); Erucic acid (22:1 ω9); and Nervonic acid (24:1 ω9). Exemplary of an omega-9 fatty acid is oleic acid, for example, Oleic Acid 70% Food Grade Kosher Vegetable-Based, 100% Natural, sold by KIC Chemicals, Inc., Armonk, N.Y., containing at least 70% oleic acid and not more than 18% other fatty acids.

Conjugated fatty acids are PUFAs with two or more conjugated double bonds. Conjugated fatty acids can be used as nutritional supplements. Exemplary of conjugated fatty acids are Conjugated Linoleic acid (CLA), for example, 18:2 ω7, 18:2 ω6; Conjugated Linolenic acid, for example, 18:3ω6, 18:3ω5; and other conjugated fatty acids, for example, 18:3 ω3, 18:4 ω3, and 20:5 ω6.

Typically, a PUFA-containing compound used as an active ingredient in the provided compositions is included in the compositions within a concentration range of between 0% or about 0% and 30% or about 30%, typically between 5% or about 5% and 25% or about 25%, such as between at or about 5% and at or about 20% or at or about 8% and at or about 18%, for example, at or about 5%, 6%, 7%, 8%, 9%, 10%, 11%, 12%, 13%, 14%, 15%, 16%, 17%, 18%, 19%, 20%, 21%, 22%, 23%, 24% or 25%, w/w, of the concentrate.

1. Omega-3 Fatty Acid Compounds

Exemplary of the PUFA-containing active ingredients that can be used in the provided compositions are compounds that contain one or more omega-3 (ω3; n-3) fatty acids, for example, compounds containing DHA and/or EPA fatty acids, for example, marine oils, for example, fish oil, hill oil and algae oil; and compounds containing ALA fatty acids, for example, flax seed oil.

Typically, oils and aqueous compositions containing long-chain polyunsaturated fatty acids (PUFA) are susceptible to oxidation, making them unstable and giving them an unpleasant taste. The ingredients and relative concentrations thereof, as well as the methods for making the concentrates, contribute to desirable properties of DHA/EPA-containing concentrates. In one example, ingredients and methods minimize the "fishy" odor and/or taste of DHA/EPA compositions and increase their stability over time. In one aspect, the compounds in the concentrates have low oxidation, contributing to these desirable properties.

a. DHA/EPA

Exemplary of non-polar active ingredients that contain one or more omega-3 fatty acids, which can be used in the provided compositions, are compounds containing DHA and/or EPA, for example, marine oil, for example, fish oil, krill oil and algae oil. Any oil containing DHA and/or EPA can be used. In one example, the non-polar active ingredient contains between 10% or about 10% and 40% or about 40% DHA. In another example, the non-polar active ingredient contains between 25% or about 25% and 35% or about 35% DHA. In another example, the non-polar active ingredient contains at least 70% or about 70%, by weight (w/w), DHA, for example, at least 75% or about 75%, at least 80% or about 80%, at least 85% or about 85%, or at least 90% or about 90%, by weight (w/w), DHA. In another example, the non-polar active ingredient contains between 5% or about 5% and 20% or about 20% EPA, for example, at or about 5, 6, 7, 8, 9, 10, 11, 12, 13, 14, 15, 16, 17, 18, 19 or 20%, by weight (w/w), EPA. In another example, the non-polar active ingredient contains not more than 10% or about 10% EPA or less than 10% or about 10% EPA. In another example, the non-polar active ingredient contains DHA and EPA, for example, DHA representing at least 20% or about 20%, by weight of the non-polar active ingredient and EPA representing not more than 13% or about 13% of the non-polar active ingredient, for example, not more than 10% or about 10%, by weight of the non-polar active ingredients. In another example, the non-polar active ingredient contains DHA, representing at least 35% or about 35% of the non-polar active ingredient and EPA representing not more than 13% or about 13% of the non-polar active ingredient, for example, not more than 10% or about 10% of the non-polar active ingredients. In another example, the non-polar active ingredient contains DHA and EPA, for example, DHA representing at least 70% or about 70% of the non-polar active ingredient and EPA representing not more than 13% or about 13% of the non-polar active ingredient, for example, not more than 10% or about 10% of the non-polar active ingredients. In another example, the non-polar active ingredient contains DHA and EPA, for example, DHA representing at least 9% or about 9% of the non-polar active ingredient, for example, at least 11% or about 11% or the non-polar active ingredient and EPA representing at least 15% or about 15% of the non-polar active ingredient, for example, at least 17% or about 17% of the non-polar active ingredients. Omega-3 containing non-polar active ingredients are typically added to the compositions in amounts such that when diluted in a food or beverage, one serving of the food or beverage provides an amount of the DHA and EPA between at or about 16 and at or about 220 mg, typically between at or about 32 and at or about 220 mg, between at or about 50 and at or about 150 mg, between at or about 100 and at or about 220 mg, for example, at or about 16, at or about 32, at or about 50, at or about 100, at or about 150, at or about 200 or at or about 220 mg, per serving of the food or beverage, such as for example, 8 ounces of a beverage.

i. Fish Oils

Exemplary of the PUFA-containing non-polar active ingredients that can be used in the provided compositions are oils derived from fish, which contain DHA, EPA, or DHA and EPA. Particularly, cold water marine fish are a known source of omega-3 fatty acids (U.S. Pat. No. 4,670, 285). Suitable fish oil containing DHA, EPA, or DHA and EPA can be obtained from any of a number of commercial sources, for example, fish oils available from Hormel Foods Specialty Products, any of which can be used with the provided compositions.

Fish oils typically are extracted from fish tissue, for example, frozen fish tissue. In one example, the fish oil is a tasteless fish oil, for example, a cod liver oil, which has been isolated from fish, for example, from cod liver, and then refined and deodorized, or in some other way treated so its taste becomes neutral, for example, as described in International Publication Nos. WO 2000/023545 and WO 2004/098311. In one example, these fish oils are isolated from frozen fish tissue by a process that minimizes oxidation. Exemplary of such a tasteless fish oil is Denomega™ 100, Borregaard Ingredients, Sarpsborg, Norway; distributed by Denomega Nutritional Oils AS, Boulder, Colo. Typically, the tasteless fish oil, for example, cod liver oil, contains between 25% or about 25% and 35% or about 35% Omega-3 fatty acids, for example, 34% Omega-3 fatty acids. In one example, the fish oil, for example, the Denomega™ 100 oil, contains 13% or about 13% DHA and 13% or about 13% EPA.

Also exemplary of the fish oils that can be included in the provided compositions are fish oils containing high amounts of omega-3 fatty acids, for example, high amounts of DHA. One example of such a fish oil contains at least about 85 DHA, typically greater than 85% DHA and at least about 90% omega-3 fatty acids, typically greater than, 90% omega-3 fatty acids. In another example, the fish oil can contain 98% PUFA, 89% omega-3 fatty acids, about 70% DHA, about 10% EPA, 8.9% omega-6 fatty acids and 0.7% omega-9 fatty acids.

Exemplary of a fish oil containing high amounts of omega-3 fatty acids that can used as the non-polar compound in the provided compositions is an Omega-3 Fish Oil EE (O3C Nutraceuticals, supplied by Jedwards International Inc., Quincy, Mass.), which contains 89% omega-3 fatty acids, 8.9% omega-6 fatty acids, 0.7% omega-9 fatty acids, 0.1% saturated fatty acids, 1.0% monounsaturated fatty acids, 74.5% Docosahexanoic (DHA) fatty acids, 9.3% Eicosapentaenoic (EPA) fatty acids and 98% polyunsaturated fatty acids (PUFA). This fish oil also contains 0.1% (16:0) palmitic acid, 0.1% (16:1 ω7) palmitoleic acid, 0.1% (18:0) stearic acid, 0.6% (18:1 ω9) oleic acid, 0.1% (18:1 ω7) oleic acid, 0.3% (18:2 ω6) linoleic acid, 0.2% (18:3 ω3) linolenic acid, 0.2% (18:4 ω3) octadecatetraenoic acid, 0.1% (20:1 ω9) eicosanoic acid, 0.1% (20:2 ω6) eicosadienoic acid, 0.2% (20:3 ω6) Eicosatrienoic Acid, 2.4% (20:4 ω6) arachidonic acid, 0.6% (20:4 ω3) arachidonic acid, 0.1% (22:1 ω11) erucic acid, 0.6% (21:5 ω3) uncosapentaenoic acid, 0.5% (22:4 ω6) docosatetraenoic acid, 5.4% (22:5 ω6), docosapentaenoic, 3.6% (22:5 ω3) docosapentaenoic acid and 0.9% other fatty acids.

Also exemplary of a fish oil containing high amounts of omega-3 fatty acids that can be used in the provided compositions is Omega Concentrate 85 DHA TG Ultra (O3C Nutraceuticals AS, Oslo, Norway), which contains greater than 85% DHA (C22:6n-3) and greater than 90% total omega-3 fatty acids and is isolated from fatty fish species Eugraulidae, Clupeidae and Scombridae families. This fish oil is produced by purifying and concentrating the oils from these fish with gentle technologies to increase the concentration of omega-3 fatty acid DHA.

Any fish oil containing DHA and/or EPA can be used as the non-polar compound in the provided compositions. Exemplary of the fish oils that can be included in the provided compositions is Etema™ Omegasource™ Oil (supplied by Hormel Foods Specialty Products Division, Austin, Minn.), which contains at least 30% omega-3 fatty acids (DHA, EPA and ALA), is odorless, virtually free of cholesterol and bland in flavor. This fish oil contains about 28% DHA and EPA, typically 17% EPA and 11% DHA, and additionally contains 4.5% Omega-6 fatty acids. Also exemplary of the fish oils that can be included in the provided compositions are Omega 30 TG Food Grade (Non-GMO) MEG-3™ Fish Oil (supplied by Ocean Nutrition Canada, Dartmouth, Nova Scotia, Canada), a Kosher fish oil which contains about 30% DHA/EPA and Marinol C-38 (supplied by Lipid Nutrition B.V., Channahon, Ill.), which contains about 52% omega-3 fatty acids, including at least 38% DHA/EPA, more specifically includes about 22% EPA and 14% DHA. Also exemplary of the fish oils are other fish oils made by O3C Nutraceuticals, AS and other fish oils supplied by Jedwards, International, Inc. Also exemplary of a fish oil is Marinol D-40 (supplied by Lipid Nutrition B.V., Channahon, Ill.), which contains about 40% DHA and 7% EPA.

Also exemplary of the fish oils are hill oils, made according to International Publication No. WO 2007/080515.

ii. Algae Oil

Also exemplary of non-polar compounds containing omega-3 PUFAs, particularly DHA (and optionally EPA), that can be used as the non-polar compound in the provided compositions are oils derived from microorganisms, for example, oils derived from marine dinoflagellates, for example, microalgae, for example, *Crypthecodinium* sp, particularly, *Crypthecodinium cohnii*. Microalgae oils, like algal oil, are an excellent source of omega-3 fatty acids, particularly DHA (see e.g., U.S. Pat. Nos. 5,397,591, 5,407, 957, 5,492,938 and 5,711,983). Exemplary of oils derived from microalgae are the oils disclosed in, and oils made according to the methods described in, U.S. Pat. Nos. 5,397,591, 5,407,957, 5,492,938 and 5,711,983 and U.S. Publication number 2007/0166411, including DHASCO® and DHASCO-S® (Martek Biosciences Corporation).

For example, U.S. Pat. No. 5,397,591 describes, inter alia, single cell edible oils (algae oils) (and methods for making the oils), which contain at least 70% triglycerides, which contain about 20-35% DHA and lack EPA, isolated from *Crypthecodinium cohnii*, generally containing more than 70% triglycerides, having 15-20% myristic acid; 20-25% palmitic acid; 10-15% oleic acid; 30-40% DHA and 0-10% other triglycerides. U.S. Pat. No. 5,407,957 describes, inter alia, algae oils (and methods for making the oils) derived from *Crypthecodinium cohnii*, generally containing greater than about 90% triglycerides, at least 35% DHA, by weight (w/w), in one example, having 15-20% myristic acid, 20-25% palmitic acid, 10-15% oleic acid, 40-45% DHA, and 0-5% other oils. U.S. Pat. No. 5,492,938 describes, inter alia, single cell edible oils (and methods for making the oils) containing at least 70% triglycerides, which contain about 20-35% DHA and lack EPA, isolated from *Crypthecodinium cohnii*, in one example, containing more than 70% triglycerides, having 15-20% myristic acid; 20-25% palmitic acid; 10-15% oleic acid; 30-40% DHA; 0-10% other triglycerides. U.S. Pat. No. 5,711,983 describes, inter alia, single cell edible oils (and methods for making the oils) containing at least 70% triglycerides, which contain about 20-35% DHA and lack EPA, isolated from *Crypthecodinium cohnii*, in one example, containing more than 70% triglycerides, having 15-20% myristic acid; 20-25% palmitic acid; 10-15% oleic acid; 30-40% DHA and 0-10% other triglycerides.

Also exemplary of suitable microalgae oils are those disclosed, for example, in U.S. Pat. No. 6,977,166 and U.S. Publication Number US 2004/0072330. Exemplary of an algal oil that can be included in the provided compositions is Martek DHA™-S (supplied by Martek Biosciences Corporation, Columbia, Md.), derived from the marine alga *Schizochytrium* sp., containing not less than 35 DHA. This algal oil additionally contains 16.1% (22:5 ω6) docosapentaenoic acid, 1.3% (20:5 ω3) eicosapentaenoic acid, 0.6% (20:4 ω6) arachidonic acid, 1.6% (18:2 ω6) linoleic acid, 16.9% (18:1 ω9) oleic acid and 19.8% other fatty acids. Also exemplary of an algal oil that can be included in the provided compositions is Docosahexaenoic acid (supplied by VB Medicare Private Limited, Bangalore, Ind.), derived from the marine alga *Schizochytrium* sp., containing not less than 35% DHA. Any oil derived from dinoflagellates, for example, microalgae, which contains DHA, and optionally EPA, is suitable as an algae oil for use with the provided compositions, for example, V-Pure algae oil (Water4Life, Switzerland), which contains EPA and DHA.

b. Flax Seed Oil—Omega 3 (ALA)

Also exemplary of the omega-3 containing non-polar compounds used in the provided compositions is flaxseed oil (flaxseed oil, linseed oil). Flaxseed oils, which are good sources of omega-3 fatty acids, particularly alpha-linolenic acid, have been used as nutritional supplements. Flaxseed oils are produced by pressing the flax seed and refining the oil from the flax seeds. Exemplary of a flaxseed oil that can be used as the non-polar compound in the provided compositions is flaxseed oil derived from *Linum usitatissimum* L., for example, flaxseed oil supplied by Sanmark LLC, Greensboro, N.C. (Sanmark Limited, Dalian, Liaoning Province, China), which contains not less than (NLT) 50% C18:3 alpha-linolenic acid, and further contains other fatty acids, for example, 3-8% C16:0 Palmitic acid, 2-8% C18:0 Stearic acid, 11-24% C18:1 Oleic acid, 11-24% C18:2 linoleic acid and 0-3% other fatty acids. Also exemplary of suitable flaxseed oil is a flaxseed oil containing 6% Palmitic acid, 2.5% stearic acid, 0.5% arachidic acid, 19% oleic acid, 24.1% linoleic acid, 47.4% linolenic acid, and 0.5% other fatty acids. Also exemplary of flaxseed oil that can be used as the non-polar compound in the provided compositions is Barlean's Organic Flaxseed Oil (supplied by Barlean's Organic Oils, Ferndale, Wash.), containing not less than 55% alpha-linolenic acid, and further contains other fatty acids, for example, 5.5% C16:0 Palmitic acid, 5% C18:0 Stearic acid, 17% C18:1 Oleic acid, 17% C18:2 linoleic acid and 0-1% other fatty acids. The fatty acid composition of flaxseed oil can vary. Any flaxseed oil can be used as the non-polar compound in the provided compositions. In one example, the flaxseed oil contains at least 45% alpha-linolenic acid or at least about 45% alpha-linolenic acid. In another example, the flaxseed oil contains at least 65% or about 65% or 70% or about 70% alpha-linolenic acid. Exemplary of a flaxseed containing greater than 65% linolenic acid content (of total fatty acid content), for example, 70-80% or 70-75%, is the flaxseed described in U.S. Pat. No. 6,870,077.

2. Omega-6 Compounds

Also exemplary of the non-polar compounds used in the provided compositions are compounds containing omega-6 PUFAs, for example, gamma-linolenic acid (GLA), for example, borage oil and evening primrose (*Oenothera biennis*) oil, blackcurrant seed oil, hemp seed oil, fungal oil and spirulina extract. Any oil containing omega-6 fatty acids can be used in the provided compositions.

a. Borage oil (Gamma-Linolenic Acid (GLA))

Exemplary of the omega-6 containing non-polar compounds are compounds containing GLA, for example, borage oil. GLA is an omega-6 PUFA, which primarily is derived from vegetable oils, for example, evening primrose (*Oenothera biennis*) oil, blackcurrant seed oil, hemp seed oil, and spirulina extract. GLA has been used as a nutritional supplement. It has been proposed that GLA has a role in treating various chronic diseases and in particular that it has anti-inflammatory effects (Fan and Chapkin, *The Journal of Nutrition* (1998), 1411-1414). In one example, the non-polar active ingredient contains at least about 22% or about 22%, by weight (w/w), GLA, for example, at or about 22, 23, 24, 25, 26, 27, 28, 29, 30, 31, 32, 33, 34, 35, 36, 37, 38, 39, 40, 50, 60%, or more, by weight (w/w), GLA. Omega-6 containing non-polar active ingredients are typically added to the compositions in amounts such that when diluted in a food or beverage, one serving of the food or beverage provides an amount of the GLA between at or about 1.5 and at or about 3 g, typically between at or about 1.5 and at or about 2 g, between at or about 1.5 and at or about 2.5 g, between at or about 2 and at or about 2.5 g, between at or about 2 and at or about 3 g, between at or about 2.5 and at or about 3, for example, at or about 1.5, at or about 2, at or about 2.5 or at or about 3 g, per serving of the food or beverage, such as for example, 8 ounces of a beverage.

Borage (*Borago officinalis*), also known as "starflower," is an herb with seeds containing high amounts of GLA. Exemplary of a borage oil that is used as a non-polar active ingredient in the provided compositions is the borage oil supplied by Sanmark LLC, Greensboro, N.C. (Sanmark Limited, Dalian, Liaoning Province, China), derived by pressing and isolating oil from the seeds of *Borago officinalis* L. This oil contains not less than (NLT) 22% C18:3 gamma-linolenic acid (GLA), between 9 and 12% C16:0 Palmitic acid, between 3% and 5% C18:0 Stearic acid, between 15% and 20% C18:1 Oleic acid, between 35% and 42% C18:2 linoleic acid, between 3% and 5% C20:1 Ocosenoic acid, between 1% and 4% C22:1 Docosenoic acid and between 0% and 4% other fatty acids. Other borage oils can be used. Other GLA-containing oils also can be used as the non-polar compound.

3. Conjugated Linoleic Acid (CLA)

Also exemplary of the PUFA non-polar compounds that can be used in the provided compositions are non-polar compounds containing conjugated fatty acids. Conjugated fatty acids are PUFAs with two or more conjugated double bonds. Conjugated fatty acids can be used as nutritional supplements. Exemplary of the active ingredients containing conjugated fatty acids are compounds containing Conjugated Linoleic acid (CLA), for example, 18:2 ω7, 18:2 ω6; Conjugated Linolenic acid, for example, 18:3ω6, 18:3ω5; and other conjugated fatty acids, for example, 18:3 ω3, 18:4 ω3, and 20:5 ω6. CLA refers to a family of linoleic acid isomers found primarily in meat and dairy products of ruminants. Typically, the CLA compounds contain a mixture of different CLA isomers, for example, C18:2 CLA c9, t11, CLA t10, c12 and other CLA isomers. Exemplary of the CLA that can be used as an active ingredient in the provided compositions is CLA (80%) commercially available from Sanmark, LTD (Dalian, Liaoning Province, China; product code 01057-A80). This CLA is clear white to pale yellow oil and has the following fatty acid composition: NMT (not more than) 9.0% C16:0 Palmitic acid, NMT 4.0% Stearic acid, NMT 15.0% C18:1 Oleic acid, NMT 3.0% C18:2 Linoleic acid, NLT (not less than) 80% C18:2 CLA (including the following isomers: NLT 37.5% C18:2 CLA c9,t11, 37.5% C18:2 CLA t10, c12, and NMT 5.0% other CLA isomers); and NMT 5.0% other fatty acids. Also exemplary of the CLA that can be used as an active ingredient in the provided compositions is Clarinol G-80 (supplied by Lipid Nutrition B.V., Channahon, Ill.), containing about 80% CLA, including about 40% C18:2 CLA c9,t11 and 40% C18:2 CLA t10,c12. Also exemplary of the CLA that can be used as an active ingredient in the provided compositions is Tonalin TG 80 (supplied by Cognis Corporation, La Grange, Ill.), containing about 80% CLA, including about 40% C18:2 CLA c9,t11 and 40% C18:2 CLA t10,c12, additionally containing about 13% oleic acid, 2% palmitic acid, 3% stearic acid and less than 1% linoleic acid. Any CLA containing compounds can be used in the provided compositions.

ii. Coenzyme Q Active Ingredients and Other Compounds

Exemplary of the non-polar active ingredients are compounds containing Coenzyme Q, for example, Coenzyme Q10 (also called CoQ10, ubiquinone, ubidecarenone, ubiquinol and vitamin Q10) and Pyrroloquinoline quinine (PQQ). Coenzyme Q compounds are benzoquinone compounds containing isoprenyl units. The number of isoprenyl units in each of the different CoQ species is indicated with a number following CoQ. For example, CoQ10 contains 10 isoprenyl units. Coenzyme Q10 is a predominant Coenzyme Q species.

Coenzyme Q can exist in two different forms: an oxidized form and a reduced form. When the oxidized form of a Coenzyme Q species is reduced by one equivalent, it becomes a ubisemiquinone, denoted QH, which contains a free radical on one of the oxygens in the benzene ring of the benzoquinone. Oxidized and reduced coenzyme Q containing compounds can be used as active ingredients in the provided compositions.

Typically, a coenzyme-containing compound used as an active ingredient in the provided compositions is included in the compositions within a concentration range of between 0% or about 0% and 30% or about 30%, typically between 5% or about 5% and 25% or about 25%, such as between at or about 5% and at or about 20% or at or about 8% and at or about 18%, for example, at or about 5%, 6%, 7%, 8%, 9%, 10%, 11%, 12%, 13%, 14%, 15%, 16%, 17%, 18%, 19%, 20%, 21%, 22%, 23%, 24% or 25%, w/w, of the composition. Coenzyme Q-containing non-polar compounds are typically added to the compositions in amounts such that when diluted in a food or beverage, one serving of the food or beverage provides between at or about 10 and at or about 200 mg, typically, between at or about 10 and at or about 100 mg, between at or about 10 and at or about 150 mg, between at or about 50 and at or about 150 mg, between at or about 50 and at or about 200 mg, between at or about 100 and at or about 200 mg, for example, at or about 10, at or about 20, at or about 50, at or about 100, at or about 150 or at or about 200 mg coenzyme Q, for example Coenzyme Q10, per serving of the food or beverage, such as for example, 8 ounces of a beverage.

1. Coenzyme Q10

Exemplary of the Coenzyme Q containing non-polar compounds that can be used in the provided compositions are non-polar compounds containing Coenzyme Q10. Coenzyme Q10 (also called CoQ10, ubiquinone, ubidecarenone, ubiquinol, and vitamin Q10) is a benzoquinone compound that contains 10 isoprenoid units. The "Q" in the name refers to Quinone and the 10 refers to the number of isoprenoid units. CoQ10 typically refers to the oxidized form of CoQ10, which also is referred to as ubidecarenone, as opposed to the reduced form of CoQ10. In both the reduced and oxidized CoQ10 are exemplary of the coenzyme Q species that can be used as active ingredients in the provided compositions.

CoQ10 has electron-transfer ability and is present in cellular membranes, such as those of the endoplasmic reticulum, peroxisomes, lysosomes, vesicles and the mitochondria. A decrease in natural CoQ10 synthesis has been observed in sick and elderly people. Because of this observation and its potent antioxidant properties, CoQ10 is used as a dietary supplement and a treatment for diseases such as cancer and heart disease. CoQ10, however, exhibits relatively poor bioavailability.

CoQ10 containing compounds are available commercially. Any CoQ10 compound or reduced CoQ10 compound can be used with the provided composition. Exemplary of the CoQ10 compounds that can be used as active ingredients are coenzyme Q10 compounds containing greater than 98% or greater than about 98% ubidecarenone, for example, the compound sold under the name Kaneka Q10™ (USP Ubidecarenone) by Kaneka Nutrients, L.P., Pasadena, Tex. The compound sold under the name Kaneka Q10™ is fermented entirely from yeast and is identical to the body's own CoQ10 and free from the cis isomer found in some synthetically produced CoQ10 compounds. Any CoQ10 compound can be used in the provided compositions.

iii. Phytochemical-Containing Active Ingredients

Exemplary of the non-polar compounds used as active ingredients in the provided compositions are phytochemical-containing compounds, for example, phytosterols (plant sterols), phytoestrogens, for example, genistein and daidzein, flavonoids, for example, isoflavones, for example, soy isoflavones, phytoalexins, for example, Resveratrol (trans-3,5,4'-trihydroxystilbene) and red clover extract.

Typically, phytochemical-containing compounds are used in the provided compositions within a concentration range of between 0% or about 0% and 30% or about 30%, typically between 5% or about 5% and 25% or about 25%, such as between at or about 5% and at or about 20% or at or about 8% and at or about 18%, for example, at or about 5%, 6%, 7%, 8%, 9%, 10%, 11%, 12%, 13%, 14%, 15%, 16%, 17%, 18%, 19%, 20%, 21%, 22%, 23%, 24% or 25%, w/w, of the composition.

1. Phytosterols

Exemplary of the phytochemical-containing compounds used as active ingredients in the provided compositions are phytosterols (plant sterols). Plant sterols are structurally similar to cholesterol and have been found to reduce the absorption of dietary cholesterol, which can affect the levels of serum cholesterol. According to the U.S. Food and Drug Administration (FDA), two servings per day, each containing 0.4 grams of plant sterols, for a total daily intake of at least 0.8 grams, as part of a diet low in saturated fat and cholesterol, may reduce the risk of heart disease. Thus, plant sterols are used in nutritional supplements.

Phytosterol non-polar compounds are typically added to the compositions in amounts such that when diluted in a food or beverage, one serving of the food or beverage provides between at or about 100 and at or about 1000 mg, typically between at or about 100 and at or about 500 mg, between at or about 100 and at or about 800 mg, between at or about 300 and at or about 500 mg, between at or about 300 and at or about 800 mg, between at or about 500 and at or about 1000 mg, for example, at or about 100, at or about 200, at or about 300, at or about 400, at or about 500, at or about 600, at or about 700, at or about 800, at or about 900 or at or about 1000 mg phytosterols, per serving of the food or beverage, such as for example, 8 ounces of a beverage.

Any phytosterol-containing compound can be used as an active ingredient in the provided compositions. Exemplary of the phytosterol-containing compounds that can be used as active ingredients in the provided compositions are compounds containing plant sterols, for example, the compound sold under the name CardioAid™, distributed by B&D Nutrition and manufactured by ADM Natural Health and Nutrition, Decatur, Ill. This compound contains Kosher, Pareve, and Halal plant sterols that are produced under current food GMPs. The sterols are PCR negative and the material is derived from genetically modified organisms (GMOs). This phytosterol compound contains a minimum of 95% plant sterols, which can include up to 5 plant sterols. The compound can contain, for example, 40-58% Beta sitosterol, 20-30% Campesterol, 14-22% Stigmasterol, 0-6% Brassicasterol and 0-5% Sitostanol. The compound further can contain tocopherols, for example, 0-15 mg/g tocopherols. The compound is tested and is negative for microorganisms, such as *Salmonella, E. coli* and *Staphylococcus aureus*.

2. Resveratrol

Exemplary of the phytochemical-containing compounds used as active ingredients in the provided compositions is resveratrol. Resveratrol, or trans-resveratrol (trans-3,5,4'-trihydroxystilbene), is a phytoalexin naturally produced by several plants, such as the Japanese knotweed, and also is found in the skin and seeds of grapes, numerous berries, including mulberry, blueberries, bilberries and cranberries, and in peanuts. This polyphenolic compound can act as an antioxidant and additionally aid in cancer prevention and reduction of cardiovascular disease.

Any resveratrol-containing compound can be used as an active ingredient in the provided compositions. Exemplary of the resveratrol-containing compounds that can be used as active ingredients in the provided compositions are compounds containing trans-resveratrol, for example the compounds sold under the name ReserveNature™, sold by Jiaherb, Shaanxi, China. This compound contains trans-resveratrol from the botanical source *Polygonum cuspidatum* (Japanese knotweed). This resveratrol compound contains a minimum of 98.5% trans resveratrol and does not contain emodin. The compound is tested and is negative for microorganisms, such as *Salmonella, E. coli*, yeast and mold.

iv. Carotenoid-Containing Active Ingredients

Exemplary of the non-polar compounds used as active ingredients in the provided compositions are carotenoid-containing compounds, for example, carotenoids, including hydrocarbons (carotenes) and oxygenated, alcoholic derivatives of hydrocarbons (xanthophylls), for example, beta carotene, mixed carotenoids complex, lutein, Zeaxanthin, cryptoxanthin, for example, beta-cryptoxanthin, lycopene, beta carotene, mixed carotenoids complex, astaxanthin, bixin, canthaxanthin, capsanthin, capsorubin, apo-carotenal, beta-12'-apo-carotenal, "Carotene" (mixture of alpha and beta-carotene), gamma carotene, ciolerythrin, zeaxanthin, and esters of hydroxyl- or carboxyl-containing members thereof. Carotenoids are efficient free-radical scavengers, or anti-oxidants, and are capable of enhancing the vertebrate immune system.

Typically, carotenoid-containing compounds are used in the provided compositions within a concentration range of between 0% or about 0% and 30% or about 30%, typically between 5% or about 5% and 25% or about 25%, such as between at or about 5% and at or about 20% or at or about 8% and at or about 18%, for example, at or about 5%, 6%, 7%, 8%, 9%, 10%, 11%, 12%, 13%, 14%, 15%, 16%, 17%, 18%, 19%, 20%, 21%, 22%, 23%, 24% or 25%, w/w, of the composition.

1. Carotenes

Exemplary of the carotenoid-containing compounds used as active ingredients in the provided compositions are carotenes, for example, alpha-carotene, beta-carotene and lycopene. Any carotene-containing compound can be used as an active ingredient in the provided compositions. Exemplary of the carotene-containing compounds that can be used as active ingredients in the provided compositions is lycopene, sold by Zhejiang Medicine CO., LTD, Xinchang Pharmaceutical Factory, Xinchang, China, a purple or red crystalline powder containing not less than 70% all E-lycopene, not more than 23% 5-Z-lycopene and not more than 9% related substances.

2. Xanthophylls

Exemplary of the carotenoid-containing compounds used as active ingredients in the provided compositions are xanthophylls, for example, neoxanthin, violaxanthin, α- and β-cryptoxanthins, lutein and zeaxanthin. Xanthophylls, or phylloxanthins, are oxygen containing carotenoids that are typically yellow pigments. Any carotene-containing compound can be used as an active ingredient in the provided compositions. Exemplary of the carotene-containing compounds that can be used as active ingredients in the provided compositions are lutein and zeaxanthin, sold under the name Xanmax®-80 (Lutein crystals), by Katra Phytochem (India) Private Limited, Bangalore, India, containing 80% lutein and 4.5% zeaxanthin.

v. Micronutrient-containing Active Ingredients

Exemplary of the non-polar compounds used as active ingredients in the provided compositions are micronutrient-containing compounds, for example, vitamins, including Vitamins A, D, E and K, and corresponding provitamins and vitamin derivatives with an action resembling that of vitamin A, D, E, or K, and alpha lipoic acid (thioctic acid).

1. Vitamins

Exemplary of the vitamins used as active ingredients in the provided compositions are fat-soluble vitamins, for example, Vitamins A, D, E and K, and corresponding provitamins and vitamin derivatives such as esters with an action resembling that of vitamin A, D, E or K for example, retinol (vitamin A) and pharmaceutically acceptable derivatives thereof, for example, palmitate ester of retinol and other esters of retinol, for example, Vitamin A Palmitate, and calciferol (vitamin D) and pharmaceutically acceptable derivatives thereof, for example, cholecalciferol (Vitamin D3), and precursors of vitamin D, d-alpha tocopherol (vitamin E) and derivatives thereof, including pharmaceutical derivatives thereof, for example, Tocotrienols, d-alpha tocopherol acetate and other esters of d-alpha tocopherol, and ascorbyl palmitate, a fat-soluble version of vitamin C.

Any vitamin can be used as an active ingredient in the provided compositions. Exemplary of the vitamins that can be used as active ingredients in the provided compositions are vitamin A palmitate, for example, vitamin A palmitate containing 1.7 mIU/g, produced by DSM Nutritional Products, Inc., Belvidere, N.J., and distributed through Stauber Performance Ingredients, Inc., Fullerton, Calif., and vitamin D3, for example, vitamin D3 in corn oil, containing about 1 mIU/g, produced by DSM Nutritional Products, Inc., Belvidere, N.J., and distributed through Stauber Performance Ingredients, Inc., Fullerton, Calif.

Typically, vitamin non-polar active ingredients are included in the provided compositions within a concentration range of between 0.0001% or about 0.0001% and 15% or about 15%, more typically between at or about 0.001% and at or about 0.1%, or between at or about 1% and at or about 15%, or between at or about 5% and at or about 15%, for example, at or about 0.0001%, 0.0005%, 0.0008%, 0.0009%, 0.001%, 0.002%, 0.003%, 0.004%, 0.005%, 0.01%, 0.02%, 0.03%, 0.04%, 0.05%, 0.1%, 0.5%, 1%, 2%, 3%, 4%, 5%, 6%, 7%, 8%, 9%, 10%, 11%, 12%, 13%, 14% or 15%, w/w, of the composition. Vitamin non-polar active ingredients are typically added to the compositions in amounts such that when diluted in a food or beverage, one serving of the food or beverage provides an amount of the vitamin that corresponds to the dietary reference intakes. For example, vitamin A is added such that, when diluted in a food or beverage, a serving of the food or beverage provides between at or about 10 to at or about 2000 micrograms (mcg), for example, between at or about 20 to at or about 900 mcg, more typically between at or about 40 to at or about 400 mcg of vitamin A per serving, for example, between at or about 40 and at or about 200 mcg, or between at or about 100 and at or about 400 mcg, or between at or about 100 and at or about 300 mcg per serving. For example, the food or beverage can contain 40 or about 40, 50 or about 50, 60 or about 60, 70 or about 70, 80 or about 80, 90 or about 90, 100 or about 100, 110 or about 110, 120 or about 120, 130 or about 130, 140 or about 140, 150 or about 150, 200 or about 200, 250 or about 250, 300 or about 300, 350 or about 350, or 400 or about 400 mcg Vitamin A per serving. In another example, vitamin D3 is added such that, when diluted in a food or beverage, a serving of the food or beverage provides between at or about 100 to at or about 2000 International Units (IU), for example, between at or about 100 to at or about 1000 IU, more typically, between at or about 400 and at or about 800 IU, per serving, for example between at or about 400 and at or about 600 or between at or about 500 and at or about 800, or between at or about 600 and at or about 800 IU per serving. For example, the food or beverage can contain 400 or about 400, 450 or about 450, 500 or about 500, 550 or about 550, 600 or about 600, 650 or about 650, 700 or about 700, 750 or about 750 or 800 or about 800 IU Vitamin D3 per serving.

2. Alpha Lipoic Acid (Thioctic Acid)

The alpha lipoic acid active ingredients include Alpha Lipoic Acid, sold by NutriChem Resources Company, Walnut, Calif., and Alpha Lipoic Acid, sold by Zhejiang Medicines & Health Products Import & Export Co., Ltd, Hangzhou, China and other alpha lipoic acids. Typically, alpha lipoic acid is used in the provided compositions within a concentration range of between 0% or about 0% and 30% or about 30%, typically between 5% or about 5% and 25% or about 25%, such as between at or about 5% and at or about 20% or at or about 8% and at or about 18%, for example, at or about 5%, 6%, 7%, 8%, 9%, 10%, 11%, 12%, 13%, 14%, 15%, 16%, 17%, 18%, 19%, 20%, 21%, 22%, 23%, 24% or 25%, w/w, of the composition.

vi. Other Fatty Acids

Exemplary of fatty acids that can be included in the provided compositions are triglycerides, including medium chain triglycerides, polar lipids, for example, ether lipids, phosphoric acid, choline, fatty acids, glycerol, glycolipids, triglycerides, and phospholipids (e.g., phosphatidyl-choline (lecithin), phosphatidylethanolamine, and phosphatidylinositol); saw palmetto extract, ethyl linoleate, herb oils, for example, garlic oils and scordinin, short-chain saturated fatty acids (4:0-10:0), Lauric acid (12:0), Myristic acid (14:0), Pentadecanoic acid (15:0), Palmitic acid (16:0), Palmitoleic acid (16:1 ω7), Heptadecanoic acid (17:0), Stearic acid (18:0), Oleic acid (18:1 ω9), and Arachidic acid (20:0).

1. Saw Palmetto Extract

Also exemplary of the non-polar compounds used in the provided compositions is saw palmetto extract, a lipophilic extract of the ripe berries of the American dwarf palm (also called *Serenoa repens* or *Sabal serrulata*), which has been used to treat genitourinary and other diseases and to enhance sperm production, breast size and libido, as a mild diuretic, a nerve sedative, an expectorant and a digestive tract tonic, and particularly to treat benign prostate hyperplasia (BPH) (Ernst, (2002) *Academia and Clinic* 136:42-53; Gordon and Shaughnessy, (2003) *Complementary and Alternative Medicine* 76(6):1281-1283). Saw palmetto extract is commercially available from a number of sources. Any saw palmetto lipid extract can be used in the provided compositions. Exemplary of the saw palmetto extract that can be used in the provided compositions is Saw Palmetto Lipophilic Extract, commercially available from Natural Medicinals, Inc., Felda, Fla. This Saw Palmetto Lipophilic Extract is carbon dioxide extracted and, in one example, contains, 85.9% total fatty acids, including 0.8% Caproic acid, 2% Caprylic acid, 2.4% Capric acid, 27.1 Lauric acid, 10.3 Myristic acid, 8.1% Palmitic acid, 0.2% Palmitoleic acid, 2% Stearic acid, 26.7 Oleic acid, 4.9% Linoleic acid, 0.7% linolenic acid, 0.42%; 0.42% phytosterols, including 0.42% beta Sitosterol, 0.09% Campesterol, 0.03% Stigmasterol; and 0.2% moisture. Other sources of saw palmetto extract can be used.

2. MCT Oil

Also exemplary of the non-polar compounds used in the provided compositions is MCT oil, such as a MCT oil that contains capryilic acid (C8; 66%) and capric acid (C10; 32%), for example, the MCT oil sold as Neobee® M-5 by Stepan Lipid Nutrition, Maywood, N.J. Typically, MCT oil is used in the provided compositions within a concentration range of between 0% or about 0% and 30% or about 30%, typically between 5% or about 5% and 25% or about 25%, such as between at or about 5% and at or about 20% or at or about 8% and at or about 18%, for example, at or about 5%, 6%, 7%, 8%, 9%, 10%, 11%, 12%, 13%, 14%, 15%, 16%, 17%, 18%, 19%, 20%, 21%, 22%, 23%, 24% or 25%, w/w, of the composition.

b. Modified Food Starches

The compositions provided herein contain a modified food starch. Modified food starches that can be used in the compositions provided herein are known to those of skill in the art. For example, the modified food starch can be a natural or synthetic modified food starch. In some examples, the modified food starch can be modified chemically, enzymatically, physically or by any combination thereof. In some examples, the modified food starch is modified by pregelatinization, oxidation, enzymatic degradation, enzymatic conversion, esterification, cross-linking, acetylation, hydroxypropylation or any combination thereof. For example, natural modified food starches are modified by esterification with a fatty acid chain, such that the modified emulsion stabilizer has balanced lipophilic and hydrophilic properties. The modified food starches for use in the provided compositions include modified starches, for example, modified corn, potato, wheat, rice, tapioca, sago, oat, barley, amaranth, waxy corn, cassava, waxy barley, waxy rice, glutinous rice or sweet rice starches. In some examples, the modified food starches for use in the provided compositions include, but are not limited to, hydrolyzed starches such as maltodextrins, high amylose corn maize, high amylopectin corn maize; chemically substituted starches such as acidic modified, oxidized, cross-linked, starch esters, starch ethers and cationic starches; physically modified starches, such as a pregelatinized starch; and mixtures thereof.

Any suitable modified food starch can be used that can stabilize provided emulsion concentrates. Suitable modified food starches include modified starches treated to contain hydrophobic as well as hydrophilic groups, such as those described in Caldwell et al., U.S. Pat. No. 2,661,349. Octenyl succinate (OCS) modified starches such as those described in Marotta et al., U.S. Pat. No. 3,455,838 and Barndt et al., U.S. Pat. No. 4,460,617 are especially preferred emulsifiers.

In one example, the modified starch is a modified corn starch obtained through the chemical conversion of a waxy corn starch, such as by modification with an n-octenyl succinic anhydride. For example, modified food starches for use in the concentrates provided herein include octenyl succinate starches (OSA modified starch), such as sodium octenyl succinate starches, calcium octenyl succinate starches or aluminum octenyl succinate starches. Exemplary of an modified corn starch is a sodium starch octenyl succinate, sold under the name N-creamer 46 (substituted waxy maize), sold by Ingredion™, Westchester, Ill. Also exemplary of a modified corn starch is a calcium starch octenyl succinate, sold under the name Farmal™ MS 6135, from Corn Products International Inc., Westchester, Ill., available from Cosmetic Specialties, Inc., Haddon Heights, N.J. (see, for example, U.S. Pat. No. 2,661,349) and an aluminum starch octenyl succinate, sold under the name Farmal™ MS 5110, from Corn Products International Inc., Westchester, Ill., available from Cosmetic Specialties, Inc., Haddon Heights, N.J. OSA-starches may contain further hydrocolloids, such as starch, maltodextrin, carbohydrates, gum, corn syrup etc. and optionally any typical emulsifier (as co-emulsifier), such as mono- and diglycerides of fatty acids, polyglycerol esters of fatty acids, lecithins, sorbitan monostearate, and plant fibre or sugar.

Additional modified food starches that can be used in the concentrates provided herein include those sold under trademarks, such as, but are not limited to, Capsul®, Capsul® TA, N-Lok® 1930, Purity Gum® 2000, Purity Gum® 1773, Purity Gum® Ultra, Purity Gum® 539, Purity® 4, Purity® 550, Purity® 420, Purity® 69, Purity® D, Purity® W, Purity® TF, Ultrasperse®-A, Ultra-Tex® 2, Ultra-Tex® 2000, Ultra-Tex® 3, Ultra-Tex® 4, Ultra-Tex® SR, Ultra-Tex® 8, Textra® Plus, Eliane™ VC 280, Eliane™ SC 160, Eliane™ VC 120, Eliane™ VC 240 AG, Eliane™ VE 540, Eliane™ 100, Eliane™ C100, Eliane™ EZ 100, Perfectagel™ MPT, N-Lite®, Instant CLEARJEL®, COLFLO® 67, ELASTIGEL® 1000J, FRIGEX® W, H-50, Hi-Set® 322, Hi-Set®, Instant Pure-Flo® F, Instant Textaid® A, Textaid® A, Instant Textra®, Textra®, National Frigex™, National Frigex™ HV, and Hi Cap® 100 sold by Ingredion™, Westchester, Ill., Ultrasperse®-A (pregelatinized, waxy corn) and Ultrasperse®-M, available from National Starch Food Innovation, Bridgewater, N.Y., and EmTex®, EmCap® and EZ Fill® sold by Cargill, Minneapolis, Minn.

c. Surfactants

The provided compositions, including concentrates, such as liquid emulsion concentrates, dilution compositions containing the concentrates and compositions for direct consumption, can optionally contain surfactants. For example, in addition to the non-polar compound(s) and the modified food starch, the concentrates can contain one or more surfactants. In the provided methods for producing the compositions, including the concentrates, the surfactant is added to the water phase, the oil phase, or to the water and the oil phase. The compositions additionally can further contain one or more co-surfactants or emulsifiers. Typically, the surfactants are natural surfactants, for example, a surfactant that is G.R.A.S. (generally recognized as safe) by the FDA and/or Kosher certified.

The surfactants aggregate in aqueous liquids, such as in the provided compositions (e.g., concentrates, aqueous liquid dilution compositions and beverages) to form micelles, which contain the non-polar compound(s). The hydrophilic portion(s) of the surfactant molecules are oriented toward the outside of the micelle, in contact with the aqueous medium, while the hydrophobic portion(s) of the surfactant molecules are oriented toward the center of the micelle, in contact with the non-polar compound(s), which is contained in the center of the micelle. The micelles can contain more than one surfactant and/or co-surfactant. Properties of the provided compositions, for example, the particle size of the compositions and desirable properties related to the particle size, are influenced by the choice of surfactant(s) and the relative amount (concentration) of surfactant. For example, the HLB of the surfactant(s) can affect particle size, clarity, taste, smell, crystal formation, stability and other properties of the provided compositions. Similarly, the concentration of the surfactant compared with the concentration(s) of other ingredients, particularly compared with the concentration of the polar solvent(s) and the concentration of the non-polar compound(s), can affect various desirable properties, for example, the ability to disperse or dissolve in a water-based food or beverage, e.g., to form a stable dilution compositions or dilution compositions with a pleasant taste and/or smell.

Surfactants (and co-surfactants) are molecules that contain hydrophobic and hydrophilic portions. In one example, the hydrophobic portion is a hydrophobic tail and the hydrophilic portion is a hydrophilic head of the surfactant molecule.

The HLB value of a surfactant is derived from a semi-empirical formula; HLB values are used to index surfactants according to their relative hydrophobicity and hydrophilicity. An HLB value is a numerical representation of the relative representation of hydrophilic groups and hydrophobic groups in a surfactant or mixture of surfactants. The weight percent of these respective groups indicates properties of the molecular structure. See, for example, Griffin, W. C., (1949) *J. Soc. Cos. Chem.* 1:311.

Surfactant HLB values range from 1-45, while the range for non-ionic surfactants typically is from 1-20. The more lipophilic a surfactant is, the lower its HLB value. Conversely, the more hydrophilic a surfactant is, the higher its HLB value. Lipophilic surfactants have greater solubility in oil and lipophilic substances, while hydrophilic surfactants dissolve more easily in aqueous liquids. In general, surfactants with HLB values greater than 10 or greater than about 10 are called "hydrophilic surfactants," while surfactants having HLB values less than 10 or less than about 10 are referred to as "hydrophobic surfactants." HLB values are known for a number of surfactants. Table 1 (above) lists HLB values of exemplary surfactants and co-surfactants.

Exemplary of surfactants that can be used in the provided methods and compositions are surfactants having an HLB value of between 13 or about 13 and 20 or about 20, for example, 13 or about 13, 14 or about 14, 15 or about 15, 16 or about 16, 17 or about 17, 18 or about 18, 19 or about 19, or 20 or about 20. The surfactants typically are non-ionic surfactants, and typically have an HLB value between at or about 13 and at or about 18, more typically between at or about 15 and at or about 18. Particular examples of suitable surfactants for use in the provided compositions include non-ionic surfactants, such as Vitamin E-derived surfactants.

Exemplary Vitamin E-derived surfactants include, but are not limited to, surfactants such as tocopherol and/or tocotrienol-derived surfactants, in which the Vitamin E moiety represents the hydrophobic region of the surfactant, and is attached, via a linker, to another moiety, such as a polyethylene glycol (PEG) moiety, that provides the hydrophilic portion of the surfactant. Vitamin-E derived surfactants include, but are not limited to, tocopherol derived surfactants, including polyalkylene glycol derivatives of tocopherol, typically polyethylene glycol (PEG) derivatives of tocopherol, such as tocopherol polyethylene glycol succinate (TPGS), TPGS analogs, TPGS homologs and TPGS derivatives. Alternatively, the surfactants can be other PEG derivatives having similar properties, for example, PEG derivatives of sterols, e.g. a cholesterol or a sitosterol (including, for example, any of the PEG derivatives disclosed in U.S. Pat. No. 6,632,443) or PEG-derivatives of other fat-soluble vitamins, for example, some forms of Vitamin A (e.g. Retinol) or Vitamin D (e.g. Vitamin D1-D5).

i. Vitamin E Derived Surfactants

Vitamin E-derived surfactants, such as tocopherol and/or tocotrienol-derived surfactants, contain a Vitamin E moiety which represents the hydrophobic region of the surfactant, attached, via a linker, to another moiety, such as a polyethylene glycol (PEG) moiety that provides the hydrophilic portion of the surfactant. The vitamin-E derived surfactants include, but are not limited to, tocopherol derived surfactants, including polyalkylene glycol derivatives of tocopherol, typically polyethylene glycol (PEG) derivatives of tocopherol, such as tocopherol polyethylene glycol succinate (TPGS), TPGS analogs, TPGS homologs and TPGS derivatives.

1. PEG-Derivatives of Vitamin E

The Vitamin E-derived surfactants (e.g., tocopherol-derived or a tocotrienol-derived surfactants) include polyalkylene glycol derivatives of Vitamin E, typically polyethylene glycol (PEG) derivatives of Vitamin E, for example, PEG derivatives of tocopherol or tocotrienol. Suitable PEG derivatives of Vitamin E typically contain one or more tocopherols or tocotrienols, joined (for example, by an ester, ether, amide or thioester bond) with one or more PEG moieties, via a linker, for example, a dicarboxylic acid linker. An exemplary surfactant is shown schematically below:

where the line between the PEG and Linker; and the line between the Linker and Vitamin E each independently represent a covalent bond selected from among an ester, ether, amide or thioester.

Typically, the Vitamin E PEG derivatives are made by joining the PEG moiety, via esterification, to a vitamin E-linker conjugate (e.g., a tocopherol-linker conjugate). In one example, the tocopherol-linker conjugate first is formed by covalently joining (by esterification) the hydroxyl moiety of tocopherol with a dicarboxylic acid to produce an ester bond. In this example, the tocopherol-linker conjugate is a tocopherol ester (such as tocopherol succinate). The esterification reaction can be performed by any of a number of known methods (see, for example, U.S. Pat. Nos. 2,680,749, 4,665,204, 3,538,119 and 6,632,443). To make the tocopherol-PEG surfactant, the resulting tocopherol ester then is joined (via the linker) to the PEG molecule, in another esterification reaction. In this example, the resulting surfactant is a tocopherol polyethylene glycol diester (TPGD).

Alternatively, PEG derivatives of a tocopherol-linker or tocotrienol-linker conjugate can be made by other methods. Various methods known in the art for producing PEG derivatives can be used to join a PEG molecule to tocopherol-linker or tocotrienol-linker compounds. For example, a tocopherol-linker conjugate can be covalently bonded to the PEG molecule via an amide, ether or thioether bond. For example, a tocopherol-linker conjugate that contains an amine group can be reacted with a PEG-NHS derivative to form an amide bond between the tocopherol-linker and the PEG molecule. A tocopherol-linker conjugate that contains an amine group can be reacted with a PEG-aldehyde derivative to form an amide bond between the tocopherol-linker and the PEG molecule. In another example, a tocopherol-linker that contains an carboxylic acid can be activated to the corresponding acid halide and reacted with a PEG-SH derivative to form a thioester bond between the tocopherol-linker and the PEG molecule.

a. Tocopherols and Tocotrienols

The tocopherol(s) used to make the surfactant can be any natural or synthetic Vitamin E tocopherol, including but not limited to alpha-tocopherols, beta-tocopherols, gamma-tocopherols and delta-tocopherols, either in pure forms or in heterogenous mixtures of more than one form. Exemplary tocopherols are d-α-tocopherols and d,l-tocopherols. To make the surfactant, the tocopherol typically is esterified with a linker, for example, a dicarboxylic acid, to form a tocopherol ester, which then is joined to a PEG moiety.

The tocotrienol(s) used to make the surfactants can be any natural or synthetic Vitamin E tocotrienol, including but not limited to alpha-tocotrienols, beta-tocotrienols, gamma-tocotrienols and delta-tocotrienols, either in pure forms or in heterogenous mixtures of more than one form. Mixtures of tocopherols and tocotrienols, are contemplated for use in the provided methods and compositions. A tocotrienol can be esterified with a linker, such as a dicarboxylic acid, before joining with a PEG moiety.

b. PEG Moieties

The PEG used in the tocopherol-PEG derivative can be any of a plurality of known PEG moieties. Exemplary of suitable PEG moieties are PEG moieties having varying chain lengths, and varying molecular weights, for example, PEG 1000, PEG 200, PEG 500, and PEG 20,000. The numbers following individual PEG moieties indicate the molecular weight (in daltons, Da) of the PEG moieties. The PEG moiety of the tocopherol-derived surfactant typically has a molecular weight of between 200 daltons or about 200 daltons and 20,000 daltons or about 20,000 daltons, typically between 200 daltons or about 200 daltons and 6000 daltons or about 6000 daltons, for example, between 600 daltons or about 600 daltons and 6000 daltons or about 6000 daltons, typically between 200 daltons or about 200 daltons and 2000 or about 2000 daltons, between 600 or about 600 daltons and 1500 daltons or about 1500 daltons, such as but not limited to 200, 300, 400, 500, 600, 800, and 1000 daltons. Exemplary of a PEG-derivative of tocopherol ester having a PEG moiety with 1000 daltons is TPGS-1000. Also exemplary of suitable PEG moieties are PEG moieties that are modified, for example, methylated PEG (m-PEG), which is a PEG chain capped with a methyl group. Other known PEG analogs also can be used. The PEG moieties can be selected from among any reactive PEG, including, but not limited to, PEG-OH, PEG-NHS, PEG-aldehyde, PEG-SH, PEG-NH$_2$, PEG-CO$_2$H, and branched PEGs.

c. Linkers

Typically, the PEG derivatives of Vitamin E are diesters or other esters, e.g., triesters. When the PEG derivative is a diester, the linker joining the Vitamin E to the PEG typically is a carboxylic acid, typically a dicarboxylic acid, as in, for example, tocopherol polyethylene glycol succinate (TPGS), where the linker is a succinic acid, and the surfactant is made by an esterification reaction joining a PEG moiety and a tocopherol ester of the dicarboxylic acid. In another example, the linker is another molecule, for example, an amino acid, such as glycine, alanine, 5-aminopentanoic acid or 8-aminooctanoic acid; or an amino alcohol, such as ethanolamine.

d. Tocopherol Polyethylene Glycol and Tocotrienol Polyethylene Glycol Diesters (Dicarboxylic Acid Esters of Vitamin E Linked to PEG)

Typically, the Vitamin E PEG derivatives are vitamin E polyethylene glycol diesters, which are Vitamin E esters of PEG, made by joining a Vitamin E ester to one or more PEG moieties by esterification. Exemplary of the Vitamin E diesters are tocopherol polyethylene glycol diesters (TPGD) and tocotrienol polyethylene glycol diesters.

When the tocopherol or tocotrienol ester linked with the PEG moiety is a tocopherol ester of a dicarboxylic acid (e.g., tocopherol succinate), the linker is a dicarboxylic acid (a carboxylic acid having two carboxy groups, e.g., succinic acid). In this example, the tocopherol or tocotrienol PEG diester is formed by esterification reaction, in which PEG is attached to a tocopherol ester of a dicarboxylic acid. Exemplary of dicarboxylic acids that can be used as linkers in these tocopherol and tocotrienol PEG diester surfactants are succinic acid, sebacic acid, dodecanedioic acid, suberic acid, azelaic acid, citraconic acid, methylcitraconic acid, itaconic acid, maleic acid, glutaric acid, glutaconic acid, fumaric acid and phthalic acids. Accordingly, exemplary of the tocopherol esters that can be esterified to form the PEG-derivatives are tocopherol succinate, tocopherol sebacate, tocopherol dodecanodioate, tocopherol suberate, tocopherol azelaate, tocopherol citraconate, tocopherol methylcitraconate, tocopherol itaconate, tocopherol maleate, tocopherol glutarate, tocopherol glutaconate, and tocopherol phthalate, among others.

PEG derivatives of vitamin E, for example, tocopherol polyethylene glycol diesters (TPGD) and tocotrienol polyethylene glycol diesters, typically contain a mixture of monomers and dimers. As shown in Scheme I below, a monomer is a single vitamin E molecule covalently joined to a water-soluble moiety, such as a polyethylene glycol, through a linker, where the water-soluble moiety, e.g., PEG, has a free, unreacted, terminal reactive group, e.g., a free terminal hydroxyl group, or alternatively, a methyl group; and a dimer is made up of two vitamin E molecules covalently joined to a water-soluble moiety, such as a polyethylene glycol, through one or more linkers, where both ends of the water-soluble moiety, e.g., both terminal hydroxyl groups of a PEG moiety, have reacted with a linker that is joined to a vitamin E molecule so that there are no free terminal reactive groups, e.g., hydroxyl groups.

Exemplary of the vitamin E polyethylene glycol diesters made with dicarboxylic acids are those containing the monomer and dimer compounds having the formulas shown in Scheme I below (and homologs, analogs and derivatives thereof):

Scheme I

Monomer:

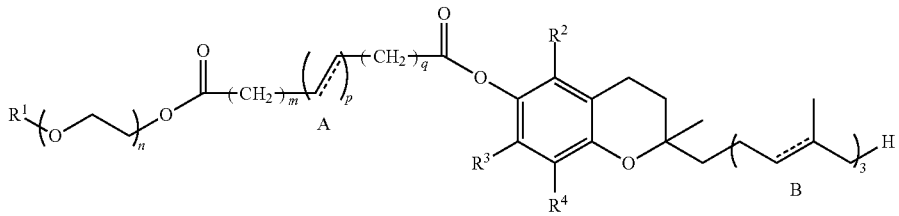

Dimer:

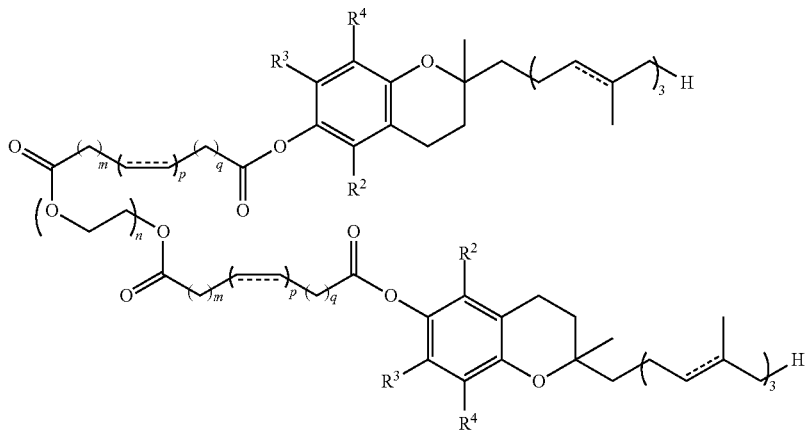

where $R^1$, $R^2$, $R^3$ and $R^4$ each independently is H or methyl ($CH_3$); each dashed line is independently a single or double bond; n is an integer from 1-5000; m and q each independently are 0 or 1; and p is an integer from 1-20. In one example, the surfactant is a compound where, when both m and q are 0, p is an integer between 2-20.

In one example, the surfactant contains a mixture of the monomer and dimer compounds having the formulas shown in Scheme II below (including homologs, analogs and derivatives thereof):

Scheme II

Monomer:

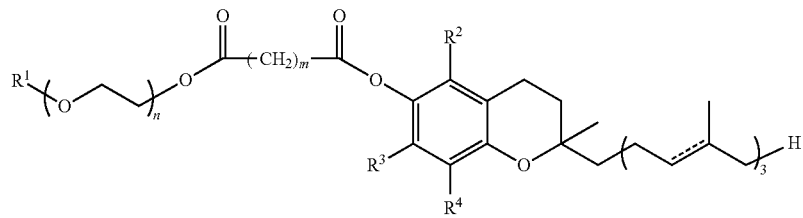

Dimer:

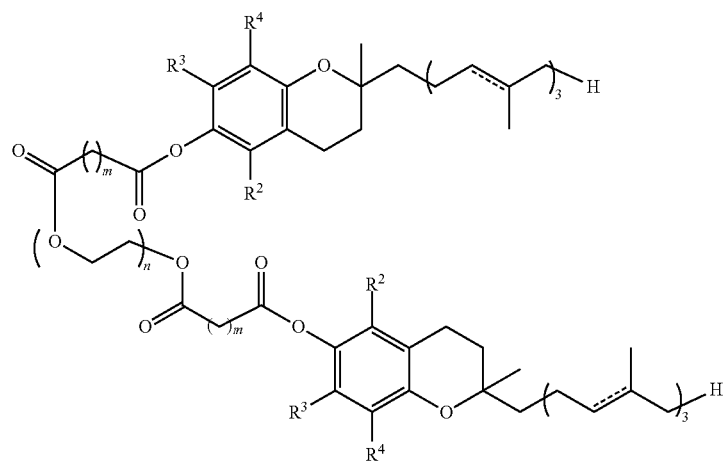

where $R^1$, $R^2$, $R^3$ and $R^4$ each independently is hydrogen (H) or methyl ($CH_3$); the bond represented by the dashed line is either a single or double bond, m is an integer from 1 to 20, and n is an integer from 1 to 5000.

In another example, the surfactant is a TPGS analog, such as, but not limited to, a surfactant other than TPGS having the monomer and dimer formulas shown in Scheme III:

Scheme III

Monomer:

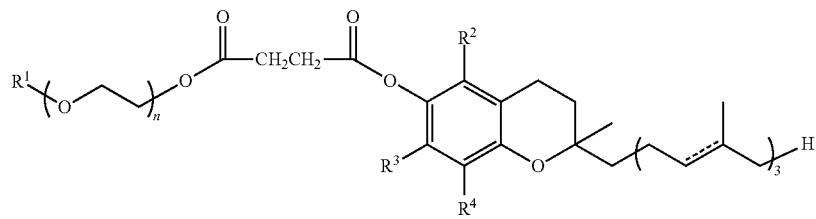

Dimer:

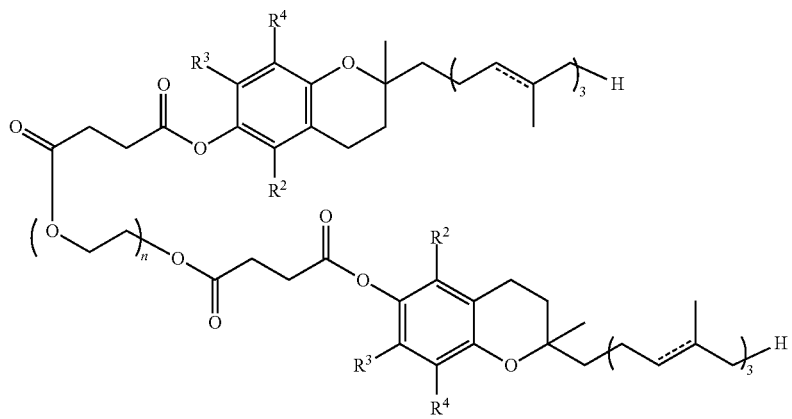

where $R^1$, $R^2$, $R^3$ and $R^4$ each independently is hydrogen (H) or methyl (CH$_3$); the bond represented by the dashed line is either a single or double bond, and n is an integer from 1 to 5000.

Exemplary of tocopherol and tocotrienol PEG diesters that can be used as surfactants in the provided compositions and methods include, but are not limited to: tocopherol polyethylene glycol succinates (TPGS; including D-α TPGS and d,l-TPGS; see for example, U.S. Pat. No. 3,102,078), tocopherol polyethylene glycol sebacate (PTS; see for example, U.S. Pat. No. 6,632,443), tocopherol polyethylene glycol dodecanodioate (PTD; see for example, U.S. Pat. No. 6,632,443), tocopherol polyethylene glycol suberate (PTSr; see for example, U.S. Pat. No. 6,632,443) and tocopherol polyethylene glycol azelaate (PTAz; see for example, U.S. Pat. No. 6,632,443), polyoxyethanyl tocotrienyl sebacate (PTrienS, for example, PTrienS-600; see for example, U.S. Pat. No. 6,632,443), as well as analogs, homologs and derivatives or any of the tocopherol diesters.

e. Other Vitamin E PEG Esters

In another example, the tocopherol ester joined to the PEG to form the tocopherol PEG diester is a tocopherol ester of a tricarboxylic acid, for example, Citric acid, isocitric acid, aconitic acid and propane-1,2,3-tricarboxylic acid (tricarballylic acid, carballylic acid) or a carboxylic acid having three or more carboxy groups.

In another example, the PEG derivatives of tocopherol are tocopherol polyethylene glycol triesters (TPGT), for example, esters containing a tocopherol, a linker, a PEG moiety, and an additional moiety, for example, an additional tocopherol, a second PEG moiety, or a water-soluble group, such as a quaternary amine. In one example, when the triester contains two PEG moieties, each PEG moiety has a smaller chain length (and lower molecular weight) than the PEG moiety in a PEG derivative of tocopherol, having similar properties, that contains only one PEG chain.

f. TPGS Surfactants

Exemplary of the tocopherol polyethylene glycol diester surfactants are tocopherol polyethylene glycol succinates (TPGS), and analogs, homologs and derivatives thereof. TPGS is a natural surfactant that is GRAS and Kosher certified and thus, desirable for use in products designated for human consumption, for example, beverages, food and nutritional supplements. TPGS typically has an HLB value of between 13 or about 13 and 18 or about 18. Exemplary of the TPGS surfactants is TPGS-1000, which has a PEG moiety of 1000 daltons. TPGS 1000 is a pale yellow, waxy solid substance that is amphipathic and hydrophilic, with a molecular weight of approximately 1,513 Daltons. This surfactant is a water-soluble form of natural-source vitamin E, which is prepared by esterifying the carboxyl group of crystalline d-alpha-tocopheryl acid succinate with polyethylene glycol 1000 (PEG 1000), contains between 260 and 300 mg/g total tocopherol and has an HLB value between at or about 16 and at or about 18. A similar compound can be made by esterifying the carboxyl group of the d,1 form of synthetic Vitamin E with PEG 1000. It forms a clear liquid when dissolved 20% in water. This tocopheryl polyethylene glycol is a water-soluble preparation of a fat-soluble vitamin (vitamin E), for example, as disclosed in U.S. Pat. Nos. 3,102,078 and 2,680,749 and U.S. Published Application Nos. 2007/0184117 and 2007/0141203. At room temperature, TPGS typically is a waxy low-melting solid. In one example, the TPGS is heated prior to use, for example, to at least the melting temperature, for example, between 37° C. or about 37° C. and 41° C. or about 41° C. and the desired amount is poured out. In another example, the TPGS can be added as a waxy solid to a vessel and heated with the heating apparatus.

TPGS contains both the monomer and dimer forms, which are formed during the esterification reaction between the acid moiety of vitamin E succinate and the terminal hydroxyl groups of a polyethylene glycol to produce TPGS. Known, commercially available TPGS compositions contain primarily TPGS monomer, e.g., between 70 wt % and 87 wt %, or higher TPGS monomer. The monomer has been considered the effective component and the dimer considered to be a byproduct, thus the amounts of dimer are minimal, e.g., less than 12 wt %.

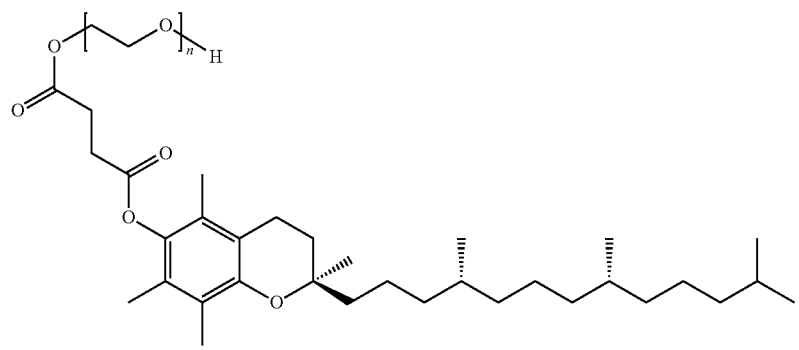

TPGS monomer

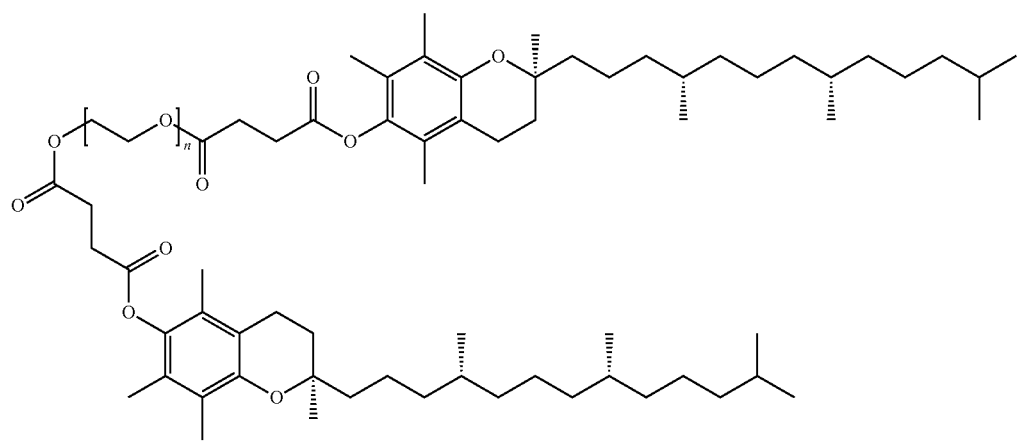

TPGS dimer

Synthesis

Scheme IV shows the synthesis of an exemplary water-soluble vitamin E derivative, TPGS, but any vitamin E moiety, i.e., any tocopherol or tocotrienol, can be used as the starting material, and reacted with any linker, such as those described herein, that is capable of reacting with a polyalkylene glycol moiety to form a monomer form and dimer form of a water-soluble vitamin E derivative. As shown in Scheme IV below, TPGS can be prepared by reacting vitamin E with succinic anhydride or succinic acid to obtain vitamin E succinate, i.e., D-a-tocopheryl succinate, followed by esterification with a polyethylene glycol molecule, to obtain TPGS (see U.S. Pat. No. 2,680,749). TPGS analogs varying in PEG chain length (e.g., TPGS 200, 238, 400, 600, 2000, 3400, 3500, 4000 and 6000) have been synthesized, but the most widely used form of TPGS is TPGS 1000 which incorporates PEG 1000, a polyethylene glycol molecule with a molecular weight of approximately 1,000 Daltons (Collnot et al. (2006) J. Controlled Release 111:35-40). TPGS 1000 is a pale yellow, waxy solid substance that is amphipathic and hydrophilic, with a molecular weight of approximately 1,513 Daltons.

Scheme IV

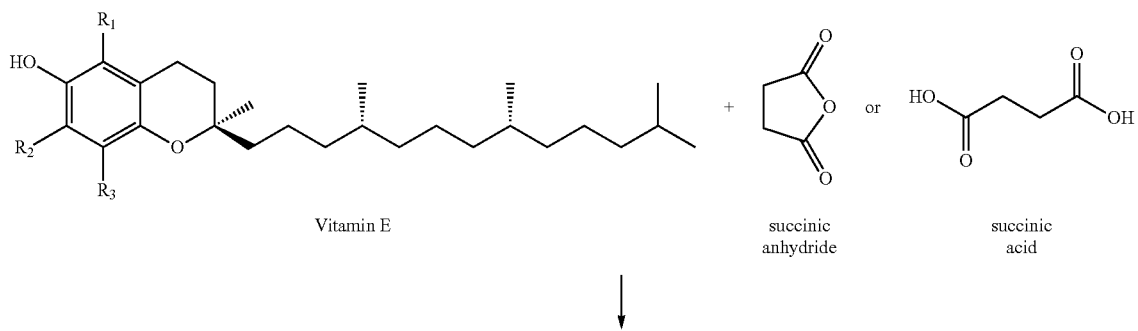

Vitamin E     succinic anhydride     succinic acid

↓

-continued

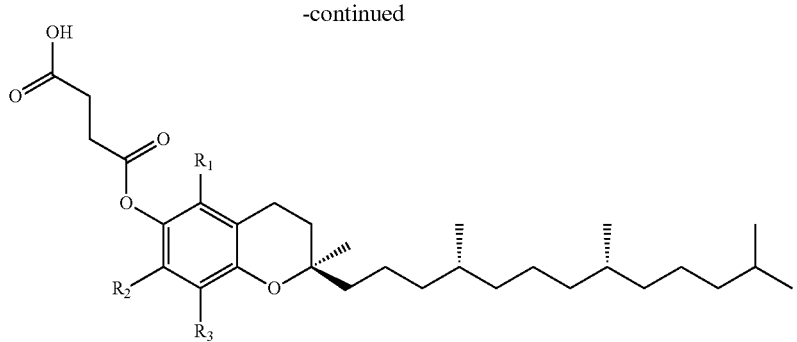

Vitamin E succinate
(D-alpha-tocopheryl succinate)

HO(CH₂CH₂O)ₙH
polyethylene glycol
n = 200 to 20,000

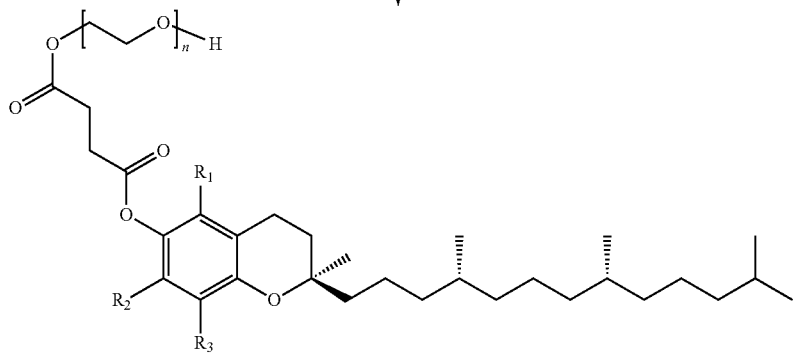

TPGS monomer
(D-alpha-tocopheryl polyethylene gylcol succinate monomer)

+

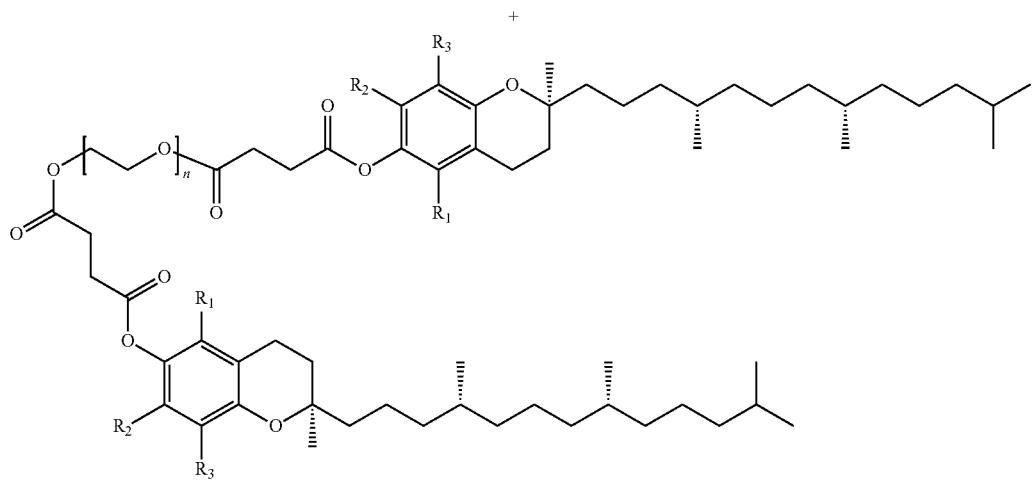

TPGS dimer
(D-alpha-tocopheryl polyethylene gylcol succinate dimer)

In some examples, the provided compositions can contain TPGS that contains high percentages of the monomeric form. TPGS compositions, as generally prepared, such as commercially available TPGS 1000, are mixtures that contain primarily TPGS monomer (between at or about 70% and at or about 87% or more) and a lesser amount of TPGS dimer (less than at or about 12%). The monomer is considered the effective component in TPGS, while the dimer is viewed as a byproduct of the esterification reaction between polyethylene glycol and vitamin E succinate. For example, commercially available TPGS, such as TPGS 1000 available from Eastman Chemical Company (Kingsport, Tenn.), contains primarily TPGS monomer (~86%) and a small amount of TPGS dimer (~11%) (Christiansen et al. (2011) J. Pharm. Sci. 100(5):1773-1782). TPGS synthesized according to standard methods, for example, the method described in U.S. Pat. No. 2,680,749, results in a TPGS composition that is composed primarily of TPGS monomer (70-87%) and a small amount of TPGS dimer (<12%) (US Pharmacopeia 23 (1998) Supp. 9:4712; Scientific Panel of the European Food Safety Authority (2007) EFSA J. 490:1-20). Because the separation of TPGS monomer and TPGS dimer is difficult and because TPGS monomer is considered the effective component in TPGS, TPGS compositions containing primarily TPGS dimer have not been developed (Kong et al. (2011) *J. Chromatography A* 1218:8664-8671). TPGS dimer, shown below, is usually considered an unwanted byproduct of the esterification reaction between PEG and vitamin E succinate, formed due to the equal reactivity of both terminal hydroxyl groups of PEG.

The PEG moiety of alternative TPGS surfactants can have a molecular weight range of between about 200 daltons or 200 daltons and 20,000 daltons or about 20,000 daltons, for example, between 600 daltons or about 600 daltons and 6000 daltons or about 6000 daltons, typically between 600 daltons or about 600 daltons and 1500 daltons or about 1500 daltons. Any known source of TPGS, or any analog, homolog or derivative thereof, can be used.

TPGS Analogs

Exemplary of TPGS analogs are compounds, other than TPGS, that are similar to a parent TPGS compound, but differ slightly in composition, for example, by the variation, addition or removal of an atom, one or more units (e.g., methylene unit(s)—$(CH_2)_n$) or one or more functional groups.

Also exemplary of the surfactants are TPGS analogs, which include Vitamin E derived surfactants, including PEG derivatives of Vitamin E, including vitamin E PEG diesters, such as, but not limited to, tocopherol polyethylene glycol sebacate (PTS), tocopherol polyethylene glycol dodecanodioate (PTD), tocopherol polyethylene glycol suberate (PTSr), tocopherol polyethylene glycol azelaate (PTAz) and polyoxyethanyl tocotrienyl sebacate (PTrienS) as well as other PEG derivatives of Vitamin E.

2. Water-Soluble Derivative of Vitamin E Mixtures

Exemplary surfactants for use in the compositions provided herein, including liquid emulsion concentrates, liquid dilution compositions and beverages including beverages for direct consumption, are water-soluble derivative of vitamin E mixtures that contain higher amounts of dimer forms of PEG-derivatives of vitamin E (as described in detail above) compared to the monomer form than in the well-known PEG-derivative of vitamin E compositions, such as the food grade TPGS sold under the name Eastman Vitamin E TPGS®, food grade, by Eastman Chemical Company, Kingsport, Tenn. (see, e.g., U.S. Pat. Nos. 3,102,078, 2,680,749) discussed above. Those compositions are prepared to contain high concentrations, typically greater than 87%, of the monomer form.

The high dimer containing preparations are described in U.S. Provisional Application Ser. No. 61/852,243, filed Mar. 15, 2013 (see also, copending U.S. application Ser. No. 14/207,310, which claims priority to the provisional application; see also, Example, 3 below, which is reproduced from the copending application). These compositions contain, for example, less than 70 wt % monomer, and more dimer, i.e., greater than 12 wt % dimer, than in the typical known water-soluble derivative of vitamin E compositions, for example, known TPGS compositions. Such water-soluble derivative of vitamin E mixtures are high dimer water-soluble derivative of vitamin E mixtures. The high dimer forms have advantageous properties. Typically, the high dimer water-soluble derivative of vitamin E mixture described herein can contain between at or about 25 wt % and at or about 69 wt % monomer and between at or about 13 wt % and at or about 95 wt % dimer, such as water-soluble derivative of vitamin E mixtures containing between at or about 40 wt % and at or about 60 wt % monomer and between at or about 25 wt % and at or about 60 wt % dimer, such as between at or about 29% and at or about 55%, between at or about 35% and at or about 50%, or between at or about 30% and at or about 45%, water-soluble derivative of vitamin E dimer. Advantageous properties are exhibited by compositions that contain at least these amounts.

In the water-soluble derivative of vitamin E mixtures described herein, the total amount of monomer as a percentage (%), by weight, of the composition (wt %) can be, e.g., between at or about 25 wt % and at or about 69 wt % monomer, inclusive, such as between at or about 25% and at or about 30%, at or about 25% and at or about 35%, at or about 25% and at or about 40%, at or about 25% and at or about 45%, at or about 25% and at or about 50%, at or about 25% and at or about 55%, at or about 25% and at or about 60%, at or about 25% and at or about 65%, at or about 25% and at or about 69%, at or about 30% and at or about 35%, at or about 30% and at or about 40%, at or about 30% and at or about 45%, at or about 30% and at or about 50%, at or about 30% and at or about 55%, at or about 30% and at or about 60%, at or about 30% and at or about 65%, at or about 30% and at or about 69%, at or about 35% and at or about 40%, at or about 35% and at or about 45%, at or about 35% and at or about 50%, at or about 35% and at or about 55%, at or about 35% and at or about 60%, at or about 35% and at or about 65%, at or about 35% and at or about 69%, at or about 40% and at or about 45%, at or about 40% and at or about 50%, at or about 40% and at or about 55%, at or about 40% and at or about 60%, at or about 40% and at or about 65%, at or about 40% and at or about 69%, at or about 45% and at or about 50%, at or about 45% and at or about 55%, at or about 45% and at or about 60%, at or about 45% and at or about 65%, at or about 45% and at or about 69%, at or about 50% and at or about 55%, at or about 50% and at or about 60%, at or about 50% and at or about 65%, at or about 50% and at or about 69%, at or about 55% and at or about 60%, at or about 55% and at or about 65%, at or about 55% and at or about 69%, at or about 60% and at or about 65%, at or about 60% and at or about 69%, and at or about 65% and at or about 69% monomer, by weight, of the composition. Generally, the water-soluble derivative of vitamin E mixtures contain less than 69 wt % monomer. For example, the water-soluble derivative of vitamin E mixtures described herein contain at least at or about 25%, 30%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, but less than 69% (wt %) total monomer, by weight, of the composition.

In the water-soluble derivative of vitamin E mixtures described herein, the total amount of dimer as a percentage (%) by weight of the composition (wt %) can be, e.g., between at or about 13 wt % and at or about 95 wt % dimer, inclusive, such as between at or about 13% and at or about 20%, at or about 13% and at or about 25%, at or about 13% and at or about 30%, at or about 13% and at or about 35%, at or about 13% and at or about 40%, at or about 13% and at or about 45%, at or about 13% and at or about 50%, at or about 13% and at or about 55%, at or about 13% and at or about 60%, at or about 13% and at or about 65%, at or about 13% and at or about 70%, at or about 13% and at or about 75%, at or about 13% and at or about 80%, at or about 13% and at or about 85%, at or about 13% and at or about 90%, at or about 13% and at or about 95%, at or about 20% and at or about 25%, at or about 20% and at or about 30%, at or about 20% and at or about 35%, at or about 20% and at or about 40%, at or about 20% and at or about 45%, at or about 20% and at or about 50%, at or about 20% and at or about 55%, at or about 20% and at or about 60%, at or about 20% and at or about 65%, at or about 20% and at or about 70%, at or about 20% and at or about 75%, at or about 20% and at or about 80%, at or about 20% and at or about 85%, at or about 20% and at or about 90%, at or about 20% and at or about 95%, at or about 25% and at or about 30%, at or about 25% and at or about 35%, at or about 25% and at or about 40%, at or about 25% and at or about 45%, at or about 25% and at or about 50%, at or about 25% and at or about 55%, at or about 25% and at or about 60%, at or about 25% and at or about 65%, at or about 25% and at or about 70%, at or about 25% and at or about 75%, at or about 25% and at or about 80%, at or about 25% and at or about 85%, at or about 25% and at or about 90%, at or about 25% and at or about 95%, at or about 30% and at or about 35%, at or about 30% and at or about 40%, at or about 30% and at or about 45%, at or about 30% and at or about 50%, at or about 30% and at or about 55%, at or about 30% and at or about 60%, at or about 30% and at or about 65%, at or about 30% and at or about 70%, at or about 30% and at or about 75%, at or about 30% and at or about 80%, at or about 30% and at or about 85%, at or about 30% and at or about 90%, at or about 30% and at or about 95%, at or about 35% and at or about 40%, at or about 35% and at or about 45%, at or about 35% and at or about 50%, at or about 35% and at or about 55%, at or about 35% and at or about 60%, at or about 35% and at or about 65%, at or about 35% and at or about 70%, at or about 35% and at or about 75%, at or about 35% and at or about 80%, at or about 35% and at or about 85%, at or about 35% and at or about 90%, at or about 35% and at or about 95%, at or about 40% and at or about 45%, at or about 40% and at or about 50%, at or about 40% and at or about 55%, at or about 40% and at or about 60%, at or about 40% and at or about 65%, at or about 40% and at or about 70%, at or about 40% and at or about 75%, at or about 40% and at or about 80%, at or about 40% and at or about 85%, at or about 40% and at or about 90%, at or about 40% and at or about 95%, at or about 45% and at or about 50%, at or about 45% and at or about 55%, at or about 45% and at or about 60%, at or about 45% and at or about 65%, at or about 45% and at or about 70%, at or about 45% and at or about 75%, at or about 45% and at or about 80%, at or about 45% and at or about 85%, at or about 45% and at or about 90%, at or about 45% and at or about 95%, at or about 50% and at or about 55%, at or about 50% and at or about 60%, at or about 50% and at or about 65%, at or about 50% and at or about 70%, at or about 50% and at or about 75%, at or about 50% and at or about 80%, at or about 50% and at or about 85%, at or about 50% and at or about 90%, at or about 50% and at or about 95%, at or about 55% and at or about 60%, at or about 55% and at or about 65%, at or about 55% and at or about 70%, at or about 55% and at or about 75%, at or about 55% and at or about 80%, at or about 55% and at or about 85%, at or about 55% and at or about 90%, at or about 55% and at or about 95%, at or about 60% and at or about 65%, at or about 60% and at or about 70%, at or about 60% and at or about 75%, at or about 60% and at or about 80%, at or about 60% and at or about 85%, at or about 60% and at or about 90%, at or about 60% and at or about 95%, at or about 65% and at or about 70%, at or about 65% and at or about 75%, at or about 65% and at or about 80%, at or about 65% and at or about 85%, at or about 65% and at or about 90%, at or about 65% and at or about 95%, at or about 70% and at or about 75%, at or about 70% and at or about 80%, at or about 70% and at or about 85%, at or about 70% and at or about 90%, at or about 70% and at or about 95%, at or about 75% and at or about 80%, at or about 75% and at or about 85%, at or about 75% and at or about 90%, at or about 75% and at or about 95%, at or about 80% and at or about 85%, at or about 80% and at or about 90%, at or about 80% and at or about 95%, at or about 85% and at or about 90%, at or about 85% and at or about 95%, and at or about 90% and at or about 95% dimer, by weight, of the composition. Generally, the compositions contain less than 95 wt % dimer. For example, the water-soluble derivative of vitamin E mixtures described herein contain at least at or about 13%, 15%, 20%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, but less than 95% (wt %) total dimer, by weight, of the composition.

The water-soluble derivative of vitamin E mixtures described herein containing less than 70 wt % monomer and greater than 12 wt % dimer exhibit decreased turbidity values when dissolved in an aqueous solution, for example, when dissolved in water, as compared to typical known water-soluble vitamin E derivative compositions, i.e., water-soluble vitamin E derivative compositions that contain more than 70 wt % monomer and less than 12 wt % dimer. The water-soluble derivative of vitamin E mixtures described herein containing less than 70 wt % monomer and greater than 12 wt % dimer allow for the addition of a higher concentration of non-polar compounds when used in aqueous food and beverage products as compared to available aqueous food and beverage products, while maintaining clarity and stability, for example, exhibiting decreased turbidity values.

Exemplary of the water-soluble derivative of vitamin E mixtures described herein are TPGS compositions containing less than 70 wt % TPGS monomer and more than 12 wt % TPGS dimer, such as water-soluble derivative of vitamin E mixtures containing between or between about 25 wt % and 69 wt % TPGS monomer and between or between about 13 wt % and 95 wt % TPGS dimer, such as TPGS compositions containing between or between about 40 wt % and 60 wt % TPGS monomer and between or between about 25 wt % and 60 wt % TPGS dimer, are described herein. The water-soluble derivative of vitamin E mixtures described herein containing less than 70 wt % TPGS monomer and greater than 12 wt % TPGS dimer exhibit decreased turbidity values when dissolved, for example, when dissolved in water, as compared to typical known TPGS compositions, i.e., TPGS compositions that contain more than 70 wt % TPGS monomer and less than 12 wt % TPGS dimer. The water-soluble derivative of vitamin E mixtures, e.g., TPGS compositions, described herein allow for the addition of a higher concentration of non-polar compounds when used in aqueous food and beverage products as compared to available aqueous food and beverage products, while maintaining clarity and stability, for example, exhibiting decreased turbidity values.

The water-soluble derivative of vitamin E mixtures, e.g., TPGS compositions, described herein contain a mixture of monomer and dimer, e.g., a mixture of TPGS monomer and TPGS dimer. The monomer, for example, a TPGS monomer, can be present in an amount that is less than what is typically found in known water-soluble derivative of vitamin E mixtures, e.g., known TPGS compositions, i.e., less than 70 wt % monomer. The dimer, for example, a TPGS dimer, can be present in an amount that is greater than what is typically found in known water-soluble derivative of vitamin E mixtures, e.g., known TPGS compositions, i.e., greater than 12 wt % dimer. The water-soluble derivative of vitamin E mixtures, such as the TPGS compositions, described herein can also contain other components, such as, for example, unreacted PEG, unreacted vitamin E, e.g., D-α-tocopheryl succinate, and one or more catalysts.

Methods for preparing such water-soluble derivative of vitamin E mixtures, such as the TPGS compositions described herein, that contain less than 70 wt % TPGS monomer and more than 12 wt % TPGS dimer, are described herein. For example, the water-soluble derivative of vitamin E mixtures, e.g., TPGS compositions, prepared according to the methods can contain between at or about 25 wt % and at or about 69 wt % monomer, by weight, of the mixture, for example, at or about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68 or 69 wt % monomer, by weight, of the mixture, and between at or about 13 wt % and at or about 95 wt % dimer, by weight, of the mixture, for example, at or about 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 89, 80, 81, 82, 83, 84, 85, 86, 87, 88, 89, 90, 91, 92, 93, 94 or 95 wt % dimer, by weight, of the mixture.

Exemplary of the water-soluble derivative of vitamin E mixtures described herein that contain a mixture of monomer and dimer, for example, are TPGS compositions that contain a mixture of TPGS monomer and TPGS dimer, such as TPGS compositions that contain between at or about 25 wt % and at or about 69 wt % monomer and between at or about 13 wt % and at or about 95 wt % dimer, such as between at or about 29% and at or about 55%, dimer. For example, the water-soluble derivative of vitamin E mixtures can contain at or about 39.35 wt % monomer and at or about 35.56 wt % dimer; at or about 40.39 wt % monomer and at or about 54.90 wt % dimer; at or about 40.95 wt % monomer and at or about 53.15 wt % dimer; at or about 42.76 wt % monomer and at or about 51.10 wt % dimer; at or about 43.52 wt % monomer and at or about 49.80 wt % dimer; at or about 43.90 wt % monomer and at or about 53.90 wt % dimer; at or about 52.92 wt % monomer and at or about 33.70 wt % dimer; at or about 55.88 wt % monomer and at or about 29.27 wt % dimer; at or about 57.70 wt % monomer and at or about 40.40 wt % dimer; at or about 60.00 wt % monomer and at or about 38.10 wt % dimer; and at or about 70.90 wt % monomer and at or about 28.65 wt % dimer.

Described herein are water-soluble derivative of vitamin E mixtures, such as TPGS compositions, that contain less monomer, i.e., less than 70 wt % monomer, such as between at or about 25 wt % and at or about 69 wt % monomer, and more dimer, i.e., more than 12 wt % dimer, such as between at or about 13 wt % and at or about 95% dimer, than typical commercial TPGS compositions.

The compositions, including concentrates, beverages and liquid dilution compositions, containing water-soluble derivative of vitamin E mixtures, such as tocopheryl polyalkylene glycol derivative compositions, including TPGS compositions, described herein, allow for the solubilization of higher amounts of non-polar compounds, such as non-polar compounds containing non-polar active ingredients, in foods and beverages, particularly aqueous beverages to which the concentrate is added. Provided herein are liquid emulsion concentrates, liquid dilution compositions and beverage compositions that contain the high dimer water-soluble derivative of vitamin E mixtures described herein.

For example, these concentrates allow for the addition of non-polar compounds containing non-polar active ingredients to products suitable for human consumption, e.g., food or beverage products, in amounts between at or about 1 wt % and at or about 75 wt %, such as between at or about 1% and at or about 5%, at or about 1% and at or about 10%, at or about 1% and at or about 15%, at or about 1% and at or about 20%, at or about 1% and at or about 25%, at or about 1% and at or about 30%, at or about 1% and at or about 35%, at or about 1% and at or about 40%, at or about 1% and at or about 45%, at or about 1% and at or about 50%, at or about 1% and at or about 55%, at or about 1% and at or about 60%, at or about 1% and at or about 65%, at or about 1% and at or about 70%, at or about 1% and at or about 75%, at or about 5% and at or about 10%, at or about 5% and at or about 15%, at or about 5% and at or about 20%, at or about 5% and at or about 25%, at or about 5% and at or about 30%, at or about 5% and at or about 35%, at or about 5% and at or about 40%, at or about 5% and at or about 45%, at or about 5% and at or about 50%, at or about 5% and at or about 55%, at or about 5% and at or about 60%, at or about 5% and at or about 65%, at or about 5% and at or about 70%, at or about 5% and at or about 75%, at or about 10% and at or about 15%, at or about 10% and at or about 20%, at or about 10% and at or about 25%, at or about 10% and at or about 30%, at or about 10% and at or about 35%, at or about 10% and at or about 40%, at or about 10% and at or about 45%, at or about 10% and at or about 50%, at or about 10% and at or about 55%, at or about 10% and at or about 60%, at or about 10% and at or about 65%, at or about 10% and at or about 70%, at or about 10% and at or about 75%, at or about 15% and at or about 20%, at or about 15% and at or about 25%, at or about 15% and at or about 30%, at or about 15% and at or about 35%, at or about 15% and at or about 40%, at or about 15% and at or about 45%, at or about 15% and at or about 50%, at or about 15% and at or about 55%, at or about 15% and at or about 60%, at or about 15% and at or about 65%, at or about 15% and at or about 70%, at or about 20% and at or about 25%, at or about 20% and at or about 30%, at or about 20% and at or about 35%, at or about 20% and at or about 40%, at or about 20% and at or about 45%, at or about 20% and at or about 50%, at or about 20% and at or about 55%, at or about 20% and at or about 60%, at or about 20% and at or about 65%, at or about 20% and at or about 70%, at or about 20% and at or about 75%, at or about 25% and at or about 30%, at or about 25% and at or about 35%, at or about 25% and at or about 40%, at or about 25% and at or about 45%, at or about 25% and at or about 50%, at or about 25% and at or about 55%, at or about 25% and at or about 60%, at or about 25% and at or about 65%, at or about 25% and at or about 70%, at or about 25% and at or about 75%, at or about 30% and at or about 35%, at or about 30% and at or about 40%, at or about 30% and at or about 45%, at or about 30% and at or about 50%, at or about 30% and at or about 55%, at or about 30% and at or about 60%, at or about 30% and at or about 65%, at or about 30% and at or about 70%, at or about 30% and at or about 75%, at or about 35% and at or about 40%, at or about 35% and at or about 45%, at or about 35% and at or about 50%, at or about 35% and at or about 55%, at or about 35% and at or about 60%, at or about 35% and at or about 65%, at or about 35% and at or about 70%, at or about 35% and at or about 75%, at or about 40% and at or about 45%, at or about 40% and at or about 50%, at or about 40% and at or about 55%, at or about 40% and at or about 60%, at or about 40% and at or about 65%, at or about 40% and at or about 70%, at or about 40% and at or about 75%, at or about 45% and at or about 50%, at or about 45% and at or about 55%, at or about 45% and at or about 60%, at or about 45% and at or about 65%, at or about 45% and at or about 70%, at or about 45% and at or about 75%, at or about 50% and at or about 55%, at or about 50% and at or about 60%, at or about 50% and at or about 65%, at or about 50% and at or about 69%, at or about 55% and at or about 60%, at or about 55% and at or about 65%, at or about 55% and at or about 70%, at or about 55% and at or about 75%, at or about 60% and at or about 65%, at or about 60% and at or about 70%, at or about 60% and at or about 75%, at or about 65% and at or about 70%, at or about 65% and at or about 75%, and at or about 70% and at or about 75% non-polar compound, by weight, of the food or beverage product. Generally, the products contain less than 75 wt non-polar compound. For example, the food and beverage products containing the water-soluble derivative of vitamin E mixtures, particularly the concentrates, provided herein contain at least at or about 1%, 5%, 10%, 15%, 20%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, but less than 75% (wt %) total non-polar compound that contains non-polar active ingredients.

Exemplary of a water-soluble derivative of vitamin E mixture for use in the provided compositions is a TPGS composition having a high percentage of dimer. For example, the TPGS compositions for use in the compositions provided herein are prepared so that they contain significantly more dimer, i.e., more than 12%, particularly at least at or about 13%, 20%, 25%, 29% or more, generally between at or about 29 to at or about 55%, or more such as up to at or about 75%, 80%, 85%, 90% or 95% dimer, and contain some monomer, i.e., less than 70 wt % monomer. For example, TPGS compositions for use in the compositions provided herein contain less TPGS monomer, i.e., less than 70 wt % TPGS monomer, and more TPGS dimer, i.e., more than 12 wt % TPGS dimer, such as at least 13%, 20%, 25%, 29% or more, up to 75%, 80%, 85%, 90% or 95% dimer. Typically, TPGS compositions for use in the compositions provided herein, including concentrates, liquid dilution compositions and beverages contain between at or about 46.09% and at or about 43.15%, by weight, monomer, between at or about 39.07% and at or about 50.28%, by weight, dimer, and up to at or about 3% or 3.2%, by weight, other compounds, including vitamin E and vitamin E succinate. Exemplary of a TPGS for use in the compositions provided herein is a TPGS composition containing 51% dimer, 48% monomer, 0.24% vitamin E and 0.46% vitamin E succinate.

ii. Concentration of the Surfactant

Typically, the concentration of the surfactant(s) in a particular concentrate composition is selected, as described herein, by formulating an initial concentrate with a surfactant(s) concentration within a starting concentration range, followed by evaluation of the initial concentrate and, optionally, adjusting the surfactant(s) concentration. Alternatively, the surfactant concentration can be chosen based on the concentration of surfactant in one or more existing liquid concentrate formulas. Typically, the concentration of the surfactant is between 0% or about 0% and 98% or about 98%, by weight (w/w), of the composition, for example, between at or about 0.1% and at or about 35%, or between at or about 1% and at or about 30%, or between at or about 2% and at or about 20%, by weight (w/w) of the composition. Exemplary of surfactant concentrations within the appropriate range are 5%, by weight (w/w), of the concentrate.

d. Polar Solvents

The compositions, including concentrates, such as liquid emulsion concentrates, dilution compositions containing the concentrates and compositions for direct consumption, further include one or more polar solvents. Polar solvents are well known in the art. The polarity of a solvent generally indicates which compounds are soluble in the solvent, and with which other solvents/liquids the solvent is miscible. Generally speaking, polar compounds are more readily solubilized in water and other polar solvents than are non-polar compounds. Polar solvents are more likely to be miscible with water and other polar solvents and liquids.

The polarity of a solvent can be assessed by measuring a number of different parameters according to well-known methods (see, e.g., Prizbytek, "High Purity Solvent Guide," Burdick and Jackson Laboratories, Inc., 1980), such as by determining a property of the solvent such as the dielectric constant, the dipole moment, or the polarity index. For example, polar solvents generally have high dielectric constants, typically dielectric constants greater than at or about 15 (see, e.g., Lowery et al., Mechanism and Theory in Organic Chemistry, Harper Collins Publishers, $3^{rd}$ ed., 1987, p. 177), such as at or about 15, 16, 17, 18, 19, 20, 21, 22, 23, 24, 25, 26, 27, 28, 29, 30, 31, 32, 33, 34, 35, 40, 45, 50, 55, 60, 65, 70, 75, 80 85, 90, or greater than 90. For example, the dielectric constant of water is at or about 80.10. Polar solvents generally have high polarity indices, typically greater than at or about 3 (see, e.g., Snyder, (1974) *J. Chromatography A*, 92:223-230), such as at or about 3, 4, 5, 6, 7, 8 or 9 or greater than 9. Polar solvents generally have large dipole moments, typically greater than at or about 1.4 Debye, such as at or about, 1.4, 1.5, 1.6, 1.7, 1.8, 1.9, 2.0, 2.1, 2.2, 2.3, 2.4, 2.5, 2.6, 3.0, 3.5, 4 or greater than 4 Debye (see, e.g., "CRC Handbook of Chemistry and Physics," Lide, ed., $82^{nd}$ edition, CRC Press, 2001, p. 15(14)-15(18)). Other methods of assessing solvent polarity are known in the art, including, but not limited to, the Kosower Z scale (Kosower, "An introduction to physical organic chemistry," Wiley, 1969, p. 293), the donor number and donor acceptor scale (Gutmann, 1976 *Coord. Chem. Rev.*, 18:225-255), and the Hildebrand solubility parameters (see, e.g., Giddings et al., 1968 *Science*, 162:67-73, 1968).

Polar solvents include polar protic solvents and polar aprotic solvents. A polar protic solvent (e.g., water, methanol, ethanol) contains a hydrogen atom attached to an electronegative atom, such that the hydrogen has a proton-like character and/or the bond between the hydrogen and electronegative atom is polarized. Polar aprotic solvents, on the other hand, (e.g., acetone, acetonitrile), generally do not contain positively polarized hydrogen atoms.

The polar solvents in the provided compositions typically are polar protic solvents, including, but not limited to, water; alcohols, including, but not limited to, dihydric alcohols (e.g., glycols, e.g., propylene glycol, ethylene glycol, tetraethylene glycol, triethylene glycol, trimethylene glycol), which contain two hydroxyl groups, trihydric alcohols (e.g., glycerin, butane-1,2,3-triol, pentane-1,3,5-triol, 2-amino-2-hydroxymethyl-propane-1,3-diol), which contain three hydroxyl groups, monohydric alcohols (e.g., methanol, ethanol, propanol, isopropanol, n-butanol and t-butanol) and other alcohols; and acids, including but not limited to acetic acid and formic acid. Other polar solvents include, but are not limited to, acetone, acetonitrile, butyl acetate, dimethylformamide, dimethyl sulfoxide, dioxane, ethyl acetate, tetrahydrofuran and hexamethylphosphoric triamide. Typically, the polar solvent is water, or is an alcohol that typically contains two or more hydroxyl groups, such as a trihydric or dihydric alcohol, such as, but not limited to, glycerol and propylene glycol. The polar solvents further include low molecular weight polyethylene glycols (PEGs), such as PEGs having a molecular weight not more than at or about 600 daltons, such as between at or about 200 daltons and at or about 600 daltons, typically not more than at or about 400 daltons, for example, not more than 200 daltons.

Exemplary concentrates provided herein also include those containing a mixture of one or more polar solvents, selected from among, but not limited to, water, propylene glycol, ethylene glycol, tetraethylene glycol, triethylene glycol, trimethylene glycol, methanol, ethanol, propanol, isopropanol, n-butanol and t-butanol, other alcohols, acids, including but not limited to acetic acid and formic acid, acetone, acetonitrile, butyl acetate, dimethylformamide, dimethyl sulfoxide, dioxane, ethyl acetate, tetrahydrofuran and hexamethylphosphoric triamide. In the compositions provided herein, mixtures of one or more solvents typically include water and glycerin, or water and propylene glycol, or glycerin and propylene glycol.

In one example, the polar solvent has a dielectric constant greater than at or about 15, and typically between at or about 20 and at or about 80, such as at or about 80.1, 46.53, or 28.67. In another example, the polar solvent has a polarity index between at or about 3 and at or about 9. In another example, the dipole moment of the polar solvent is between 1.5 and 3, and typically between at or about 1.8 and 2.8, such as 1.9, 2.6, and 2.2 (for dielectric constants of solvents, see, for example, Landolt-Bornstein, New Series IV/17, Static Dielectric Constants of Pure Liquids and Binary Liquid Mixtures, Springer, 2008; and CRC Handbook of Chemistry and Physics," Lide, ed., 82$^{nd}$ edition, CRC Press, 2001; for dipole moment of solvents, see, for example, CRC Handbook of Chemistry and Physics," Lide, ed., 82$^{nd}$ edition, CRC Press, 2001) and for polarity indices of solvents, see, for example, Snyder, 1974 *J. Chromatography A*, 92:223-230).

The total amount of the polar solvent typically is, for example, within a concentration range of between 30% or about 30% and 85% or about 85%, by weight (w/w), of the concentrate, for example, between 30% or about 30% and 80% or about 80%, between 30% or about 30% and 75% or about 75%, between 30% or about 30% and 70% or about 70%, between 30% or about 30% and 65% or about 65%, between 30% or about 30% and 60% or about 60%, between 30% or about 30% and 55% or about 55%, between 35% or about 35% and 85% or about 85%, between 35% or about 35% and 80% or about 80%, between 35% or about 35% and 75% or about 75%, between 35% or about 35% and 70% or about 70%, between 35% or about 35% and 65% or about 65%, between 35% or about 35% and 60% or about 60%, between 35% or about 35% and 55% or about 55%, between 40% or about 40% and 85% or about 85%, between 40% or about 40% and 80% or about 80%, between 40% or about 40% and 75% or about 75%, between 40% or about 40% and 70% or about 70%, between 40% or about 40% and 65% or about 65%, between 40% or about 40% and 60% or about 60%, between 40% or about 40% and 55% or about 55%, between 45% or about 45% and 85% or about 85%, between 45% or about 45% and 80% or about 80%, between 45% or about 45% and 75% or about 75%, between 45% or about 45% and 70% or about 70%, between 45% or about 45% and 65% or about 65%, between 45% or about 45% and 60% or about 60%, between 45% or about 45% and 55% or about 55%, between 50% or about 50% and 85% or about 85%, between 50% or about 50% and 80% or about 80%, between 50% or about 50% and 75% or about 75%, between 50% or about 50% and 70% or about 70%, between 50% or about 50% and 65% or about 65%, between 50% or about 50% and 60% or about 60%, between 55% or about 55% and 85% or about 85%, between 55% or about 55% and 80% or about 80%, between 55% or about 55% and 75% or about 75%, between 55% or about 55% and 70% or about 70%, between 55% or about 55% and 65% or about 65%, between 55% or about 55% and 60% or about 60%, for example, 30% or about 30%, 31% or about 31%, 32% or about 32%, 33% or about 33%, 34% or about 34%, 35% or about 35%, 36% or about 36%, 37% or about 37%, 38% or about 38%, 39% or about 39%, 40% or about 40%, 41% or about 41%, 42% or about 42%, 43% or about 43%, 44% or about 44%, 45% or about 45%, 46% or about 46%, 47% or about 47%, 48% or about 48%, 49% or about 49%, 50% or about 50%, 51% or about 51%, 52% or about 52%, 53% or about 53%, 54% or about 54%, 55% or about 55%, 56% or about 56%, 57% or about 57%, 58% or about 58%, 59% or about 59%, 60% or about 60%, 61% or about 61%, 62% or about 62%, 63% or about 63%, 64% or about 64%, 65% or about 65%, 66% or about 66%, 67% or about 67%, 68% or about 68%, 69% or about 69%, 70% or about 70%, 71% or about 71%, 72% or about 72%, 73% or about 73%, 74% or about 74%, 75% or about 75%, 76% or about 76%, 77% or about 77%, 78% or about 78%, 79% or about 79%, 80% or about 80%, 81% or about 81%, 82% or about 82%, 83% or about 83%, 84% or about 84% or 85% or about 85%, by weight (w/w), of the composition. Exemplary of polar solvent concentrations in the provided liquid concentrates are 58.52%, 67.52%, 68.52%, 70.52%, 72.7% and 75.37% (w/w) of the composition. In one example, the concentration range of the polar solvent is between 40% or about 40% and 85% or about 85% (w/w) of the composition. In another example, the concentration range of the polar solvent is between 55% or about 5% and 80% or about 80% (w/w) of the composition.

In the provided methods for making the concentrates, the polar solvent (e.g., water, propylene glycol or glycerin) is added to the water phase. In one example, the polar solvent is water, e.g., deionized water or purified water, such as water that is purified prior to adding it to the concentrate formula, for example, by charcoal filter, ion exchange, reverse osmosis, UV sterilization and/or filtering using a filter, for example, a 50-100 micron filter. Typically, when a filter is used, it is an end point of use filter, which filters the water before it reaches the tank in the provided process. Alternatively, previously filtered water can be added to the concentrates.

e. Soluble Fiber

In one example, the compositions, including concentrates, such as liquid emulsion concentrates, dilution compositions containing the concentrates and compositions for direct consumption, further contain one or more soluble fibers. For example, the soluble fiber can be included to increase the stability of the liquid concentrate and additionally as a fiber additive. Exemplary soluble fiber that can be used in the provided concentrates include but are not limited to fructo-oligosaccharides, for example, inulins, for example, inulins found in chicory, Jerusalem artichoke, dahlia, garlic, leeks and onions, fructans and water-soluble soybean fiber. Exemplary of a soluble fiber that can be used in the provided concentrates is an inulin, for example, Oliggo-Fiber Instant Inulin (Fibruline® Instant) (supplied by Cosucra-Groupe Warcoing SA, Belgium, sold by Gillco Products, San Marcos, Calif.), containing chicory inulin.

Typically, the concentration of the soluble fiber is within a concentration range of between 0.5% or about 0.5% and 5% or about 5%, for example, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.03%, 2.1%, 2.2%, 2.3%, 2.4%, 2.5%, 2.6%, 2.7%, 2.8%, 2.9%, 3.0%, 3.5%, 4.0%, 4.5% or 5%, w/w, of the composition. For example, the concentration is within the concentration range of between 1% or about 1% and 3% or about 3%, w/w, of the composition.

f. Co-surfactants (Emulsifiers)

In one example, the compositions, including concentrates, such as liquid emulsion concentrates, dilution compositions containing the concentrates and compositions for direct consumption, further contain one or more co-surfactants (emulsifiers). For example, a co-surfactant can be included to improve emulsification of the active ingredient and/or the stability of the composition, for example, by preventing or slowing oxidation of the non-polar compound. Exemplary of a co-surfactant used in the provided concentrates is a phospholipid, for example, phosphatidylcholine.

Phospholipids

Exemplary of the co-surfactants that can be used in the provided compositions are phospholipids. Phospholipids are amphipathic lipid-like molecules, typically containing a hydrophobic portion at one end of the molecule and a hydrophilic portion at the other end of the molecule. A number of phospholipids can be used as ingredients in the provided compositions, for example, lecithin, including phosphatidylcholine (PC), phosphatidylethanolamine (PE), distearoyl-phosphatidylcholine (DSPC), phosphatidylserine (PS), phosphatidylglycerol (PG), phosphatidic acid (PA), phosphatidylinositol (PI), sphingomyelin (SPM) or a combination thereof. Typically, the phospholipid is phosphatidylcholine (PC), which sometimes is referred to by the general name "lecithin." Exemplary of the phospholipids that can be used as co-surfactants in the provided compositions are the phospholipids sold by Lipoid, LLC, Newark, N.J., for example, Purified Egg Lecithins, Purified Soybean Lecithins, Hydrogenated Egg and Soybean Lecithins, Egg Phospholipids, Soybean Phospholipids, Hydrogenated Egg and Soybean Phospholipids. Synthetic Phospholipids, PEG-ylated Phospholipids and phospholipid blends sold by Lipoid, LLC. Exemplary of the phosphatidylcholine that can be used as a co-surfactant in the provided compositions is the phosphatidylcholine composition sold by Lipoid, LLC, under the name Lipoid S100, which is derived from soy extract and contains greater than 95% or greater than about 95% phosphatidylcholine.

In one example, the phospholipid, for example, PC, represents less than or equal to 1% or about 1%, by weight (w/w), of the composition. In one example, the phosphatidylcholine represents between 0.1% or about 0.1% and 1% or about 1%, for example, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95 or 1%, per weight (w/w), of the composition. In one example, the phospholipid represents between 0.15% or about 0.15% and 0.7% or about 0.7%, by weight (w/w), of the composition.

g. Emulsion Stabilizers (Co-Emulsifier)

In one example, the provided compositions, including concentrates, such as liquid emulsion concentrates, dilution compositions containing the concentrates and compositions for direct consumption, further contain one or more emulsion stabilizers (co-emulsifiers) other than the modified food starch, which can be used to stabilize the liquid emulsion concentrate and/or the aqueous compositions containing the concentrates. In one example, the emulsion stabilizer increases the viscosity of the liquid concentrate. In one example, one or more emulsion stabilizers is added, during formulation, after evaluation of an initial concentrate, particularly if the oil and water phases of the initial concentrate (or the aqueous liquid dilution composition resulting from dilution of the initial concentrate) appear to be separating. Addition of the emulsion stabilizer can prevent separation of the oil and water phases.

Exemplary of an emulsion stabilizer that can be used in the provided compositions is a composition containing a blend of gums, for example, gums used as emulsifying agents, for example, a blend containing one or more of xanthan gum, guar gum and sodium alginate, for example, the emulsion stabilizer sold under the brand name SALADIZER®, available from TIC Gums, Inc. (Belcamp, Md.). Other gums can be included in the emulsion stabilizer, for example, gum acacia and sugar beet pectin. Other blends of similar gums can also be used as emulsion stabilizers.

The emulsion stabilizer can be added to the water phase, the oil phase, and typically to the water and the oil phase, during formation of the liquid concentrates. In one example, the emulsion stabilizer is added to the water phase at a concentration, such that it represents less than 1% or about 1 w/w of the liquid concentrate. In one example, the emulsion stabilizer is added to the water phase for a final concentration of between 0.1% or about 0.1% and 1% or about 1%, for example, 0.1%, 0.12%, 0.13%, 0.14%, 0.15%, 0.16%, 0.17%, 0.18%, 0.19%, 0.2%, 0.25%, 0.3%, 0.31%, 0.32%, 0.33%, 0.34%, 0.35%, 0.36%, 0.37%, 0.38%, 0.39%, 0.4%, 0.5%, 0.6%, 0.7%, 0.8%, 0.9% or 1% w/w of the composition. In one example, the emulsion stabilizer is added to the oil phase such that it represents less than 0.1% or about 0.1%, for example, between 0.01% or about 0.01% and 0.1% or about 0.1%, for example, 0.01%, 0.02%, 0.03%, 0.04%, 0.05%, 0.06%, 0.061%, 0.062%, 0.063%, 0.0635%, 0.07%, 0.08%, 0.09% or 0.1%, by weight (w/w), of the composition. In one example, the emulsion stabilizer is added to the water phase and the oil phase, for example, at a concentration within the oil and water phase concentration ranges listed above. In one such example, the emulsion stabilizer represents less than 1%, for example, between 0.01% or about 0.01% and 1% or about 1% (w/w), emulsion stabilizer, for example, 0.01%, 0.02%, 0.03%, 0.04%, 0.05%, 0.06%, 0.061%, 0.062%, 0.063%, 0.0635%, 0.07%, 0.08%, 0.09%, 0.1%, 0.12%, 0.13%, 0.14%, 0.15%, 0.16%, 0.17%, 0.18%, 0.19%, 0.2%, 0.25%, 0.3%, 0.31%, 0.32%, 0.33%, 0.34%, 0.35%, 0.36%, 0.37%, 0.38%, 0.39%, 0.4%, 0.5%, 0.6%, 0.7%, 0.8%, 0.9% or 1%, by weight (w/w), of the composition.

h. Preservatives and Sterilizers

In one example, the provided compositions, including concentrates, such as liquid emulsion concentrates, dilution compositions containing the concentrates and compositions for direct consumption, further contain one or more preservatives (or preservativers) and/or sterilizers. The preservative(s) can be included to improve the stability of the concentrate, and the compositions made by diluting the concentrate, over time. Preservatives, particularly food and beverage preservatives, are well known. Any known preservative can be used in the provided compositions. Exemplary of the preservatives that can be used in the provided compositions are oil soluble preservatives, for example, benzyl alcohol, Benzyl Benzoate, Methyl Paraben, Propyl Paraben, antioxidants, for example, Vitamin E, Vitamin A Palmitate and Beta Carotene. Typically, a preservative is selected that is safe for human consumption, for example, in foods and beverages, for example, a GRAS certified and/or Kosher-certified preservative, for example, benzyl alcohol.

The preservative typically represents less than 1%, less than about 1%, 1% or about 1%, by weight (w/w), of the composition or between 0.1% or about 0.1% and 1% or about 1%, by weight (w/w), of the composition, for example, 0.1%, 0.2%, 0.3%, 0.4%, 0.5%, 0.6%, 0.7%, 0.8%, 0.9%, 1%, about 0.1%, about 0.2%, about 0.3%, about 0.4%, about 0.5%, about 0.6%, about 0.7%, about 0.8%, about 0.9%, about 1%, by weight (w/w), of the composition.

i. Non-Polar Solvents

In one example, the compositions, including concentrates, such as liquid emulsion concentrates, dilution compositions containing the concentrates and compositions for direct consumption, further contain one or more non-polar solvents, for example, an oil. Typically, the non-polar solvent is included in the composition in addition to the non-polar active ingredient, and is used to dissolve the non-polar active ingredient. In one example, the solvent is an oil that is not contained in the non-polar active ingredient. When a non-polar solvent is included in the concentrate, it typically is used to dissolve the non-polar compound before mixing with the other ingredients, for example, before mixing with the other oil phase ingredients. In one example, use of a non-polar solvent reduces the crystal size and/or increase the clarity of the aqueous liquid dilution composition containing the diluted concentrate. Exemplary of non-polar solvents that can be used in the provided concentrates are oils (in addition to the non-polar active ingredient), for example, Vitamin E oil, oleic acid, flaxseed oil, CLA, Borage Oil, D-limonene, Canola oil, corn oil, MCT oil and oat oil. Other oils also can be used. Exemplary of the Vitamin E oil, used as a non-polar solvent in the provided compositions, is the oil sold by ADM Natural Health and Nutrition, Decatur, Ill., under the name Novatol™ 5-67 Vitamin E (D-alpha-Tocopherol; ADM product code 410217). This Vitamin E oil contains at least 67.2% Tocopherol and approximately 32.8% soybean oil.

Typically, the concentration of the non-polar solvent is within a concentration range of between 1% or about 1% and 10% or about 10%, for example, 1%, 1.5%, 2%, 2.5%, 3%, 3.5%, 4%, 4.5%, 5%, 5.5% or 6%, w/w, of the composition. For example, the concentration is within the concentration range of between 3% or about 3% and 6% or about 6%, w/w, of the composition.

j. Flavors

In one example, the compositions, including concentrates, such as liquid emulsion concentrates, dilution compositions containing the concentrates and compositions for direct consumption, further contain one or more flavors or flavoring agents, for example, any compound to add flavor to the concentrate and/or to the aqueous liquid dilution composition containing the diluted concentrate, for example, the food or beverage containing the concentrate. Several flavors are well known. Any flavor can be added to the concentrates, for example, any flavor sold by Mission Flavors, Foothill Ranch, Calif. Exemplary of flavors that can be used are fruit flavors, such as guava, kiwi, peach, mango, papaya, pineapple, banana, strawberry, raspberry, blueberry, orange, grapefruit, tangerine, lemon, lime and lemon-lime; cola flavors, tea flavors, coffee flavors, chocolate flavors, dairy flavors, root beer and birch beer flavors, methyl salicylate (wintergreen oil, sweet birch oil), citrus oils and other flavors. Typically, the flavors are safe and/or desirable for human consumption, for example, GRAS or Kosher-certified flavors. Exemplary of flavoring agents that can be used in the compositions are lemon oil, for example lemon oil sold by Mission Flavors, Foothill Ranch, Calif.; and D-limonene, for example, 99% GRAS certified D-Limonene, sold by Florida Chemical, Winter Haven, Fla. Typically, the flavor is added, using the provided methods, to the emulsion concentrates after combining the oil and water phases. Alternatively, flavor(s) can be added to the water and/or oil phase directly.

Typically, the concentration of flavoring agent added to the provided concentrates is less than 5% or about 5%, typically less than 1% or about 1%, for example, 0.1%, 0.2%, 0.3%, 0.4%, 0.5%, 0.6%, 0.7%, 0.8% or 0.9%, by weight, of the composition.

j. pH Adjusters

In one example, one or more pH adjusters is added to the provided compositions, including concentrates, such as liquid emulsion concentrates, dilution compositions containing the concentrates and compositions for direct consumption, typically to the emulsion that is formed after combining the water and oil phases according to the provided methods. In particular, the pH adjuster is used in compositions containing water. Alternatively, the pH adjuster can be added, at an appropriate concentration to achieve a desired pH, to the oil phase and/or the water phase. Typically, the pH adjuster is added to adjust the pH of the concentrate to within a range of 2.0 or about 2.0 to 4.0 or about 4.0. One or more of a plurality of pH adjusting agents can be used. Typically, the pH adjusting agent is safe for human consumption, for example, GRAS certified. Exemplary of a pH adjuster is citric acid, for example, the citric acid sold by Mitsubishi Chemical, Dublin, Ohio.

Typically, the concentration of pH adjuster added to the provided compositions is less than 5% or about 5%, typically less than 3.5% or about 3.5%, for example, 0.1%, 0.2%, 0.28%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.8%, 2.9%, 3.0%, 3.1%, 3.18%, 3.2%, 3.3%, 3.4% or 3.5%, by weight, of the composition.

l. Antifoaming Agents

In one example, an antifoaming agent is added to the provided compositions, including concentrates, such as liquid emulsion concentrates, dilution compositions containing the concentrates and compositions for direct consumption, typically to the water phase, or to the oil phase, or to the water phase or the oil phase according to the provided methods. In particular, an antifoaming agent is added to the water phase. Typically the antifoaming agent is added dropwise to the provided concentrate until a reduction in air bubbles is observed. More typically, about 1 drop of antifoaming agent is added per liter of concentrate. Any antifoaming agent can be used in the provided concentrates. Exemplary of an antifoaming agent that can be added is Tramfloc 1147, sold by Tramfloc Inc, Formey, Tex., containing an emulsion of polydimethylsiloxane fluid and amorphous silica.

m. Stabilizers

The compositions, including concentrates, such as liquid emulsion concentrates, dilution compositions containing the concentrates and compositions for direct consumption, provided herein can contain one or more stabilizers, or a stabilizing system. Typically, beverage compositions provided herein contain one or more stabilizers, or a stabilizing system. Stabilizers include any compound used to stabilize the non-polar compounds in the compositions. The stabilizer or stabilizing system can aid in retaining one or more organoleptic properties of the compositions, such as beverage compositions, for example the appearance, taste or odor. The beverage compositions provided herein containing nonpolar compounds and a stabilizer or stabilizing system can retain one or more organoleptic properties of the composition, such as the beverage composition, for a period of time after formulation, such as at or about 1, 2, 3, 4, 5, 6, or 7 days, at or about 1, 2, 3, 4, 5, 6, 8, 12, 18, 24, or 36 weeks, at or about 1, 2, 3, 4, 5, 6, 8, 12, 18, 24, or 36 months, or at or about 1, 2, 3, or 4 years. The stabilizers include, but are not limited to, carbonates and bicarbonates, acids, antioxidants, and any combination thereof. Typically the stabilizer or stabilizing system are food-approved, i.e., edible or ingestible, stabilizers, for example, stabilizers that are safe and/or approved for human consumption.

In general, the compositions contain more than one stabilizer. Typically, the total amount of stabilizers included in the provided compositions is less than 20% or about 20%, typically less than 10% or about 10%, for example, less than 20%, 15%, 10%, 5%, 4.5%, 4%, 3.5%, 3%, 2.5%, 2%, 1.5%, 1%, 0.5% or 0.1%, by weight, of the composition.

i. Bicarbonates or Carbonates

Exemplary of a stabilizer used in the provided compositions, such as beverage compositions, is a bicarbonate or carbonate, for example, any edible or food-approved bicarbonate or carbonate. Examples of suitable bicarbonates and carbonates include sodium bicarbonate, potassium bicarbonate, sodium carbonate, potassium carbonate, calcium carbonate, magnesium carbonate, zinc carbonate, and any combination thereof. In some examples, the carbonate or bicarbonate is a carbonated beverage, such as a soda, flavored soda, carbonated water or carbonated juice. Alternatively, the beverage can be carbonated by the addition of carbon dioxide. Additional suitable bicarbonates and carbonates for use in the provided beverage compositions will be apparent to those skilled in the art.

Typically, the amount of bicarbonate or carbonate used in the provided compositions, such as beverage compositions, is between or between about 0.01% and 7%, by weight, of the composition, for example, between at or about 0.01% and at or about 6%, between at or about 0.01% and at or about 5%, between at or about 0.01% and at or about 4%, between at or about 0.01% and at or about 3%, between at or about 0.01% and at or about 2%, between at or about 0.01% and at or about 1%, between at or about 0.1% and at or about 7%, between at or about 0.1% and at or about 6%, between at or about 0.1% and at or about 5%, between at or about 0.1% and at or about 4%, between at or about 0.1% and at or about 3%, between at or about 0.1% and at or about 2%, between at or about 0.1% and at or about 1%, between at or about 0.5% and at or about 7%, between at or about 0.5% and at or about 6%, between at or about 0.5% and at or about 5%, between at or about 0.5% and at or about 4%, between at or about 0.5% and at or about 3%, between at or about 0.5% and at or about 2%, between at or about 0.5% and at or about 1%, between at or about 1% and at or about 7%, between at or about 1% and at or about 6%, between at or about 1% and at or about 5%, between at or about 1% and at or about 4%, between at or about 1% and at or about 3%, between at or about 1% and at or about 2%, between at or about 2% and at or about 7%, between at or about 2% and at or about 5%, between at or about 2% and at or about 4%, between at or about 3% and at or about 7%, between at or about 3% and at or about 5%, between at or about 4% and at or about 7%, between at or about 6% and at or about 7%, between at or about 5% and at or about 7%, or between at or about 5% and at or about 6%, by weight, of the beverage composition. In some examples, the amount of bicarbonate or carbonate used in the provided compositions, such as beverage compositions, is less than 7% or about 7%, typically less than 5% or about 5%, for example at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.2%, 6.5%, 6.7%, or 7%, by weight, of the composition.

ii. Acids

In one example, the stabilizer used in the compositions, such as beverage compositions, contains one or more acids, for example, any compound added to the composition that can lower the pH of the composition. The acid can be, for example, an edible, ingestible or food-approved acid. Exemplary of suitable acids for use in the provided compositions are citric acid, phosphoric acid, adipic acid, ascorbic acid, lactic acid, malic acid, fumaric acid, gluconic acid, succinic acid, tartaric acid, maleic acid, and any combination thereof. In one example, the acid is citric acid.

Typically, the amount of acid added to the provided compositions, such as beverage compositions, is between or between about 0.01% and 5%, by weight, of the composition, for example, between at or about 0.01% and at or about 4%, between at or about 0.01% and at or about 3%, between at or about 0.01% and at or about 2%, between at or about 0.01% and at or about 1%, between at or about 0.1% and at or about 5%, between at or about 0.1% and at or about 4%, between at or about 0.1% and at or about 3%, between at or about 0.1% and at or about 2%, between at or about 0.1% and at or about 1%, between at or about 0.5% and at or about 5%, between at or about 0.5% and at or about 4%, between at or about 0.5% and at or about 3%, between at or about 0.5% and at or about 2%, between at or about 0.5% and at or about 1%, between at or about 1% and at or about 5%, between at or about 1% and at or about 4%, between at or about 1% and at or about 3%, between at or about 1% and at or about 2%, between at or about 2% and at or about 5%, between at or about 2% and at or about 4%, between at or about 2% and at or about 3%, between at or about 3% and at or about 5%, between at or about 3% and at or about 4%, or between at or about 4% and at or about 5%, by weight, of the composition. In some examples, the amount of acid added to the provided compositions is less than 5% or about 5%, typically less than 4% or about 4%, for example, at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9% or 5%, by weight, of the composition.

iii. Antioxidants

In one example, the stabilizer used in the compositions, such as beverage compositions, contain an antioxidant, for example, a molecule that is capable of inhibiting the oxidation of other molecules. Antioxidants may include molecules that scavenge free radicals. Suitable antioxidants include those that are used as ingredients in dietary supplements. The antioxidant can be a natural antioxidant or a synthetic antioxidant.

Examples of antioxidants include, but are not limited to hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, vitamins and vitamin cofactors, such as vitamin A, vitamin C, vitamin E, vitamin E phosphate and ubiquinone (ubidecarenone, coenzyme Q, coenzyme Q10), ascorbic acid, citric acid, rosemary oil, minerals, such as mineral selenium and manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gulamine, oxalic acid, tocopherol-derived compounds, di-alpha-tocopheryl phosphate, tocotrienols, butylated hydroxyanisole, butylated hydroxyoluene, ethylenediaminetetraacetic acid, tert-butylhydroquinone, acetic acid, pectin, tocotrienol, tocopherol, coenzyme Q10 (CoQ10), zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms theaflavin and its gallate forms, thearubigins, isotlavone phytoestrogens, genistein, daidzein, glycitein, anythocyanins, cyaniding, delphinidin, malvidin, pelargonidin and peonidin. In one example, the antioxidant is vitamin C. In another example, the antioxidant is a coenzyme Q-containing compounds, such as ubiquinone (ubidecarenone, coenzyme Q, coenzyme Q10).

Typically, the amount of antioxidant added to the provided compositions, such as beverage compositions, is between at or about 0.01% and at or about 3%, for example, between at or about 0.01% and at or about 2.5%, between at or about 0.01% and at or about 2%, between at or about 0.01% and at or about 1.5%, between at or about 0.01% and at or about 1%, between at or about 0.01% and at or about 0.5%, between at or about 0.05% and at or about 3%, between at or about 0.05% and at or about 2.5%, between at or about 0.05% and at or about 2%, between at or about 0.05% and at or about 1.5%, between at or about 0.05% and at or about 1%, between at or about 0.05% and at or about 0.5%, between at or about 0.1% and at or about 3%, between at or about 0.1% and at or about 2.5%, between at or about 0.1% and at or about 2%, between at or about 0.1% and at or about 1.5%, between at or about 0.1% and at or about 1%, between at or about 0.1% and at or about 0.5%, between at or about 0.5% and at or about 3%, between at or about 0.5% and at or about 2.5%, between at or about 0.5% and at or about 2%, between at or about 0.5% and at or about 1.5%, between at or about 0.5% and at or about 1%, between at or about 1% and at or about 3%, between at or about 1% and at or about 2.5%, between at or about 1% and at or about 2%, between at or about 1% and at or about 1.5%, between at or about 1.5% and at or about 3%, between at or about 1.5% and at or about 2.5%, between at or about 1.5% and at or about 2%, between at or about 2% and at or about 3%, between at or about 2% and at or about 2.5%, between at or about 2.5% and at or about 3%, by weight, of the composition. In some examples, the amount of antioxidant added to the provided compositions is less than 5% or about 5%, typically less than 3% or about 2%, for example, at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9% or 3.0%, by weight, of the composition.

n. Sweeteners

In one example, one or more sweeteners are added to the compositions, such as the beverage compositions or compositions for direct ingestion, at an appropriate concentrate to achieve a desired level of sweetness. Sweeteners are well known. Typically, the sweeteners are safe and/or desirable for human consumption, for example, GRAS or Kosher-certified sweeteners. Exemplary sweeteners that can be used in the provided beverage compositions are sucralose, such as Sucralose FCC VI Grade, manufactured by Changzhou Tianhua Imports & Exports Co., Ltd, sold by Ausvita, stevia, such as Stevia Leaf Powder Extract, Product code STE091 sold by MiniStar International Inc., and Xylitol, sold by Nutra Food Ingredients. Additional sweeteners that can be used in the provided beverage compositions include, but are not limited to, sucrose, lactose, fructose, an acesulfame salt, aspartame, saccharin, stevia, stevioside, and combinations thereof.

C. Methods for Making Compositions Containing Non-Polar Compounds

Also provided are methods for making the compositions, including concentrates, such as liquid emulsion concentrates, dilution compositions containing the concentrates and compositions for direct consumption. General equipment and steps of the methods are detailed below. In one example, the general methods for making the concentrates are performed using a bench-top manufacturing process, which is used for making relatively smaller-sized batches of the concentrates. In another example, the general methods for making the concentrates are performed using a scaled-up manufacturing processes, which is used for making relatively larger batches of the concentrates. The bench-top process can be scaled up to the scaled-up process. Any composition made using the bench-top method can be made using the scaled-up process, by scaling up the method.

1. Equipment for Making the Compositions

Various equipment, for example, vessels for mixing the oil phase, water phase and emulsion, for example, tanks; scales; mixers, including standard mixers and homogenizers; heating and cooling apparatuses, including water jacketed tanks, hot plates, water baths and chillers (coolers), including recirculating coolers; transfer apparatuses, for example, transfer means, for example, pumps, hoses, sanitary fittings; ball valves; purifiers, for example, filters, for example, carbon filters, ion exchange equipment, reverse osmosis equipment, end-point filters and end product filters; evaluation means, for example, pH and temperature meters; and other equipment, is used in various steps of the provided methods for making the concentrates. The choice of equipment depends on a plurality of factors, including batch size and manufacturing process.

a. Scales

One or more scales are typically used to measure the ingredients before adding them to the appropriate vessel. Alternatively, the ingredients can be weighed in the vessel, for example, in a tank on top of a scale.

Any of a plurality of well-known, commercially sold scales can be used to weigh the ingredients. Choice of scale(s) can depend on a number of factors, including the mass of the final concentrate being made and the ingredient being weighed. In one example, multiple scales are used to weigh the various ingredients of the concentrate. In general, relatively larger capacity (weight) scale(s) are used in making larger batches of concentrate while relatively smaller capacity scale(s) are used in making smaller batches.

Exemplary of the scales used with the provided methods to weigh the ingredients are a Toledo Scale (Model GD13x/USA), a Sartorius Basic Analytical Scale (Model BA110S) which is a basic series analytical scale with a 110 g capacity and a resolution of 0.1 mg; and an OHAUS Scale (Model CS2000), which is a compact portable digital scale having a 2000 g capacity and a resolution of 1 g.

b. Purifiers, Including Filters

Purifiers, typically more than one purifier, for example, filters, are used in the provided methods to remove impurities in the ingredients prior to their addition to the concentrate and/or from the final concentrate and/or an intermediate phase of the concentrate. For example, when the polar solvent is water, the water typically is purified water. In one example, one or more purifiers, for example, carbon filters, ion exchange purifiers, reverse osmosis purifiers, and/or end point filters are used to filter water, for example, city water, prior to its addition to the water phase, for example, to remove impurities, for example, sediment, from the water.

Exemplary of the purifiers that can be used with the provided methods are filters, for example, 100 micron filters and carbon filters, which are filters that use activated carbon to remove impurities by chemical adsorption. Carbon filtering typically is used for water purification and is particularly effective at filtering out chlorine, sediment, volatile organic compounds and other impurities. Typically, the particles removed by carbon filters are between about 0.5 microns and about 50 microns. Other filters are well known and can be used with the provided methods.

Also exemplary of the purifiers that can be used in the provided methods are reverse osmosis purifiers, which use mechanical pressure to purify liquids, for example, water. In one example, the pressure forces the water through a semipermeable membrane to remove impurities.

Also exemplary of the purifiers that can be used in the provided methods are ion exchange purifiers, for example, an ion exchange purifier using a resin bed, for example, a zeolite resin bed, to replace salts, e.g., cations, for example, magnesium and calcium, with other cations, for example, sodium and potassium cations. Such purifiers can be purchased, for example, from Aquapure Filters, Clarkston, Mich.

In another example, an end product filter (e.g., a 100 micron FSI filter, Product Number BPEM 100-5GP) is used to filter any impurities out of the final product (e.g., the final liquid emulsion composition). Other filters are known and can be used with the provided methods.

c. Vessels for Mixing the Ingredients

One or more, typically two or more, vessels, for example, tanks, for example, water-jacketed tanks; pots; and/or beakers, for example, Pyrex® beakers, are used in the provided methods to contain the ingredient(s) of the liquid concentrates, for example, during mixing and/or heating or cooling. Typically, separate vessels (an oil phase tank and a water phase tank) are used for mixing and heating the ingredients of the oil phase and the water phase, prior to combining the two phases to form an emulsion. In another example, an additional vessel, for example, a holding and/or packaging tank, is used for holding and/or packaging the emulsion and/or for addition/mixing of additional ingredients to the emulsion.

A number of vessels are available for mixing ingredients. Typically, the vessels are cleaned, for example, rinsed, soaped and/or sanitized according to known procedures, prior to use and between uses.

In one example, typically used with the bench-top process, the vessel is a container, for example, a bench-top container, for example, flasks, beakers, for example, Pyrex® beakers, vials, measuring containers, bottles and/or other bench-top containers.

In another example, typically used with the scaled-up manufacturing process, the vessels are tanks, for example, water phase tanks, oil phase tanks and holding/packaging tanks. Typically, the tanks are equipped with one or more mixers, for example, a standard mixer and/or homogenizer, which are used to mix the ingredients added to the tank. In one example, the tank further is equipped with a heating and/or cooling device. For example, the tank can be a water-jacketed tank. The temperature of the water-jacketed tank is controlled through the water-jacket, for example, to heat the contents, for example, while mixing.

Exemplary of the tanks that can be used with the provided methods are water-jacketed tanks, for example, the Overly 550 Gallon water jacketed tank (Model 10576501G), which has a 550 gallon capacity and typically is used as a water-phase tank, the Schweitzers 450 gallon tank (Model #5214-C), which has a 450 gallon capacity and typically is used as an oil phase tank and the Royal 190 gallon water jacketed tank (Model 9977-5), which has a 190 gallon capacity and can be used as a water or oil phase tank when mixing smaller volumes. Other tanks are well known and can be used with the provided methods for mixing the concentrates, for example, the phases of the concentrates.

d. Mixers

Mixers are used in the provided methods to blend, mix and/or emulsify the liquid concentrates and/or various ingredients and/or phases of the liquid concentrates. In one example, the mixers are used to keep the ingredients and/or mixture circulating to maintain temperature, viscosity and/or other parameters of the mixture. Exemplary of the mixers that can be used in the provided methods are standard mixers, which can be used, for example, to mix the ingredients in the water and/or oil phases, to maintain a homogeneous mixture while heating. Exemplary of the standard mixers is a LIGHTNIN® mixer (LIGHTNIN, Rochester, N.Y.), for example, Model Numbers XJC117 and ND-2. In one example, the LIGHTNIN® mixers are fixed-mount, gear drive high-flow mixers, for use with closed tanks. Another example of a standard mixer is a mixer sold by IKA®, for example, overhead IKA® mixers, for example, model Nos. RW-14 Basic and RE-16S, which are laboratory stirrers and can be used to mix ingredients, for example, to generate the oil and water phases. In one example, the mixer(s) is/are attached to the vessels, for example, the tanks, for example, mounted or clamped onto the tanks, for example, the top of the tanks. In another example, the mixers are placed in the vessels for mixing.

Also exemplary of the mixers used with the provided methods are homogenizers (also called shears), which typically are used to form the emulsion by emulsifying the oil and water phases after they are combined. The homogenizers typically provide high shear dispersion of solids and emulsification of immiscible liquids at high shear rates. Exemplary of the homogenizers that can be used in the provided methods are high-shear homogenizers, for example, reversible homogenizers sold by Arde Barinco, Inc., Norwood, N.J., for example, Model CJ-50, which is a 3600 rpm mixer having a 6 inch rotor diameter, a top speed of 5575 ft/minute and an emersion depth of 33 inches and has six separate openings at the bottom and top, which concentrates the liquid into six chambers, reducing the surface volume and creating a shear effect; and Model CJ-4E, which is a 10,000 rpm mixer with fan-cooled motor, optimized for 1 to 5 gallon batch sizes, having a 1.875 inch rotor diameter, a top speed of 4920 rpm and an immersion depth of 16 inches. Other homogenizers, for example, other reversible homogenizers sold by Arde Barinco Inc., can be used with the provided methods.

In one example, the homogenizer is attached to the top of the vessel, for example, the tank, for example, by clamps or by channel locks and an electrical hoist. In another example, the homogenizer is placed in the vessel. The Arde Barinco reversible homogenizers contain axial flow impellers, which create two distinct mixing actions, depending on direction. Downward "vortex flow" pulls solids from top and bottom of the mixture, while upward "umbrella flow" controls mixing at the highest shear and recirculation rates without splashing or incorporation of air. The reversible homogenizers typically are equipped with an adjustable baffle plate, which can be adjusted to control the type of mixing, for example at different times during emulsification.

A number of additional mixers are well known and can be used with the provided methods. Exemplary of the mixers that can be used with the provided methods are shears, inline mixers/mixing, Ribbon, Plow/Paddle Blenders Forberg Mixers, Conveyors, Bag Dumps & Compactors, V-Blenders, Blade Mixers, Double Cone Mixers, Continuous Mixers, Speedflow Mixers, Batch Mixers, Double Ribbon Blenders, Paddle and Ribbon Mixers with Choppers, Plow Blenders/Turbulent Mixers, Fluidizing Forberg-Type Mixers, Air Mixers, Active Mixers, Passive Mixers, Top Entry Mixers, Side Entry Mixers, Static Mixers, Fixed Entry Mixers, Portable Mixers—direct and gear drive, Sanitary Mixers, Drum Mixers, Bulk Container (IBC) Mixers, Lab Stirrers, Variable Speed Mixers, dough mixer, vertical mixer, spiral mixer, twin arm mixer, fork mixer, double spiral mixer, all agitators, agitator mixers, Banbury Mixers, Rubber Mixers, Blondheim Mixers, Churn Mixers, Conical Mixers, Continuous Mixers, Disperser Mixers, Pan Mixers, Emulsifier Mixers, Hobart Mixers, Liquifier Mixers, Littleford Mixers, Meat Mixers, Plow Mixers, Mixmuller Mixers, Nauta Mixers, Oakes Mixers, Planetary Mixers, Pony Mixers, PUG Mixers, Ribbon Mixers, Ross Mixers, Rotary Mixers, Sigma Mixers, Single Arm Mixers, Tote Bin Mixers, Tumble Mixers, Vacuum Mixers, Turbolizer Mixers, Twin Shell Mixers, V-Type Mixers, Zig-Zag Mixers side arm mixers, hand-held mixers, stir rods, stir bars, magnetic mixers and overhead mixers, for example, mechanical and/or electric overhead mixers.

e. Heating Apparatuses

One or more, typically more than one, heating apparatuses are used in the provided methods to control the temperature of the ingredients, phases and/or concentrate, typically while mixing.

In one example, the heating apparatuses are water-jackets. In this example, the vessels used to mix the ingredients and/or emulsify the phases are water jacketed tanks. The water jacket can be controlled, for example, using a control panel, to adjust the temperature of the contents of the vessel.

Alternatively, other heating apparatuses can be used to heat the ingredients, phases, and/or concentrates. Exemplary of heating apparatuses that can be used with the provided methods are immersible and/or submersible heaters, for example, 12 KW or 13 KW sanitary heaters, which are food-grade heaters that are immersed into the tanks while mixing, typically for applications requiring high heat, for example, temperatures greater than 60° C. or about 60° C., or greater than 80° C. or about 80° C. Also exemplary of heating apparatuses are stoves, for example, propane stoves. Also exemplary of the heating apparatuses are hot plates, for example, the Thermolyne hot plate, model number 846925 and model number SP46615. Typically, the heater is capable of heating the mixture to between 45° C. or about 45° C. and 85° C. or about 85° C., for example, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84 or 85° C. Typically, the heater is capable of heating the mixture to 60° C. or about 60° C., for example, providing low heat.

f. Cooling Apparatuses

One or more cooling apparatuses can be used with the provided methods, for example, to cool the ingredients during mixing, for example, to chill the mixture while emulsifying the oil and water phases. Exemplary of the cooling apparatuses are chillers, for example, recirculating coolers, which can be attached to the vessel, for example, remotely or by a tank mounted in the cooler, to recirculate fluid from the tank, through the chiller and back to the tank, in order to rapidly cool and maintain the temperature of the mixture during mixing. Exemplary of an open-loop chiller that can be attached to the tank and used with the provided methods are chillers sold by Turmoil, West Swanzey, N.H., for example, open or closed-loop coolers, for example, model No. OC-1000 RO. Other cooling apparatuses are well known and can be used with the provided methods.

Also exemplary of the cooling apparatuses are water baths and ice baths, for example, water baths and/or ice baths in which the vessel(s) are placed, for example, during homogenizing.

Typically, the cooling apparatus can be used to cool the liquid to between 25° C. or about 25° C. and 45° C. or about 45° C., for example, 25, 26, 27, 28, 29, 30, 31, 32, 33, 34, 35, 36, 37, 38, 39, 40, 41, 42, 43, 44 or 45° C., typically between 25° C. and 43° C., typically between 35° C. and 43° C., for example, 26.5° C. Typically, the cooling is rapid cooling, for example, cooling to between 25° C. or about 25° C. and 45° C. or about 45° C., for example, between 35° C. and 43° C., for example, 26.5° C., in between 15 minutes or about 15 minutes and 2 hours or about 2 hours, typically, between 30 minutes or about 30 minutes and 60 minutes or about 60 minutes, for example, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 minutes.

g. Transfer Means

Transfer means are used with the provided methods to transfer liquid from one vessel to another vessel, for example, to transfer the contents of one or more vessels to one or more other vessels, for example, to transfer the water phase to the oil phase vessel (e.g., the oil phase tank) or to transfer the oil phase to the water phase vessel (e.g., the water phase tank), in order to form the emulsion. Exemplary of the equipment used for the transfer means are transfer pumps and associated accessories, for example, ball valves, sanitary fittings (for example, sanitary fittings sold by Granger, Inc., Lake Forrest, Ill.) and transfer hoses (for example, hoses sold by Sani-Tech West, Oxnard, Calif.), for example, food grade hoses attached to the transfer pumps. Exemplary of the transfer pumps that can be used with the provided methods is the Teel Pump (Model 2P377B), Grainger, Inc. Lake Forest, Ill., a self-priming pump having a power rating of 2 HP, 60 Hz voltage 208-230/460 AC, speed of 3450 rpm. Other pumps, for example, other self-priming pumps from Grainger, Inc., can be used as part of the transfer means in the provided methods. Alternatively, transfer means can include means for manually transferring the liquid to another vessel, for example, by pouring, pipetting and/or other well-known methods of manually transferring liquids.

h. Evaluation Equipment

Evaluation equipment is used to evaluate one or more properties of the compositions, for example, the phases of the compositions and/or the final concentrates. For example, evaluation equipment can be used to measure one or more parameters of the concentrates and/or the phases, for example, the temperature and the pH of the liquids. Exemplary of the evaluation equipment are pH meters and temperature meters. Exemplary of the pH/temperature meters is the pH and temperature meter sold by Hanna Instruments, (model number HI 8314), which can be used to measure the temperature and the pH of the mixture(s). Also exemplary of temperature meters are temperature probes, for example, digital and/or water-proof temperature probes, for example, temperature probes sold by Cooper-Atkins, Middlefield, Conn., for example, the digital waterproof temperature probe (Model # DPP400W) from Cooper-Atkins. Other evaluation equipment for evaluating liquids and/or emulsions is well known and can be used with the provided methods.

2. General Methods for Making Compositions

In general, the methods useful for making the compositions provided herein are performed by generating an oil phase and generating a water phase (for the liquid nanoemulsion concentrates) and combining (e.g., using a transfer device) and mixing the phases to form emulsions. The oil and water phases typically are generated in separate vessels. The vessels can be, for example, tanks. Generation of the water phase and generation of the oil phase can be performed simultaneously or sequentially, in any order. Typically, both phases are heated to a desired temperature prior to combining the phases. For example, the phases can be heated to 60° C. prior to combining the phases. The provided methods can include additional steps. In some examples, the additional steps include evaluating properties of the products, adding additional ingredients (e.g., taste-modifying agents), packaging and/or filtering.

The provided methods can be performed using a bench-top manufacturing process (for small batch sizes) or performed using a scaled-up manufacturing process (for larger batch sizes). Each of the provided products can be made with either the bench-top or scaled up process. In one example, the product is first made with the bench-top process and then the method is scaled up to make larger quantities of the product.

The bench-top process can be performed on a bench, counter, table or any other suitable surface. Typically, the bench-top process is used to make emulsions having relatively smaller volumes than those made with the scaled-up process. For example, volumes less than 1 L or about 1 L, or less than 1 gallon or about 1 gallon, for example, less than or about 500 mL, for example, less than or about 1000 mL, 900 mL, 800 mL, 700 mL, 600 mL, 500 mL, 450 mL, 400 mL, 350 mL, 300 mL, 250 mL, 200 mL, 150 mL, 100 mL, or 50 mL or less, can be made using the bench-top process.

For the bench-top process, the equipment can be sufficiently compact to be used on a bench-top or other similar surface, and can be sufficiently compact to be moved, for example, lifted, by the artisan using the methods. For example, the vessels, such as water phase vessels, oil phase vessels, holding vessels, and packaging vessels, can be bench-top vessels. Exemplary bench-top vessels include, for example, flasks, beakers, vials, measuring containers, bottles and/or other bench-top containers. In some examples, the vessel in the bench-top process is a Pyrex® beaker.

Typically, the mixers for use in the bench-top processes of the provided methods are mixers that can be used in the bench-top vessels. Mixers that can be used in the bench-top vessels include, for example, standard mixers, such as hand-held mixers, stir rods, stir bars, magnetic mixers and overhead mixers, including, for example, mechanical and/or electric overhead mixers, and any other mixer that is suitable for use in the bench-top vessel. Exemplary standard mixers include those sold by IKA®, for example, overhead IKA® mixers, such as Model Nos. RW-14 Basic and RE-16S, which are laboratory stirrers and can be used to mix ingredients, such as to generate the oil and water phases. Suitable bench-top mixers also include homogenizers, for example, reversible homogenizers. An exemplary reversible homogenizer is the Arde Barinco reversible homogenizer, Model no. CJ-4E, which can be used to emulsify the phases.

Typically, the heating and cooling apparatuses are those that can be used with the bench-top vessels, such as hot plates, ice baths and/or water baths, into (or onto) which the vessels can be placed, for example, for rapid cooling. The evaluation device used in the bench-top process, for example, the temperature and/or pH meters, typically are capable of being placed in the bench-top vessels.

For the bench-top process, combining the oil and water phases typically is carried out manually, e.g., by pouring, pipetting and/or another manual transfer device.

The scaled-up manufacturing process of the methods typically is used to make products of relatively larger volumes, such as volumes greater than 1 L or about 1 L, or greater than 1 gallon (gal) or about 1 gallon. For example, volumes greater than or about 0.5 L, for example, greater than or about 0.5 L, 1 L, or 2 L, or greater than or about 1 gal, 2 gal, 3 gal, 4 gal, 5 gal, 6 gal, 7 gal, 8 gal, 9 gal, 10 gal, 11 gal, 12 gal, 13 gal, 14 gal, 15 gal, 16 gal, 17 gal, 18 gal, 19 gal, 20 gal, 21 gal, 22 gal, 23 gal, 24 gal, 25 gal, 26 gal, 27 gal, 28 gal, 29 gal, 30 gal, 40 gal, 50 gal, 60 gal, 70 gal, 80 gal, 90 gal, 100 gal, 150 gal, 200 gal, 250 gal, 300 gal, 350 gal, 400 gal, 450 gal, 500 gal, 550 gal, 600 gal, 650 gal, 700 gal, 800 gal, 900 gal, or 1000 gal or more, can be made using the scaled-up manufacturing process.

In general, equipment used for the scaled-up process is compatible with larger volume batches (batch sizes). For example, the vessels for use in the scaled-up processes can be tanks, for example, water-jacketed tanks, which are equipped with water jackets that can be used as, heating apparatuses to heat the oil and water phase ingredients during generation of the oil and water phases. The water jackets typically are controlled via control panels. The transfer device can include devices attached to and connecting the tanks, such as transfer pumps and associated fittings, for example, ball valves and hoses that are attached to the tanks. Mixers for use in the scaled-up process can be standard mixers, for example, mounted mixers, such as LIGHTNIN® mixers, e.g., Model Nos. XJC117 (a fixed-mount, gear drive high-flow mixer) and ND2.

Prior to beginning the methods, the water jacket lines on any water-jacketed oil phase and water phase tank can be bled. The water jacket switches can then be turned on to maintain a pressure in the water jackets of between at or about 20 psi and at or about 40 psi (pounds per square inch). If the pressure in the water jacket falls below 20 psi during the method, the line can be bled and checked for bubbles while purging the line.

a. Water Phase Ingredients

The water phase includes one or more polar solvents, such as water, diols, such as propylene glycol and sugar alcohols, such as glycerin, modified food starches, and, in some examples includes other water phase ingredients. Typically, water phase ingredients are hydrophilic and/or amphipathic ingredients of the liquid nanoemulsion concentrate. For example, oils and other lipophilic ingredients typically are not added to the water phase. Certain ingredients, for example, ingredients having hydrophobic and hydrophilic moieties, for example, modified food starches, surfactants and co-surfactants, can be added to either the oil or the water phase, or to the oil and the water phase. Exemplary water phase ingredients include, but are not limited to, polar solvents, e.g., water, typically filtered water, propylene glycol, glycerin and other diols; modified food starches; emulsion stabilizers; pH adjusters, for example, phosphoric acid and/or citric acid; flavors; surfactants; co-surfactants, for example, phosphatidylcholine and sucrose fatty acid esters; and preservatives.

Water phase ingredients can be added to the water phase simultaneously and/or sequentially, in a specific order. In one example, one or more water phase ingredients is added first and heated, prior to addition of further ingredient(s). In one example, when the water phase ingredients include a polar solvent and an modified food starch, these ingredients are added sequentially, in the following order: 1) polar solvent; 2) modified food starch. Alternatively, the water phase ingredients can be added in any other order.

b. Water Phase Production

Typically the water phase ingredients are weighed and/or measured, for example, using one or more scales (e.g., one or more of the scales described herein), before addition to the water phase vessel (e.g., any vessel described herein). In one example, the amount of each ingredient to be added to the water phase vessel is determined according to the provided methods for formulating the concentrates. Typically, the desired concentration, by weight (w/w), of the final emulsion concentrate is used to calculate the amount of each water phase ingredient that is added to the water phase vessel. Alternatively, the desired volume per weight, volume per volume or weight per volume can be used to calculate the correct amount of an ingredient to be measured and added to the vessel.

In one example, when water is the polar solvent, impurities in the water, for example, city water, are removed using one or more purifiers (e.g., one or more purifiers as described herein) above, before adding the water to the water phase tank. In one example, the water is purified by passage through using the following purifiers, sequentially: a carbon filter, an ion exchange purifier, a reverse osmosis purifier and an end-point filter, for example, a 100 micron end-point filter, before being added to the water phase vessel.

Typically, the water phase ingredient(s) are mixed in the water phase vessel using a standard mixer (e.g., any of the standard mixers described herein) and heated, typically simultaneously or, in part, simultaneously, using a heating apparatus (e.g., any of the heating apparatuses described herein). Typically, the water phase is heated such that the water phase ingredients reach a low heat temperature, for example, between or between about 45° C. or about 45° C. and 85° C. or about 85° C., for example, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84 or 85° C., typically, 60° C. or about 60° C., for example, to prevent oxidation of the non-polar ingredients and/or maintain the stability of the ingredients. In some examples, an antifoaming agent is added to the water phase to reduce air bubbles and lower viscosity. Typically, mixing and/or heating of water phase ingredients in the water phase vessel is continued, for example, prior to combining the water phase and the oil phase. In one example, the water phase is mixed and/or heated until the water phase ingredients have dissolved. Typically, the temperature of the water phase is maintained with mixing prior to combining the oil and water phases.

c. Oil Phase Ingredients

The oil phase includes the non-polar compound, for example, the non-polar active ingredient and, in some examples, other oil phase ingredients. Typically, oil phase ingredients include one or more lipophilic and/or amphipathic ingredients of the liquid emulsion concentrate. Oil phase ingredients typically do not include aqueous ingredients or hydrophilic ingredients. Certain ingredients, for example, ingredients having hydrophobic and hydrophilic moieties, for example, modified food starches, surfactants, co-surfactants and emulsion stabilizers, can be added to either the oil or the water phase, or to the oil and the water phase. Exemplary of ingredients used in the oil phase of the provided concentrates are non-polar compounds, for example, non-polar active ingredients, including any of the non-polar active ingredients provided herein; modified food starches; surfactants; pH adjusters, for example, phosphoric acid and/or citric acid; co-surfactants, for example, phosphatidylcholine and/or quillaja saponin; emulsion stabilizers, preservatives, and oils, for example, solvents and other oil phase ingredients. Typically, the oil phase contains at least one or more non-polar compounds, one or more emulsion stabilizers and one or more surfactants.

Oil phase ingredients can be added to the oil phase simultaneously and/or sequentially, for example, in any order or in a specific order. In one example, one or more oil phase ingredients is added first and heated, prior to addition of further ingredient(s). In one example, when the oil phase ingredients include a preservative, modified food starch, and a non-polar compound, these ingredients are added sequentially, in the following order: 1) preservative; 2) non-polar compound; and 3) modified food starch. In one example, when the oil phase ingredients include a surfactant, a preservative, modified food starch, and a non-polar compound, these ingredients are added sequentially, in the following order: 1) surfactant; 2) preservative; 3) non-polar compound; and 4) modified food starch. Alternatively, the oil phase ingredients can be added in a different order, for example, any order. Two or more oil phase ingredients can be added simultaneously. Typically, when the oil phase includes a surfactant, particularly when the surfactant is a surfactant that is solid at room temperature, the surfactant is the first oil phase ingredient added to the oil phase vessel.

d. Oil Phase Production

Typically the oil phase ingredients) are weighed and/or measured, for example, using one or more scales (e.g., one or more of the scales described herein), before addition to the oil phase vessel (e.g., any of the vessels described herein). In one example, the amount of each oil phase ingredient to be added is determined according to the provided methods for formulating the concentrates. Typically, the desired concentration, by weight (w/w), of the final emulsion concentrate is used to calculate the amount of each oil phase ingredient that should be added to the oil phase vessel. Alternatively, the volume per weight, volume per volume or weight per volume can be used to calculate the correct amount of an ingredient to be measured and added to the vessel.

Typically, the oil phase ingredients are mixed in the oil phase vessel using a standard mixer (e.g., any of the standard mixers described herein) and heated, typically simultaneously, using a heating apparatus (e.g., any of the heating apparatuses described herein). Typically, the oil phase is heated such that it reaches a low heat temperature, for example, between 45° C. or about 45° C. and 85° C. or about 85° C., for example, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84 or 85° C., typically 60° C. or about 60° C., for example, to prevent oxidation of the non-polar ingredients and/or maintain the stability of the ingredients. In one example, one or more of the oil phase ingredients are mixed and heated according to the provided methods, prior to addition of the rest of the oil phase ingredients. For example, the non-polar compound can be mixed and heated with one or more solvents, for example, an oil, for example, flaxseed oil, oleic acid and/or Vitamin E oil, until the non-polar compound is dissolved in the oil, prior to addition of the other oil ingredients. Typically, the oil phase ingredients are mixed in the oil phase vessel until dissolved. Typically, the temperature of the oil phase is maintained with mixing prior to combining the oil and water phases.

In some examples the oil and/or the water phase can be made in more than one vessel, for example, by mixing one or more of the oil phase ingredients in one vessel and mixing the one or more other oil ingredients in another vessel. In this example, the mixed oil phase ingredients in the separate vessels either can be mixed together prior to emulsifying with the water phase, or alternatively, can be added separately, during emulsification, to the water phase.

e. Combining Phases

After the oil phase and the water phase are generated, the phases can be combined, for example, by using transfer device, and mixed, e.g., homogenized, to form an emulsion. In one example, the oil phase is transferred from the oil phase vessel to the water phase vessel. In another example, the water phase is transferred from the water phase vessel to the oil phase vessel. In another example, the oil and water phases are transferred to another vessel, such as an emulsifying vessel.

Transfer device can include any device for transferring the contents of one vessel to another vessel, as described above. For example, suitable transfer device include transfer pumps and associated equipment, such as, but not limited to, combinations of sanitary fittings, hoses and/or ball valves; manual transfer device, for example, pouring and/or pipetting device; and any other suitable transfer device known to those of skill in the art. Typically, the phases are kept clean, e.g., sterile, during transfer. Sterility of the phases can be maintained, for example, by transfer device having sanitary fittings and/or by combining the phases in a sterile environment. In one example, the transfer device include a transfer pump, for example, a Teel pump (Model No. 2P377B; Granger, Inc.), sanitary fittings, transfer hoses, for example, food grade hoses, such as those sold by Sani-Tech West, and ball valves, which are attached to the tanks and connect the tanks.

Simultaneous with and/or subsequent to the combination of the phases, a mixer, for example, a homogenizer (e.g., a reversible homogenizer), can be used to emulsify the water and oil phases. In one example, a homogenizer, e.g., a homogenizer mounted on one of the tanks, is turned on, the ball valves are opened, and the transfer pump is turned on to effect transfer of the contents of one tank to another, for example, to transfer the contents of the oil phase tank to the water phase tank. As the phases are combined, they can be mixed by the homogenizer to form an emulsion. The position of the homogenizer in the tank can be adjusted, for example, by adjusting a baffle plate, e.g., moving the baffle plate further into/out of the mixture, in order to achieve and maintain the emulsion. Typically, the phases are homogenized (i.e., emulsified) by operating the mixer, e.g., homogenizer, at a speed sufficient to form an emulsion. In one example, the homogenizer is operated at a speed of between at or about 1000 and at or about 1500 rpm. Mixing typically is continued until the phases are combined, typically in an emulsion.

f. Cooling

The emulsion can be cooled during and/or after mixing to promote stability and emulsification, for example, by preventing or minimizing oxidization. The cooling can be rapid cooling and can be performed using one or more cooling apparatuses, for example, any of the cooling apparatuses described herein or any cooling apparatus known to those of skill in the art. Suitable cooling apparatuses for use with the methods include recirculating coolers and water and ice baths. An exemplary cooling apparatus is a recirculating cooler, such as those sold by Turmoil (Model No. OC-1000 RO; West Swanzey, N.H.). When the cooling apparatus is a recirculating cooler, fluid from the vessel containing the combined oil and water phases is circulated through the cooler, typically while mixing, and then back to the vessel, to rapidly cool and maintain the temperature of the mixture during mixing. Typically, the phases are mixed and cooled until the phases are emulsified and the temperature of the emulsification reaches between at or about 25° C. and at or about 43° C., typically between at or about 30° C. and at or about 35° C. For example, the emulsification can be cooled to a temperature of at or about 25° C., 26° C., 27° C., 28° C., 29° C., 30° C., 31° C., 32° C., 33° C., 34° C., 35° C., 36° C., 37° C., 38° C., 39° C., 40° C., 41° C., 42° C. or 43° C. Typically, when the cooling is rapid cooling, the temperature can be reached in less than or about 2 hours, typically less than or about 1 hour. For example, the emulsification can be cooled to the desired temperature, e.g., between at or about 25° C. and at or about 43° C., in at or about 30 minutes to at or about 60 minutes, such as in at or about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 minutes.

Cooling can be performed before or after additional steps, such as adding additional ingredients and/or evaluation of the product. In one example, the cooling is carried out after the addition of additional ingredients, for example, taste-modifying agents, and/or pH adjusting agents.

g. Filtration, Additions, Evaluation and Packaging

After combining the oil and water phases to form a mixture, i.e., emulsion, one or more additional steps can be carried out to modify, evaluate, analyze and/or package the product. Typically, taste-modifying agents are added to the emulsion, such as flavoring agents (e.g., flavoring agents that confer fruit flavors, such as peach, or other flavors, such as pina colada) and sweetening agents (e.g., sucralose). Other ingredients can be added, such as masking agents (e.g., NAT masking agent) and pH adjusting agents (e.g., acids, such as, but not limited to citric acid). The pH adjusting agent can be used to adjust the pH of the emulsion, for example, to a pH of between at or about 2 and at or about 5, e.g., to at or about 2 and at or about 3.5. Thus, the provided products typically have a pH of between at or about 2 and at or about 5, e.g., at or about 2 and at or about 3.5, such as a pH of at or about 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.

Before and/or after adding additional ingredients, the product can be evaluated, such as by measuring the pH and/or the temperature. Measurements can be taken using an instrument such as those described herein. In one example, additional ingredients (e.g., pH adjusters) are added based on information obtained by evaluating the product. The product can be analyzed and evaluated to verify and/or determine other properties of the product, for example, to verify that the product contains the appropriate amounts of the active ingredients and other ingredients. For example, the products can be evaluated to verify that microbial and heavy metal (e.g., arsenic, cadmium, mercury, lead and others) levels are within the acceptable range according to food and beverage standards. In one example, the acceptable microbial levels are not more than 1,000 cfu/g microbes (e.g., yeast, bacteria, mold and other microbes) and negative for *E. coli* and *Salmonella*. In another example, the acceptable heavy metal levels are not more than 10 ppm heavy metals and not more than 0.2 ppm lead and 2 ppm arsenic. When a standard exists for a particular amount and/or property, the amount/property is verified by tests in accordance with U.S. Pharmacopeia (USP) and/or AOAC (Association of Analytical Communities) standards. Samples can be analyzed in accordance with these standards by sending a sample of the product to a commercial testing facility, such as Eurofins U.S. (Des Moines, Iowa) or Advanced Botanical Consulting & Testing, Inc. (Tustin, Calif.), or any other facility that performs tests in accordance with these standards.

For example, the amount of some active ingredients, such as caffeine anhydrous, chromium picolinate and vitamin B12, typically is verified according to USP standards. The density and pH of the composition and the level of microbes, e.g., yeast, mold, *E. coli* and *Salmonella*, also typically are verified according to USP standards. The amount of fatty acids, e.g., coconut oil, can be verified according to AOAC standards, for example, by gas chromatography (GC), gas liquid chromatography (GLC) or other fatty acid profiling methods. The levels of heavy metals, such as lead and arsenic, are tested using inductively coupled plasma mass spectrometry (ICP-MS), or by sending a sample of the composition for testing to a testing facility, such as Eurofins U.S. (Des Moines, Iowa) or Advanced Botanical Consulting & Testing, Inc. (Tustin, Calif.), or any other facility capable of performing such tests. Additionally, Fourier transform infrared spectroscopy (FIIR) typically is used to obtain a fingerprint of the product, to verify that no other compounds except the desired ingredients are present in the product.

The emulsifications can be purified, for example, filtered, prior to use, using any of purification device described herein or any other suitable purification device. Water can be added in the case of evaporation, to bring the product up to the appropriate volume. HPLC, GC, GLC, FTIR and ICP-MS can be performed according to well-known methods (see, for example, Analytical Chemistry: An Introduction, 6th Ed., Douglas A. Skoog et al. (1994) Chapters 22 (FTIR) and 27 (GC/GLC, HPLC) and U.S. Pat. No. 6,265,717 (ICP-MS)).

After evaluation, purification, and/or addition of all the ingredients, the product can be packaged, for example, into large containers for storage or into smaller containers for administration, such as bottles or ampoules (as described below). The products can be transferred to the packaging containers using transfer device, such as transfer device described herein, including transfer pumps and fittings as described above or by manual transfer. For example, the product can be packaged for storage in containers, such as totes, e.g., 275 gallon totes (such as the 275 gallon bottle with a reconditioned CageTote tank IBC, Item No. REN275; Qualsery Enterprises, Inc. (www.qualservcontainer.com)), by transferring the mixture using a food grade hose (Sani-Tech® STHT-R-HD braid-reinforced heavy duty silicone hose; Sani-Tech West). After transfer, the tote can be closed and sealed, e.g., tied, such as with a cable tie.

h. Cleaning the Equipment

The equipment used in the provided methods can be cleaned prior to, and typically after, use. For example, the methods include cleaning all the equipment in a sink and/or rinsing the vessels, e.g., tanks, and hose lines. The tanks can be cleaned by filling with hot water, washing with soap and water, rinsing with water. The pH of the water can be checked before discharging the water from the vessel. The water can be adjusted to the desired pH, for example to a pH between 6 and 9, by adding a pH adjusting agent, such as soda ash, citric acid and/or $H_3PO_4$. After discharging the water from the vessel, the tanks can be sanitized, such as with isopropyl alcohol (IPA), and let dry.

3. Bench-Top Process

In one example of the provided methods for making the liquid emulsion concentrates, the steps of the methods are performed using a bench-top manufacturing process, which is performed on a bench, counter, table or other surface. Typically, the bench-top process is used to make emulsions having relatively smaller volumes than those made with the scaled-up process, for example, volumes less than 1 L or about 1 L or less than 1 gallon or about 1 gallon, for example, less than about 500 mL, for example, 1000, 900, 800, 700, 600, 500, 450, 400, 350, 300, 250, 200, 150, 100, 50, or less.

For the bench-top process, the equipment typically is sufficiently compact to be used on a bench top or other similar surface, typically sufficiently compact to be moved, for example, lifted, by the artisan using the methods. For example, the vessels, for example, water phase vessels, oil phase vessels, holding vessels, and packaging vessels typically are bench-top vessels, for example, flasks, beakers, vials, measuring containers, bottles and/or other bench-top containers. In one example, the vessel in the bench-top process is a Pyrex® beaker. Typically, the mixers are mixers that can be used in the bench-top vessels, for example, standard mixers, including hand-held mixers, stir rods, stir bars, magnetic mixers and overhead mixers, for example, mechanical and/or electric overhead mixers and/or other mixers that can be used in the vessels. Exemplary of appropriate bench-top mixers are standard mixers, for example, standard mixers sold by IKA®, for example, overhead IKA® mixers, for example, model Nos. RW-14 Basic and RE-16S, which are laboratory stirrers and can be used to mix ingredients, for example, to generate the oil and water phases. Also exemplary of appropriate bench-top mixers are homogenizers, for example, reversible homogenizers, including The Arde Barinco reversible homogenizer, Model No. CJ-4E, which can be used to emulsify the phases. Typically, the heating apparatuses are those that can be used with the bench-top vessels, for example, hot plates. The cooling apparatuses typically are apparatuses suited for use with the smaller bench-top vessels, for example, ice baths and/or water baths into which the vessels can be placed, for example, for rapid cooling. The evaluation means used in the bench-top process, for example, the temperature and/or pH meters, typically are capable of being placed in the bench-top vessels.

Generally, for the bench-top process, the oil phase and water phase are generated by mixing and heating in separate bench-top vessels, for example, flasks, beakers, vials, measuring containers, bottles and/or other bench-top containers. The mixing typically is performed using an appropriate bench-top mixer, for example, a standard mixer, such as a hand-held mixer, stir rod, stir bar, magnetic mixer and/or overhead mixer. Typically, heating the oil and water phases is performed using a heating apparatus appropriate to the bench-top method, for example, a heating apparatus that one or more of the vessels can be placed upon, for example, a hot plate. For combining the oil phase and the water phase, one or more phases, typically one phase, typically is transferred manually to another vessel, for example, by pouring, pipetting and/or another manual transfer means. For emulsifying the oil and water phases, a reverse homogenizer typically is used. For cooling the forming emulsion, for example, for rapidly cooling the emulsion, a cooling apparatus appropriate to the bench-top method typically is used, for example, a cooling apparatus that the vessel can be placed upon or inside, for example, a water bath or an ice bath.

4. Scaled-Up Manufacturing Processes

The provided methods for making the liquid emulsion concentrates can be performed using a scaled-up manufacturing process. A scaled-up manufacturing process typically is used when the liquid emulsion concentrate being made has a relatively larger volume than a concentrate being made with the bench-top process, for example, volumes greater than 1 L or about 1 L or greater than 1 gallon or about 1 gallon, for example, greater than about 500 mL, for example, at least 0.5 L, 1 L, 2 L, or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 150, 200, 250, 300, 350, 400, 450, 500, 550, 600, 650, 700, 800, 900, 1000, or more gallons.

In general, the scaled-up manufacturing processes are performed with equipment that is compatible with these larger volume batches (batch sizes). For example, the vessels used in the scaled up process typically are tanks, e.g., water jacketed tanks, which are equipped with water jackets that can be used as heating apparatuses to heat the oil and water phase ingredients during generation of the oil and water phases. The water jackets typically are controlled via control panels. Similarly, the transfer means used in the scaled-up process typically include transfer pumps and associated fittings, for example, ball valves and hoses. Exemplary of mixers that are used in the scaled-up process are standard mixers, for example, mounted mixers, for example LIGHTNIN® mixers, for example, Model XJC117, a fixed-mount, gear drive high-flow mixer, and Model ND2. An exemplary scaled-up process is described in this section, below. The provided methods for making the concentrates can be performed using this exemplary scaled-up process, or any variation of the scaled-up process, for example, eliminating one or more steps of the exemplary process, adding one or more steps according to the provided method, and/or substituting steps and/or equipment according to the methods provided herein.

This exemplary scaled-up process includes the following steps:

a. Water Purification

As noted herein, the polar solvent can include water (including purified water) and other polar solvents, e.g., glycerin and propylene glycol. For example, the polar solvent is water (e.g., city water), which is purified before addition to the water phase vessel by passing the water through the following purifiers, sequentially, in the following order: a carbon filter, ion exchange equipment, reverse osmosis equipment, a 100 micron end-point filter, and a 50 micron point-of-use filter.

b. Generation of the Water Phase and Oil Phase

As described above, for generation of the water phase, the polar solvent and any other water phase ingredients typically are weighed and/or measured, and added to the water phase vessel and mixed, using a standard mixer or other mixer, such as a homogenizer or other mixer described herein, and typically heated during mixing, whereby the water phase is generated with mixing and heating, typically to low heat (e.g., 60° C., 70° C., 71° C.), according to the provided methods. For example, in the scaled-up manufacturing process, the water phase vessel is a water phase tank, which is a water-jacketed tank. For example, the water phase ingredient(s) are mixed using a standard mixer, for example, a LIGHTNIN® mixer (for example, model no. XJC117, a fixed-mount gear drive high-flow mixer), attached to the tank, for example, mounted on the top of the tank. For example, the heating apparatus used to heat the water phase ingredients is the water jacket of the water jacketed tank; temperature on the water-jacket is controlled via a control panel.

As described above, for generation of the oil phase, the oil phase ingredients typically are weighed and/or measured, and added to the oil phase vessel and mixed, using a standard mixer or other mixer, such as a homogenizer or other mixer described herein, and typically are heated during mixing, whereby the oil phase is generated with mixing and heating, typically to low heat (e.g., 60° C.), according to the provided methods. In one example of the scaled-up manufacturing process, the oil phase vessel is a water-jacketed oil phase tank. For example, the oil phase ingredients are mixed using a standard mixer, for example, a LIGHTNIN® mixer (e.g., model ND2), attached to the oil phase tank, for example, mounted on the tank. The heating apparatus used to heat oil phase ingredients is the water jacket of the water-jacketed oil phase tank; temperature on the water-jacket is controlled via a control pane.

c. Combining and Emulsifying the Phases

As described herein, once the oil and water phases reach the desired temperature (e.g., 60° C., 70° C., 71° C. or other temperature), after oil phase and/or water phase ingredients have dissolved, and optionally after cooling one of the phases, e.g., cooling the water phase to 60° C. according to the provided methods, the oil and water phases are combined, via transfer, and emulsified, typically via homogenization. In one example, the transfer is carried out slowly to prevent clumping in the forming emulsion, such as by stopping the transfer periodically while continuing to mix the emulsion, or by combining the phases slowly with mixing. In one example of the scaled-up manufacturing processes, the combining of phases is effected by transferring the oil phase to the water phase vessel, via transfer means, which include a transfer pump (e.g., a Teel pump, model 2P377B, sold by Granger, Inc.), sanitary fittings, transfer hose(s) (e.g., food grade hoses sold by Sani-Tech West) and ball valve(s). Alternatively, the water phase can be transferred to the oil phase. For example, to begin the combining/emulsifying steps, a homogenizer (e.g., an Arde Barinco, Inc. reversible homogenizer), mounted on the water phase tank, is turned on, for example, at 850-1200 rpm. The ball valves then are opened and the transfer pump turned on, thereby effecting transfer of the oil phase liquid to the water phase tank via the transfer hose(s). As the phases are combined, the mixture is homogenized by continued mixing with the homogenizer.

In some examples of the scaled-up manufacturing process, to prevent clumping, the pump is periodically stopped (e.g., by turning off the pump), while continuing to mix with the mixer, during emulsification. In one aspect of this example, this method to prevent clumping is used when the polar solvent is a solvent other than water, such as propylene glycol or glycerin. During mixing, the homogenizer can be adjusted, for example, by adjusting the baffle plate on the homogenizer to achieve and maintain an emulsion, for example, by moving the baffle plate further into the forming emulsion and/or further out of the forming emulsion. In one example, the shear speed is adjusted to a speed where the oil phase can be seen coming out the top of the mixer. In one example, this adjustment is used when the polar solvent is a solvent other than water, such as propylene glycol or glycerin.

d. Cooling

As described herein, in some examples, the forming emulsion is cooled, typically rapidly cooled, during the emulsion step. In the scaled-up process, the rapid cooling typically is effected by repeatedly passing the forming emulsion through a recirculating cooler (e.g., Model No. OC-1000 RO, sold by Turmoil, West Swanzey, N.H.), which is attached to the water phase tank. Homogenization continues during the cooling step, for example, at between 850 and 1200 rpm. The cooling continues, for example, until the temperature of the emulsion reaches between at or about 25° C. and at or about 43° C., such as between at or about 25° C. and at or about 35° C., between at or about 35° C. and at or about 43° C., or at or about 40° C. Typically, the rapid cooling is carried out for between at or about 30 and at or about 60 minutes.

e. Additional Steps

As described herein, additional steps can be performed after the emulsion is formed. For example, in the scaled-up manufacturing process, the additional steps include transferring the emulsion, via transfer means, which include a transfer pump (e.g., a Teel pump, model 2P377B, sold by Grainger, Inc.), sanitary fittings, transfer hose(s) (e.g., food grade hoses sold by Sani-Tech West) and ball valve(s), to a holding/packaging tank. Transfer is performed by turning on the transfer pump and opening the ball valves. Additional ingredients can be added, for example, pH adjusters, for example, while monitoring pH, sufficient to bring the emulsion to an appropriate pH, for example, between about 2.0 and 3.0. Flavors can also be added. The additional ingredients are mixed into the concentrate using a standard mixer. The addition and mixing of additional ingredients, and/or evaluation can be performed in the holding/packaging tank; alternatively it can be performed prior to transfer to the holding/packaging tank, for example, in the water phase tank.

Variations of this exemplary scaled-up process also can be performed using the provided methods, including any of the variations described herein, to make the concentrates. For example, by elimination and/or modification of one or more steps and/or equipment, according to the general methods provided herein.

5. Methods for Making Food and Beverage Compositions Containing the Concentrates Also provided herein are methods for diluting the compositions, including concentrates, such as liquid emulsion concentrates, to make dilution compositions, typically, food or beverage dilution compositions, containing the non-polar compounds. Generally, the composition, including concentrates, such as liquid emulsion concentrates, is diluted into a variety of foods including, for example, solid or liquid foods or beverages, for example, dairy compositions, e.g., butter, milk, yogurt, and cheese, savory food compositions, sweet food compositions, frozen food, egg products, margarines, spreads, peanut butter, almond butter, sauces and dressings, e.g., mayonnaise, thousand island, ranch and tartar sauce, soups, dips, fillings for cakes and cookies, confections, whipped desserts, e.g., mousse, custard, chiffon, meringue, and whipped topping, frozen desserts, e.g., frozen yogurt and ice cream, candies, baby foods, e.g., infant formula, pet food or any other food product, or an aqueous medium, for example, a beverage, for example, water, flavored water, soda, milk, juices, including fruit juices, sauces, syrups, soups, sports drinks, fitness drinks, nutritional beverages, nutritional supplement, energy drinks, vitamin-fortified beverages, or any other beverage. More typically, the compositions are diluted into a variety of water-based foods and beverages including, but not limited to, tomato-paste based products, dairy-based products, creams, sauces, soups, pastes, dressings, water, flavored water, soda, milk, juices, including fruit juices, sauces, syrups, sports drinks, fitness drinks, nutritional beverages, nutritional supplement, energy drinks and vitamin-fortified beverages. The concentrate and the food or beverage can be mixed, for example, by stirring and/or blending or by any known mixing means. The concentrate disperses into the food or beverage to form a dilution composition, for example, a homogenous food composition or a clear or partially clear aqueous liquid dilution composition. The dilution composition can be evaluated, for example, to assess the stability, clarity, taste and/or smell of the composition.

In one example, the composition, such as the concentrate of emulsion concentrate, is incorporated directly and without further modification into the food or beverage by techniques such as mixing, infusion, injection, blending, immersion, spraying and kneading. In another example, the concentrate can be applied directly into a food or beverage by the consumer prior to ingestion. In one example, the liquid emulsion concentrate is diluted in the aqueous medium, for example, water by heating the aqueous medium, for example, by heating the aqueous medium, for example, to at least 40° C. or at least about 40° C., for example, 40, 41, 42, 43, 44, 45, 46, 47, 48, 49, 50 or more ° C., for example, 48.9° C. In this example, the liquid emulsion concentrate is added, at an appropriate dilution, as described herein, to the heated aqueous medium, and stirred until dispersed or dissolved in the solution. The resulting liquid dilution composition can then be cooled, for example, to room temperature, for example, 25° C. or about 25° C. Following dilution, a food or beverage dilution composition can be packaged, for example, by transferring to containers, for example, vials or containers. In one example, a portion of the dilution composition is transferred to a vial for analysis, for example, evaluation of properties, such as stability, clarity, turbidity, taste, smell, ringing, crystal formation and/or other properties.

Exemplary of equipment used for diluting the liquid emulsion concentrates to form the dilution compositions containing the diluted concentrates are beakers, for example, Pyrex® glass beakers, hot plates, for example, the Thermolyne hot plate, model number 846925 or model number SP46615, stir rods, temperature meters, for example, temperature probes, for example, Cooper Temperature Probes (model no. DPP400W) and scales, for example, the OHUAS 2.0 Kg scale (Model # CS2000) and/or the Sartorius Analytical Scale (model BA110S).

a. Dilutions

Typically, the provided concentrates can be diluted into a food or beverage to form dilution compositions over a wide range of dilutions. In one example, the concentrate can be diluted so that the food or beverage dilution composition contains between 0.05 g or about 0.05 g and 10 g or about 10 g, typically between 0.05 g and 5 g, of the liquid concentrate per serving of the food or beverage. For example, the concentrate can be diluted so that the aqueous liquid dilution composition contains 0.05 g, 0.06 g, 0.07 g, 0.08 g, 0.09 g, 0.1 g, 0.2 g, 0.3 g, 0.4 g, 0.5 g, 0.6 g, 0.7 g, 0.8 g, 0.9 g, 1 g, 2 g, 3 g, 4 g, 5 g, 6 g, 7 g, 8 g, 9 g, or 10 g of the concentrate per serving, about a serving, or at least a serving, for example 1, 2, 3, 4, 5, 6, 7, 8, 9, 10, 11, 12, 13, 14, 15, 16 or more, servings of a food or beverage, for example, 1 teaspoon (0.167 ounce, 4.725 g), 1 tablespoon (0.5 fluid ounce, 14.175 g), 2 tablespoons (1 fluid ounce, 28.350 g), 0.25 cup (2 fluid ounces, 56.699 g), 0.5 cup (4 fluid ounces, 113.398 g), 0.75 cup (6 fluid ounces, 170.097 g) or 1 cup (8 fluid ounces, 226.796 g) of the food or beverage.

In another example, the concentrate is diluted so that the food or beverage dilution composition contains between 1 mL or about 1 mL and 10 mL or about 10 mL of the liquid concentrate, for example, 1 mL, 2 mL, 3 mL, 4 mL, 5 mL, 6 mL, 7 mL, 8 mL, 9 mL or 10 mL of the concentrate, per serving, about a serving, or at least a serving, for example 1, 2, 3, 4, 5, 6, 7, 8, 9, 10, 11, 12, 13, 14, 15, 16 or more, servings of a food or beverage, for example, 1 teaspoon (0.166667 ounce, 4.725 g), 1 tablespoon (0.5 fluid ounce, 14.175 g), 2 tablespoons (1 fluid ounce, 28.350 g), 0.25 cup (2 fluid ounces, 56.699 g), 0.5 cup (4 fluid ounces, 113.398 g), 0.75 cup (6 fluid ounces, 170.097 g) or 1 cup (8 fluid ounces, 226.796 g) of the food or beverage.

In another example, the liquid concentrate is diluted so that the food or beverage dilution composition contains at least 10 mg or about 10 mg, typically at least 25 mg or about 25 mg, typically at least 35 mg, of the non-polar compound, for example, the non-polar active ingredient, per a serving, about a serving, or at least a serving; for example, 10, 11, 12, 13, 14, 15, 16, 17, 18, 19, 20, 21, 22, 23, 25, 25, 26, 27, 28, 29, 30, 31, 32, 33, 34, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000, 2500, 3000 mg, or more, of the non-polar compound per at least a serving, for example, 1 teaspoon (0.167 ounce, 4.725 g), 1 tablespoon (0.5 fluid ounce, 14.175 g), 2 tablespoons (1 fluid ounce, 28.350 g), 0.25 cup (2 fluid ounces, 56.699 g), 0.5 cup (4 fluid ounces, 113.398 g), 0.75 cup (6 fluid ounces, 170.097 g) or 1 cup (8 fluid ounces, 226.796 g), of the food or beverage.

For example, the liquid concentrate is diluted so that the food or beverage dilution composition contains between at or about 1.5 to at or about 3.0 grams (g) of omega-6 fatty acids per serving, between at or about 16 to at or about 220 milligrams (mg), for example, between at or about 32 to at or about 220 mg docosahexaenoic acid (DHA) and eicosapentaenoic acid (EPA) per serving, between at or about 100 and at or about 500 mg phytosterols per serving, between at or about 10 and at or about 200 mg, for example, between at or about 50 and at or about 200 mg Coenzyme Q10 per serving, between at or about 1 and at or about 20 mg beta carotene per serving, between at or about 1 and at or about 200 mg lutein, lycopene or zeaxanthin per serving, between at or about 40 and at or about 400 micrograms (mcg) Vitamin A per serving, or between at or about 400 and at or about 800 international units (IU) per a serving of a food or beverage, for example, 1 teaspoon (0.166667 ounce, 4.7249 g), 1 tablespoon (0.5 fluid ounce, 14.1747 g), 2 tablespoons (1 fluid ounce, 28.3495 g), 0.25 cup (2 fluid ounces, 56.6990 g), 0.5 cup (4 fluid ounces, 113.398 g), 0.75 cup (6 fluid ounces, 170.097 g) or 1 cup (8 fluid ounces, 226.796 g), such as 8 ounces of a beverage.

b. Analyzing the Dilution Compositions Containing the Liquid Concentrates

Properties of the dilution compositions containing the liquid concentrates can be evaluated using a number of different evaluation means. For example, the stability, for example, lack of oxidation, "ringing," precipitation, flocculation, creaming and/or visible phase separation, over time; clarity; desirability for human consumption, for example, pleasant taste, and/or smell, for example, lack of "fishy" taste/smell, lack of "ringing" and lack of crystal formation; and safety for human consumption, can be evaluated. Several of these properties can be evaluated empirically, for example, by observing the liquids immediately or over time, or by smelling and/or tasting the liquids. In one example, after evaluation of an aqueous liquid dilution composition, the concentrates are re-formulated to adjust one or more parameters. In another example, the dilution factor can be adjusted. Such methods are described in section B.1.b.i. above.

The following examples are included for illustrative purposes only and are not intended to limit the scope of the invention.

D. Examples

Example 1

Liquid Nanoemulsion Concentrates Containing a Modified Food Starch

Liquid nanoemulsion concentrates containing a modified food starch were prepared according to the method described below using a bench-top process. The concentrates contained between 5.65% and 11.5%, by weight, one or more non-polar compounds that contain one or more non-polar active ingredients. Before adding to the appropriate phase, as described below, the correct amount of each ingredient (as indicated in Tables 2-5) was weighed out using either a Sartorius Basic Analytical Scale (Model No. BA110S) or a CTS 6000 Scale (Model No. CTS-6000). Liquid ingredients were weighed in containers, while dry ingredients were weighed in bags.

A. Production of the Liquid Nanoemulsion Concentrates

1. Production of the Water Phase:

The water phase was prepared in a 1500 mL Pyrex beaker. The appropriate amount of deionized water was added to the beaker. The switch controlling the pump and UV sterilizer was then turned off.

The beaker containing the water (or other polar solvent) was placed onto a Thermolyne hot plate (Model No. SP46615). An Arde Barinco reversible homogenizer (Model No. CJ-4E; Arde Barinco, Inc., Norwood, N.J.) was immersed in the water and turned on, using the "forward" setting, at a speed of 30 rpm. The water phase was then heated to 60° C. using the Thermolyne hot plate while mixing at 30 rpm. The Arde Barinco mixer was then raised and switched to the "reverse" setting to create a vortex.

The indicated amount of modified food starch was added to the water phase beaker at 60° C. Mixing was continued at 60° C. until the food starch was mostly dispersed in the water phase. Mixing continued until the water phase was ready to be combined with the oil phase. Temperatures were measured with a pH and temperature meter (Hanna Instruments, Model No. HI 8314).

2. Production of the Oil Phase:

The oil phase was prepared in a 1500 mL Pyrex beaker. The indicated amount of benzyl alcohol was added to the oil phase beaker and heated to 60° C. using a Thermolyne hot plate while mixing with an IKA Mixer (Model No. RE16 S1). After the benzyl alcohol was heated to 60° C., the indicated amount of non-polar compound(s) and other "oil phase" ingredients, including additional modified food starch, were added and mixed with the IKA Mixer at 60° C. until ready to combine with the water phase. Temperatures were measured with a pH and temperature meter (Hanna Instruments, Model No. HI 8314).

3. Combining the Water and Oil Phases

Once the water phase and oil phase were prepared and at 60° C., the Arde Barinco homogenizer was turned on the "forward" setting at 30 rpm in the water phase beaker and the oil phase was transferred to the water phase beaker by slowly and consistently pouring from the top. Mixing with the homogenizer at 30 rpm continued until the phases had combined.

The ingredients were mixed and cooled in a water bath until the mixture reached 50° C. The indicated amount of pH adjuster was then added and the mixture was continuously mixed at 30 rpm using the Arde Barinco mixer on "forward" and further cooled to 30° C. The mixture was then filtered through a 100-200 micron filter. Additional water was added to account for any evaporation that had occurred during the process. Temperatures and pH were measured with a temperature and pH meter (Hanna Instruments, Model No. HI 8314). The pH of each mixture was measured to confirm a pH of between 2.60 and 3.20.

4. Analysis and Packaging

The resulting concentrates were analyzed to verify that the specified amounts of active and other ingredients were present and that the levels of microbiologicals and heavy metals were in accordance with standards, as described herein. USP standard testing by Eurofins U.S. (Des Moines, Iowa) verified that the products contained not more than 1,000 cfu/g microbes and were negative for *E. coli* and *Salmonella*; ICP/MS testing by Eurofins U.S. verified that the products contained not more than 10 ppm heavy metals, not more than 0.2 ppm lead and not more than 2 ppm arsenic. Fourier transform infrared spectroscopy (FTIR) was used to obtain a fingerprint of the product which was then compared to high performance liquid chromatography (HPLC) standards, to verify that no other compounds except the desired ingredients were present in the product.

B. Liquid Nanoemulsion Concentrate Ingredients

A series of liquid nanoemulsion concentrates (1A-1D) were prepared according to the procedure described above in either 150 or 300 g batches. Tables 2-5 below indicate the amount (in mg) of each ingredient contained per 1 mL serving of each liquid nanoemulsion concentrate and the percentage by weight (wt %) and amount (g) of each ingredient per batch. The column labeled "phase" indicates to which phase of the production process (described above) each ingredient was added. "Water" indicates that a particular ingredient was added during production of the water phase, "oil" indicates the ingredient was added during production of the oil phase and "emulsion/flavor" indicates the ingredient was added during or after mixing of the water and oil phases.

The liquid nanoemulsion concentrates included:

a modified food starch based on waxy maize, sold under the name N-Creamer 46, available from Ingredion (Westchester, Ill.);

a natural (GRAS-certified) preservative, benzyl alcohol;

a pH adjuster, citric acid;

a polar solvent, deionized water; and one or more non-polar compounds that included:

a fish oil that contained 2% EPA and DHA, sold as ONC TG fish oil by Ocean Nutrition Canada (Dartmouth, Nova Scotia);

vitamin D3 in corn oil (100,000 IU), such as the vitamin D3 sold by DSM Nutritional Products (Parsippany, N.J.); and a conjugated linoleic acid (CLA) that contains 74.5% CLA (Clarinol® CLA, Stepan Lipid Nutrition, Maywood, N.J.).

Ingredients marked with a * were added in the indicated amount of overage to ensure the final composition contained the stated amount of this ingredient.

TABLE 2

Liquid nanoemulsion concentrate 1A containing 8.75% ONC fish oil with 2% DHA/EPA (5% overage)

| Ingredient | mg/1 mL serving | Phase | wt % of composition | g/batch |
|---|---|---|---|---|
| Water (polar solvent) | 1445.40 | Water | 72.70 | 108.405 |
| N-Creamer 46 (modified food starch) | 264.0 | Water | 13.20 | 19.80 |
| ONC Fish oil* (non-polar compound) | 175 | Oil | 8.75 | 13.1 |
| Benzyl alcohol (preservative/natural flavor) | 10.00 | Oil | 0.50 | 0.8 |
| N-Creamer 46 (modified food starch) | 100.00 | Oil | 5.00 | 7.500 |
| Citric acid (pH adjuster) | 5.60 | Emulsion/Flavor | 0.2800 | 0.4200 |
| Totals | 2000.00 | | 100.000 | 150 |

TABLE 3

Liquid nanoemulsion concentrate 1B containing 10.5% vitamin D3 (100,000 IU/g)

| Ingredient | mg/1 mL serving | Phase | wt % of composition | g/batch |
|---|---|---|---|---|
| Water (polar solvent) | 1410.40 | Water | 70.520 | 211.56 |
| N-Creamer 46 (modified food starch) | 264.0 | Water | 13.20 | 39.60 |
| Vitamin D3 (100,000 IU/g) (non-polar compound) | 210 | Oil | 10.50 | 31.5 |
| Benzyl alcohol (preservative/natural flavor) | 10.000 | Oil | 0.50 | 1.5 |
| N-Creamer 46 (modified food starch) | 100.00 | Oil | 5.00 | 15.000 |
| Citric acid (pH adjuster) | 5.60 | Emulsion/Flavor | 0.2800 | 0.8400 |
| Totals | 2000.00 | | 100.000 | 300 |

TABLE 4

Liquid nanoemulsion concentrate 1C containing 5.65% Clarinol CLA with 4% conjugated linoleic acid (5% overage)

| Ingredient | mg/1 mL serving | Phase | wt % of composition | g/batch |
|---|---|---|---|---|
| Water (polar solvent) | 1507.40 | Water | 75.370 | 226.11 |
| N-Creamer 46 (modified food starch) | 264.0 | Water | 13.20 | 39.60 |
| Clarinol CLA (74.5% CLA)* (non-polar compound) | 113 | Oil | 5.65 | 17.0 |
| Benzyl alcohol (preservative/natural flavor) | 10.000 | Oil | 0.50 | 1.5 |
| N-Creamer 46 (modified food starch) | 100.000 | Oil | 5.00 | 15.000 |
| Citric acid (pH adjuster) | 5.60 | Emulsion/Flavor | 0.2800 | 0.8400 |
| Totals | 2000.00 | | 100.000 | 300 |

TABLE 5

Liquid nanoemulsion concentrate 1D containing 11.50% Clarinol CLA with 8% conjugated linoleic acid (5% overage)

| Ingredient | mg/1 mL serving | Phase | wt % of composition | g/batch |
|---|---|---|---|---|
| Water (polar solvent) | 1390.40 | Water | 69.520 | 208.56 |
| N-Creamer 46 (modified food starch) | 264.0 | Water | 13.20 | 39.60 |
| Clarinol CLA (74.5% CLA)* (non-polar compound) | 230 | Oil | 11.50 | 34.5 |
| Benzyl alcohol (preservative/natural flavor) | 10.000 | Oil | 0.50 | 1.5 |
| N-Creamer 46 (modified food starch) | 100.000 | Oil | 5.00 | 15.000 |
| Citric acid (pH adjuster) | 5.60 | Emulsion/Flavor | 0.2800 | 0.8400 |
| Totals | 2000.00 | | 100.000 | 300 |

C. Evaluation of the Clarity of the Liquid Nanoemulsion Concentrates

The clarity of concentrates 1A-1D listed in Tables 2-5, above, was tested by diluting 1 g of a concentrate in 8 oz. of water. The turbidity values (in NTUs) of each concentrate are listed in Table 6, below.

TABLE 6

Turbidity of liquid nanoemulsion concentrates containing a modified food starch

| Liquid nanoemulsion concentrate | Turbidity (NTU) |
|---|---|
| 1A | 13.7 |
| 1B | 15 |
| 1C | 20 |
| 1D | 28 |

Example 2

Liquid Dilution Compositions

Flavored waters (liquid dilution compositions/beverage compositions) were prepared that used the liquid nanoemulsion concentrates that contain various non-polar compounds that contain non-polar active ingredients, described in Example 1, above. Each of the flavored waters contained potassium bicarbonate and citric acid as a stabilizing system for the non-polar active ingredients. The liquid dilution compositions were prepared according to the following general bench-top method.

A. Production of the Liquid Dilution Compositions

Water, green tea and the non-polar active ingredients (including the liquid nanoemulsion concentrates that contain non-polar active ingredients, prepared according to Example 1) were added to a Pyrex beaker and mixed until dissolved using a standard overhead mixer (IKA® model No. RE-16 1S) compatible with the bench-top process. Potassium bicarbonate and, when needed, an antifoaming agent (such as Tramfloc 1147, sold by Tramfloc Inc, Formey, Tex.), were added to the beaker and mixed and heated to 80° C. using a Thermolyne hot plate (Model No. SP46615; Barnstead International, Dubuque, Iowa). Sweeteners and flavors were added while mixing and maintained at a temperature of 80° C., followed by addition of citric acid (while mixing). The solution was hot filled into a container and sealed. The container was cooled to 30° C. and stored at room temperature. The final pH of each flavored water was approximately 3-3.98.

B. Liquid Dilution Composition Ingredients

Flavored waters (liquid dilution compositions) were prepared containing the liquid nanoemulsion concentrations prepared according to Example 1, above. Additional ingredients included a green tea extract that contained 60% EGCG (epigallocatechin gallate) (sold by Guilin Layn Natural Ingredients Corp., Guilin, China); pink grapefruit flavor (sold by Gold Coast Ingredients, Commerce, Calif.; Product No. 346481); the non-polar active ingredients vitamin B1 (thiamine); vitamin B3 (niacin/niacinamide); vitamin B5 (pantothenic acid); vitamin B6; and vitamin B12; the sweeteners sucralose (FCC VI Grade; manufactured by Changzhou Tianhua Imports & Exports Co., Ltd; sold by Ausvita) and xylitol (Nutra Food Ingredients, Kentwood, Mich.); an antifoaming agent (such as Tramfloc 1147, sold by Tramfloc Inc, Formey, Tex.); a stabilizing system for the non-polar active ingredients made up of potassium bicarbonate and citric acid; and water, which is deionized water.

Table 7, below, sets forth the amount of each ingredient included in a 16 oz. (474 mL) serving of a liquid dilution composition (flavored water) that contained 0.338 wt % of the fish oil concentrate 1A and 0.002 wt % of the vitamin D3 concentrate 1B prepared according to Example 1, above.

TABLE 7

Grapefruit-flavored water containing a liquid nanoemulsion concentrate containing fish oil

| Ingredient | g per batch | mg per serving | wt % (of composition) |
|---|---|---|---|
| Water | 1936.80383 | 459022.50740 | 96.840 |
| Fish oil concentrate 1A (2% EPA/DHA) (non-polar active ingredient) | 6.75105 | 1600.00000 | 0.338 |
| Green tea extract (60% EGCG) (non-polar active ingredient) | 0.21097 | 50.00000 | 0.011 |

TABLE 7-continued

Grapefruit-flavored water containing a liquid nanoemulsion concentrate containing fish oil

| Ingredient | g per batch | mg per serving | wt % (of composition) |
|---|---|---|---|
| Vitamin D3 concentrate 1B (100,000 IU/g) (non-polar active ingredient) | 0.04388 | 10.40000 | 0.002 |
| Vitamin B1 (thiamine) + 5% (non-polar active ingredient) | 0.00270 | 0.64000 | 0.000135 |
| Vitamin B3 (niacin/niacinamide) + 5% (non-polar active ingredient) | 0.03544 | 8.40000 | 0.002 |
| Vitamin B5 (pantothenic acid) + 5% (non-polar active ingredient) | 0.02236 | 5.30000 | 0.001 |
| Vitamin B6 + 5% (non-polar active ingredient) | 0.00591 | 1.40000 | 0.0002955 |
| Vitamin B12 + >5% (non-polar active ingredient) | 0.00001 | 0.00260 | 0.0000005 |
| Pink grapefruit (flavor) | 3.53376 | 837.50000 | 0.177 |
| Sucralose (sweetener) | 0.26941 | 63.85000 | 0.013 |
| Xylitol (sweetener) | 20.00000 | 4740.00000 | 1.000 |
| Citric acid (stabilizer) | 18.39662 | 4360.00000 | 0.9198 |
| Potassium bicarbonate (stabilizer) | 13.92405 | 3300.00000 | 0.696 |
| Total | 2000 | 474000 | 100 |

Example 3

Production of Higher Dimer d-α-Tocopheryl Polyethylene Glycol 1000 Succinate Compositions d-α-Tocopheryl polyethylene glycol 1000 succinate (TPGS 1000) compositions containing high TPGS dimers was synthesized from vitamin E succinate according to the following general procedure reproduced from U.S. Provisional Application Ser. No. 61/852,243, filed Mar. 15, 2013, filed as U.S. application Ser. No. 14/207,310.

Polyethylene glycol (PEG) 1000 (168.7 kg) was added to a reaction flask containing 1430 L of toluene, followed by the addition of 71.5 kg of vitamin E (α-tocopheryl acid) succinate and 2.86 kg of p-toluene sulfonic acid. The reaction mixture was heated to 110-112° C. and refluxed for up to 6.5 hours, removing the water formed during the esterification reaction by azeotropic distillation. The reaction was terminated when the desired amounts of TPGS monomer and TPGS dimer were formed, as indicated by high performance liquid chromatography (HPLC) and thin layer chromatography (TLC), resulting in TPGS compositions that contained between 39.35% and 60.00% TPGS monomer and 29.27% and 54.90% TPGS dimer and a total of between 74.91% and 98.10% TPGS monomer plus TPGS dimer. Each TPGS composition was formed by terminating the reaction at a different time point, up to 6.5 hours, to obtain the various amounts of TPGS monomer and TPGS dimer.

The remainder of the TPGS compositions was made up of unreacted starting materials, such as vitamin E and PEG. The reaction was terminated by cooling the reaction mixture to room temperature, followed by washing with 25 L of a 10% solution of $NaHCO_3$. The solution stirred for 10 minutes, and after stirring was allowed to separate into layers. The organic (toluene) layer was removed, 6 kg of activated carbon (charcoal) was added, and the solution was heated to 55-60° C. and maintained at this temperature for 1 hour. The solution was then cooled to room temperature, filtered through 10 kg of Celite® Hyflo® filter aid (Sigma Aldrich, St. Louis, Mo.) and then washed with 100 L of toluene. The filtered toluene solution was concentrated by vacuum distillation below 60° C. to remove the toluene. Water (140 L) was added to remove traces of toluene and was then removed via vacuum distillation below 60° C. to obtain ~180 kg of a crude α-tocopheryl polyethylene glycol 1000 succinate composition that contained a mixture of TPGS monomer and TPGS dimer, along with unreacted PEG 1000 and α-tocopherol.

TABLE 8

Amounts of TPGS monomer and TPGS dimer formed during reaction

| TPGS composition | Monomer (%) | Dimer (%) | Total (% monomer + % dimer) |
|---|---|---|---|
| 1 | 43.90 | 53.90 | 97.80 |
| 2 | 42.80 | 48.80 | 91.60 |
| 3 | 40.95 | 53.15 | 94.10 |
| 4 | 43.52 | 49.80 | 93.32 |
| 5 | 55.88 | 29.27 | 85.15 |
| 6 | 52.92 | 33.70 | 86.62 |
| 7 | 42.76 | 51.10 | 93.86 |
| 8 | 40.39 | 54.90 | 95.29 |
| 9 | 57.70 | 40.40 | 98.10 |
| 10 | 39.35 | 35.56 | 74.91 |
| 11 | 60.00 | 38.10 | 98.10 |

A series of extractions were performed on the crude TPGS composition. The crude TPGS composition (~180 kg) was dissolved in 360 L of methanol and then 540 L of cyclohexane was added. The solution was stirred and then allowed to separate into layers. The cyclohexane layer was removed and an additional 540 L of cyclohexane was added to the remaining methanol layer. The solution was stirred and then allowed to separate into layers. The cyclohexane layer was again removed and an additional 540 L of cyclohexane was added to the remaining methanol layer. The solution was again stirred and allowed to separate into layers. The cyclohexane layer was removed, and the remaining methanol layer was further diluted with an additional 270 L of methanol. Activated carbon (18 kg) was added and the solution was heated to 55-60° C. and maintained at this temperature for 1 hour. The solution was then cooled to room temperature, filtered through 30 kg of Celite® Hyflo® filter aid, and washed with 100 L of methanol. The methanol solution was passed through a micron filter, then concentrated via vacuum distillation below 60° C. to obtain-98-102 kg of a TPGS composition. All traces of solvent were then removed by purging with nitrogen at 55° C. for two hours to obtain-98-102 kg of a purified TPGS composition that contained TPGS monomer and TPGS dimer.

One typical batch of TPGS prepared to contain high dimer concentration, and used in the Examples below, had the following components:
Dimer—51%
Monomer—48%
Vitamin E—0.42%
Vitamin E succinate—0.46%.
Other typical batches contained:
Mono-TPGS 46.09% w/w-43.15% w/w
Di-TPGS 39.07% w/w-50.28% w/w
Other up to about 3%-3.2% w/w Example 4

Liquid Nanoemulsion Concentrates Containing a Modified Food Starch and a Water-Soluble Vitamin E Composition Liquid nanoemulsion concentrates that contained a modified food starch and a TPGS composition described above in Example 3 were prepared according to the method described below using a bench-top process. The concentrates contained between 10.5% and 20.5%, by weight, one or more non-polar compounds that contain one or more non-polar active ingredients. Before adding to the appropriate phase, as described below, the correct amount of each ingredient (as indicated in Tables 9-11) was weighed out using either a Sartorius Basic Analytical Scale (Model No. BA110S) or a CTS 6000 Scale (Model No. CTS-6000). Liquid ingredients were weighed in containers, while dry ingredients were weighed in bags.

A. Production of the Liquid Nanoemulsion Concentrates

1. Production of the Water Phase:

The water phase was prepared in a 1500 mL Pyrex beaker. The appropriate amount of deionized water was added to the beaker. The switch controlling the pump and UV sterilizer was then turned off.

The beaker containing the water (or other polar solvent) was placed onto a Thermolyne hot plate (Model No. SP46615). An Arde Barinco reversible homogenizer (Model No. CJ-4E; Arde Barinco, Inc., Norwood, N.J.) was immersed in the water and turned on, using the "forward" setting, at a speed of 30 rpm. The water phase was then heated to 60° C. using the Thermolyne Hotplate while slowly mixing at 30 rpm. The Arde Barinco mixer was then raised and switched to the "reverse" setting to create a vortex.

The indicated amount of modified food starch was added to the water phase beaker at 60° C. Mixing was continued at 60° C. until the food starch was mostly dispersed in the water phase and until the water phase was ready to be combined with the oil phase. Temperatures were measured with a pH and temperature meter (Hanna Instruments, Model No. HI 8314).

2. Production of the Oil Phase:

The oil phase was prepared in a 1500 mL Pyrex beaker. The indicated amounts of the TPGS composition prepared according to the method described above in Example 3 and benzyl alcohol were added to the oil phase beaker and heated to 60° C. using a Thermolyne hot plate while mixing with an IKA Mixer (Model No. RE16 S1). After the TPGS and benzyl alcohol were dissolved, the indicated amount of non-polar compound(s) and other "oil phase" ingredients were added, including additional modified food starch, and mixed with the IKA Mixer at 60° C. until ready to combine with the water phase. Temperatures were measured with a pH and temperature meter (Hanna Instruments, Model No. HI 8314).

3. Combining the Water and Oil Phases

Once the water phase and oil phase had been prepared and were at 60° C., the Arde Barinco homogenizer was turned on the "forward" setting at 30 rpm in the water phase beaker and the oil phase was transferred to the water phase beaker by slowly and consistently pouring from the top. Mixing with the homogenizer at 30 rpm continued until the phases had combined.

The ingredients were mixed and cooled in a water bath until the mixture reached 50° C. The indicated amount of pH adjuster was then added and the mixture was continuously mixed at 30 rpm using the Arde Barinco mixer on "forward" and further cooled to 30° C. The mixture was then filtered through a 100-200 micron filter. Additional water was added to account for any evaporation that had occurred during the process. Temperatures and pH were measured with a temperature and pH meter (Hanna Instruments, Model No. HI 8314). The pH of each mixture was measured to confirm the pH was between 2.60 and 3.20.

4. Analysis and Packaging

The resulting concentrates were analyzed to verify that the specified amounts of active and other ingredients were present and that the levels of microbiologicals and heavy metals were in accordance with standards, as described herein. USP standard testing by Eurofins U.S. (Des Moines, Iowa) verified that the products contained not more than 1,000 cfu/g microbes and was negative for *E. coli* and *Salmonella*; ICP/MS testing by Eurofins U.S. verified that the products contained not more than 10 ppm heavy metals, not more than 0.2 ppm lead and not more than 2 ppm arsenic. Fourier transform infrared spectroscopy (FTIR) was used to obtain a fingerprint of the product which was then compared to high performance liquid chromatography (HPLC) standards, to verify that no other compounds except the desired ingredients were present in the product.

B. Liquid Nanoemulsion Concentrate Ingredients

A series of liquid nanoemulsion concentrates (4A-4C) were prepared according to the procedure described above in 300 g batches. Tables 9-11 below indicate the amount (in mg) of each ingredient contained per 1 mL serving of each liquid nanoemulsion concentrate and the percentage by weight (wt %) and amount (g) of each ingredient per batch. The column labeled "phase" indicates to which phase of the production process (described above) each ingredient was added. "Water" indicates that a particular ingredient was added during production of the water phase, "oil" indicates the ingredient was added during production of the oil phase and "emulsion/flavor" indicates the ingredient was added during or after mixing of the water and oil phases.

The liquid nanoemulsion concentrates included:
a modified food starch based on waxy maize, sold under the name N-Creamer 46, available from Ingredion (Westchester, Ill.);
TPGS prepared as described in Example 3 above;
a natural (GRAS-certified) preservative, benzyl alcohol;
a pH adjuster, citric acid;
a polar solvent, water, which was deionized water; and
one or more non-polar compounds that included:
a conjugated linoleic acid (CLA) that contains 74.5% CLA (Clarinol® CLA, Stepan Lipid Nutrition, Maywood, N.J.); and
a medium chain triglyceride (MCT) oil that contained caprylic acid (C8; 66%) and capric acid (C10; 32%), such as Neobee® M-5 (Stepan Lipid Nutrition, Maywood, N.J.).

TABLE 9

Liquid nanoemulsion concentrate 4A containing 11.5% Clarinol CLA and 8% conjugated linoleic acid

| Ingredient | mg/1 mL serving | Phase | wt % of composition | g/batch |
|---|---|---|---|---|
| Water (polar solvent) | 1350.40 | Water | 67.520 | 202.56 |
| N-Creamer 46 (modified food starch) | 204.0 | Water | 10.20 | 30.60 |
| Clarinol CLA (74.5% CLA)* (non-polar compound) | 230 | Oil | 11.50 | 34.5 |
| TPGS | 100.000 | Oil | 5.00 | 15.000 |
| Benzyl alcohol (preservative/natural flavor) | 10.000 | Oil | 0.50 | 1.5 |
| N-Creamer 46 (modified food starch) | 100.000 | Oil | 5.00 | 15.000 |
| Citric acid (pH adjuster) | 5.60 | Emulsion/Flavor | 0.2800 | 0.8400 |
| Totals | 2000.00 | | 100.000 | 300 |

TABLE 10

Liquid nanoemulsion concentrate 4B containing 10.5% MCT oil

| Ingredient | mg/1 mL serving | Phase | wt % of composition | g/batch |
|---|---|---|---|---|
| Water (polar solvent) | 1370.40 | Water | 68.520 | 205.56 |
| N-Creamer 46 (modified food starch) | 204.0 | Water | 10.20 | 30.60 |
| MCT oil (non-polar compound) | 210 | Oil | 10.50 | 31.5 |
| TPGS | 100.000 | Oil | 5.00 | 15.000 |
| Benzyl alcohol (preservative/natural flavor) | 10.000 | Oil | 0.50 | 1.5 |
| N-Creamer 46 (modified food starch) | 100.000 | Oil | 5.00 | 15.000 |
| Citric acid (pH adjuster) | 5.60 | Emulsion/Flavor | 0.2800 | 0.8400 |
| Totals | 2000.00 | | 100.000 | 300 |

TABLE 11

Liquid nanoemulsion concentrate 4C containing 20.5% MCT oil

| Ingredient | mg/1 mL serving | Phase | wt % of composition | g/batch |
|---|---|---|---|---|
| Water (polar solvent) | 1170.40 | Water | 58.520 | 175.56 |
| N-Creamer 46 (modified food starch) | 204.0 | Water | 10.20 | 30.60 |
| MCT oil (non-polar compound) | 410 | Oil | 20.50 | 61.5 |
| TPGS | 100.000 | Oil | 5.00 | 15.000 |
| Benzyl alcohol (preservative/natural flavor) | 10.000 | Oil | 0.50 | 1.5 |
| N-Creamer 46 (modified food starch) | 100.000 | Oil | 5.00 | 15.000 |
| Citric acid (pH adjuster) | 5.60 | Emulsion/Flavor | 0.2800 | 0.8400 |
| Totals | 2000.00 | | 100.000 | 300 |

C. Evaluation of the Clarity of the Liquid Nanoemulsion Concentrates

The clarity of concentrates 4A-4C listed in Tables 9-11, above, was tested by diluting 1 g of a concentrate in 8 oz. of water. The turbidity values (in NTUs) of each concentrate are listed in Table 12, below.

TABLE 12

Turbidity of liquid nanoemulsion concentrates containing a modified food starch and TPGS

| Liquid nanoemulsion concentrate | Turbidity (NTU) |
|---|---|
| 4A | 18 |
| 4B | 14 |
| 4C | 21 |

Since modifications will be apparent to those of skill in the art, it is intended that this invention be limited only by the scope of the appended claims.

The invention claimed is:

1. A composition, comprising:
   a) a modified food starch in an amount between about 1% and about 70%, by weight, of the composition;
   b) a water-soluble vitamin E derivative mixture present in an amount from 1% to 98%, inclusive, by weight, of the composition, wherein: the water-soluble vitamin E derivative mixture comprises:
   at least 13 wt % of a water-soluble vitamin E derivative dimer; and
   up to 87%, by weight, of a water-soluble vitamin E derivative monomer;
   wherein the water-soluble vitamin E derivative dimer is a polyethylene glycol (PEG) derivative of vitamin E; and
   c) a non-polar compound or a mixture of non-polar compounds other than the water-soluble vitamin E derivative mixture.

2. The composition of claim 1, wherein the water soluble vitamin E derivative mixture comprises between about 35 weight % and about 55 weight % of the water-soluble vitamin E derivative dimer.

3. The composition of claim 1, further comprises a polar solvent in an amount between about 1% and about 95%, by weight, of the composition.

4. The composition of claim 3, wherein the polar solvent is present in an amount up to about 80%, by weight, of the composition.

5. The composition of claim 1, wherein the composition is for direct consumption.

6. The composition of claim 1, wherein the composition is a concentrate.

7. The composition of claim 6, wherein the composition is an emulsion concentrate.

8. The composition of claim 4, wherein the amount of the non-polar compound or the mixture of non-polar compounds other than the water-soluble vitamin E derivative mixture is between about 0.001% and about 25%, by weight, of the composition.

9. The composition of claim 1, wherein the modified food starch is in an amount between about 1% and about 30%, by weight, of the composition.

10. The composition of claim 1, wherein the water soluble vitamin E derivative mixture is in an amount between about 1% and about 35%, by weight, of the composition.

11. The composition of claim 3, wherein the polar solvent is present in an amount between about 55% and about 90%, by weight, of the composition.

12. The composition of claim 9, wherein the modified food starch in an amount between about 2% and about 25%, by weight, of the composition.

13. The composition of claim 1, further is an emulsion concentrate, comprising:
the modified food starch is in an amount between about 5% and about 25%, by weight, of the composition;
the water soluble-vitamin E derivative mixture is in an amount between about 1% and about 30%, by weight, of the composition; and
wherein the non-polar compound or the mixture of non-polar compounds other than the water-soluble vitamin E derivative mixture, is one or more non-polar compounds in an amount between about 5% and about 30%, by weight, of the composition.

14. The composition of claim 1, wherein the water soluble vitamin E derivative mixture is: tocopheryl polyethylene glycol succinate (TPGS), tocopheryl sebacate polyethylene glycol, tocopheryl dodecanodioate polyethylene glycol, tocopheryl suberate polyethylene glycol, tocopheryl azelaate polyethylene glycol, tocopheryl citraconate polyethylene glycol, tocopheryl methylcitraconate polyethylene glycol, tocopheryl itaconate polyethylene glycol, tocopheryl maleate polyethylene glycol, tocopheryl glutarate polyethylene glycol, tocopheryl glutaconate polyethylene glycol and tocopheryl phthalate polyethylene glycol, TPGS analogs or TPGS homologs.

15. The composition of claim 14, wherein the water soluble vitamin E derivative mixture is α-tocopheryl polyethylene glycol succinate (TPGS).

16. The composition of claim 15, wherein the water soluble vitamin E derivative mixture is α-tocopheryl polyethylene glycol succinate 1000.

17. The composition of claim 9, wherein the modified food starch is: a modified corn, potato, wheat, rice, tapioca, sago, oat, barley, amaranth, waxy corn, cassava, waxy barley, waxy rice, glutinous rice or sweet rice starch.

18. A food or beverage, comprising the composition of claim 1.

19. The composition of claim 1, wherein the water soluble vitamin E derivative mixture is present in an amount between about 5% and about 15%, by weight, of the composition.

20. The composition of claim 1, wherein the modified food starch is: a modified corn, potato, wheat, rice, tapioca, sago, oat, barley, amaranth, waxy corn, cassava, waxy barley, waxy rice, glutinous rice or sweet rice starch.

21. The composition of claim 1, wherein the modified food starch is an octenyl succinate starch that is: a sodium octenyl succinate starch, calcium octenyl succinate starch or aluminum octenyl succinate starch.

22. The composition of claim 1, wherein the modified food starch is a sodium octenyl succinate waxy corn starch.

23. The composition of claim 1, wherein the non-polar compound or the mixture of non-polar compounds other than the water-soluble vitamin E derivative mixture, comprise: polyunsaturated fatty acids, coenzyme Q-containing active ingredients, oil soluble vitamins other than a vitamin E, alpha lipoic acid, medium chain triglycerides, a cannabinoid or carotenoid-containing active ingredients and phytochemicals.

24. The composition of claim 23, wherein the polyunsaturated fatty acids are: omega-3 fatty acids, omega-6 fatty acids, conjugated fatty acids, pyrroloquinoline quinines, beta caryophyllenes (BCP) or mixtures thereof.

25. The composition of claim 23, wherein the polyunsaturated fatty acids are: docosahexaenoic acids (DHA), eicosapentaenoic acids (EPA), fish oils, flaxseed oils, borage oils, alpha-linolenic acids (ALA), gamma-linolenic acids (GLA), conjugated linoleic acids (CLA), or saw palmetto extracts.

26. The composition of claim 19, wherein the water soluble vitamin E derivative mixture is tocopheryl polyethylene glycol succinate (TPGS).

27. The composition of claim 1, further comprising a solvent, wherein the solvent is: water, glycerin, propylene glycol, ethylene glycol, tetraethylene glycol, triethylene glycol or trimethylene glycol.

28. The composition of claim 1, further comprising a preservative in an amount between about 0.1% and about 1%, by weight, of the composition.

29. The composition of claim 28, wherein the preservative is benzyl alcohol.

30. A method for preparing the composition of claim 1, a liquid emulsion concentrate, comprising:
(a) generating a water phase by:
(i) heating a polar solvent in a first vessel;
(ii) adding one or more water phase ingredients; and
(iii) mixing until combined;
(b) generating an oil phase by:
(i) heating the water-soluble vitamin E derivative mixture and a preservative in a second vessel, wherein: the water-soluble vitamin E derivative mixture is a high dimer and present in an amount between 2% or about 2% and 10% or about 10%, by weight, of the liquid emulsion concentrate; and the water-soluble vitamin E derivative mixture is a polyethylene glycol (PEG) derivative of vitamin E;
(ii) adding one or more oil phase ingredients, wherein the oil phase ingredients comprise the non-polar compound or the mixture of non-polar compounds other than the water-soluble vitamin E derivative mixture in an amount between 5% or about 5% and 30% or about 30%, by weight, of the liquid emulsion concentrate; and
(iii) mixing until combined; and
(c) emulsifying the oil phase and the water phase, thereby generating the liquid emulsion concentrate;
wherein the one or more oil phase ingredients or the one or more water phase ingredients, contain a modified food starch in an amount between about 8% and about 20%, by weight, of the liquid emulsion concentrate.

31. A method for preparing the composition of claim 1, a liquid emulsion concentrate, comprising:
(a) generating a water phase by:
(i) heating a polar solvent in a first vessel, wherein the polar solvent is present in an amount between about 55% and about 80%, by weight, of the concentrate;
(ii) adding one or more water phase ingredients; and
(iii) mixing until combined;
(b) generating an oil phase by heating one or more oil phase ingredients, wherein the oil phase ingredients comprise the non-polar compound or the mixture of non-polar compounds in an amount between about 5% and about 20%, by weight, of the liquid emulsion concentrate, wherein the non-polar compound or the mixture of non-polar compounds are: polyunsaturated fatty acids, omega-3 fatty acids, omega-6 fatty acids, omega-9 fatty acids, conjugated fatty acids, coenzyme Q-containing active ingredients, oil soluble vitamins other than a vitamin E, alpha lipoic acid, medium chain triglycerides, cannabinoid or carotenoid-containing active ingredients, or phytochemicals; and (c) emulsifying the oil phase and the water phase, thereby generating the liquid emulsion concentrate;

wherein the one or more oil phase ingredients or the one or more water phase ingredients, contain a modified food starch in an amount between about 15% and about 25%, by weight, of the concentrate.

32. A lyophilized or spray dried powder produced by lyophilizing or spray drying the composition of claim 1, a liquid emulsion concentrate.

33. A container, comprising a beverage composition comprising the composition of claim 1, wherein the container is sealed and comprises nitrogen as a preservative, wherein the nitrogen replaces air in the container.

34. The container of claim 33, wherein the container is a bottle or an ampoule.

35. A container, comprising a beverage composition comprising the composition of claim 27, wherein the container is sealed and comprises nitrogen as a preservative, wherein the nitrogen replaces air in the container.

36. The container of claim 35, wherein the container is a bottle or an ampoule.

37. The composition of claim 19, wherein the water soluble-vitamin E derivative mixture is a high dimer-containing the water soluble vitamin E derivative mixture comprising: between 29 weight % of a PEG-derivative of vitamin E dimer and up to 69 weight % of PEG-derivative of vitamin E dimer.

38. The composition of claim 1, further comprising a pH adjuster in an amount less than 5% or about 5%, by weight, of the composition.

39. The composition of claim 1, wherein the non-polar compound or the mixture of non-polar compounds other than the water-soluble vitamin E derivative mixture, comprise polyunsaturated fatty acids, coenzyme Q-containing active ingredients, oil soluble vitamins other than a vitamin E, alpha lipoic acid, medium chain triglycerides, a cannabinoid or carotenoid-containing active ingredients, phytochemicals, or mixtures thereof.

40. The composition of claim 39, wherein the non-polar compounds other than the water-soluble vitamin E derivative mixture are: polyunsaturated fatty acids; wherein the polyunsaturated fatty acids are: selected from among omega-3 fatty acids, omega-6 fatty acids, conjugated fatty acids, pyrroloquinoline quinine, beta-caryophyllene (BCP) or mixtures thereof.

41. The composition of claim 1, wherein the water-soluble vitamin E derivative mixture contains 29%-69%, inclusive, of a dimer, by weight of the water-soluble vitamin E derivative mixture.

* * * * *

UNITED STATES PATENT AND TRADEMARK OFFICE
CERTIFICATE OF CORRECTION

PATENT NO. : 9,693,574 B2  
APPLICATION NO. : 14/449880  
DATED : July 4, 2017  
INVENTOR(S) : Philip J. Bromley Page 1 of 1

It is certified that error appears in the above-identified patent and that said Letters Patent is hereby corrected as shown below:

Please replace Claim 39 with the following amended claim:
39. The composition of claim 1, wherein the non-polar compound or the mixture of non-polar compounds other than the water-soluble vitamin E derivative mixture, comprise polyunsaturated fatty acids, coenzyme Q-containing active ingredients, oil soluble vitamins other than a vitamin E, alpha lipoic acid, medium chain triglycerides, cannabinoid or carotenoid-containing active ingredients, phytochemicals, or mixtures thereof.

Signed and Sealed this  
Tenth Day of April, 2018

Andrei Iancu  
*Director of the United States Patent and Trademark Office*